US012559316B2

(12) United States Patent
Dayrell

(10) Patent No.: US 12,559,316 B2
(45) Date of Patent: Feb. 24, 2026

(54) ADVANCED WAREHOUSE AND LOGISTIC SYSTEMS USING AUTONOMOUS MOBILE LIFT ROBOTS

(71) Applicant: Ivan Araujo Dayrell, Belo Horizonte (BR)

(72) Inventor: Ivan Araujo Dayrell, Belo Horizonte (BR)

( * ) Notice: Subject to any disclaimer, the term of this patent is extended or adjusted under 35 U.S.C. 154(b) by 1131 days.

(21) Appl. No.: 17/531,763

(22) Filed: Nov. 21, 2021

(65) Prior Publication Data

US 2022/0250841 A1 Aug. 11, 2022

Related U.S. Application Data

(63) Continuation-in-part of application No. 17/384,720, filed on Jul. 24, 2021, now Pat. No. 12,344,472, which is a continuation-in-part of application No. 15/970,607, filed on May 3, 2018, now Pat. No. 11,104,547.

(60) Provisional application No. 62/501,201, filed on May 4, 2017.

(51) Int. Cl.
| | |
|---|---|
| *B65G 1/137* | (2006.01) |
| *B65G 1/04* | (2006.01) |
| *B65G 1/06* | (2006.01) |
| *B66B 11/00* | (2006.01) |
| *B66B 11/04* | (2006.01) |
| *G05D 1/00* | (2024.01) |

(52) U.S. Cl.
CPC ......... *B65G 1/1373* (2013.01); *B65G 1/0471* (2013.01); *B65G 1/065* (2013.01); *B66B* 11/005 (2013.01); *B66B 11/0461* (2013.01); *G05D 1/0274* (2013.01)

(58) Field of Classification Search
CPC .... B65G 1/0492; B65G 1/065; B65G 1/0471; B65G 1/1373
See application file for complete search history.

(56) References Cited

U.S. PATENT DOCUMENTS

| | | | |
|---|---|---|---|
| 7,381,022 B1 * | 6/2008 | King | B65G 1/1375 414/807 |
| 8,721,250 B2 * | 5/2014 | Razumov | B65G 1/0492 198/463.3 |

* cited by examiner

*Primary Examiner* — Michael Mccullough
(74) *Attorney, Agent, or Firm* — Z IP Law PLLC

(57) ABSTRACT

An advanced warehouse and logistic system that comprises autonomous mobile lift robots and a rack lattice system that has a hinged rack lattice structure and has rack rail lattice structure both of which allow multiple autonomous mobile lift robots to move independently through the rack lattice structure to move goods and load trucks and other vehicles. A first and second embodiment of the autonomous mobile lift robot of the present invention comprising a plurality of driving trains having a first gear mounted perpendicularly to a second gear and a plurality of gears and driving motors having a movable gear configured to be positioned vertically or horizontally to have the autonomous mobile lift robot be movable in an up, down, left, and right direction depending on the geometry of the rack lattice structure and on the position of the plurality of gears of autonomous mobile lift robot.

16 Claims, 101 Drawing Sheets

ADVANCED WAREHOUSE AND LOGISTIC SYSTEMS USING AUTONOMOUS MOBILE LIFT ROBOTS

CROSS-REFERENCE TO RELATED APPLICATIONS

This application is a continuation-in-part of U.S. patent application Ser. No. 17/384,720 filed on Jul. 24, 2021, entitled ADVANCED WAREHOUSE AND LOGISTICS SYSTEMS USING AUTONOMOUS MOBILE LIFT ROBOTS that claims priority to U.S. Pat. No. 11,104,547 issued on Aug. 31, 2021 entitled AUTONOMOUS MOBILE LIFT which claims priority to U.S. Provisional Patent Application No. 62/501,201 filed May 4, 2017 entitled AUTONOMOUS MOBILE LIFT which are all hereby incorporated herein by reference in their entireties.

FIELD OF THE INVENTION

The present invention is related to the storage and movement of goods in a warehouse and the logistics to load them into trucks and other vehicles and more specifically to an advanced warehouse and logistic system that comprises autonomous mobile lift robots and a rack lattice system that in a first embodiment has a hinged rack lattice structure and in a second embodiment that has rack rail lattice structure both of which allow multiple autonomous mobile lift robots to move independently through the rack lattice structure to move goods and load trucks and other vehicles. The first embodiment of the autonomous mobile lift robot of the present invention comprising a plurality of driving trains having a first gear mounted perpendicularly to a second gear to have the autonomous mobile lift robot be movable in an up, down, left, and right direction depending on the geometry of the rack lattice structure. The second embodiment of the autonomous mobile lift robot of the present invention comprising a plurality of gears and driving motors having a movable gear configured to be positioned vertically or horizontally to have the autonomous mobile lift robot be movable in an up, down, left, and right direction depending on the position of the plurality of gears of autonomous mobile lift robot.

BACKGROUND

The storage of goods in warehouses is central to the modern society and has allowed the flourishment of e-commerce. Gains in efficiency and speed have increased the availability of a wide variety of goods at affordable prices.

The steady and continuing increase of automation is a recent trend that has not yet reached its full potential. Wholesale and retail companies are constantly looking for an edge in efficiency and cost reduction to face ever more fierce competition.

The current state-of-the-art warehouse design and associated automatic retrieving and movement robots offers a substantial advantage when compared to a traditional warehouse with no automation but is still inefficient in many ways and has many weak points that can be improved.

The available technologies for pallet storage and movement require the use of different machines: forklifts are used to load and unload trucks; robots are used to move the pallets inside the warehouse; and fixed shelf row robots are used to place the pallets in their designated spots. This requires the exchange of pallets from one machine to another and may cause delays, damage and mistakes. Additionally, maintenance costs to service different machines are higher, capital costs are high due to the need to set up fixed robots for each shelf row using up valuable floor space, and efficiency is low as each shelf row robot can typically handle only one pallet at a time.

A better solution that reduces floor space wasted with fixed machines and allows the storage of more pallets loaded with goods for a given warehouse volume, and a single robot that can handle the pallets seamlessly from inside the truck all the way to its designated storage spot at a greater speed is needed. Additionally, the warehouse design must allow for the simultaneous handling of a large number of trucks loading and unloading goods without producing choke points inside the warehouse.

SUMMARY OF THE INVENTION

Technical Problem

The existing warehouse designs of the prior art require large areas for the installation of fixed shelf row robots with the movement of loaded robots and/or forklifts wasting valuable floor space and increasing capital costs.

The shelf row robots can typically handle only one pallet at a time, this produces a choke point that seriously limits the capacity to service multiple trucks loading and unloading at a given time.

Loaded and unloaded robots and/or forklifts require space to maneuver inside the warehouse and additional floor space is required to avoid choke points.

The multiple transfers from one machine to another causes delays and requires intermediate storage places that take yet more floor space, further reducing efficiency and increasing costs.

The traditional warehouse design of the prior art allows for the loading and unloading of trucks typically only in one or two sides of the building, requiring the trucks to be parked side by side. The trucks parked at the end of the truck bay take longer to load and unload than the trucks near the center of the truck bay as the robots need to travel further to collect or deliver the goods.

The use of forklifts to load and unload trucks may cause damage to the pallets and goods caused by human error or tipping.

Technical Solution

An object and advantage of the present invention is a new warehouse design that eliminates the need for fixed robots and forklifts and as a result increases floorspace usage, being able to hold more pallets of goods for a given volume than existing designs.

Another object of the present invention is a shelf design that allows for autonomous mobile lift robots to climb access shafts and reach any storage location without blocking the entire shaft, increasing efficiency, and allowing multiple storage spots to be reached at the same time by different autonomous mobile lift robots in the same shaft.

Another object and advantage of the present invention is a single autonomous mobile lift robot that is configured to pick up, move, and place pallets inside trucks, move inside the warehouse floor and climb the access shafts to take or deposit the pallets on their designated storage spots.

Another object of the present invention is a shelf and a rail rack design within a truck that allows for multiple autonomous mobile lift robots to enter and leave in succession in such a way that all pallets of a given shelf level are loaded or unloaded simultaneously in one operation. The last autonomous mobile lift robot to enter the truck is the first to leave after the pallets are loaded or unloaded.

Another object of the present invention is one or more software applications configured to control the movement of the autonomous mobile lift robots inside the warehouse and in and out of the trucks to maximize efficiency.

Another object of the present invention is a rail rack structure that accommodates pallets of stacked goods, boxes, and containers to increase flexibility in storage based on the dimensions and logistic requirements of the goods.

Another object of the present invention is a versatile rack lattice design having shelving and/or rail racks for flexibility and storage of pallets, boxes, containers or a combination of these items.

Another object of the present invention is a versatile rack lattice structure that can easily be assembled and configured for specific pallet sizes, boxes and containers and a combination of these items. The versatile rack lattice may as desired be easily taken apart, reassembled, and reconfigured for other specific pallet sizes and/or other pre-dimensioned containers to maximize warehouse space.

Another object of the present invention is a versatile rack lattice design having the structural integrity to increase the effective vertical storage area to optimize the use of space within a warehouse.

Advantageous Effects of the Invention

The proposed invention increases efficiency of the warehouse operation in multiple dimensions.

The warehouse is able to hold a higher number of goods in a smaller area when compared with the traditional warehouse design of the prior art, allowing for better usage of existing space.

The warehouse is able to stack a higher number of goods vertically while maintaining structural integrity when compared with the traditional warehouse design of the prior art, allowing for better usage of existing space.

The warehouse design allows for trucks to be parked at any place around the warehouse building at the same average distance to the warehouse shelves reducing travel distance between the truck and the warehouse shelves and maximizing loading and unloading speed.

The rack structure shelf design is simple, flexible and modular, allowing for easy expansion and modifications in the layout. Rack structure shelves of different heights can be used with the same equipment.

Additional levels of rack structure shelves or rail racks can be built on top of an existing operating structure expanding the installed capacity of the warehouse without disturbing the normal operation in any way.

A single autonomous mobile lift robot design is used for all operations, simplifying the operations, reducing maintenance costs, and eliminating the need to transfer cargo from one machine such as a robot and/or forklift to another.

Multiple autonomous mobile lift robots can work simultaneously to accomplish one loading operation, reducing the time it takes to load or unload a truck.

Standardization and reduction of the number of components reduces the cost of equipment and the cost of maintenance.

The warehouse design of the present invention allows for a high number of autonomous mobile lift robots to perform several loading operations and/or unloading operations simultaneously without producing choke points thereby maximizing speed and efficiency.

The present invention is related to an advanced warehouse and logistic system, comprising a rack lattice having a plurality of hinged racks configured to set the geometry of the rack lattice; an autonomous mobile lift robot having a plurality of driving trains, the autonomous mobile lift robot configured to be movable along the rack lattice in an up, down, left, and right direction depending on the geometry of the rack lattice; and wherein the geometry of the rack lattice sets the direction of movement of the autonomous mobile lift robot. In embodiments of the advanced warehouse and logistic system of the present invention a hinged rack of the plurality of hinged racks comprises an internal lock fixture configured to lock the hinged rack in a first position to set the geometry of the rack lattice for movement of the autonomous mobile lift robot in a first direction; an external lock fixture configured to lock the hinged rack in a second position to set the geometry of the rack lattice for movement of the autonomous mobile lift robot in a second direction; and a lock bar configured to set the hinged rack in either the first position or the second position. In embodiments of the advanced warehouse and logistic system of the present invention, the autonomous mobile lift robot comprises an actuator arm configured to move the lock bar from the first position to the second position to set the geometry of the rack lattice. In embodiments of the advanced warehouse and logistic system of the present invention, the rack lattice comprises a plurality of rack poles, each rack pole having frustum shaped teeth, the rack pole configured to support one or more components of the rack lattice. In some embodiments each rack pole has a hinge pin configured to support and pivot one of the plurality of hinged racks. In some embodiments each rack pole has at least one dovetail notch configured for the attachment of a fixed rack having a dovetail pin. In embodiments of the advanced warehouse and logistic system of the present invention, each of the plurality of hinged racks of the rack lattice having a hinge and frustrum shaped teeth. In some embodiments, the rack lattice comprises a rack pole top cover having a lock fixture configured to support the lock bar. In some embodiments, the rack lattice comprises a plurality of plain poles configured to support one or more of a plurality of non-hinged racks. In some embodiments, the rack lattice comprises a plurality of base rack spacers having frustum shaped teeth, a shelf insertion notch, a shelf support, and a rack extension, and wherein the base rack spacer configured to support components of the rack lattice. In some embodiments, the rack lattice comprises a plurality of shelves. In some embodiments, the shelves have a shelf neck and shelf fixation pin configured for insertion in the shelf insertion notch. In some embodiments, the rack lattice comprises a shelf blank having a shelf stub, the shelf blank with shelf stub configured to fill space corresponding to a shelf not installed. In some embodiments, the rack lattice comprises access shafts configured to provide for the autonomous mobile lift robot to reach any storage location without blocking the entire shaft.

In embodiments of the advanced warehouse and logistic system of the present invention, the autonomous mobile lift robot comprises a pantographic lift, the pantographic lift configured to raise a pallet for transport using the autonomous mobile lift robot and lower a pallet to a shelf. In embodiments of the advanced warehouse and logistic system of the present invention comprises a truck having a rack lattice system installed to configure the truck for fast loading using a plurality of autonomous mobile lift robots. In some embodiments, the autonomous mobile lift robot comprises wheels configured to move and maneuver the autonomous mobile lift robot in any direction outside of the rack lattice system. In some embodiments, the autonomous mobile lift robot comprises electronics to establish connection to one or more digital devices for communication to have the one or more digital devices control the operation and movement of the autonomous mobile lift robot. In some embodiments, the autonomous mobile lift robot comprises electronics to establish connection to one or more digital devices for communication to have the one or more digital devices schedule the operations of the autonomous mobile lift robot using one or more software applications. In some embodiments, the autonomous mobile lift robot comprises electronics to establish connection to one or more digital devices for communication to have the one or more software applications map the locations for delivery and schedule the loading of pallets using the autonomous mobile lift robot in the proper order to have the proper goods of each pallet be delivered along a designated route to the proper location. In some embodiments, the autonomous mobile lift robot comprises at least one first gear having tapered teeth, the first gear configured to move the autonomous mobile lift robot in a vertical direction along the frustum shaped teeth of the rack lattice; at least one second gear having tapered teeth mounted perpendicularly to the first gear, the second gear configured to move the autonomous mobile lift robot in a horizontal direction along the frustum shaped teeth of the rack lattice. In some embodiments, the autonomous mobile lift robot comprises a control guide track configured to adjust the angle of the tapered teeth to have the tapered teeth adjust and align within the frustum shaped teeth providing the traction necessary to move the autonomous mobile lift robot case along the frustum shaped teeth of the rack lattice. In some embodiments, the autonomous mobile lift robot comprises a plurality of control disks; at least one driving motor configured to drive one or more of the plurality of control disks; and wherein the control disks configured to move the actuator arm that is configured to move the lock bar from the first position to the second position to move a hinged rack to set the geometry of the rack lattice.

The present invention is also related to an autonomous mobile lift robot, comprising a plurality of tapered gears, the tapered gears configured to move the autonomous mobile lift robot through a rack lattice. In some embodiments, one of each of the plurality of tapered gears are positioned at a corner of the autonomous mobile lift robot. In some embodiments, each of the plurality of tapered gears configured to engage flat teeth tracks of an access shaft of a rack lattice to move the autonomous mobile lift robot up and down through the access shaft. In some embodiments, the autonomous mobile lift robot comprises an actuator assembly configured to extend each the plurality of tapered gears to engage with teeth of a track and configured to retract to disengage with teeth of a track. In some embodiments, the actuator assembly of the autonomous mobile lift robot comprises an actuator comprising a hollow shaft and support pins; at least one support rail having a guide slot; a gear support configured to support one of each of the plurality of tapered gears, the gear support having guide pins, the guide pins configured to slide along the guide slot; a control rod affixed to the gear support, the control rod configured to slide through the hollow shaft of the actuator; and wherein the control rod configured to move through the actuator shaft aligning the guide pins within the guide slot thereby controlling the movement of one of each of the plurality of tapered gears to an extended or retracted position. In some embodiments, the autonomous mobile lift robot comprises a pivoting gear assembly configured to rotate one of each of the plurality of tapered gears. The pivoting gear assembly comprising at least one pivoting support plate having a curved bevel support rail; a bevel gear having an angle control bevel, the angle control bevel configured to engage the curved bevel support rail and rotate the pivoting support plate. In some embodiments, the pivoting gear assembly comprises the at least one pivoting support plate having a guide slot spanning a 45 degree arch; a gear support configured to support one of each of the plurality of tapered gears, the gear support having guide pins, the guide pins configured to slide through the guide slot spanning a 45 degree arch; and wherein the rotation of the bevel gear aligns the guide pins in the guide slot spanning a 45 degree arch thereby controlling the rotational movement of one of each of the plurality of tapered gears. The autonomous mobile lift robot comprising at least one first gear having tapered teeth, the first gear configured to move the autonomous mobile lift robot in a vertical direction along a rack lattice; at least one second gear having tapered teeth mounted perpendicularly to the first gear, the second gear configured to move the autonomous mobile lift robot in a horizontal direction along a rack lattice. The autonomous mobile lift robot comprising a pantographic lift, the pantographic lift configured to raise a pallet, package, or other container for transport using the autonomous mobile lift robot and lower a pallet, package, or other container. The autonomous mobile lift robot comprising a roller, the roller configured to move a shelf having shelf slides. The autonomous mobile lift robot comprising a pantographic lift, the pantographic lift configured to raise a pallet for transport using the autonomous mobile lift robot; a roller configured to move a shelf having shelf slides; and wherein the pantographic lift configured to raise a pallet, package, or other container, the roller configured to slide a shelf supporting the pallet, package, or other container out from under the pallet, package, or other container providing for the removal of the pallet, package, or other container from the shelf for transport of the pallet package, or other container using the autonomous mobile lift robot. The autonomous mobile lift robot comprising wheels configured to move and maneuver the autonomous mobile lift robot in any direction outside of a rack lattice system. The autonomous mobile lift robot comprising electronics to establish connection to one or more digital devices for communication to have the one or more digital devices schedule the operations of the autonomous mobile lift robot using one or more software applications. The autonomous mobile lift robot comprising electronics to establish connection to one or more digital devices for communication to have one or more software applications map the locations for delivery and scheduling the loading of containers, pallets, packages, or other objects on the autonomous mobile lift robot.

The present invention is also related to an advanced warehouse and logistic system, comprising a rack lattice including an access shaft, the access shaft configured to engage a plurality of tapered gears of an autonomous mobile lift robot to provide for the autonomous mobile lift robot to move vertically up and down through the access shaft of the rack lattice. In some embodiments, the access shaft comprising tracks positioned across from one another, the tracks configured to support the autonomous mobile lift robot when moving through the access shaft of the rack lattice. In some embodiments, the rack lattice comprises a plurality of hinged racks, the hinged racks configured to support horizontal and/or vertical movement of an autonomous mobile lift robot having a plurality of first gears positioned perpendicularly to a plurality of second gears, the plurality of first gears configured to move the autonomous mobile lift robot through the rack lattice in a vertical direction and the plurality of second gears configured to move the autonomous mobile lift robot through the rack lattice in a horizontal direction. In some embodiments, the rack lattice comprises an internal lock fixture configured to lock the hinged rack in a first position to set the geometry of the rack lattice for movement of the autonomous mobile lift robot in a first direction; an external lock fixture configured to lock the hinged rack in a second position to set the geometry of the rack lattice for movement of the autonomous mobile lift robot in a second direction; and a lock bar configured to set the hinged rack in either the first position or the second position. In some embodiments, the rack lattice comprises shelves having slides, the shelf slides configured to be engaged with a roller of an autonomous mobile lift robot to have the autonomous mobile lift robot slide the shelf.

These and other features, advantages and improvements according to this invention will be better understood by reference to the following detailed description and accompanying drawings.

BRIEF DESCRIPTION OF DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

Detail

Detail

FIG. 6 is an isometric view of the first step of the assembly process of one embodiment of an advanced warehouse of the present invention using the parts shown in previous FIG. 3 through FIG. 5;

Detail

Detail

Detail

Detail

Detail

Detail

Detail

Detail

Detail

FIG. 22 is an isometric view of one embodiment of the parts used to construct a pantographic lift;

Detail

Detail

Detail

Detail

Detail

Detail

Detail

Detail

Figure 41:
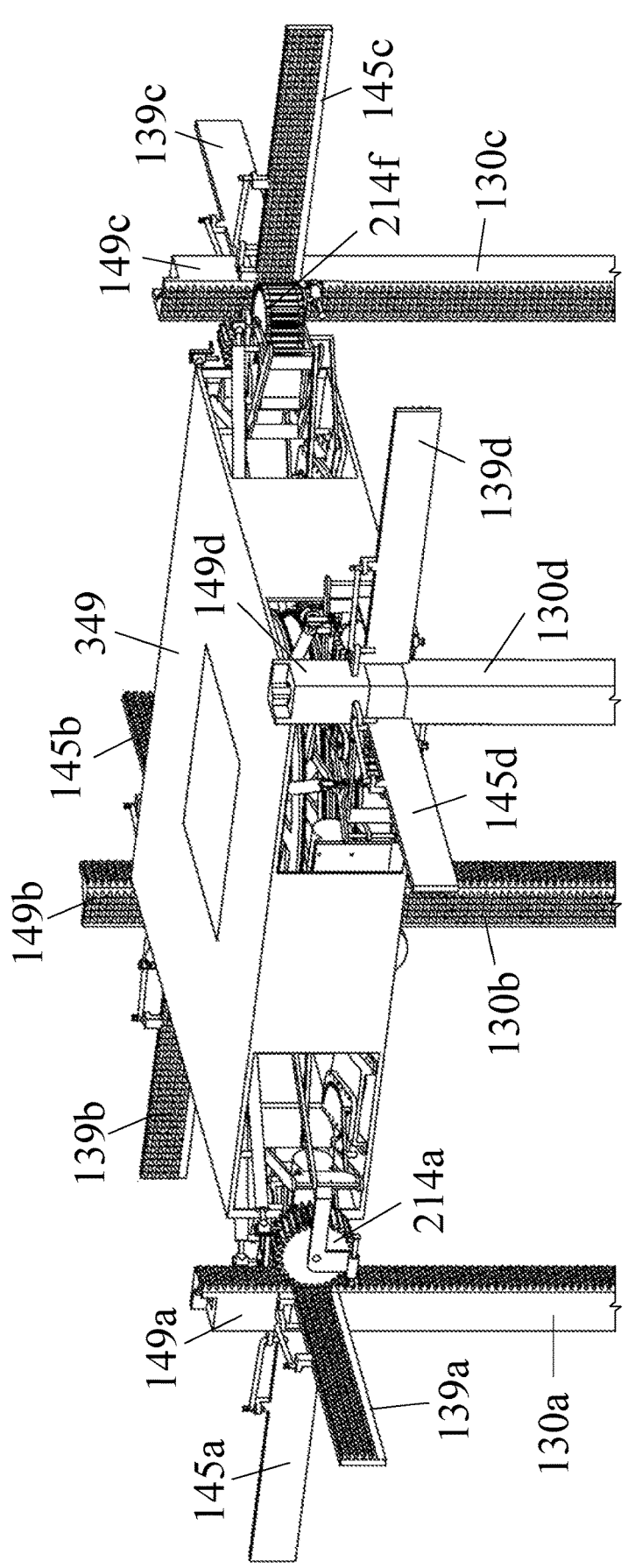
FIG. 41 is an isometric view of one embodiment of the autonomous mobile lift robot of the present invention and moving components of the advanced warehouse of the present invention in a first position to explain the process of manipulation of the moving components of the advanced warehouse by the autonomous mobile lift robot.
Figure 41A:
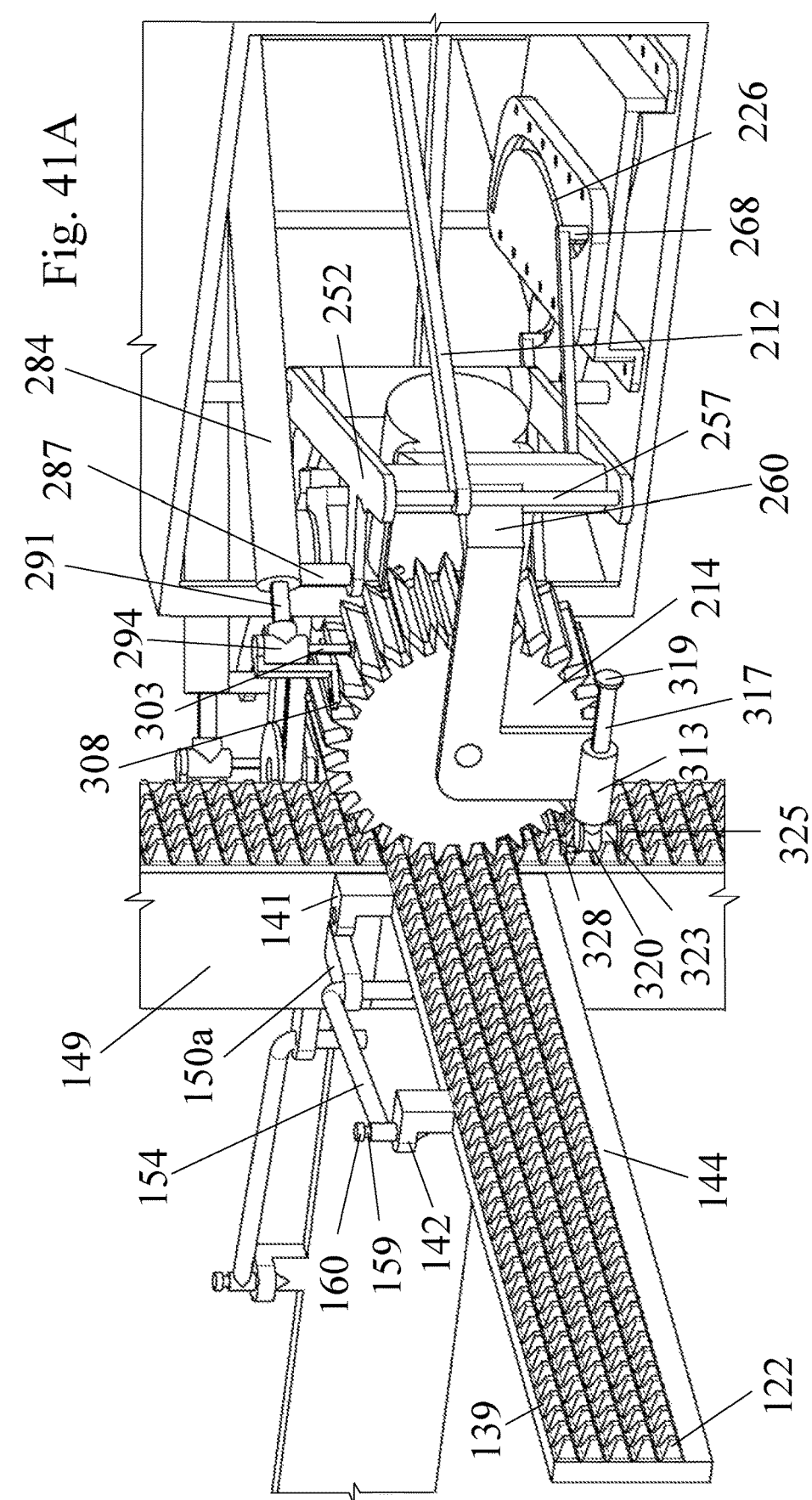
FIG. 41A is a zoomed isometric view of one tapered teeth gear and actuators used to manipulate the moving components in a first position.
Figure 41B:
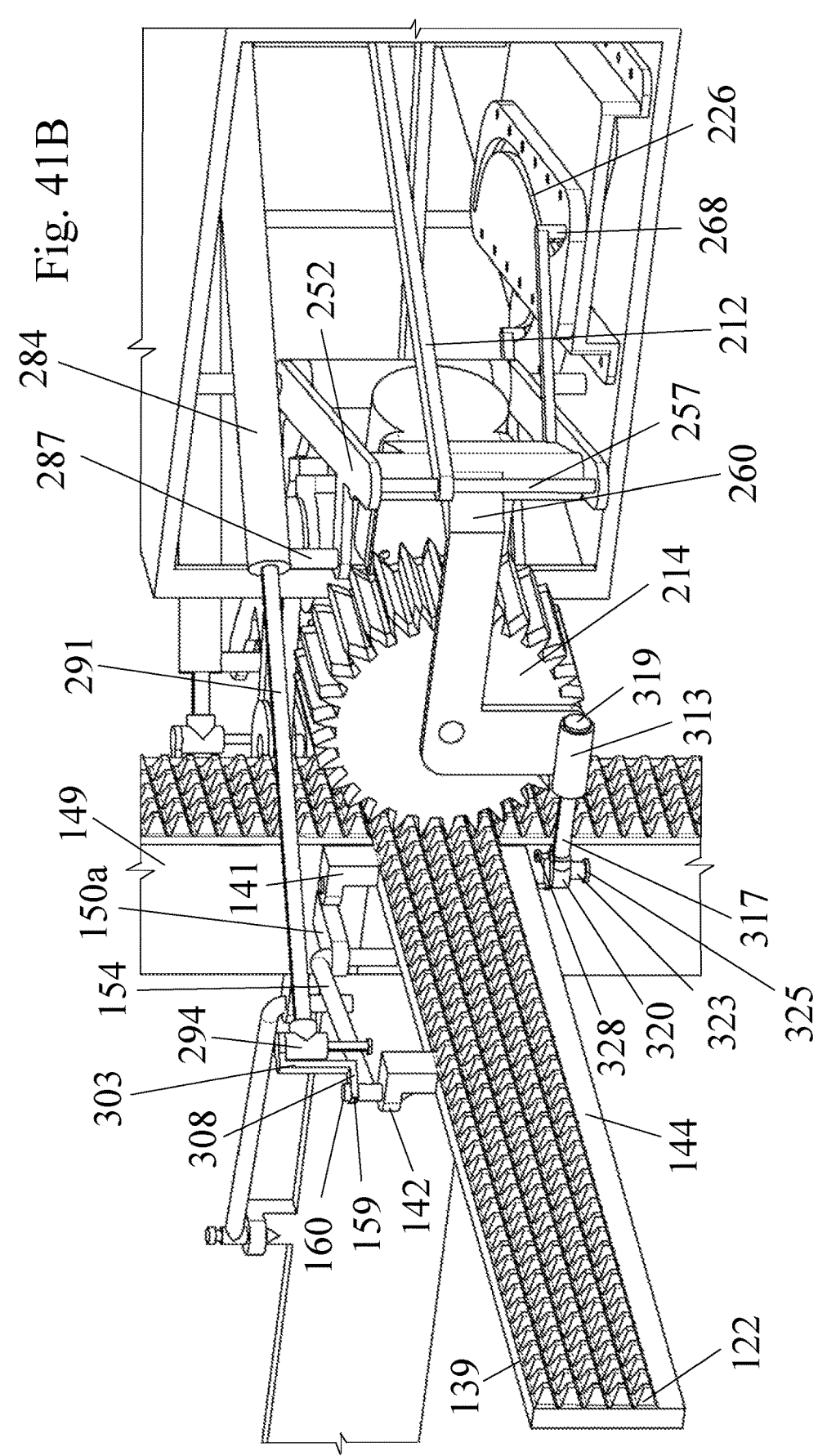
FIG. 41B is a zoomed isometric view of one tapered teeth gear and actuators used to manipulate the moving components in a second position.
Figure 41C:
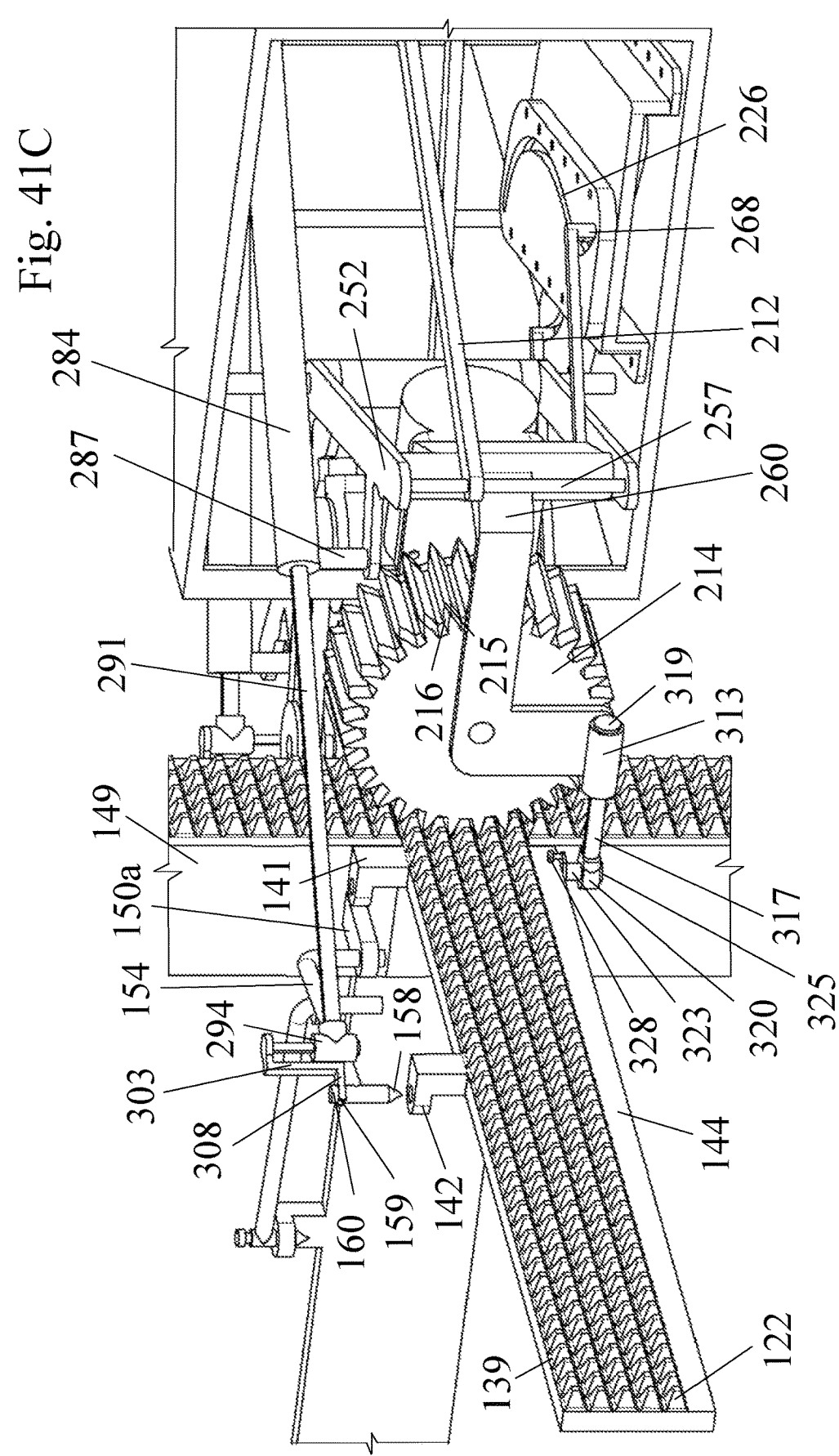
FIG. 41C is a zoomed isometric view of one tapered teeth gear and actuators used to manipulate the moving components in a third position.
Figure 41D:
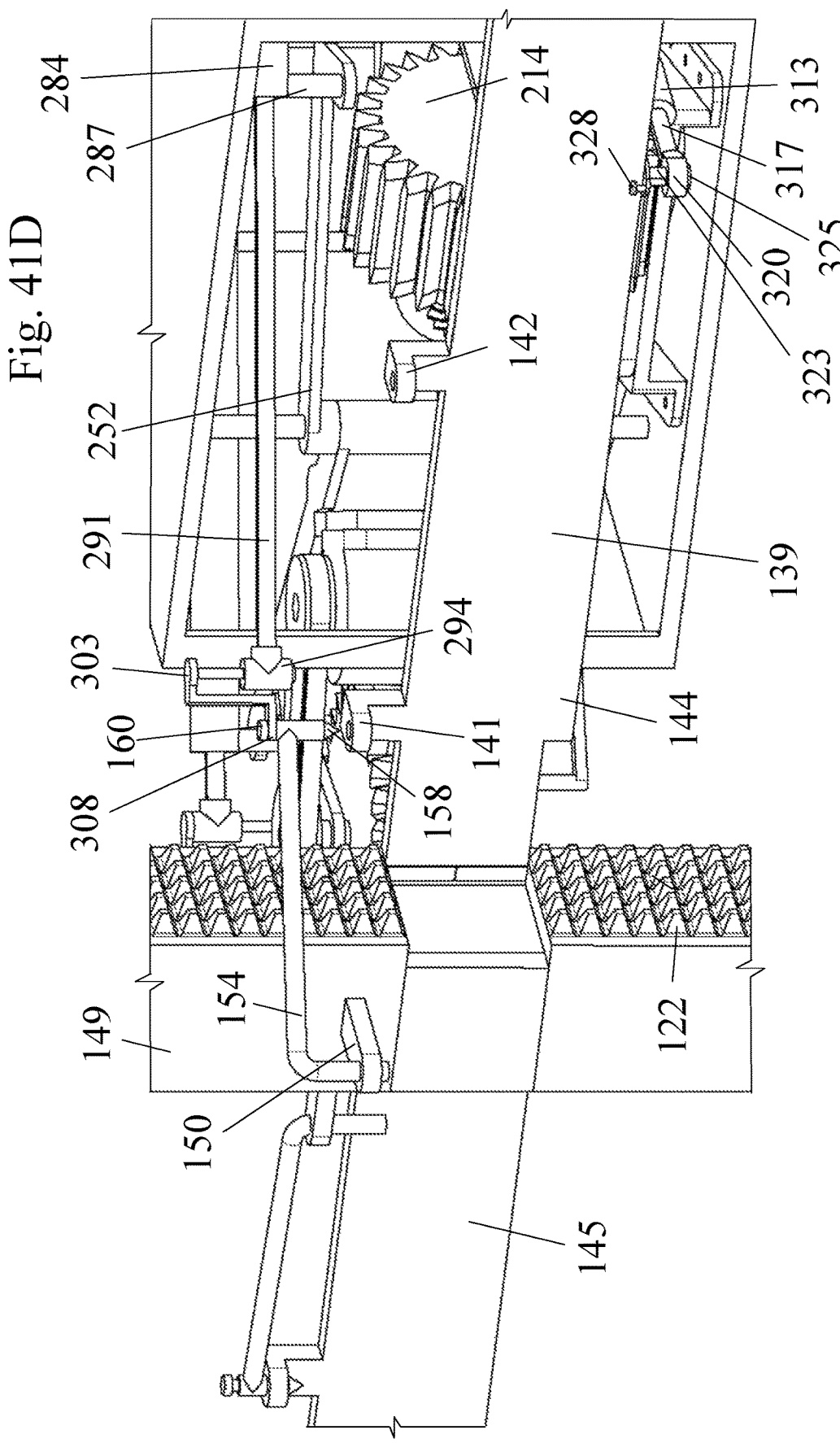
FIG. 41D is a zoomed isometric view of one tapered teeth gear and actuators used to manipulate the moving components in a fourth position showing the other perpendicularly mounted tapered teeth gear.
Figure 41E:
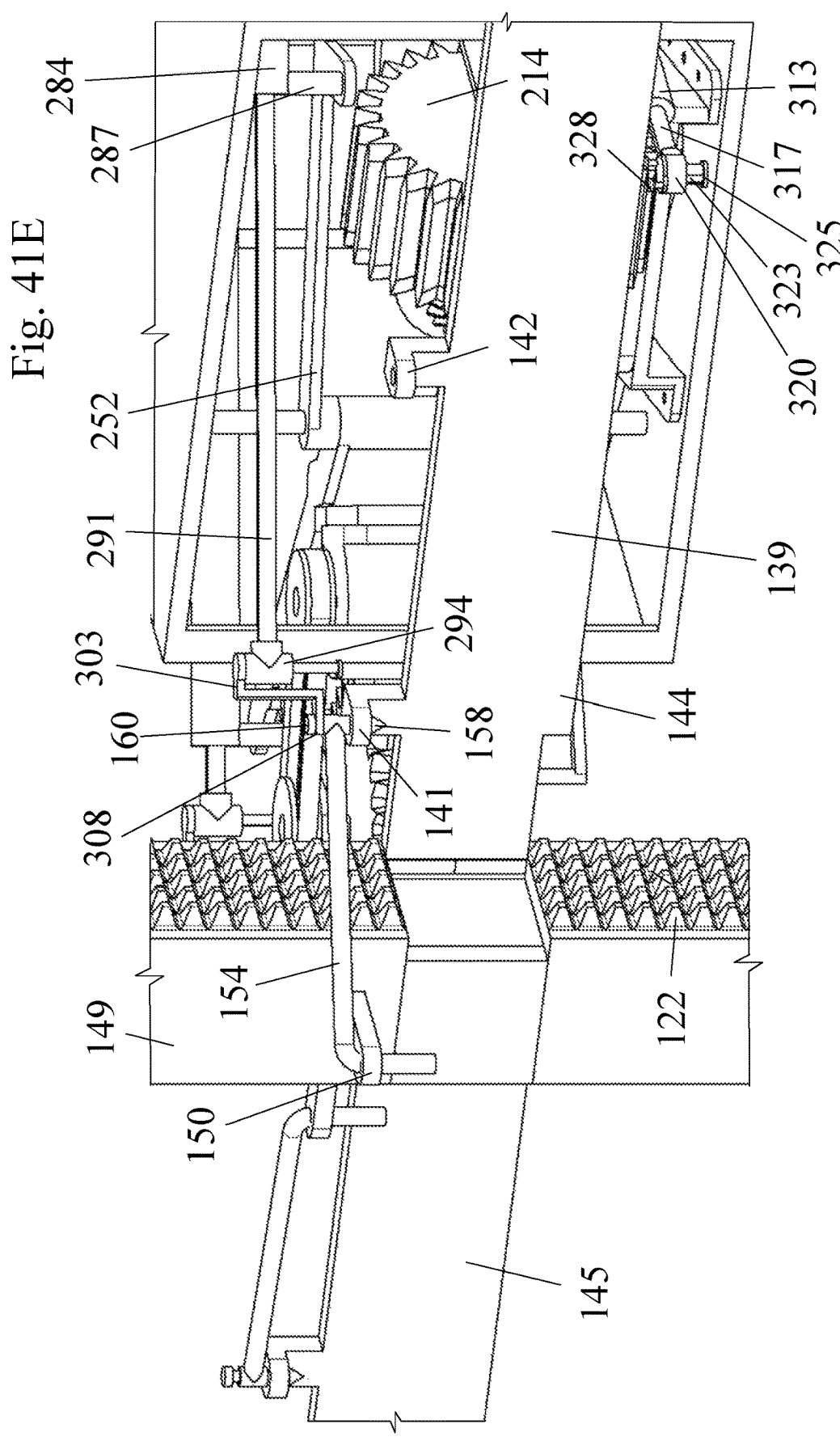
FIG. 41E is a zoomed isometric view of one tapered teeth gear and actuators used to manipulate the moving components in a fifth position showing the other perpendicularly mounted tapered teeth gear.
Figure 41F:
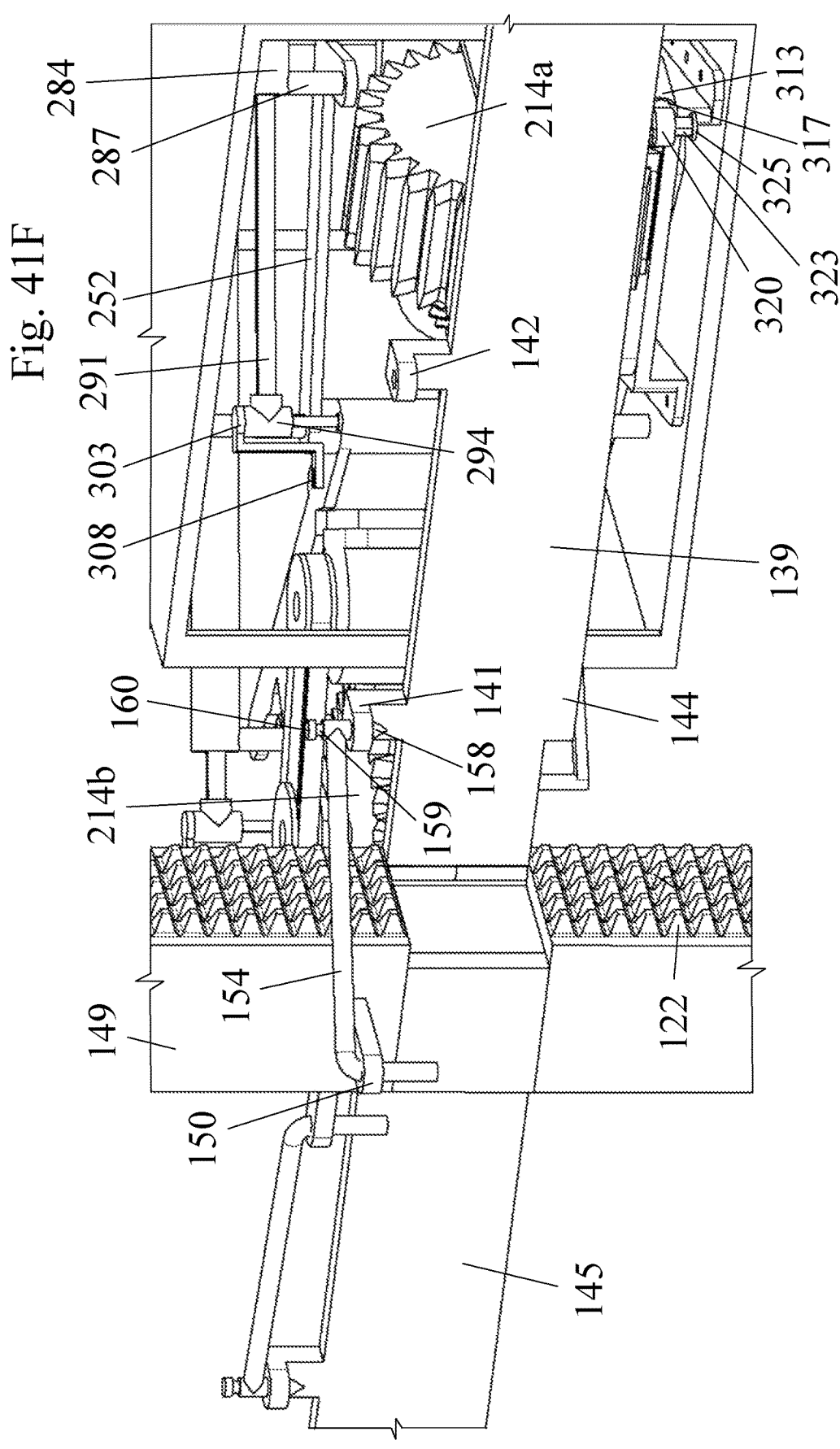
Figure 42:
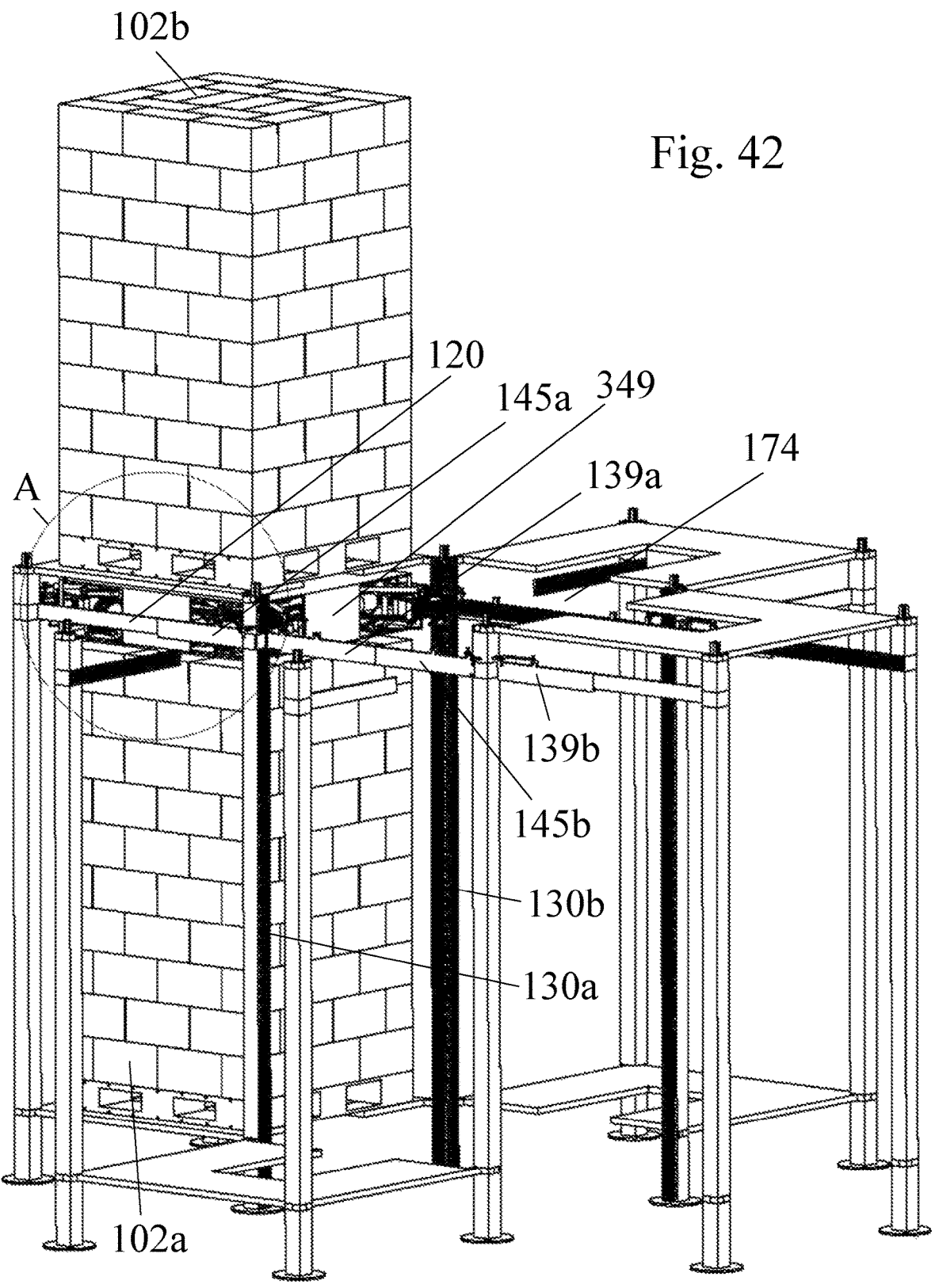
Figure 42A:
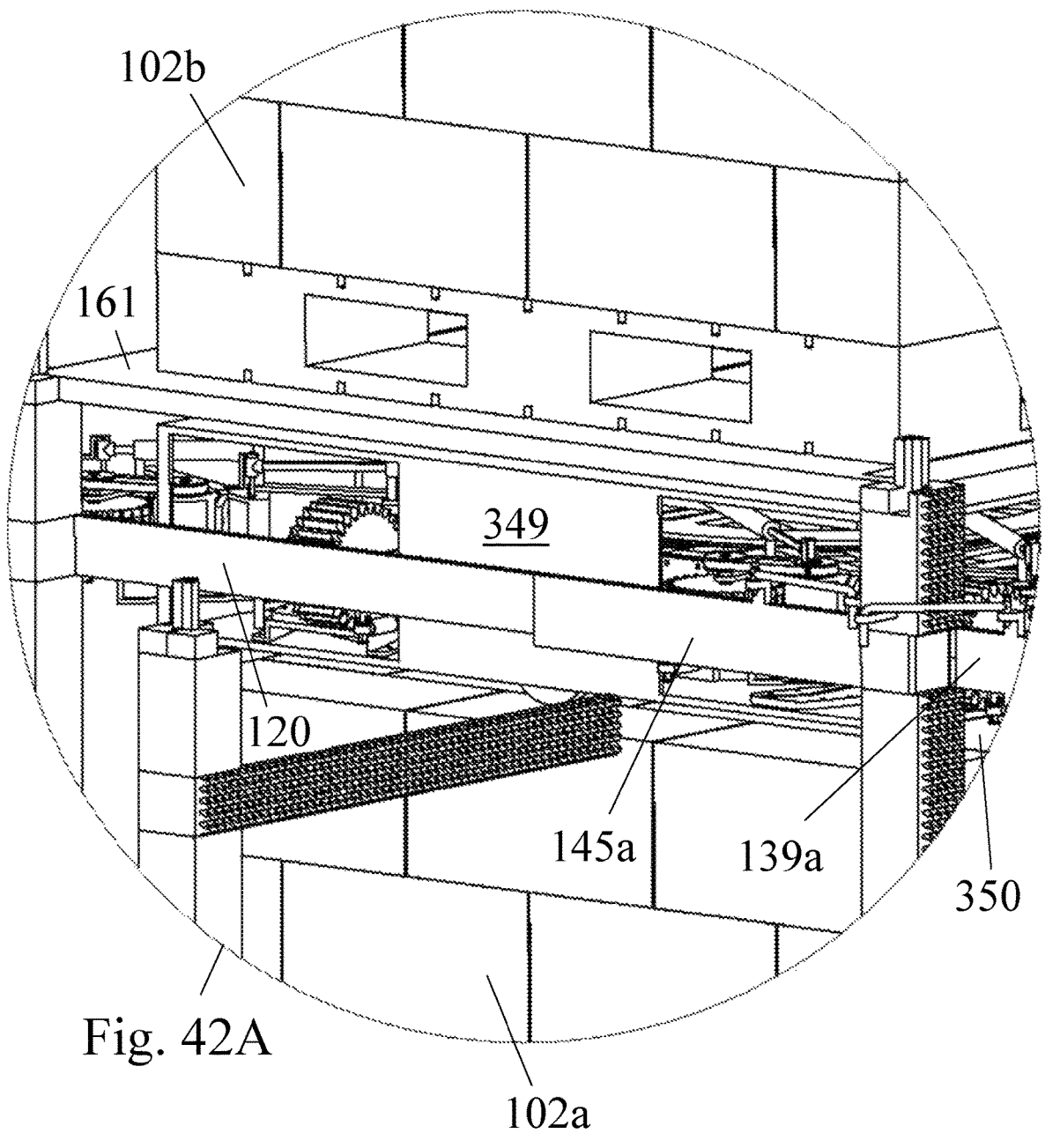
Figure 43:
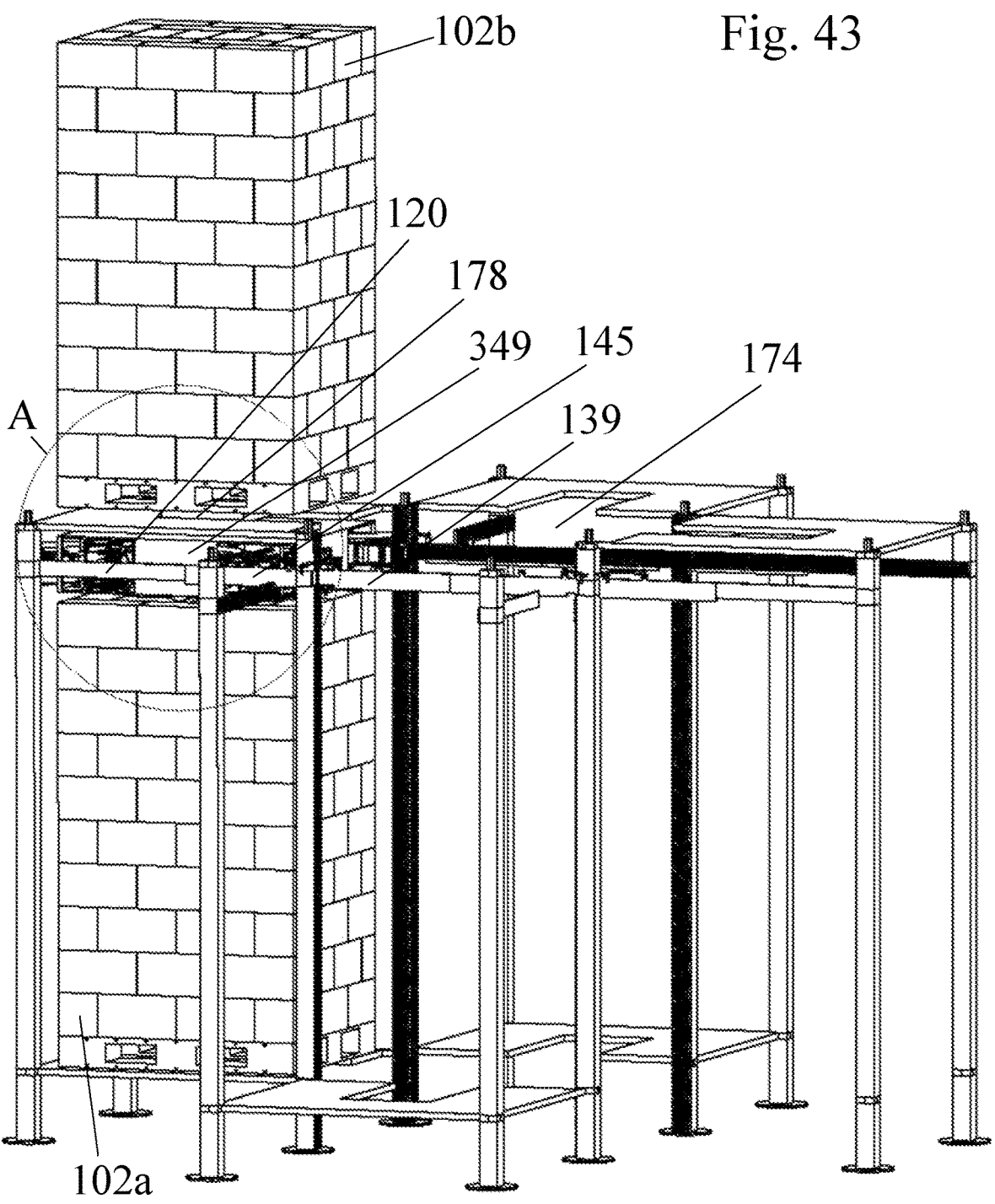
Figure 43A:
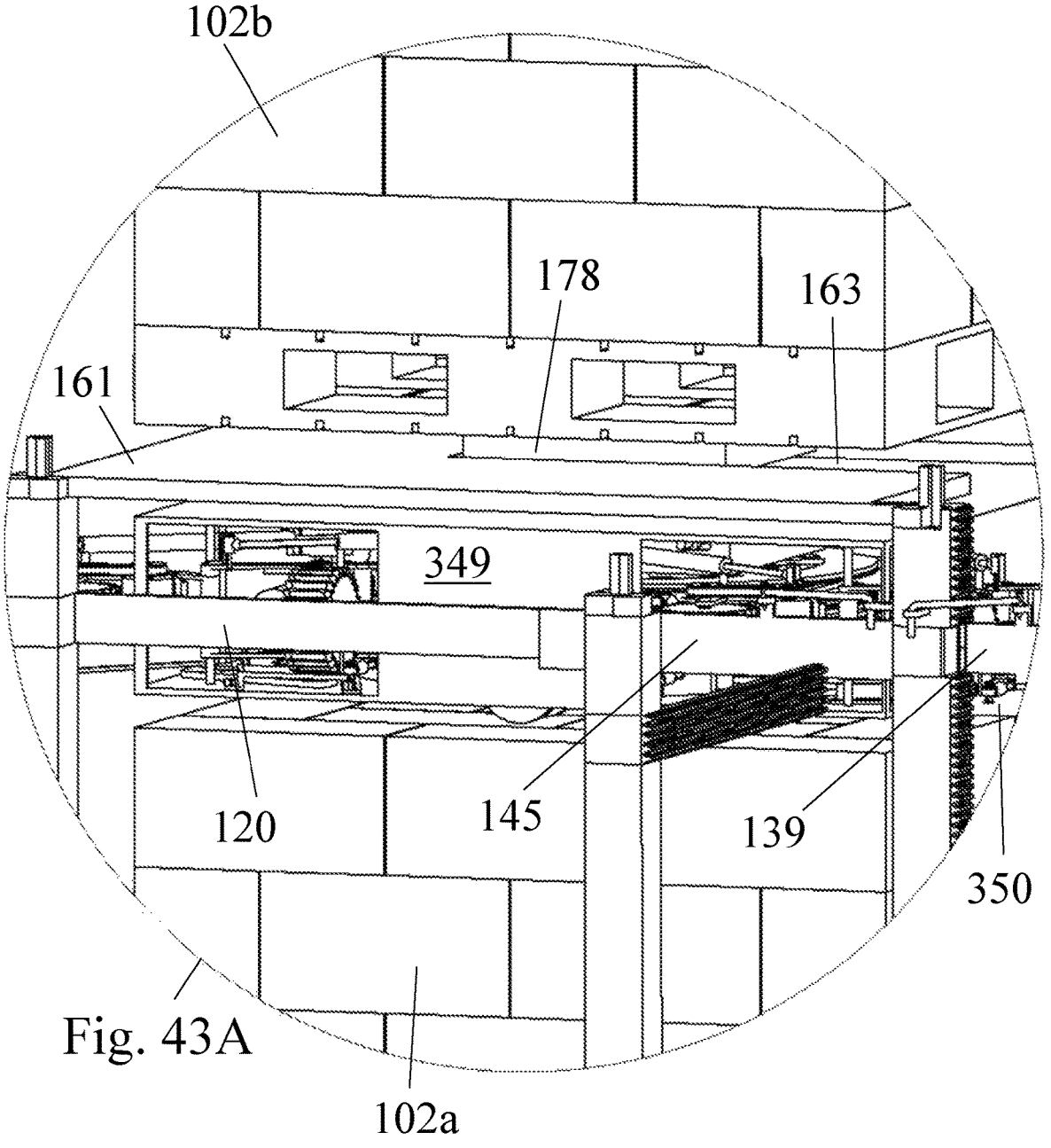
Figure 44:
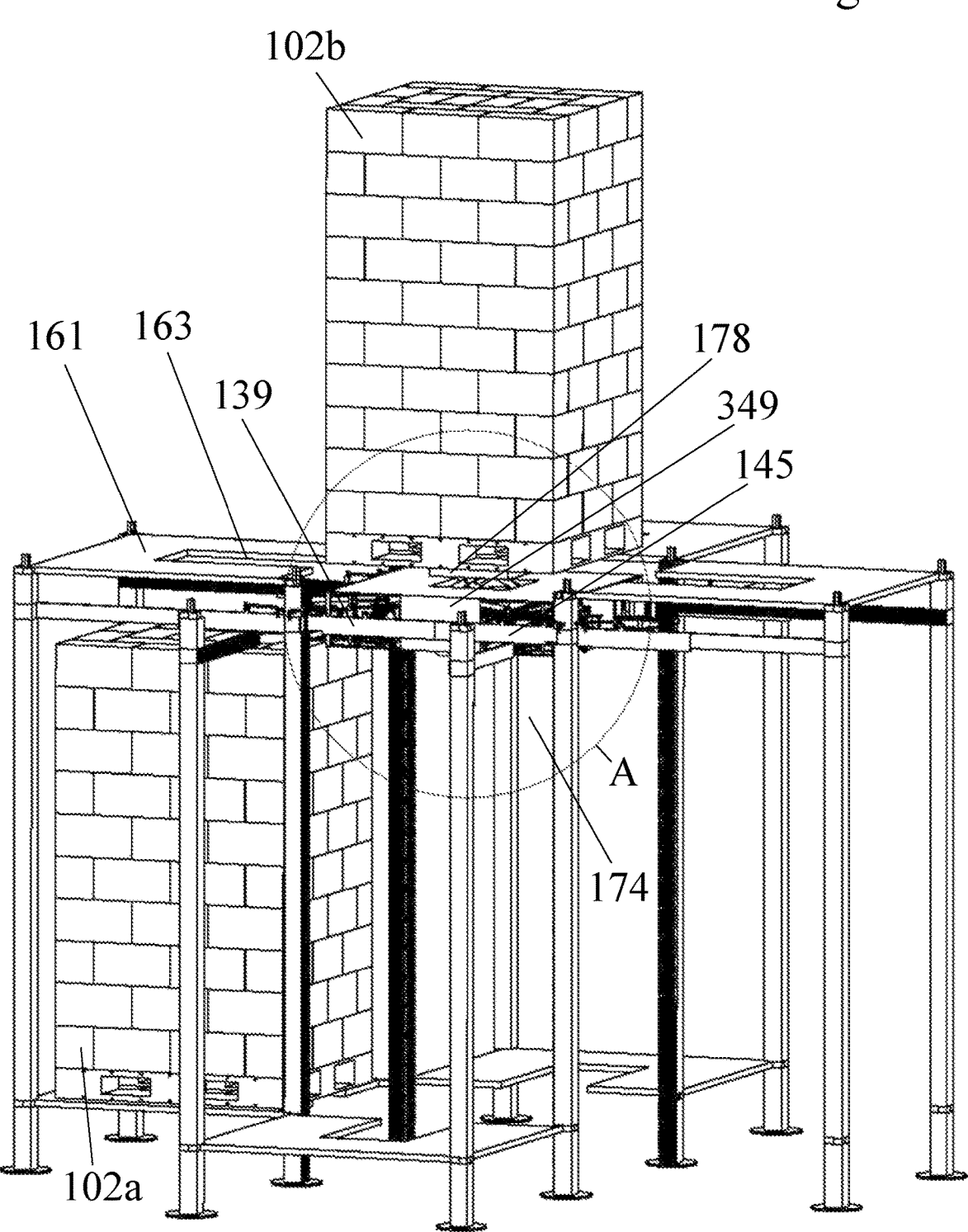
Figure 44A:
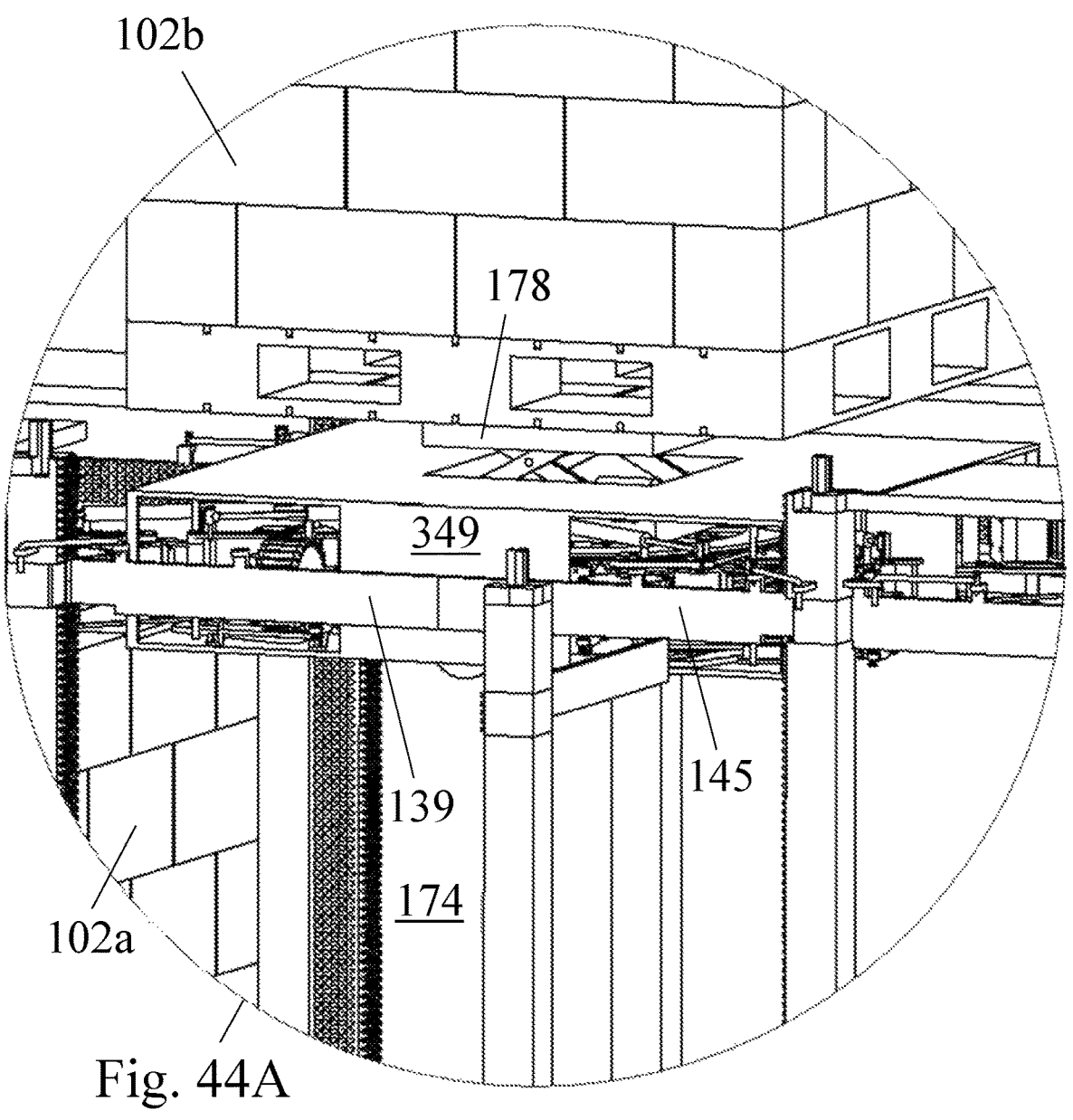
Figure 45:
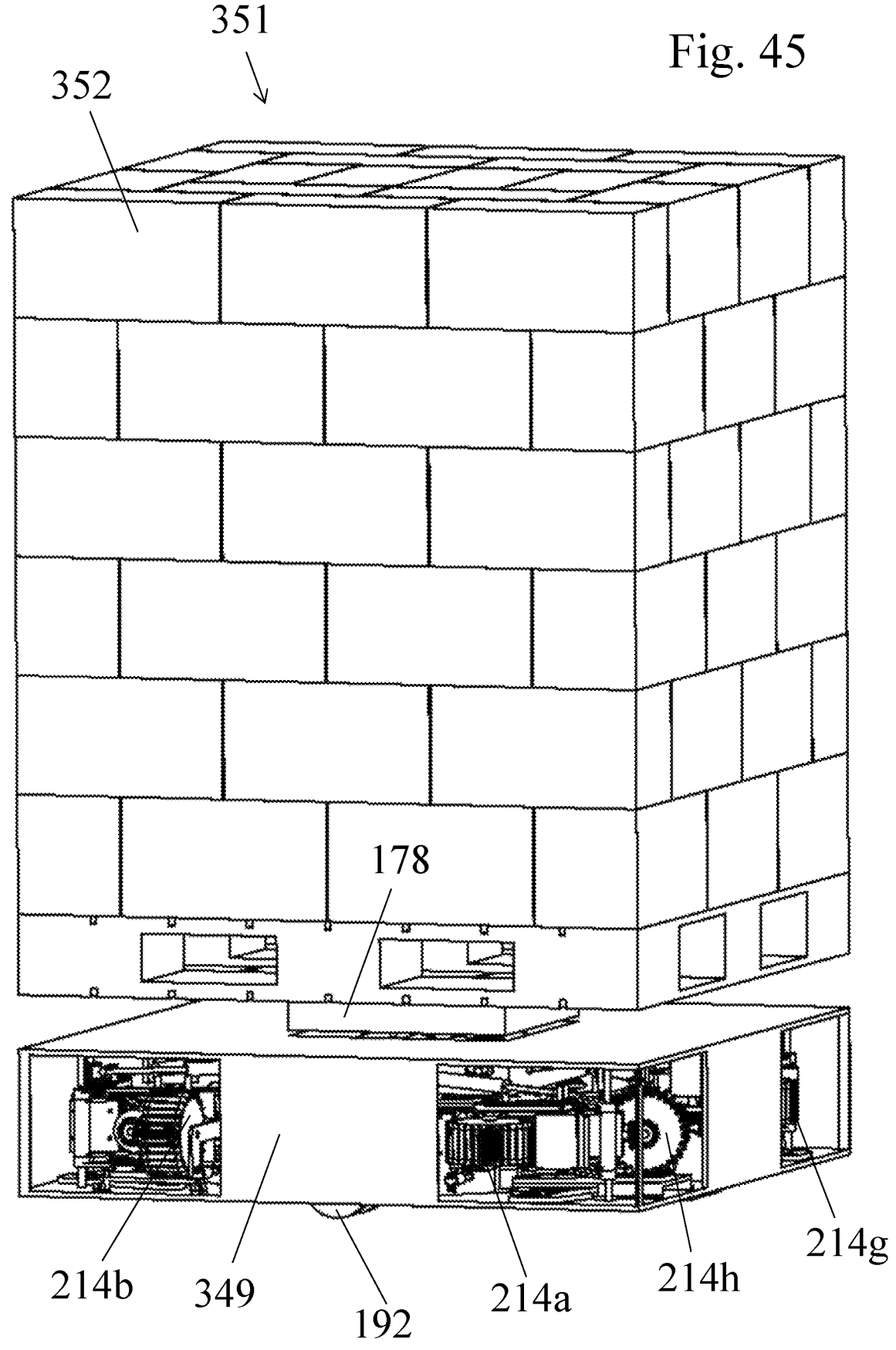
Figure 46:
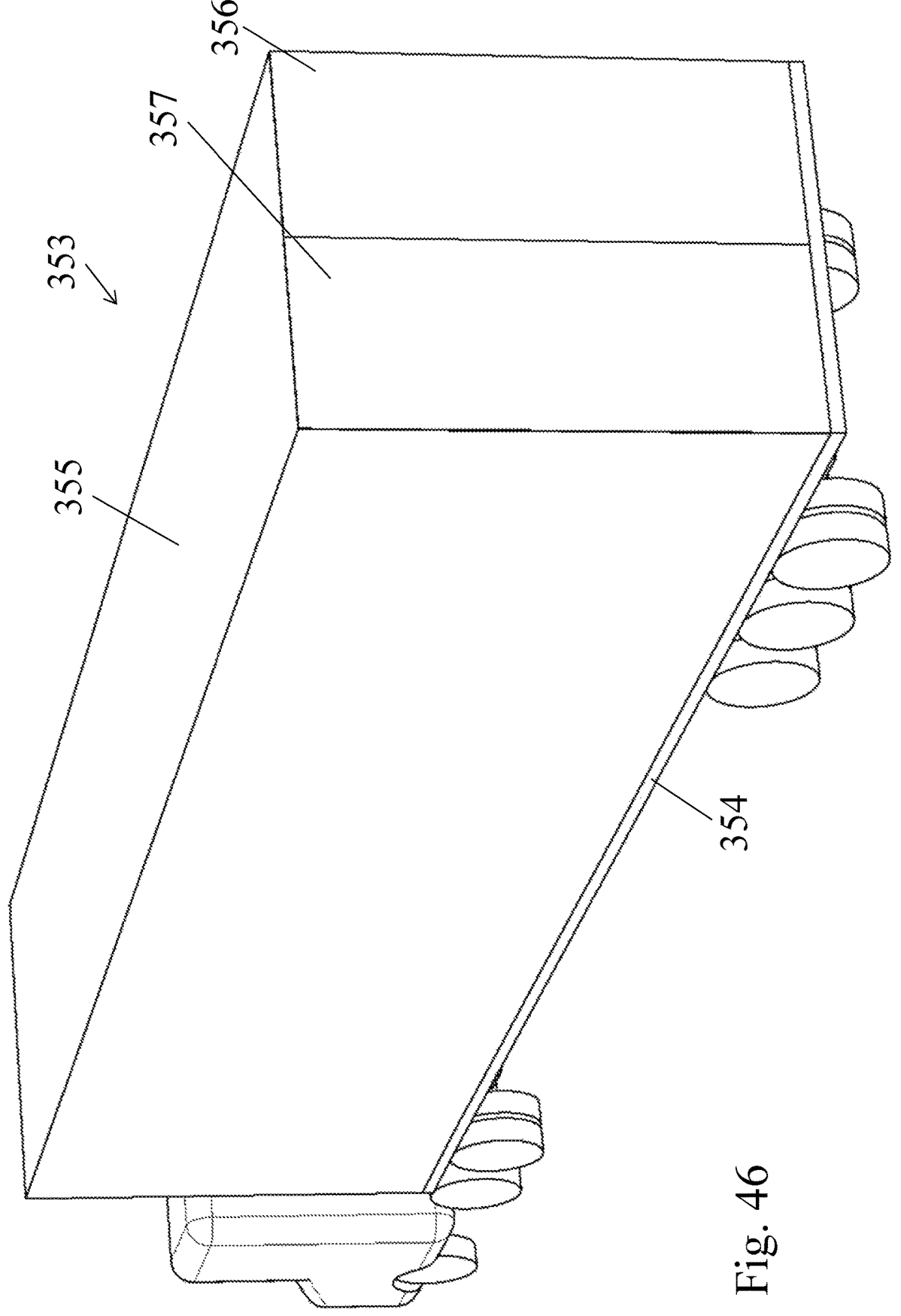
Figure 47:
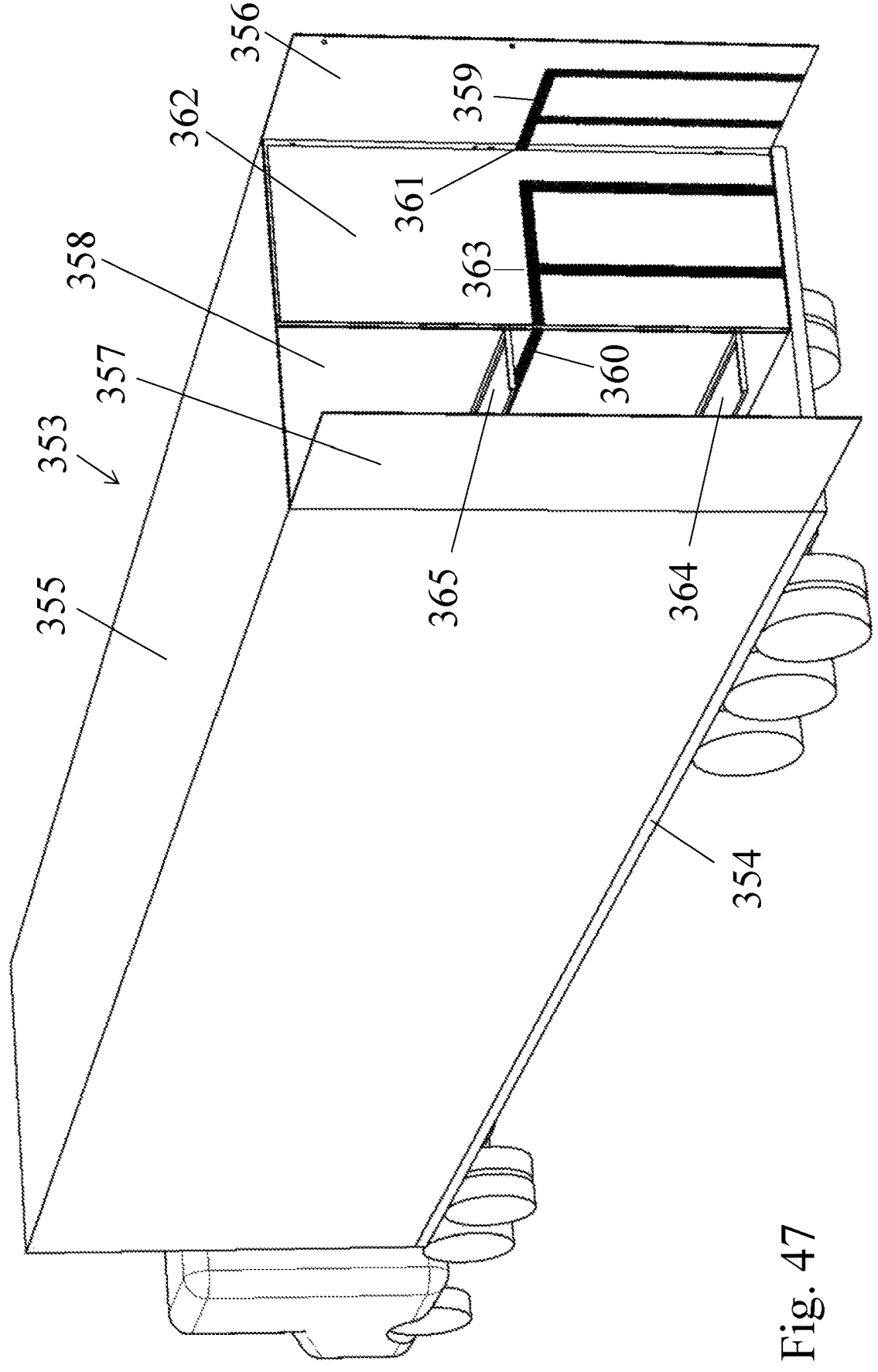
Figure 48:
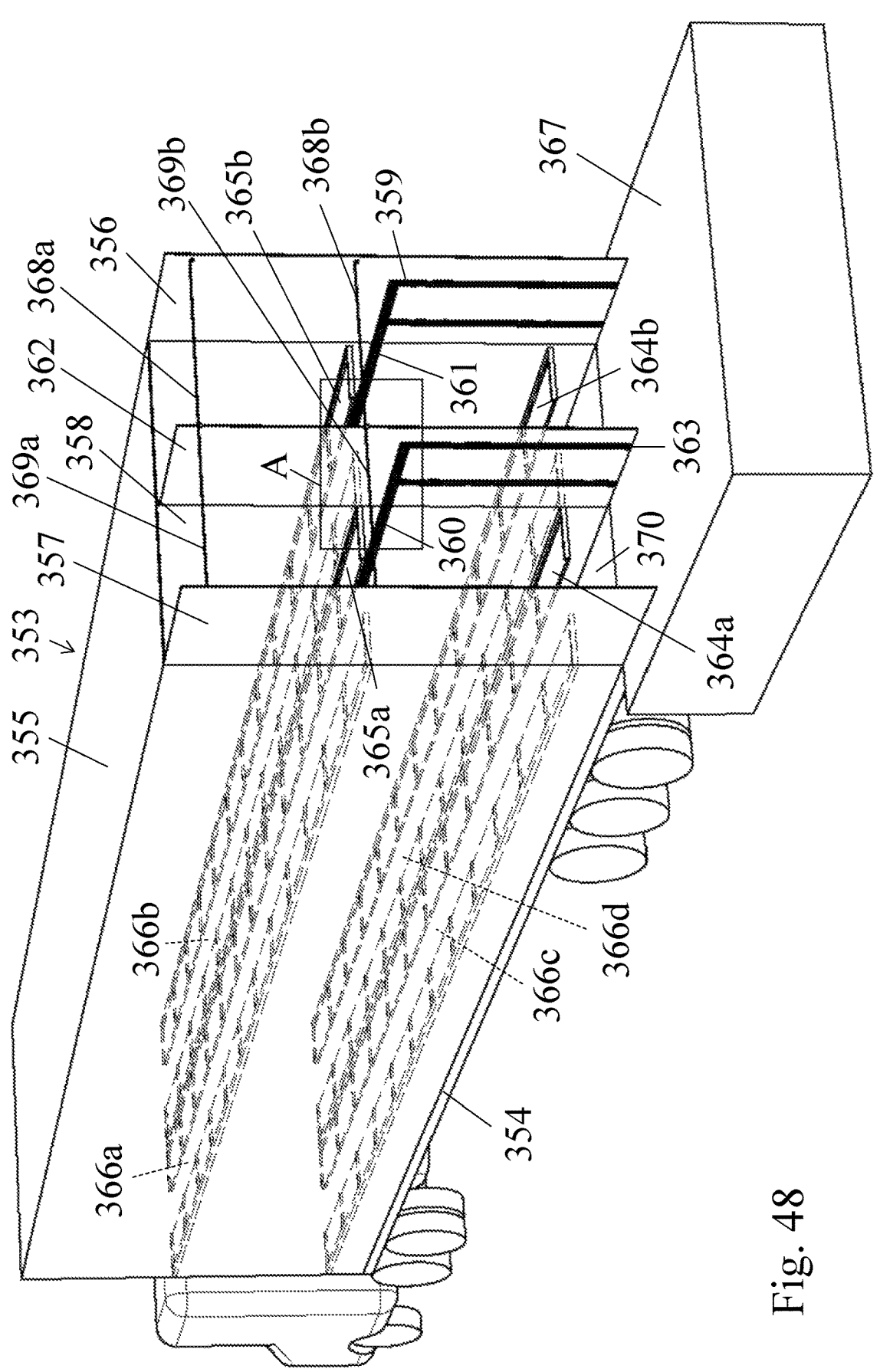
Figure 48A:
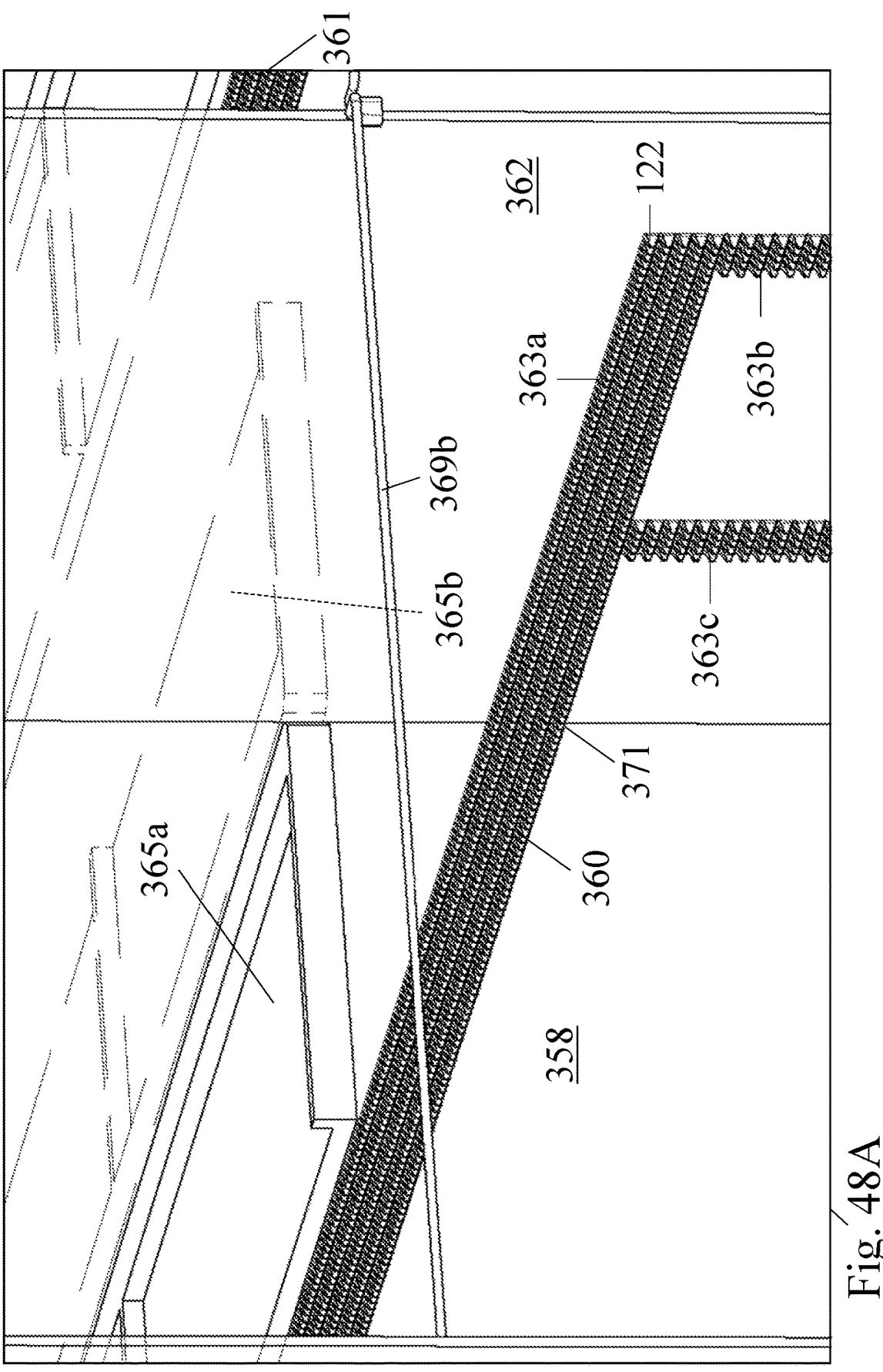
Figure 49:
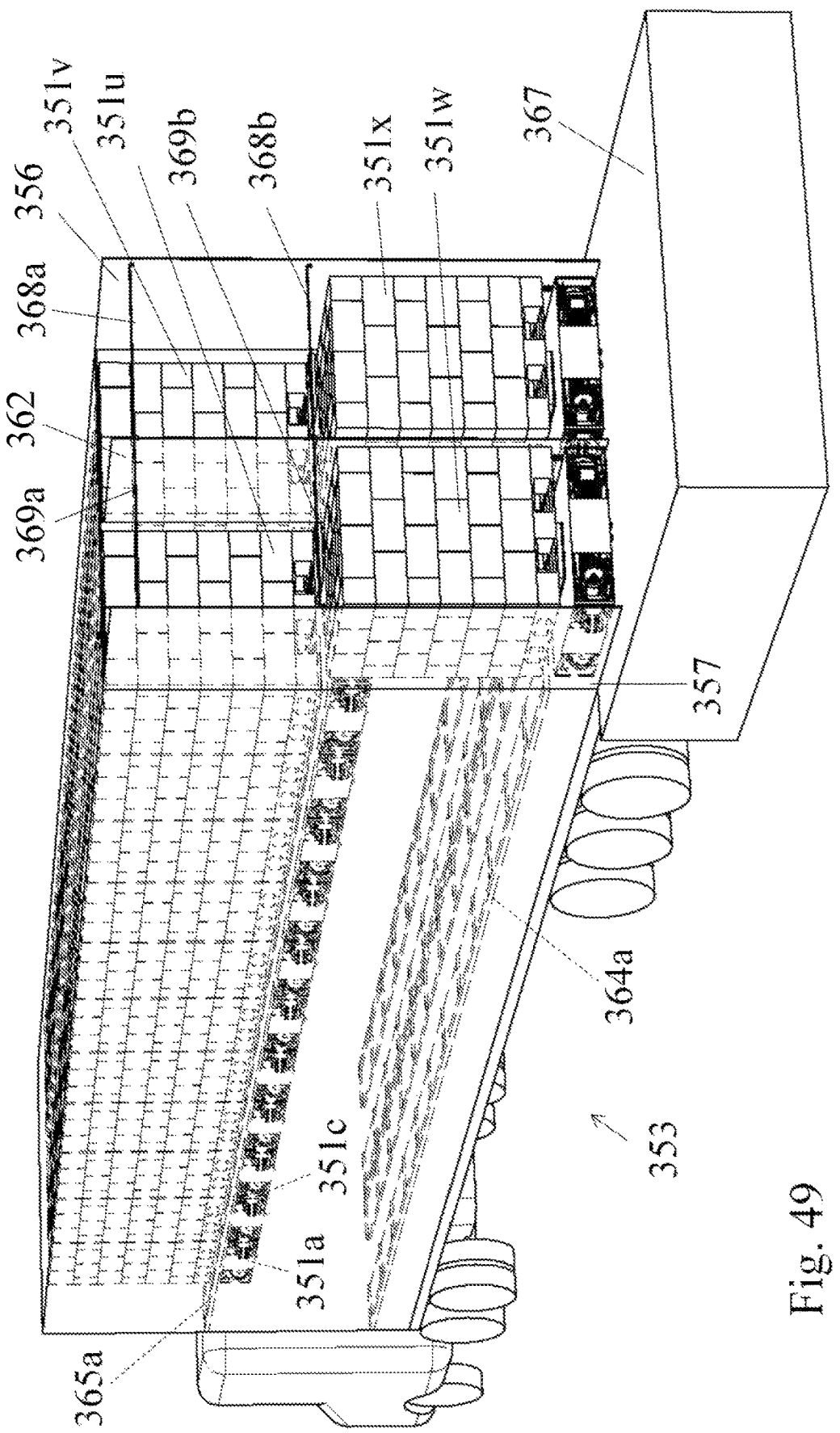
Figure 50:
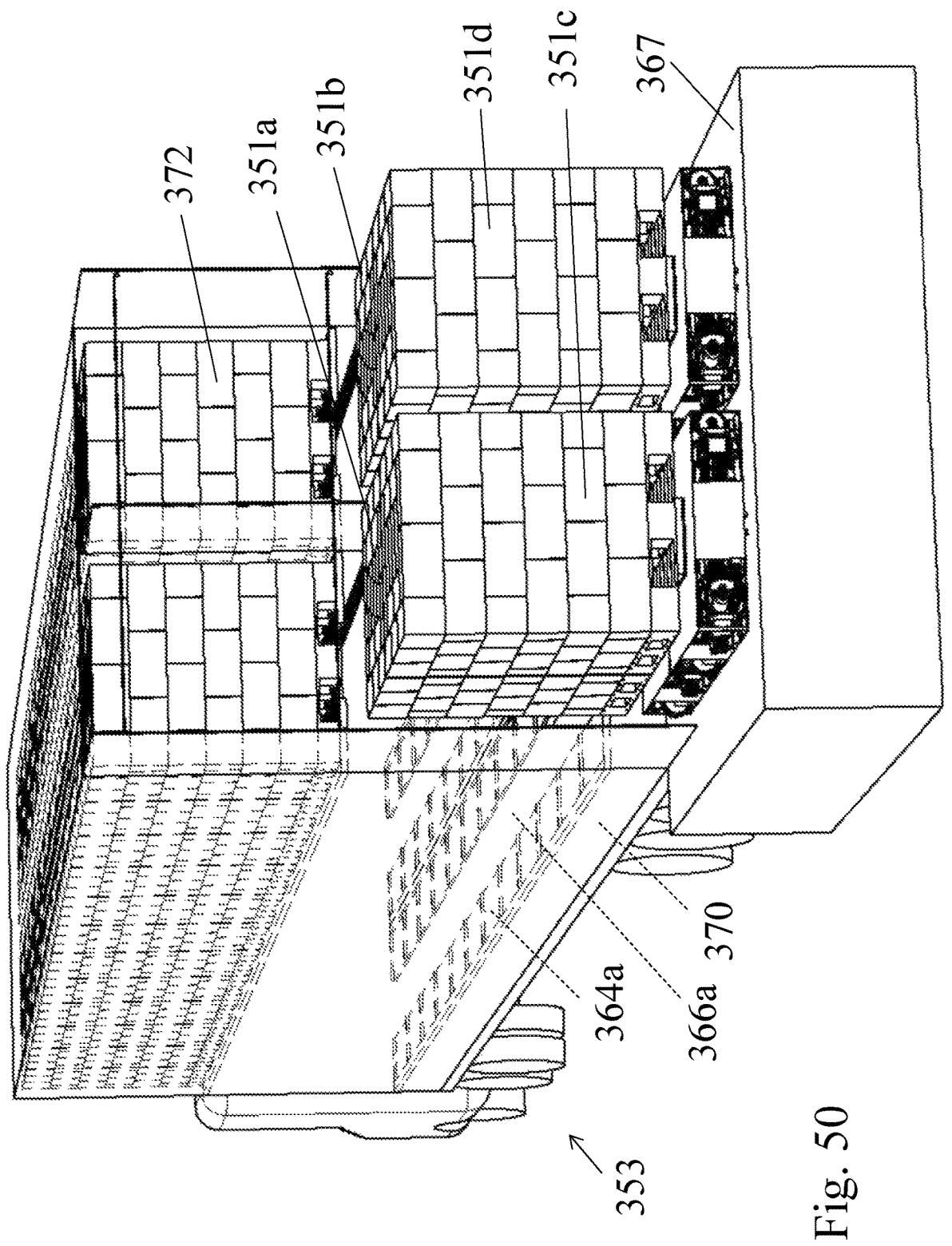

Detail FIG. 41F a zoomed isometric view of one tapered teeth gear and actuators used to manipulate the moving components in a sixth position showing the other perpendicularly mounted tapered teeth gear;

FIG. 42 is an isometric view of one embodiment of the autonomous mobile lift robot of the present invention at the first level of a access shaft positioned to retrieve a pallet that is still resting on the shelf;

Detail FIG. 42A is an isometric view of an embodiment of the autonomous mobile lift robot of the present invention at the first level of a access shaft under a pallet that is still resting on the shelf;

FIG. 43 is an isometric view of one embodiment of the autonomous mobile lift robot of the present invention at the first level of a access shaft with raised pantographic lift platform to lift the pallet from the shelf;

Detail FIG. 43A is an isometric view of one embodiment of the autonomous mobile lift robot of the present invention with raised pantographic lift platform lifting the pallet from the shelf;

FIG. 44 is an isometric view of an embodiment of the autonomous mobile lift robot of the present invention back at the center of the first level of a access shaft carrying a pallet on top of the raised pantographic lift platform;

Detail FIG. 44A is an isometric view of an embodiment of the autonomous mobile lift robot of the present invention carrying a pallet on top of the raised pantographic lift platform;

FIG. 45 is an isometric view of an embodiment of the autonomous mobile lift robot of the present invention with tapered teeth gears in the retracted position suitable for maneuvering to a truck for loading carrying a half size pallet on top of the raised pantographic lift platform;

FIG. 46 is an isometric rear view of one embodiment of a fast loading truck of the present invention with doors closed;

FIG. 47 is an isometric rear view of one embodiment of a fast loading truck of the present invention with doors open and middle division folded;

FIG. 48 is an isometric rear view of one embodiment of a fast loading truck of the present invention with doors and middle division open parked at a truck loading bay awaiting loading;

Detail FIG. 48A is an isometric view of the inside of the cargo bay of one embodiment of a fast loading truck of the present invention showing the upper shelves, the cargo bay center rack, and the middle division rack;

FIG. 49 is an isometric rear view of one embodiment of a fast loading truck of the present invention with doors and middle division open parked at a truck loading bay being loaded at the upper level by a train of multiple loaded autonomous mobile lift robots;

FIG. 50 is an isometric rear view of one embodiment of a fast loading truck of the present invention with doors and middle division open parked at a truck loading bay with a loaded upper level and being loaded at the lower level by a train of multiple loaded autonomous mobile lift robots.

Figure 51:
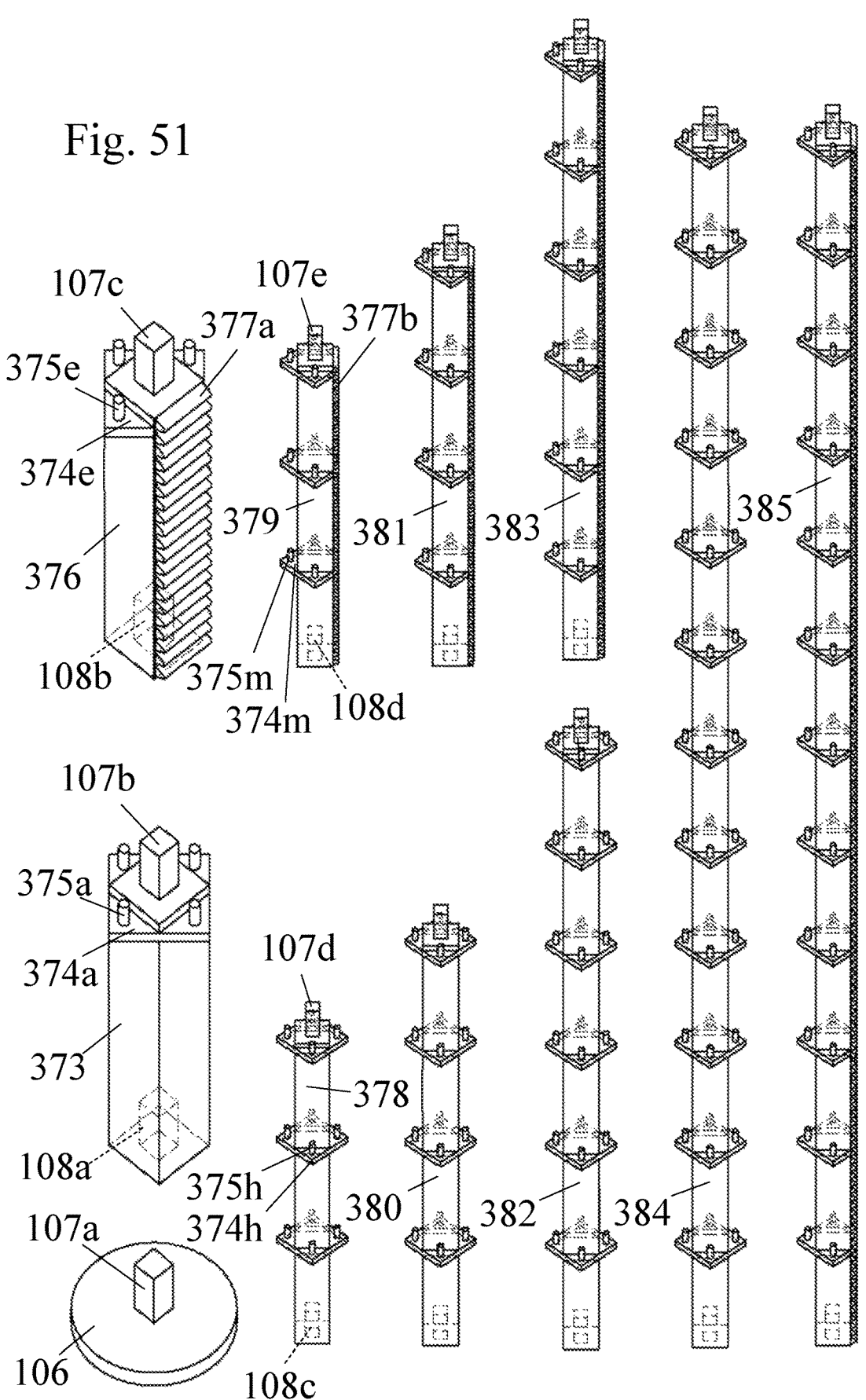
Figures 52, 52A, 52B:
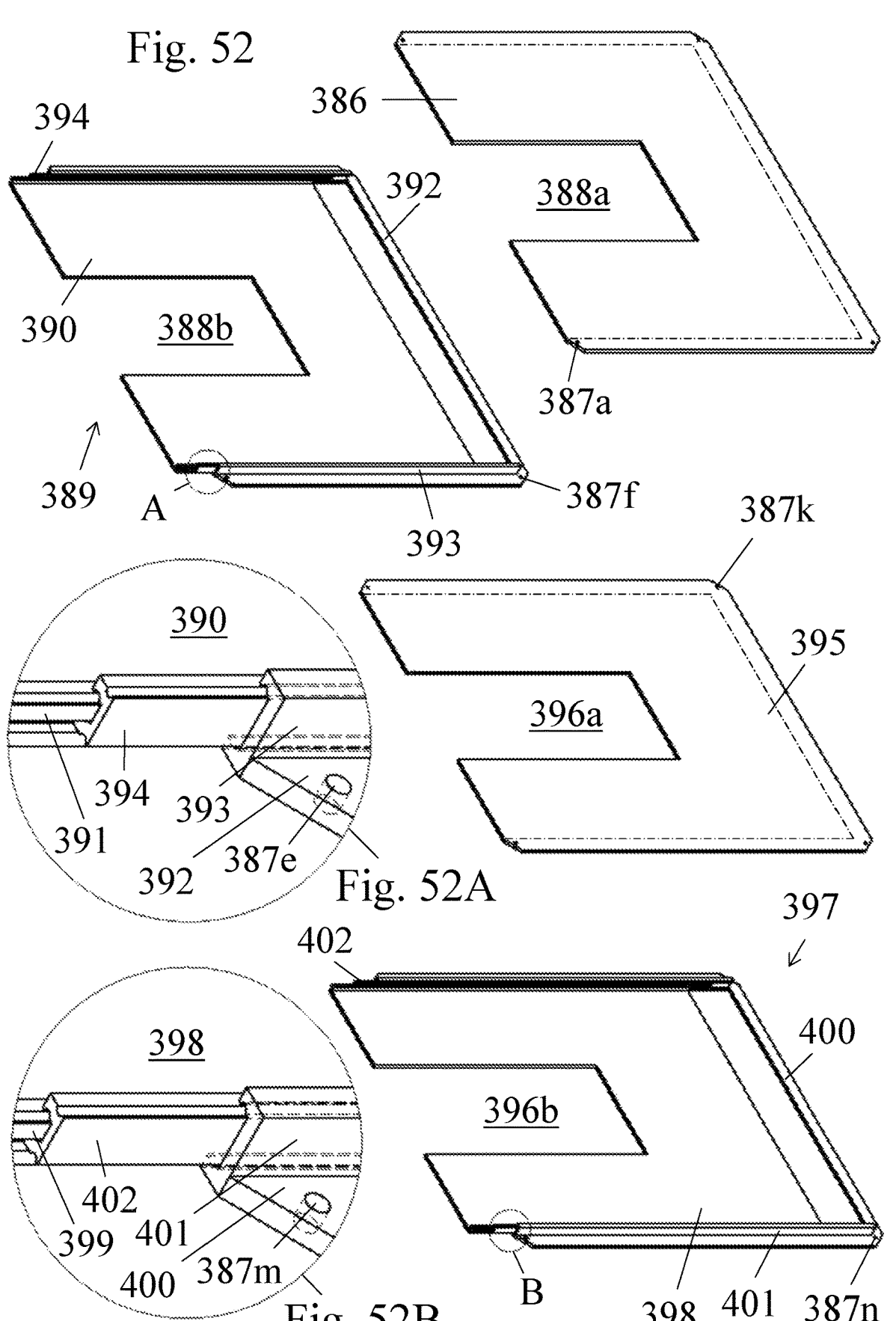
Figure 53:
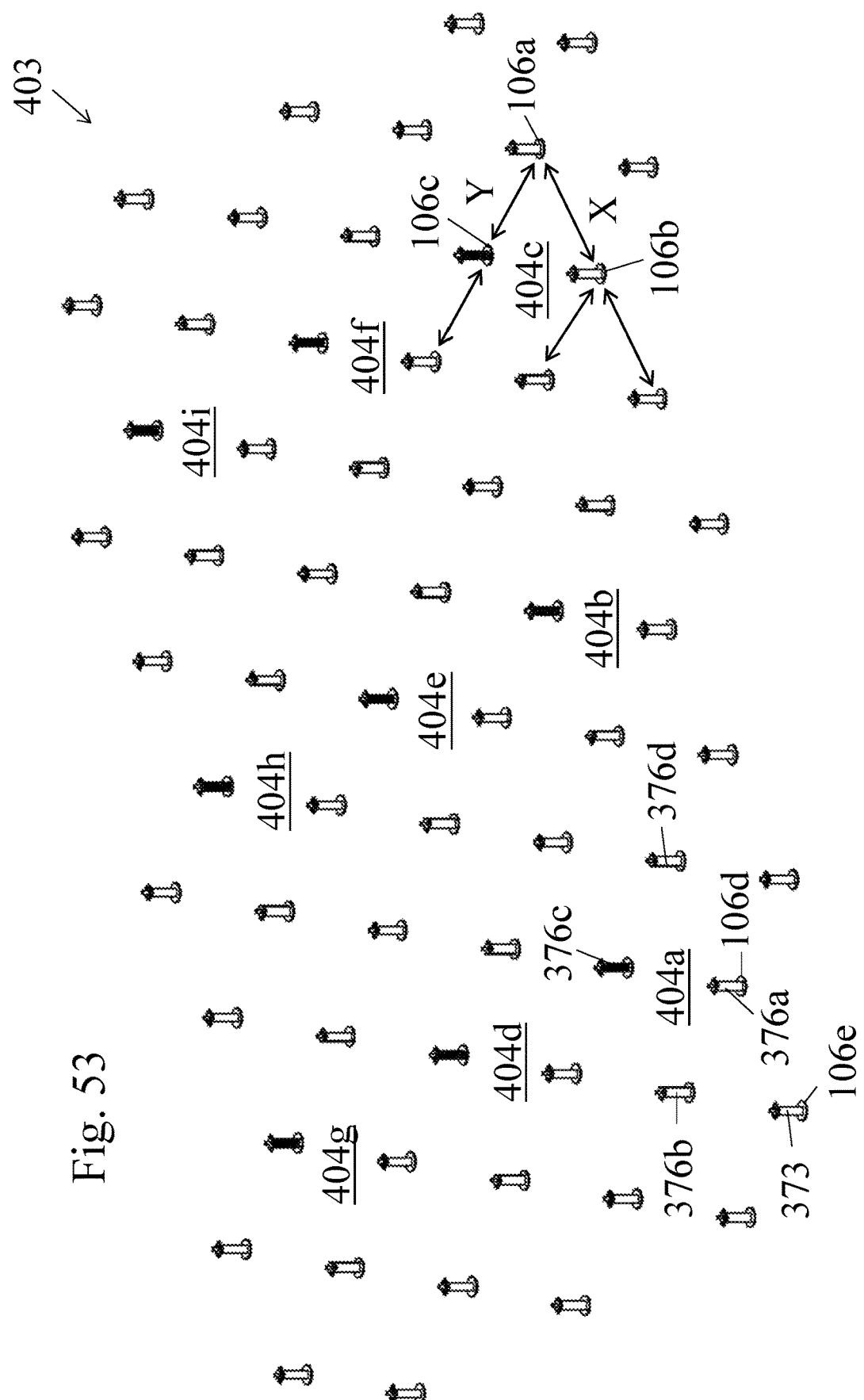
Figures 54, 54A, 54B:
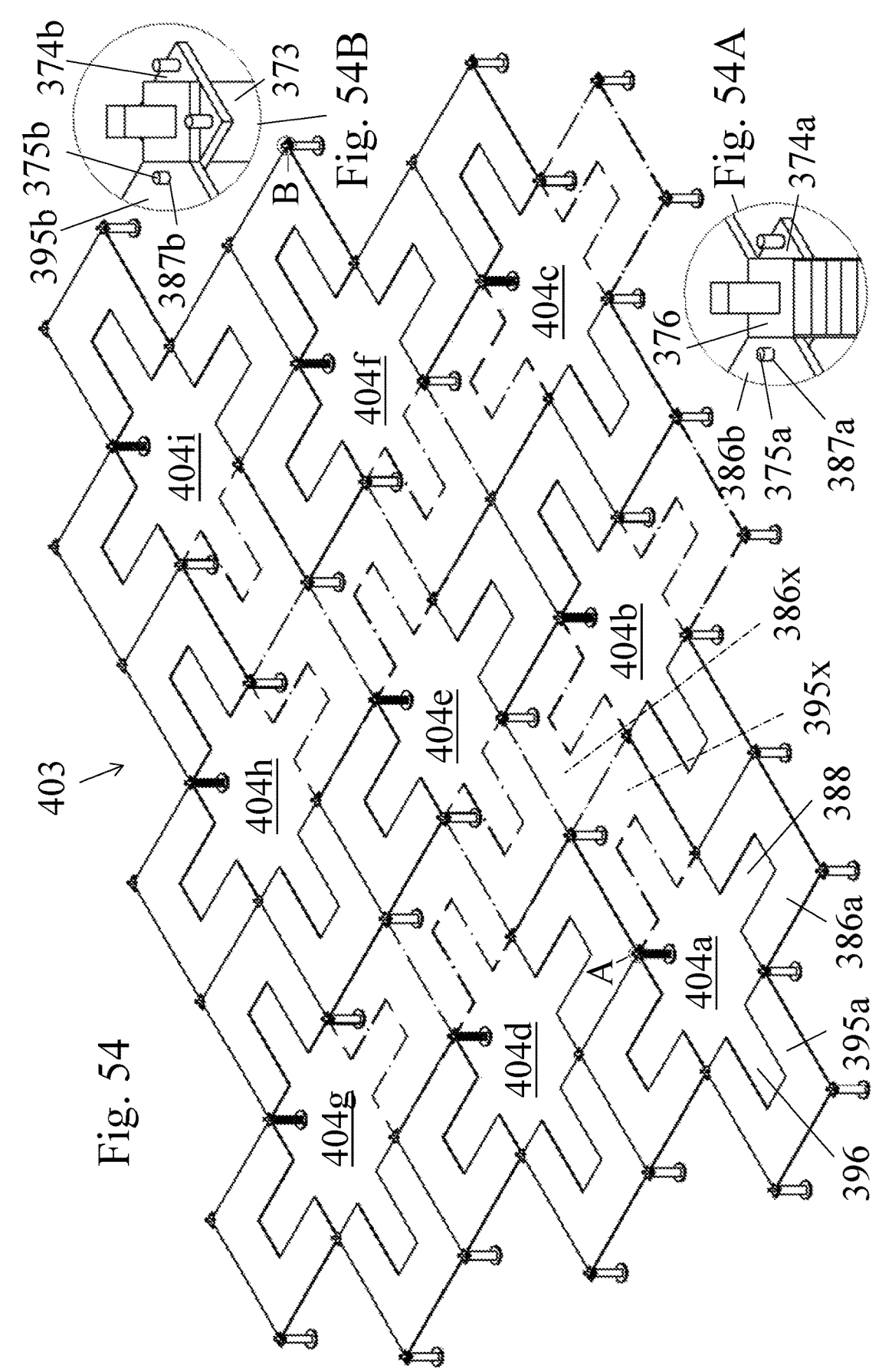
Figure 55:
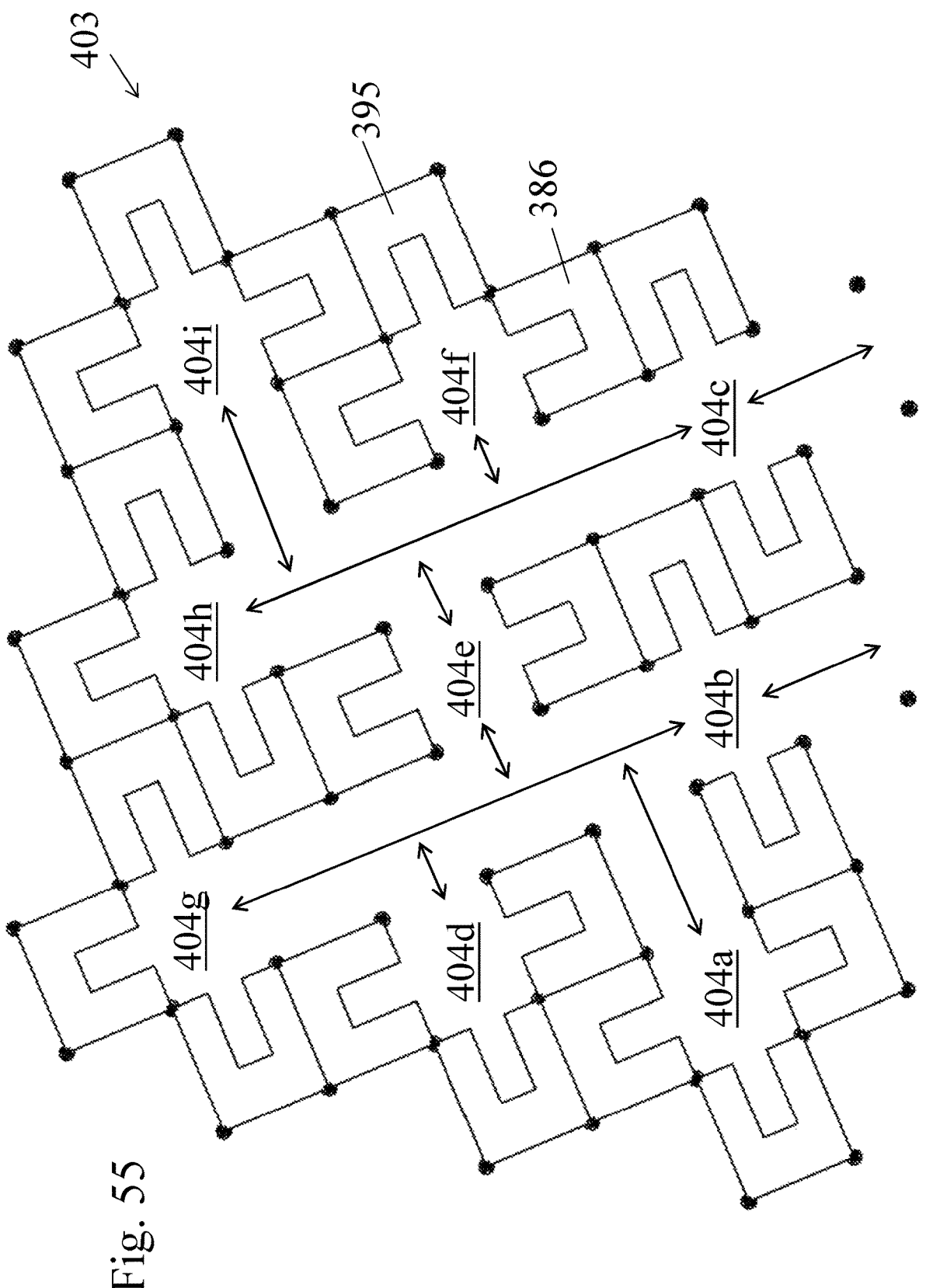
Figure 56:
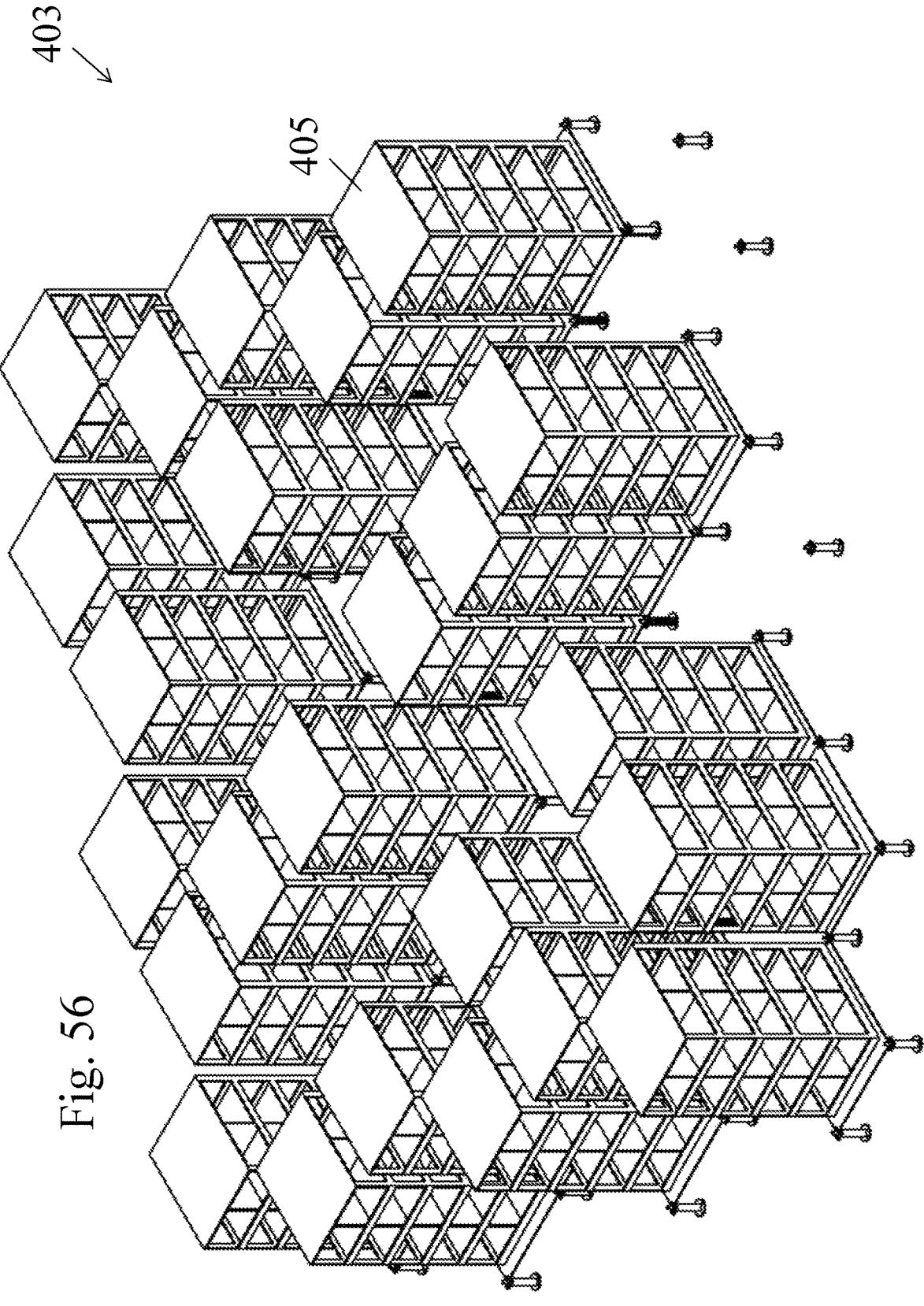
Figure 57:
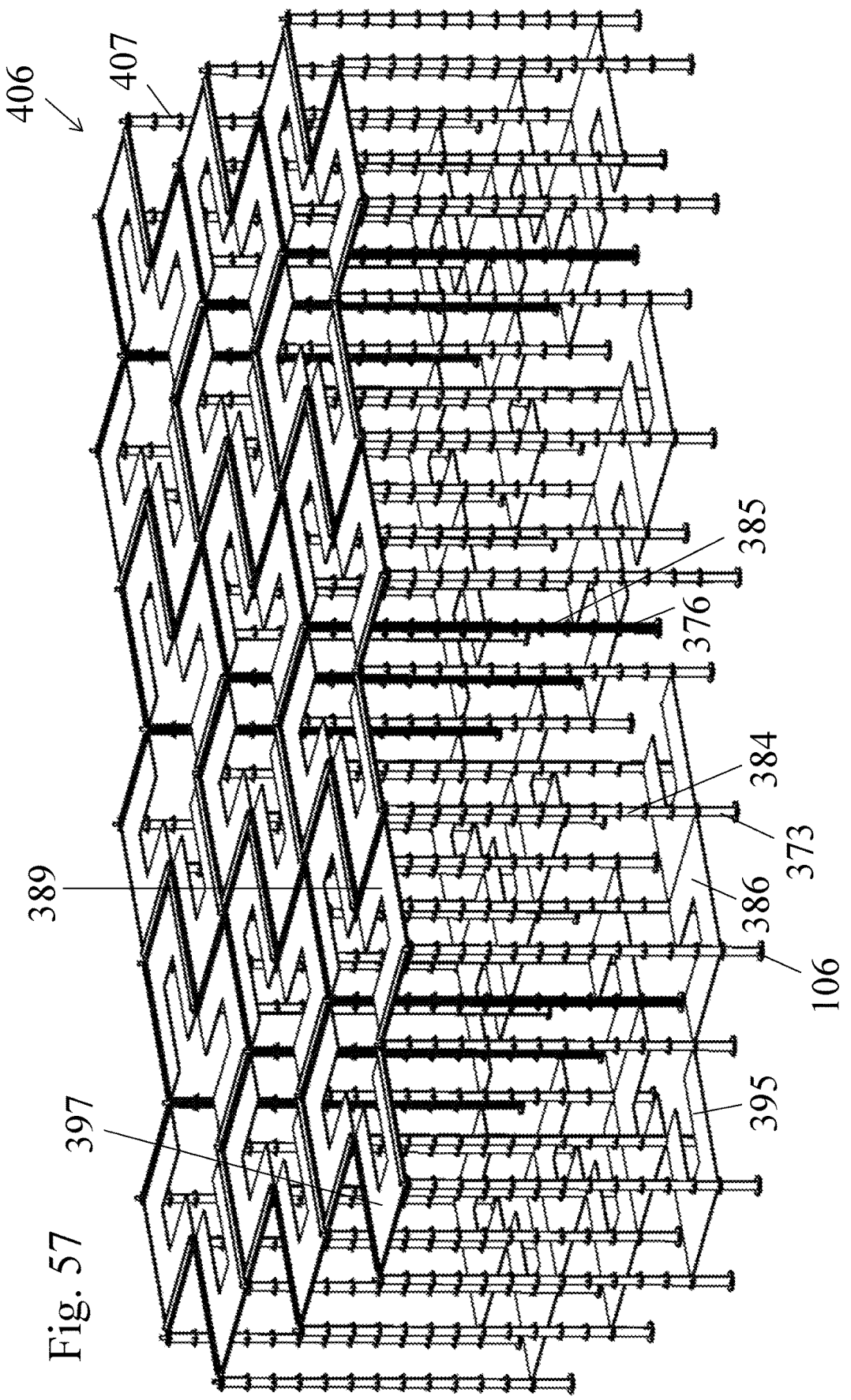
Figure 58:
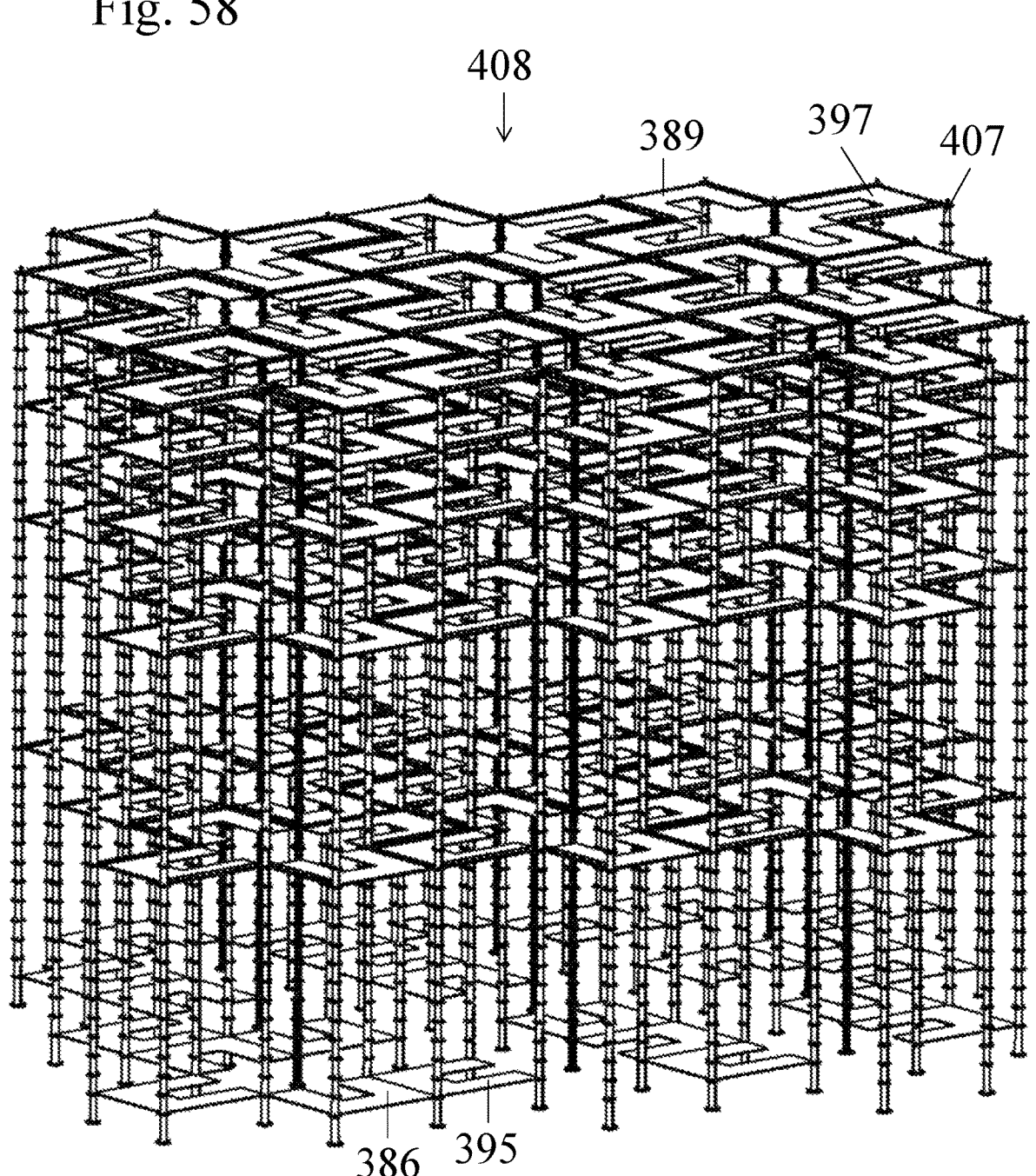
Figure 59:
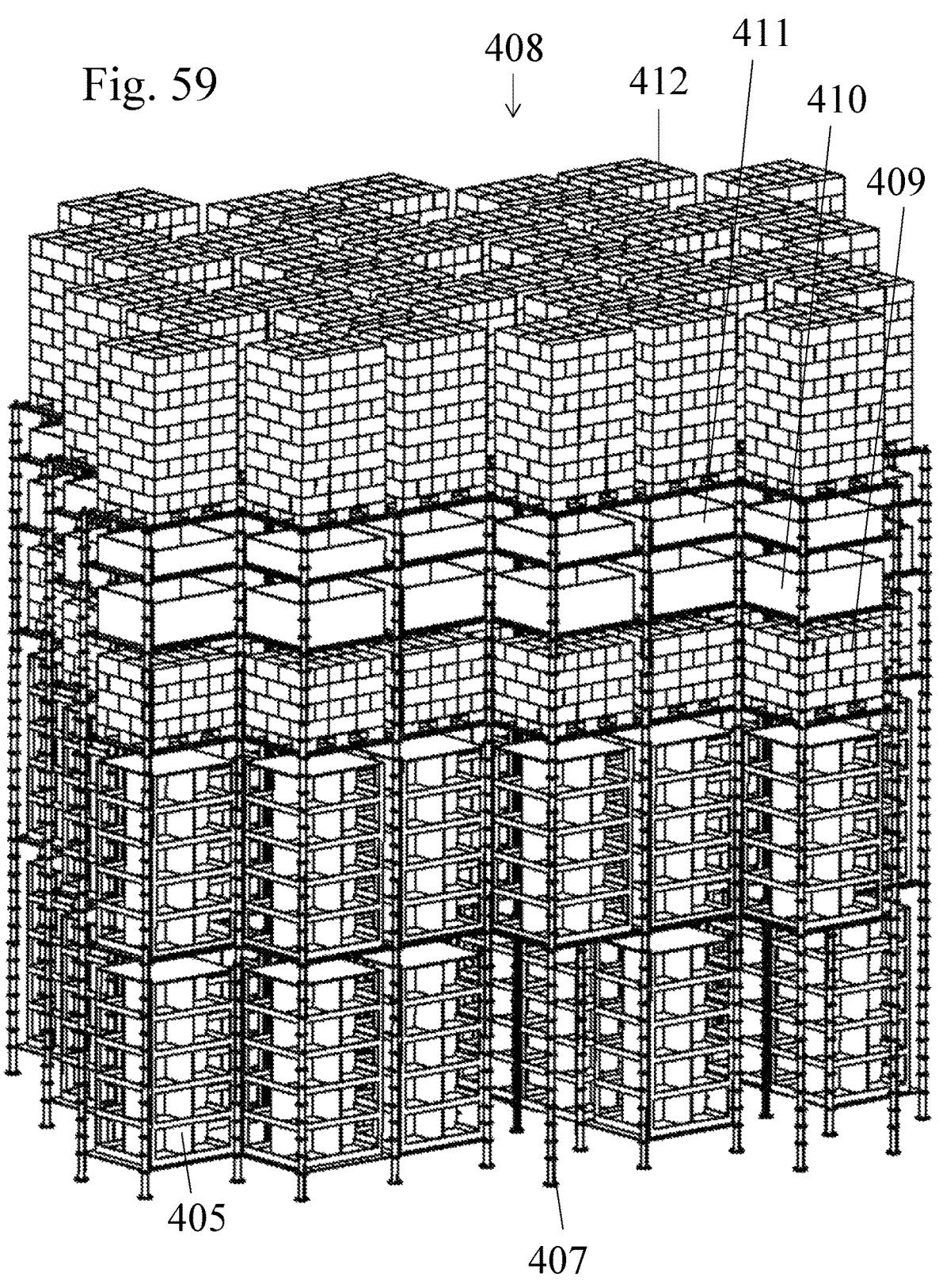
Figure 60:
Figure 60:
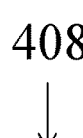
Figure 61:
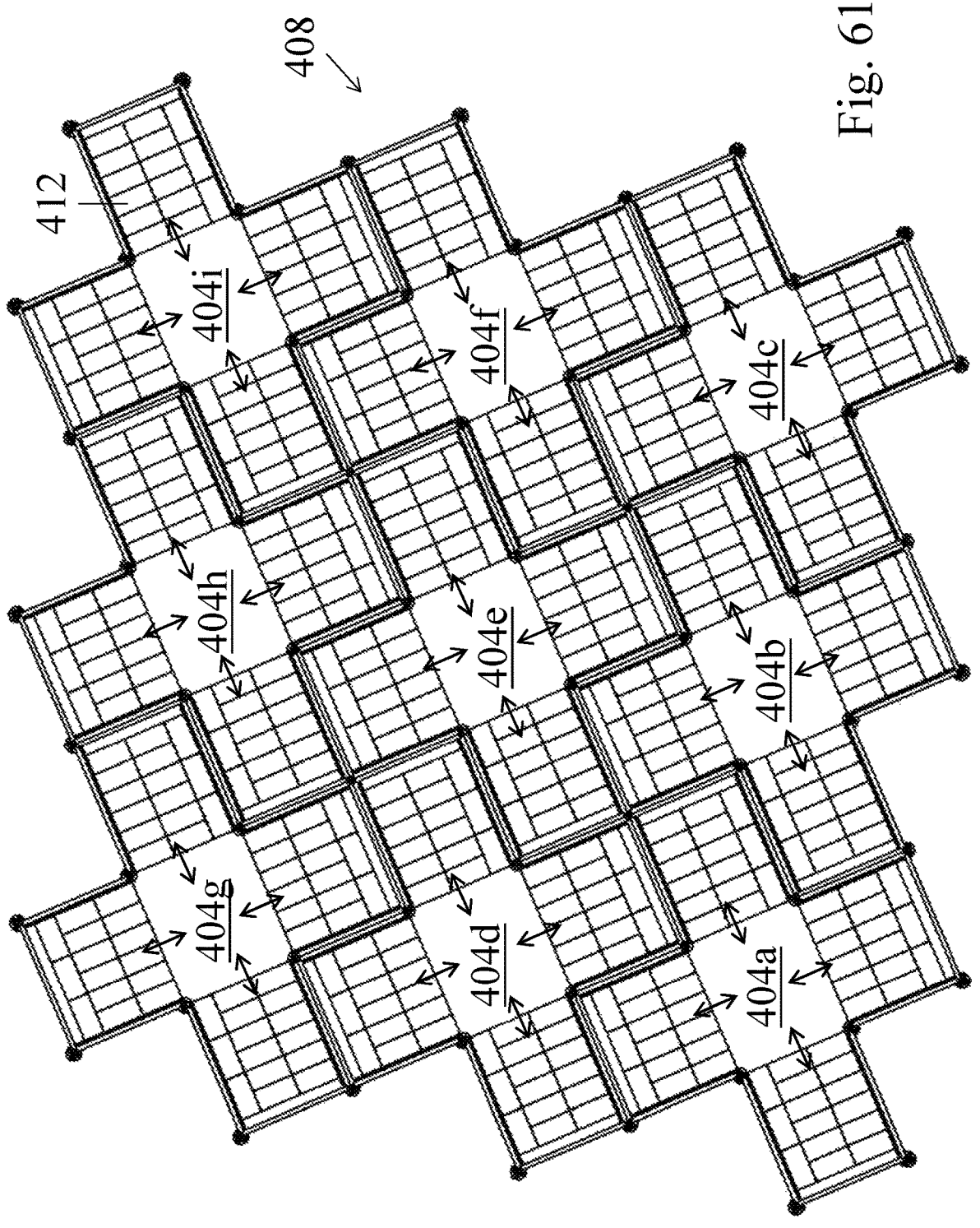
Figure 63:
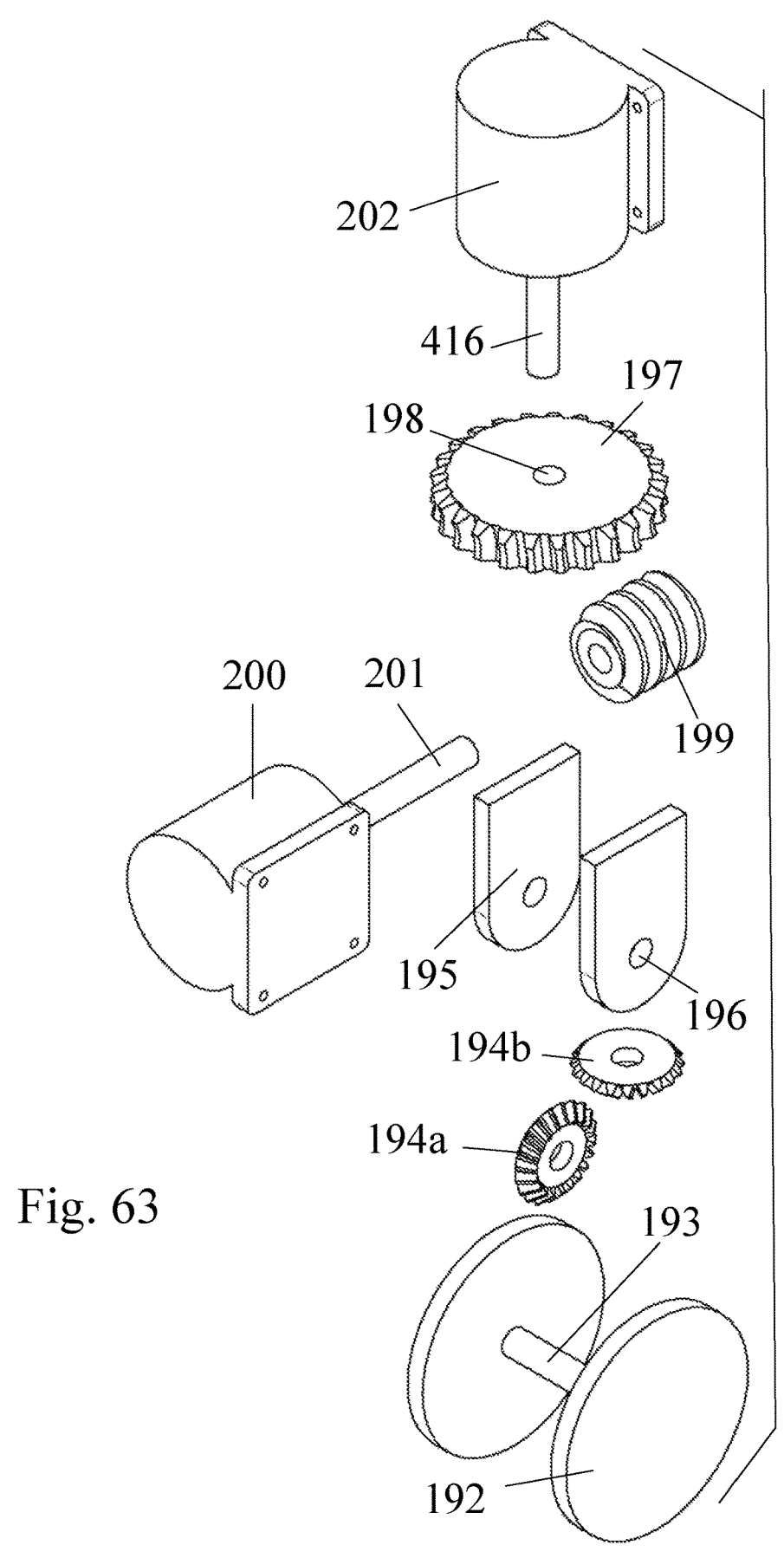
Figure 64:
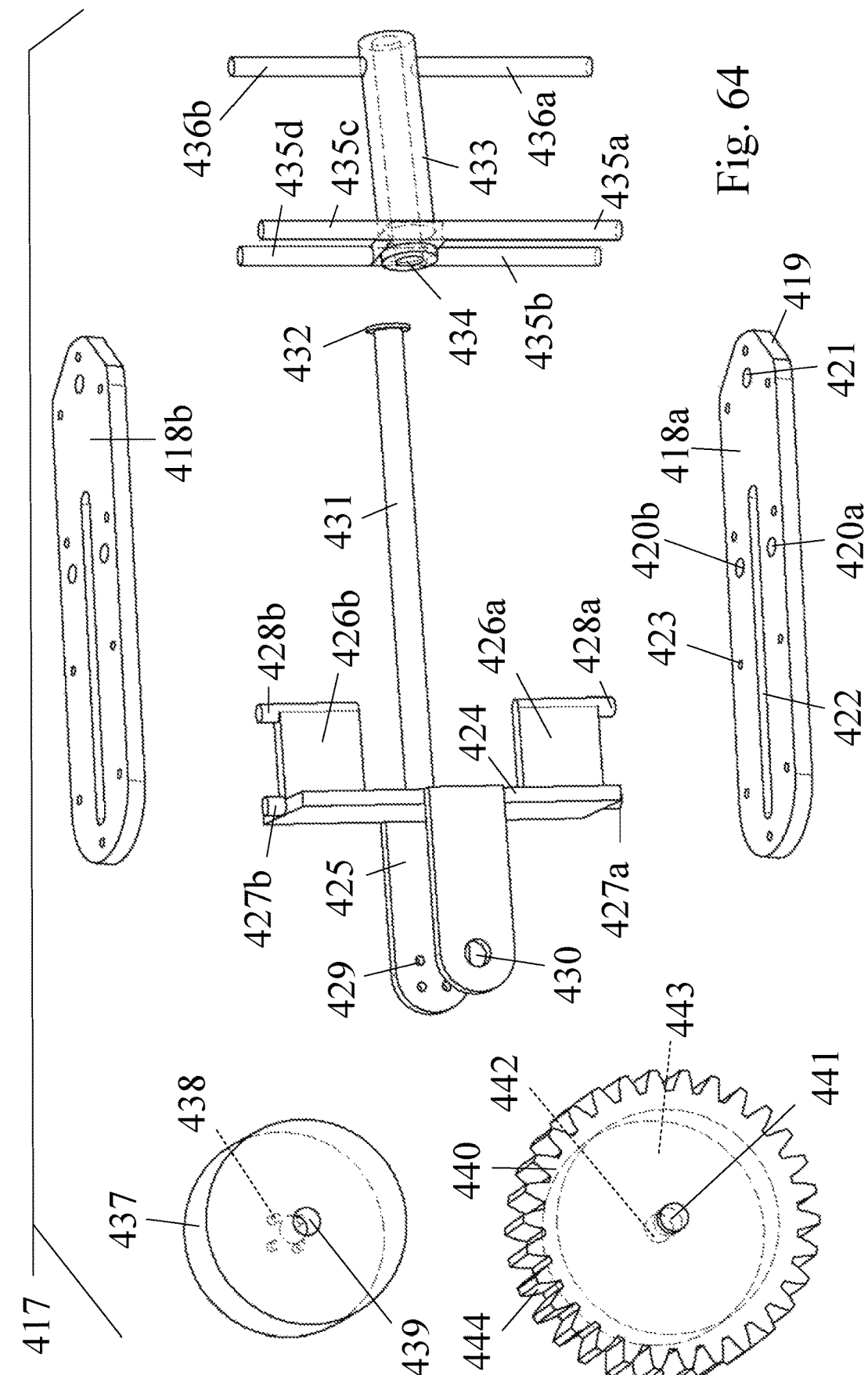
Figures 65, 65A:
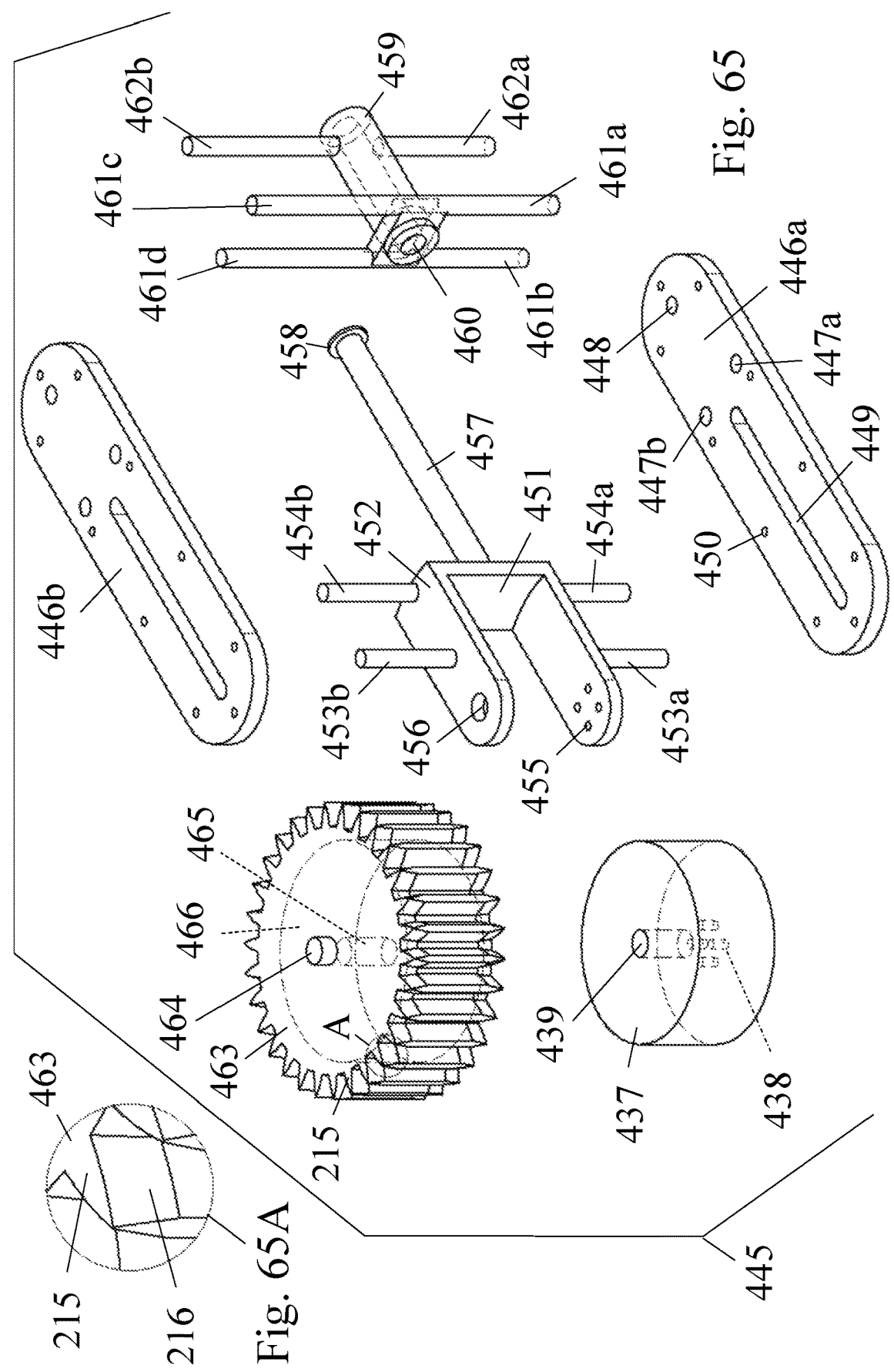
Figure 66:
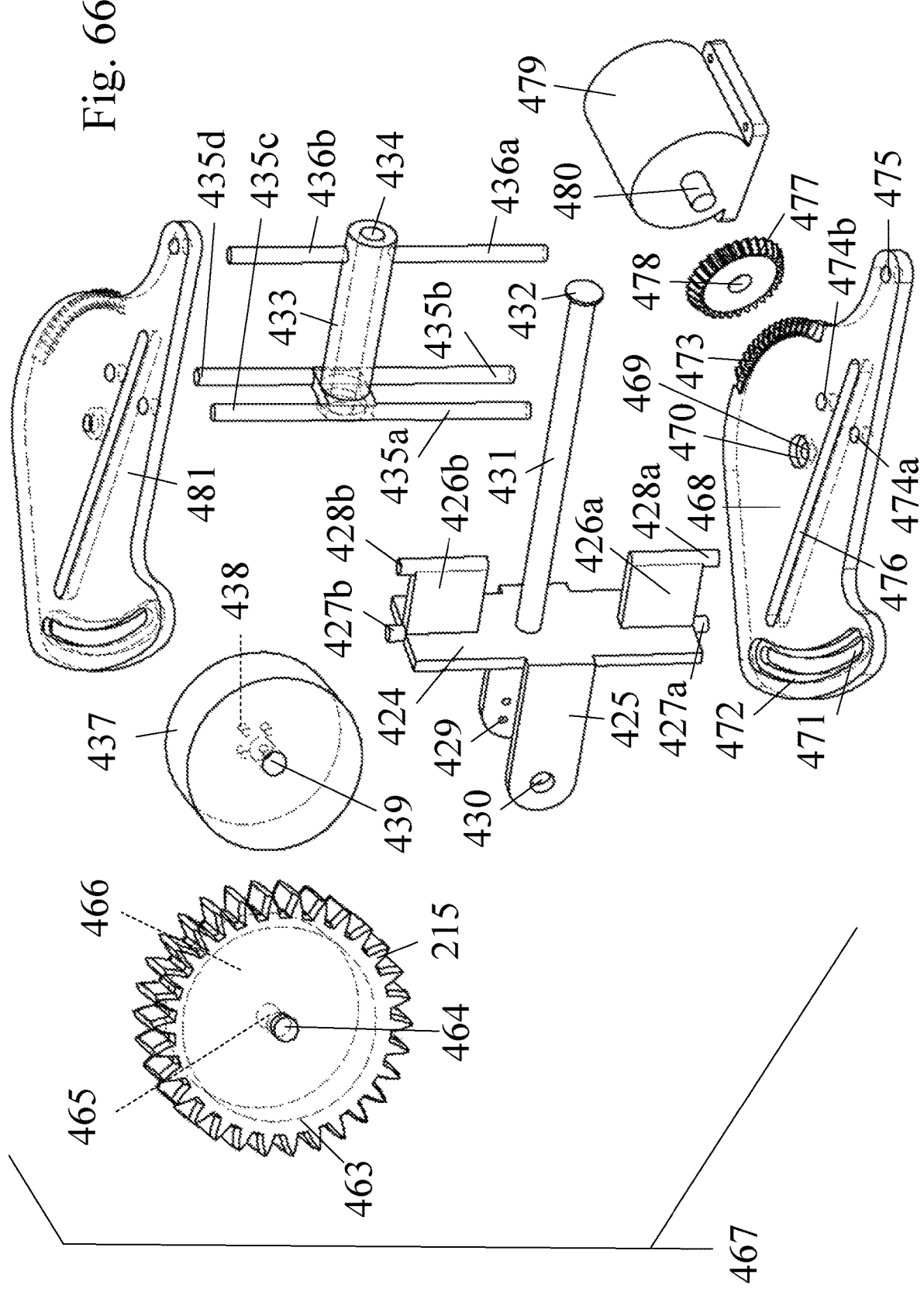
Figure 67:
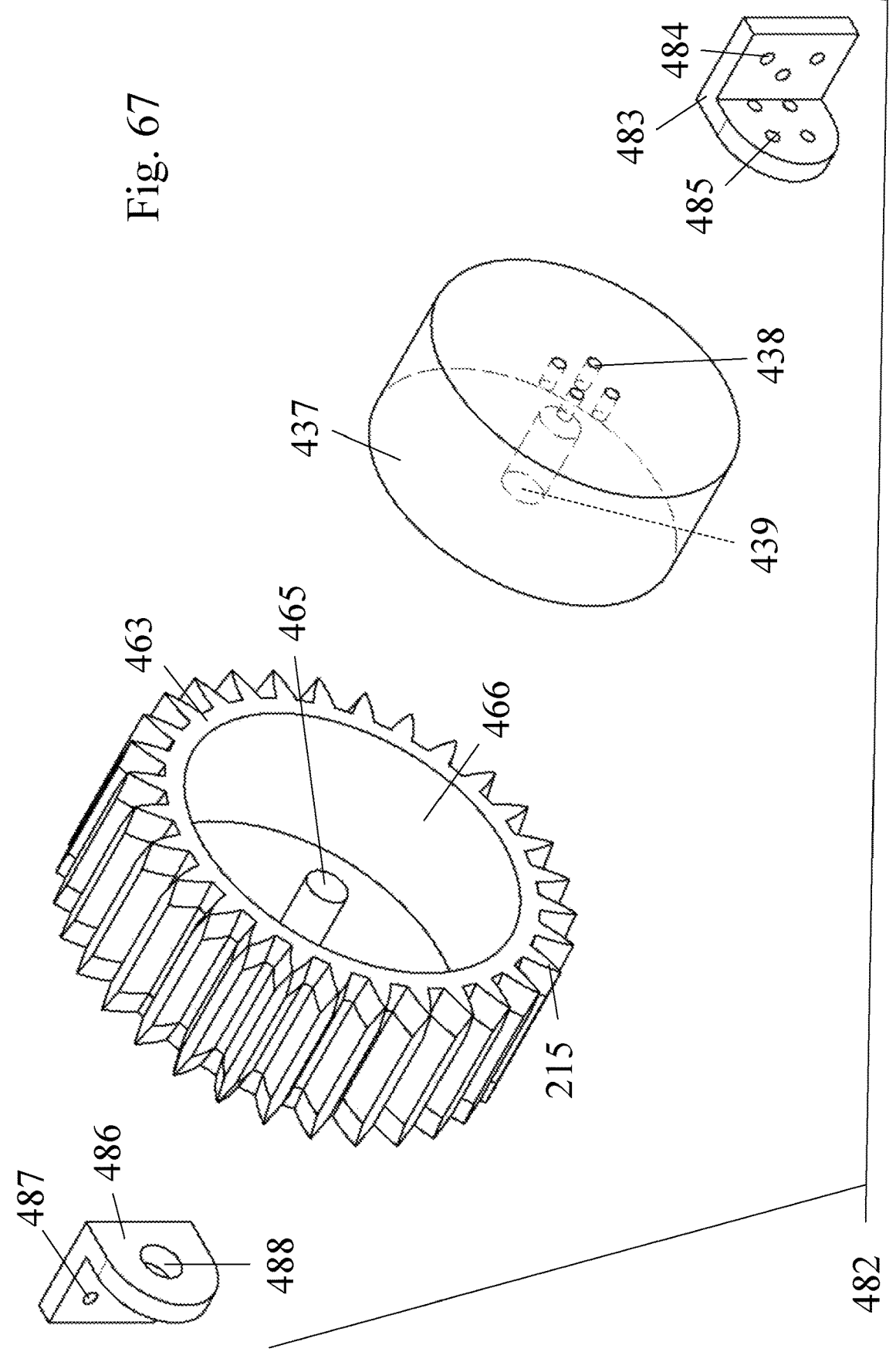
Figure 68:
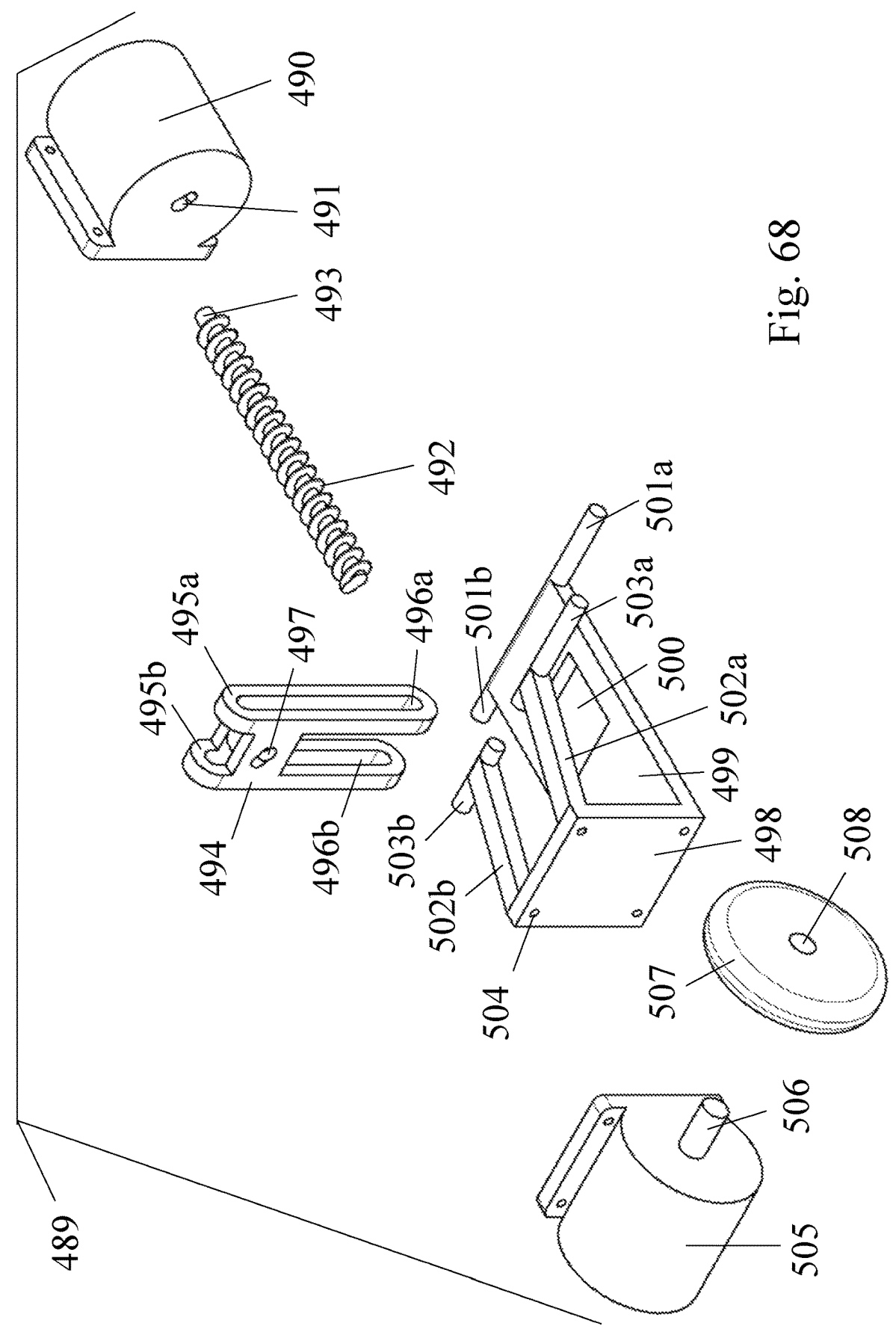
Figure 69:
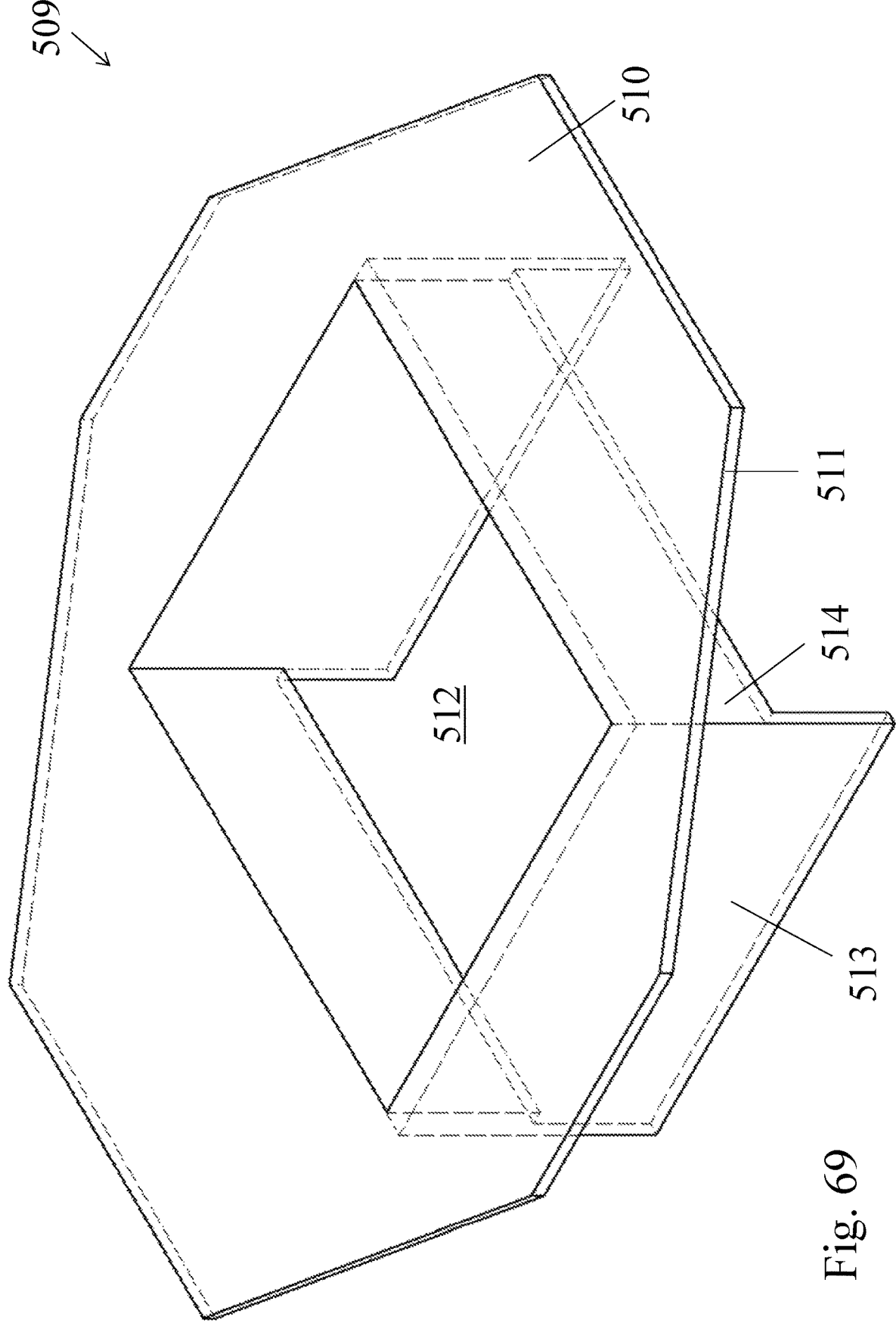
Figure 70:
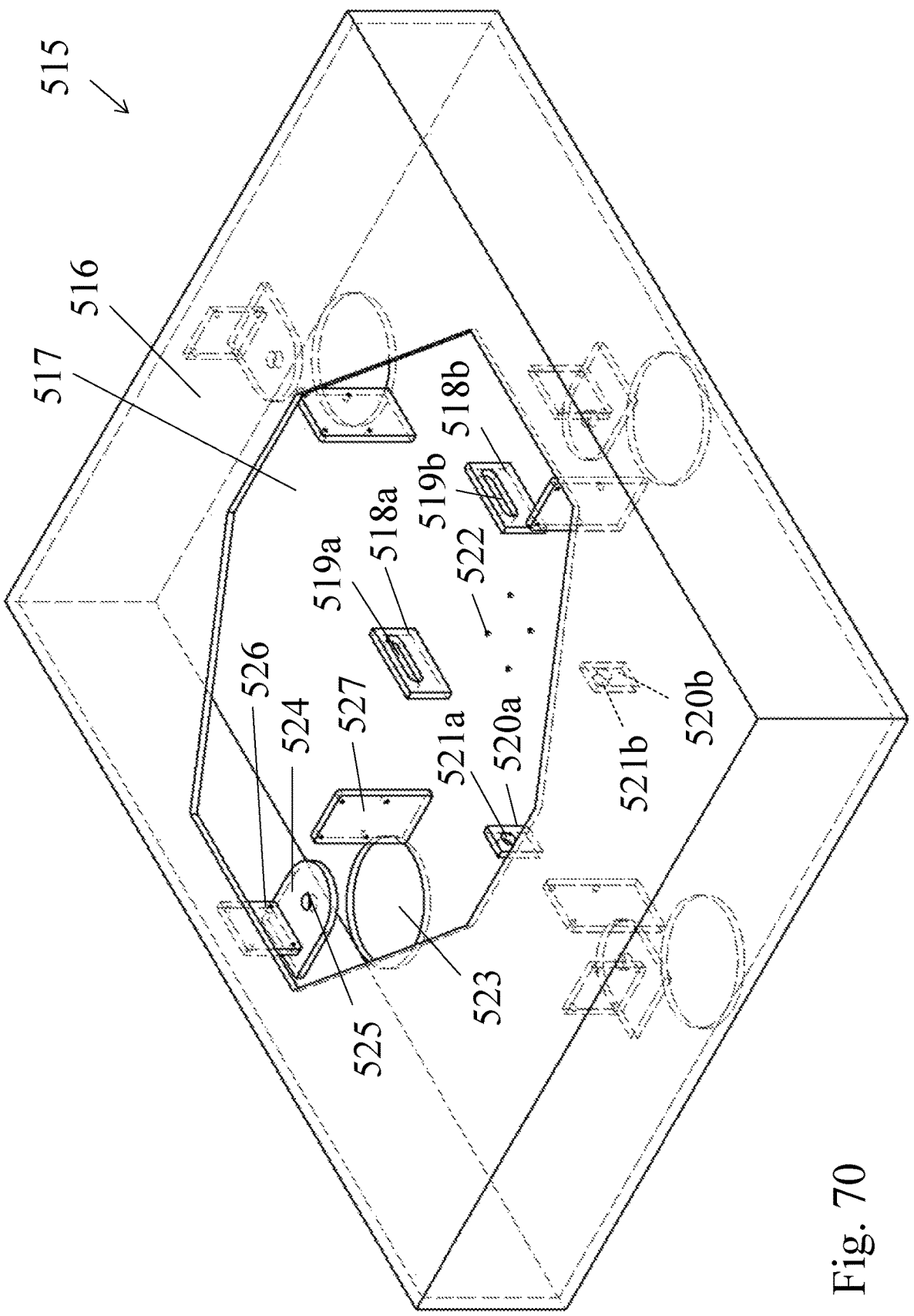
Figure 71:
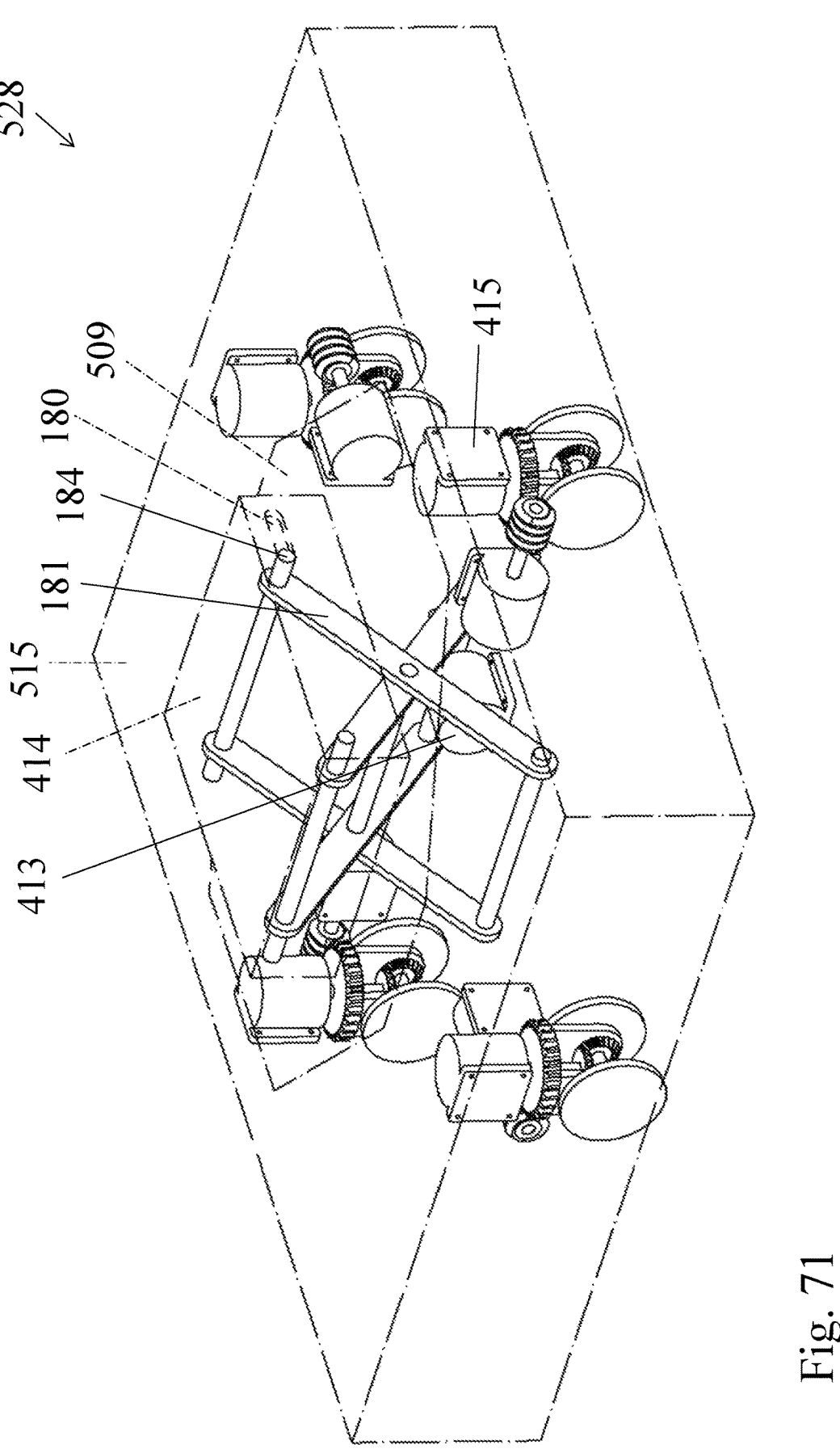
Figure 72:
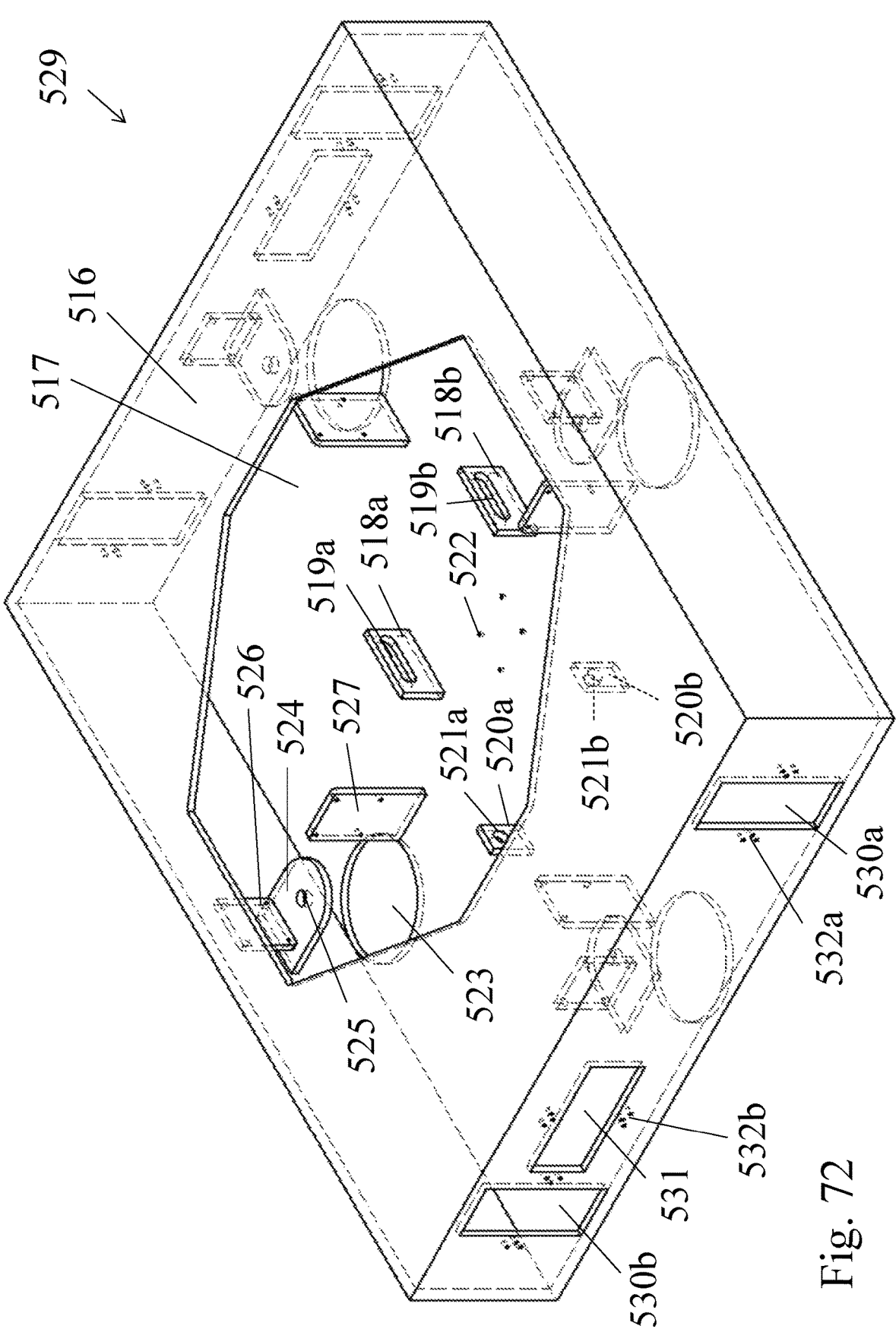
Figure 73:
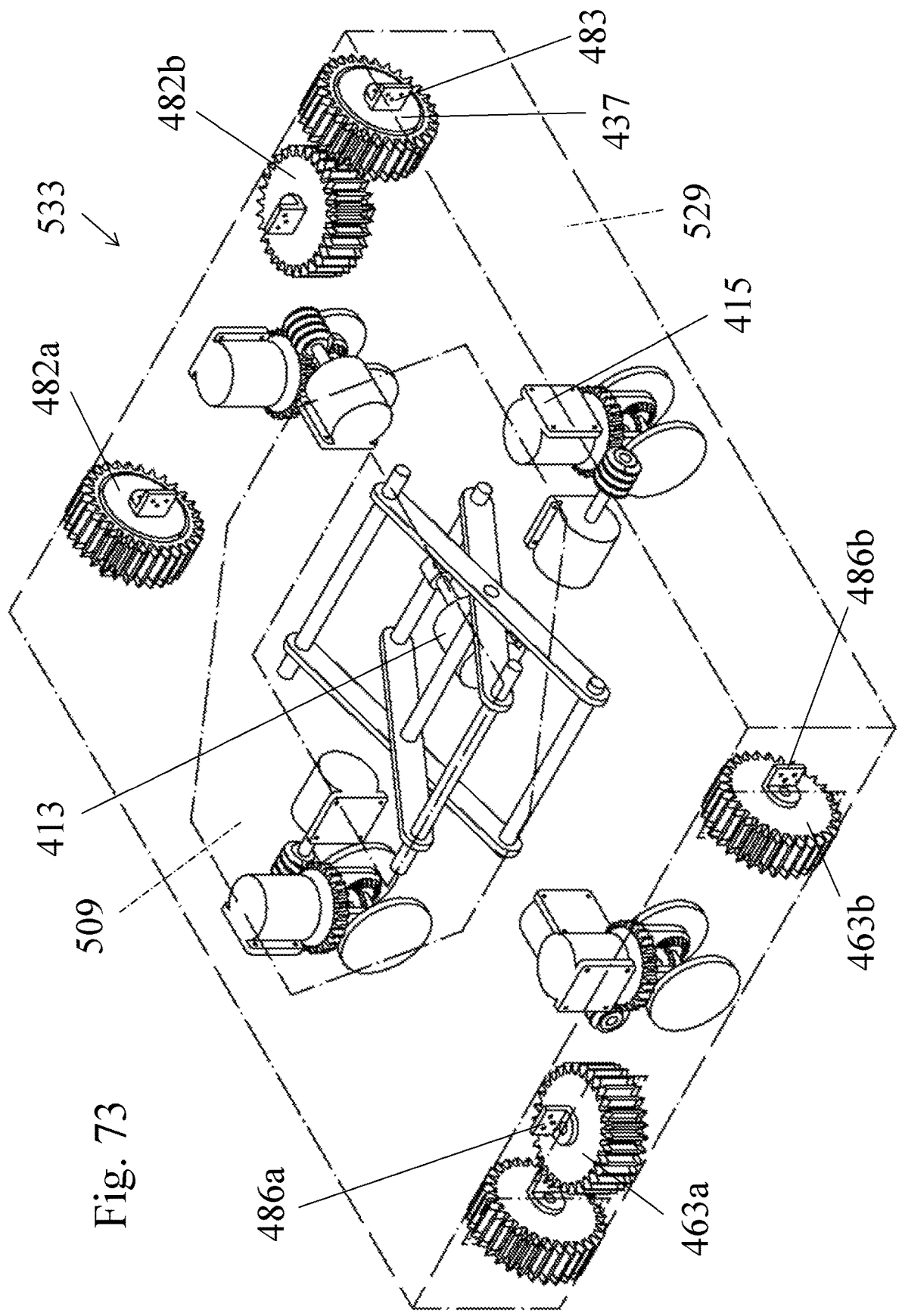
Figure 74:
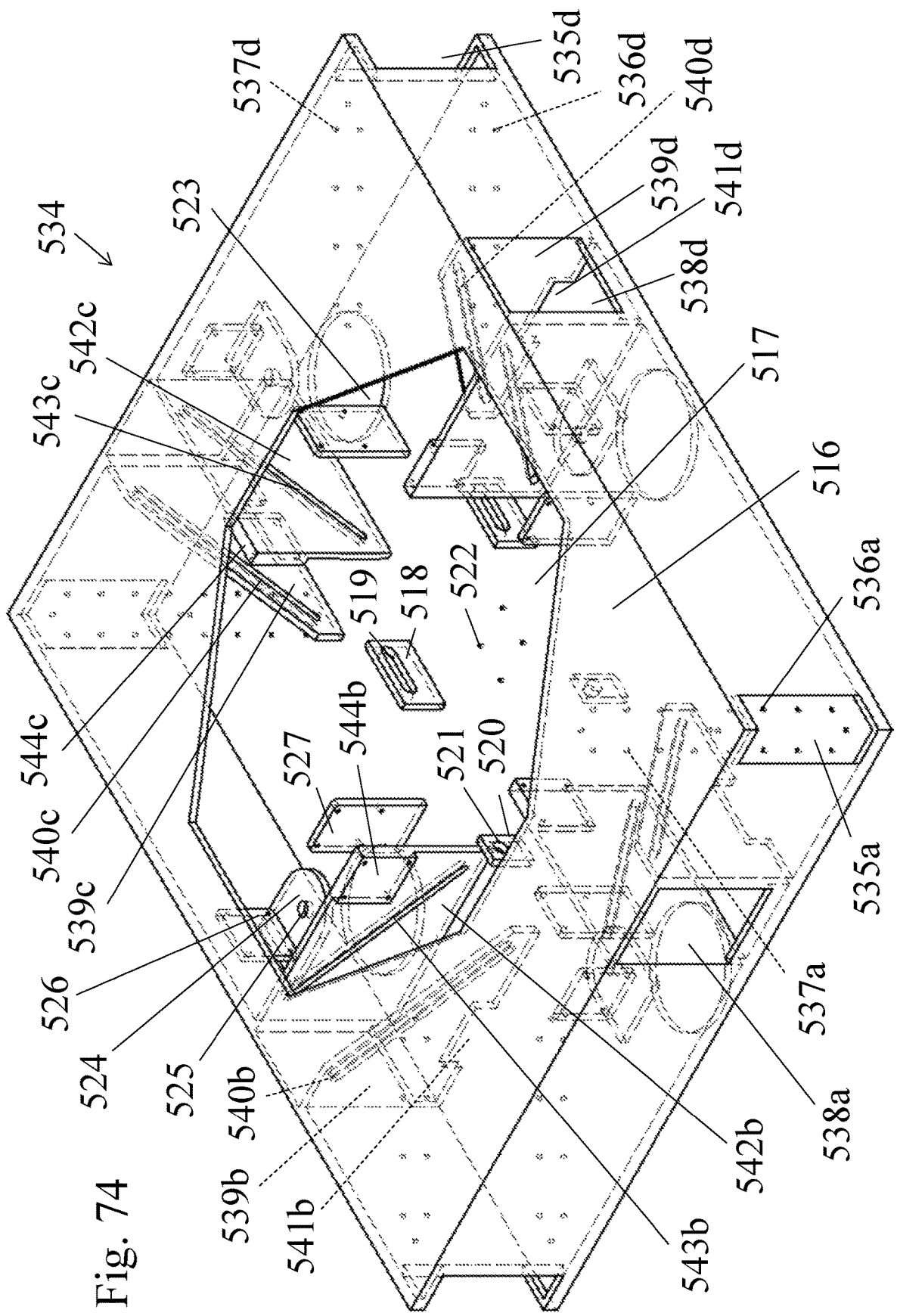
Figure 75:
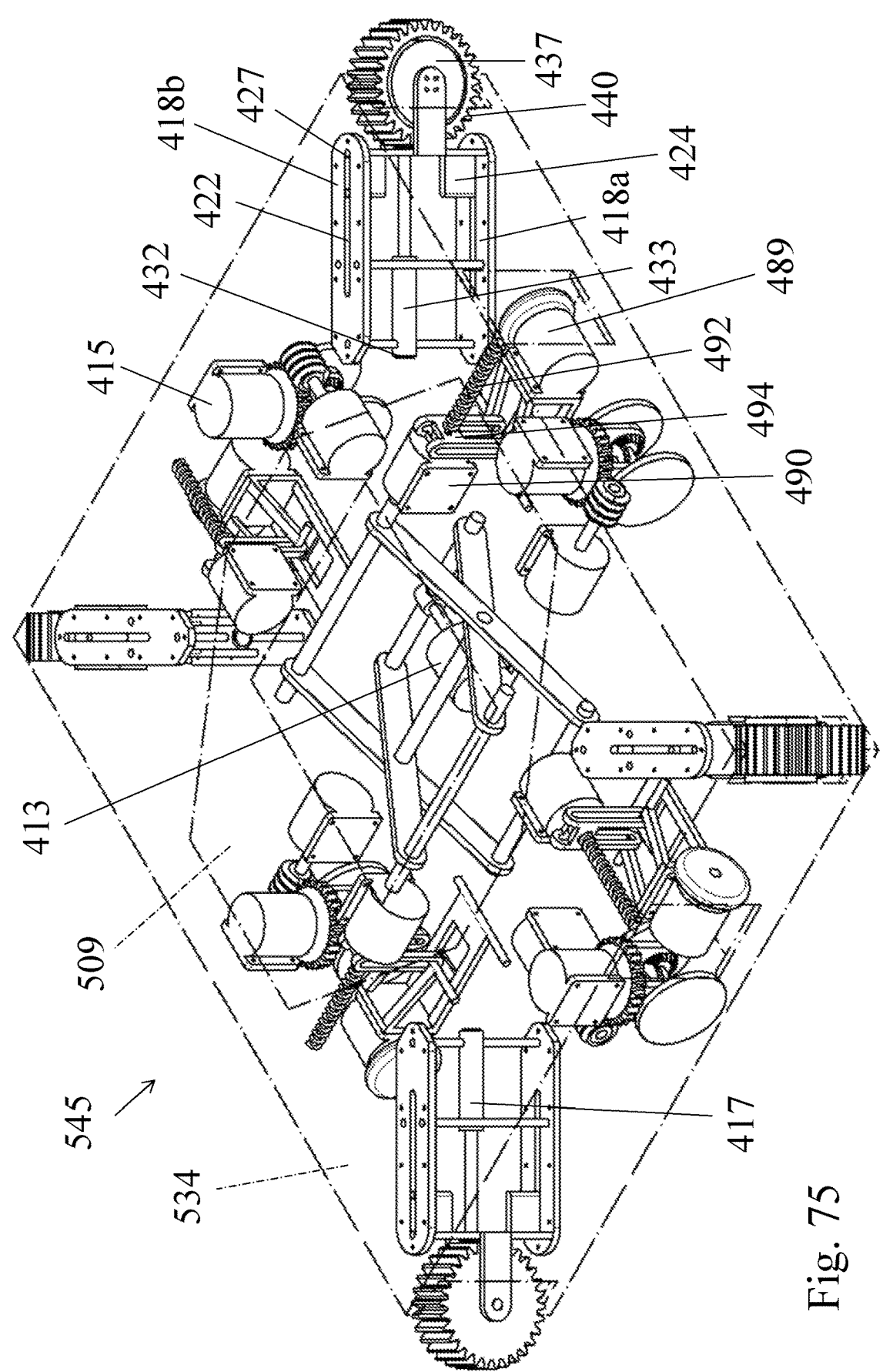
Figure 76:
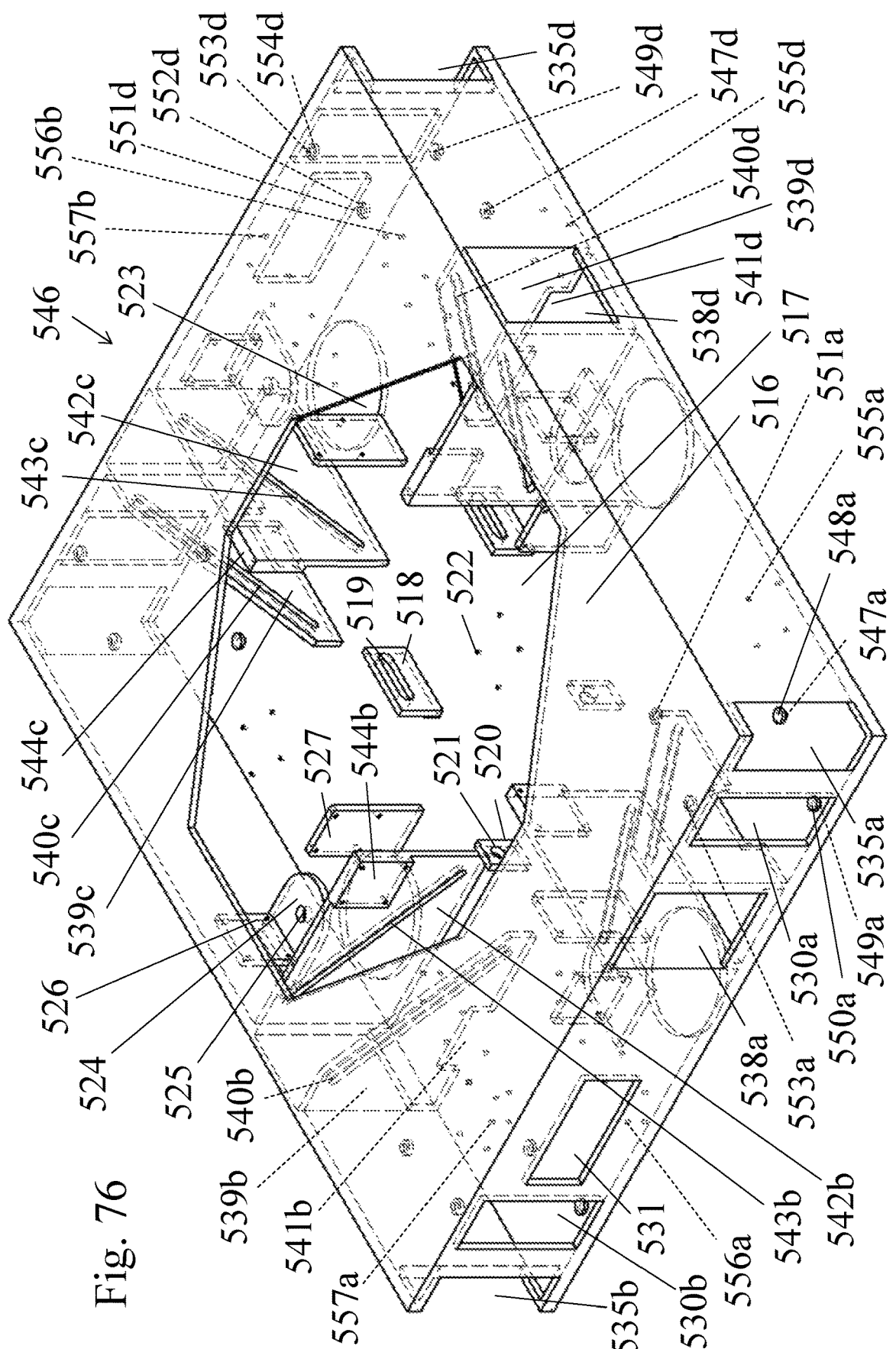
Figure 77:
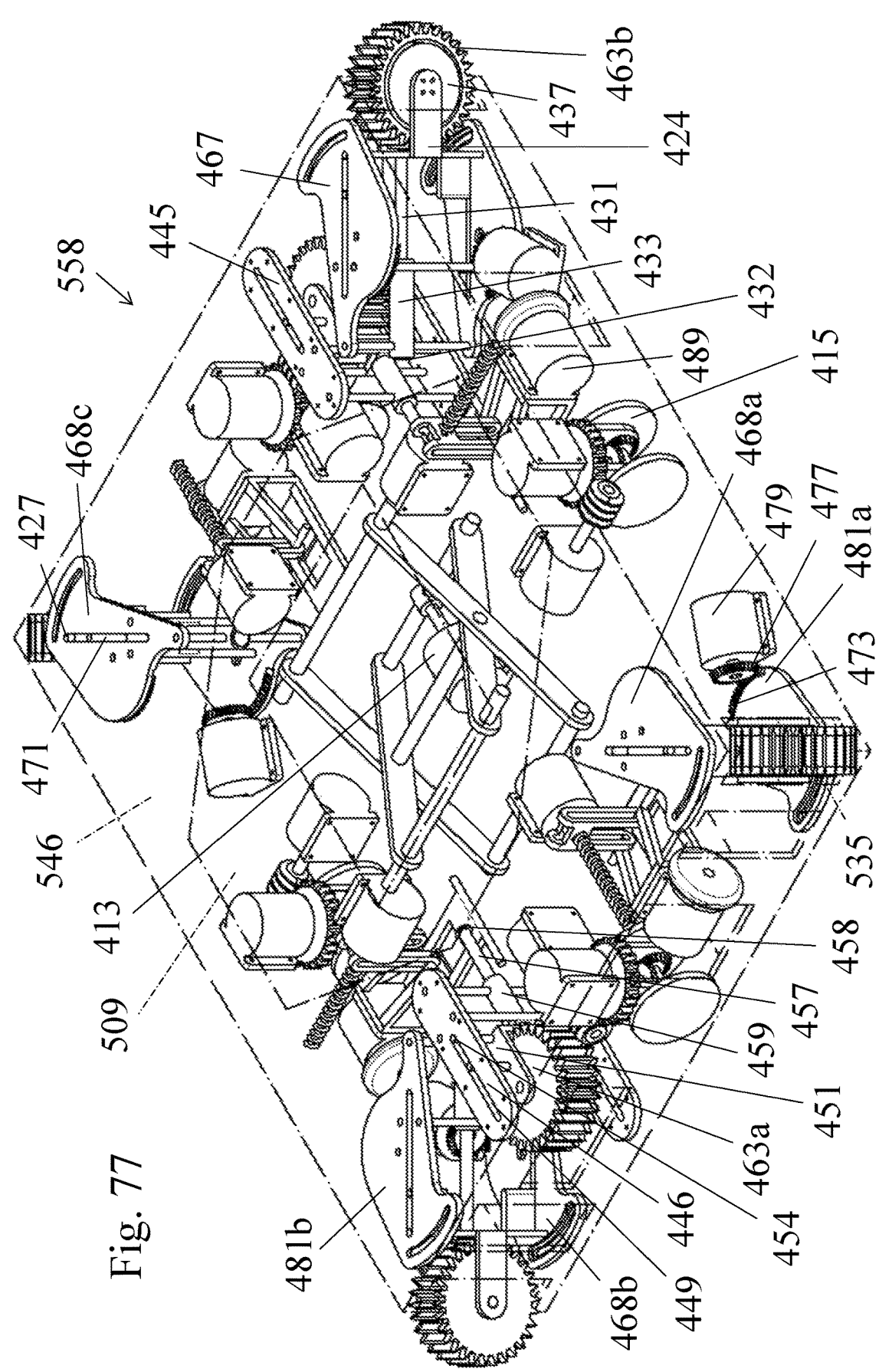
Figure 78:
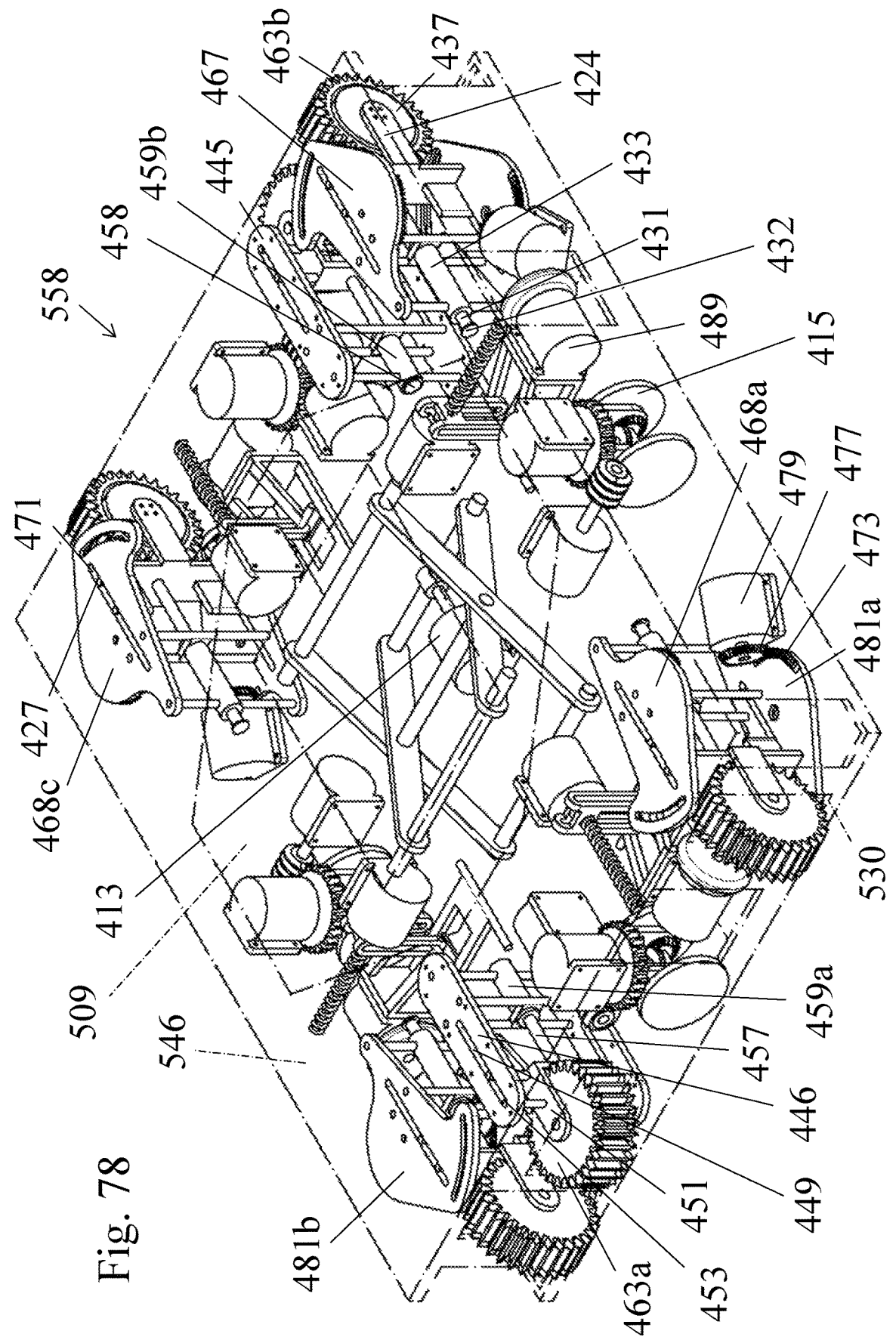
Figure 79:
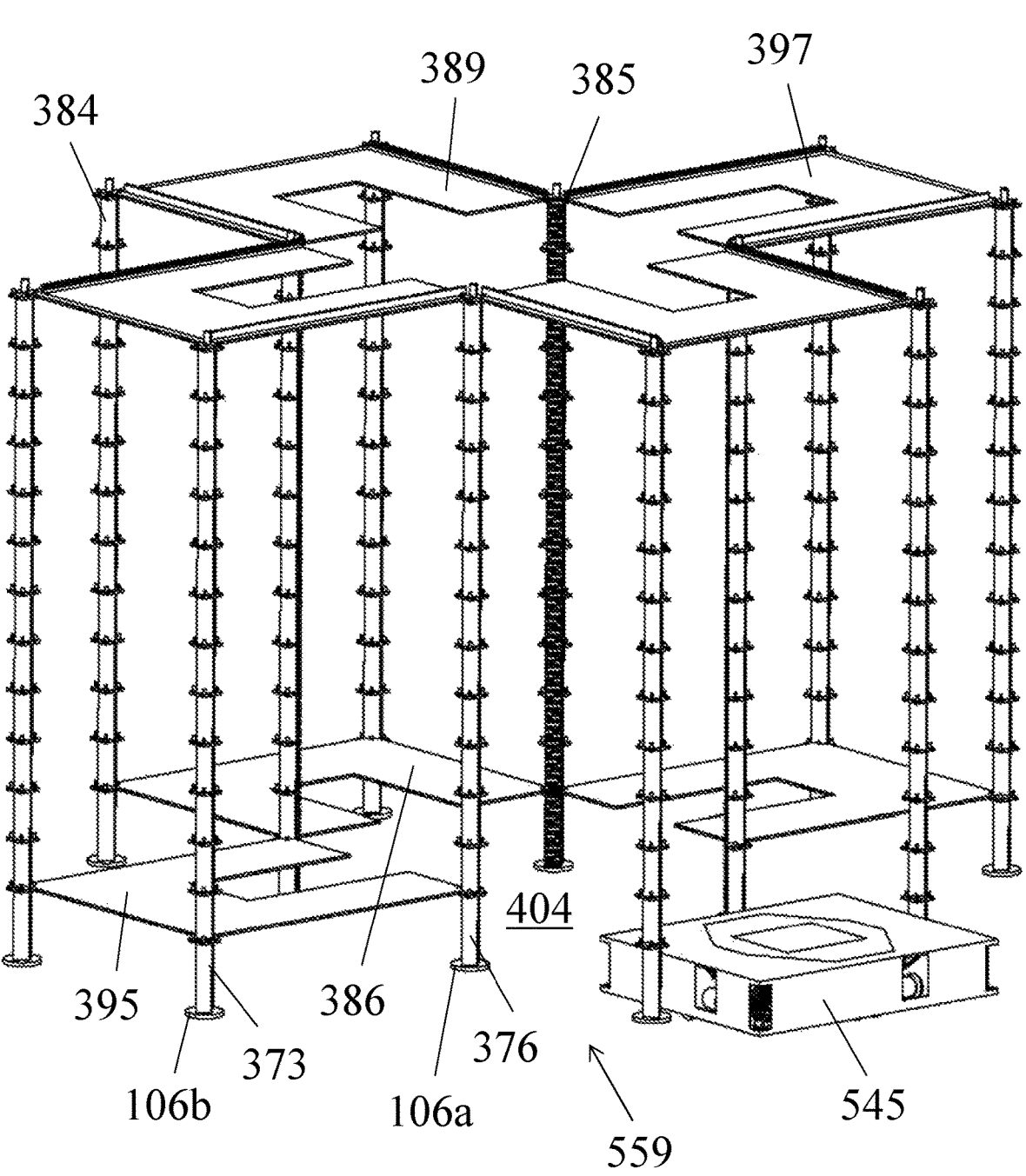
Figure 80:
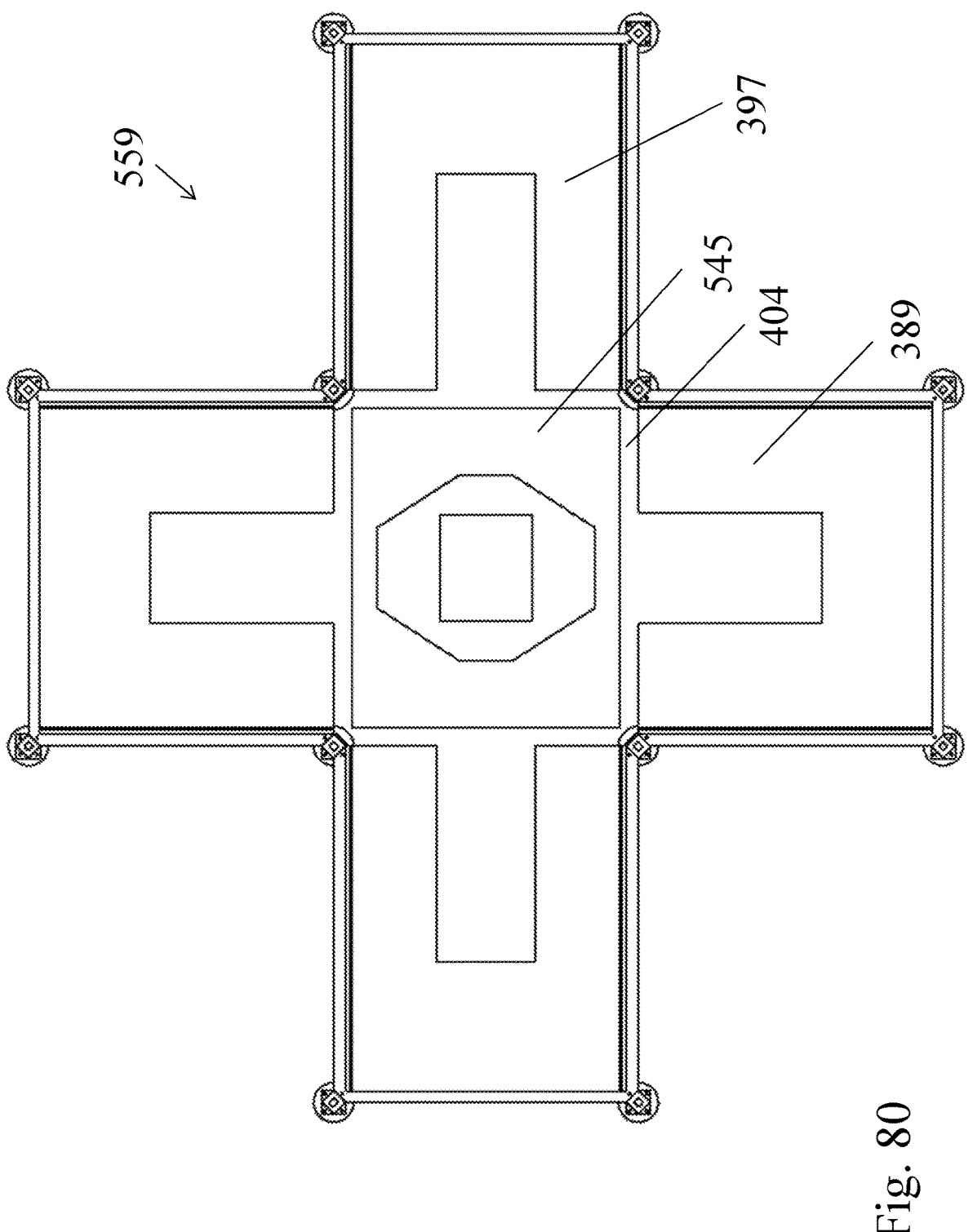
Figure 81:
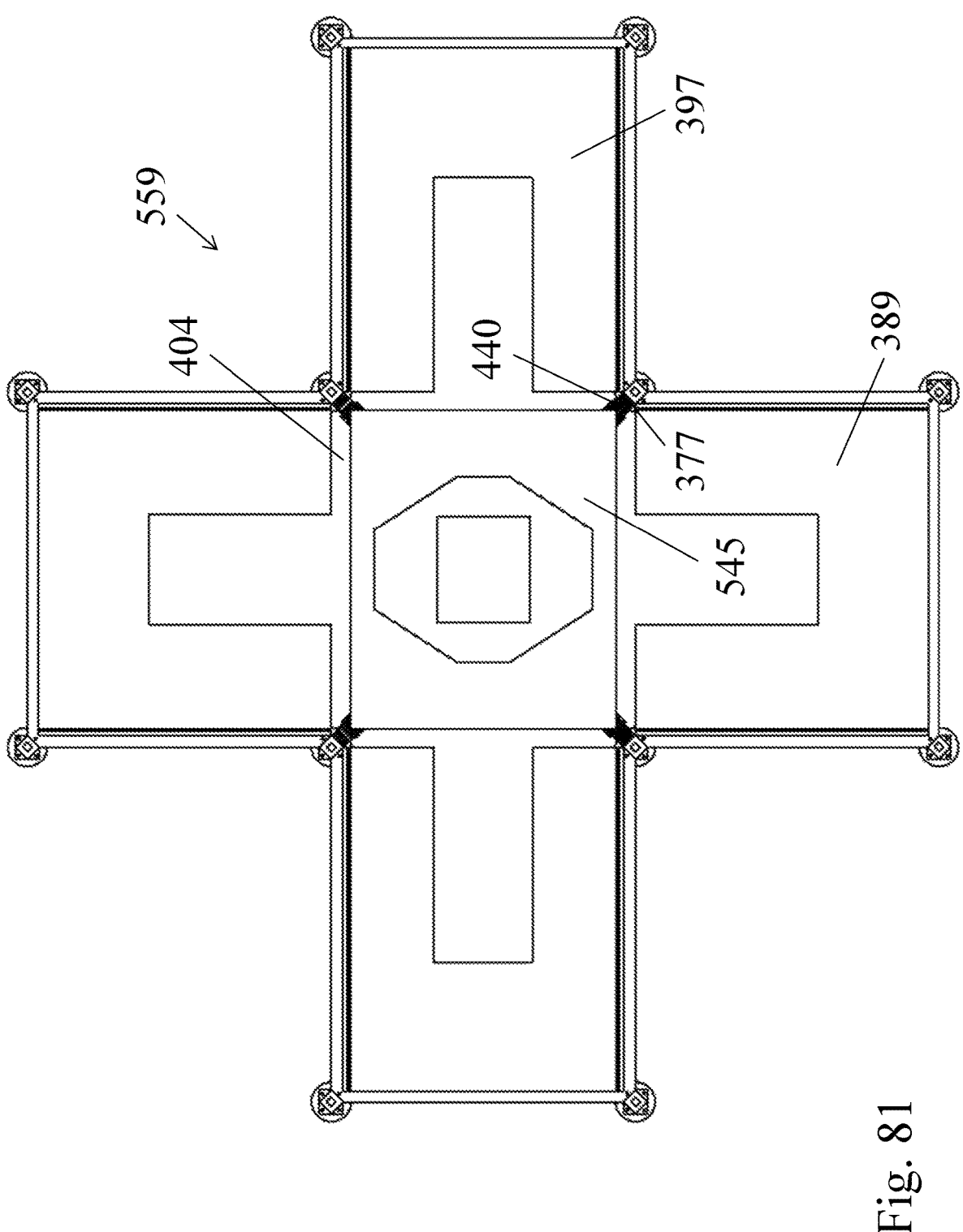
Figure 82:
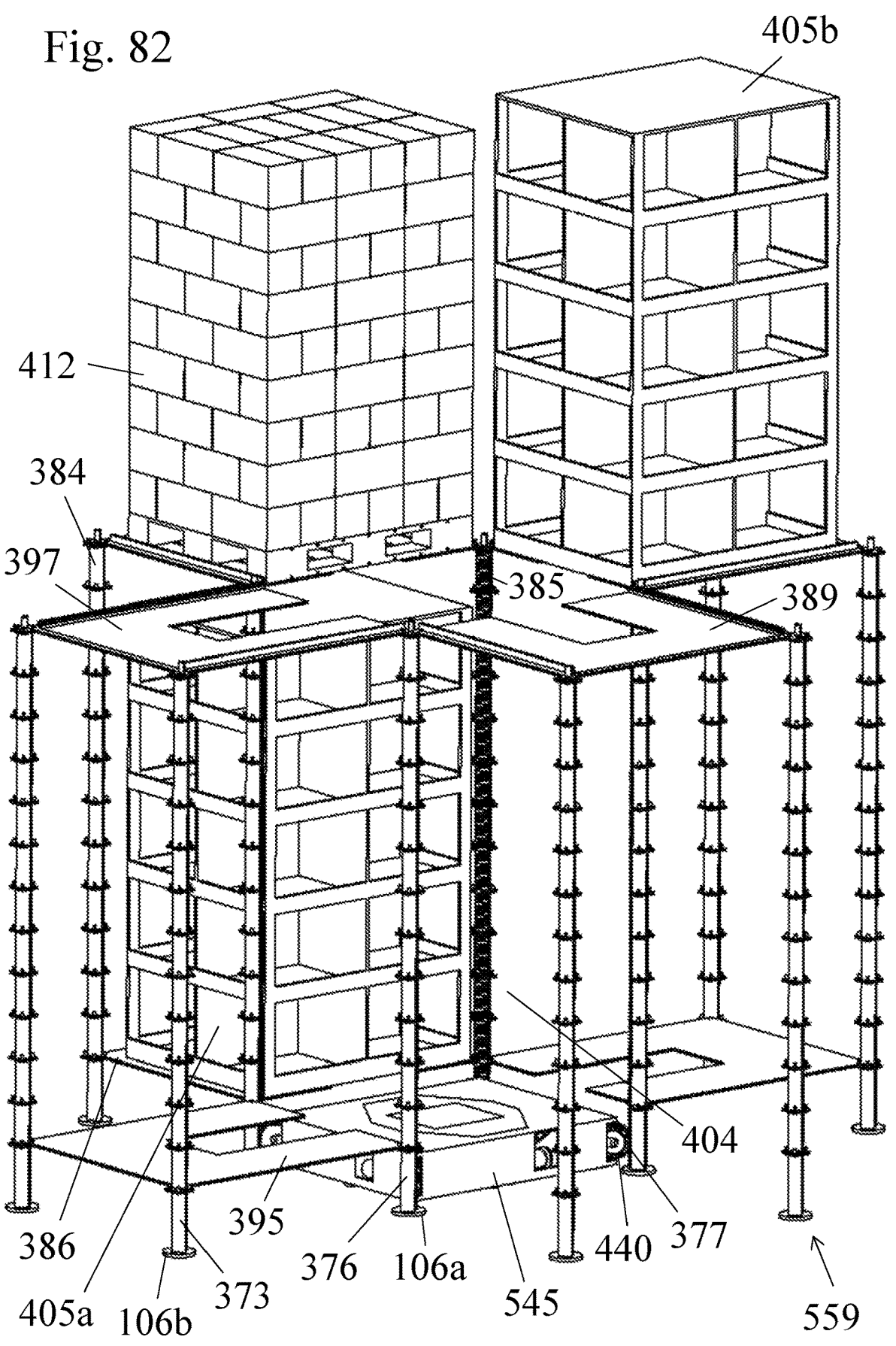
Figure 83:
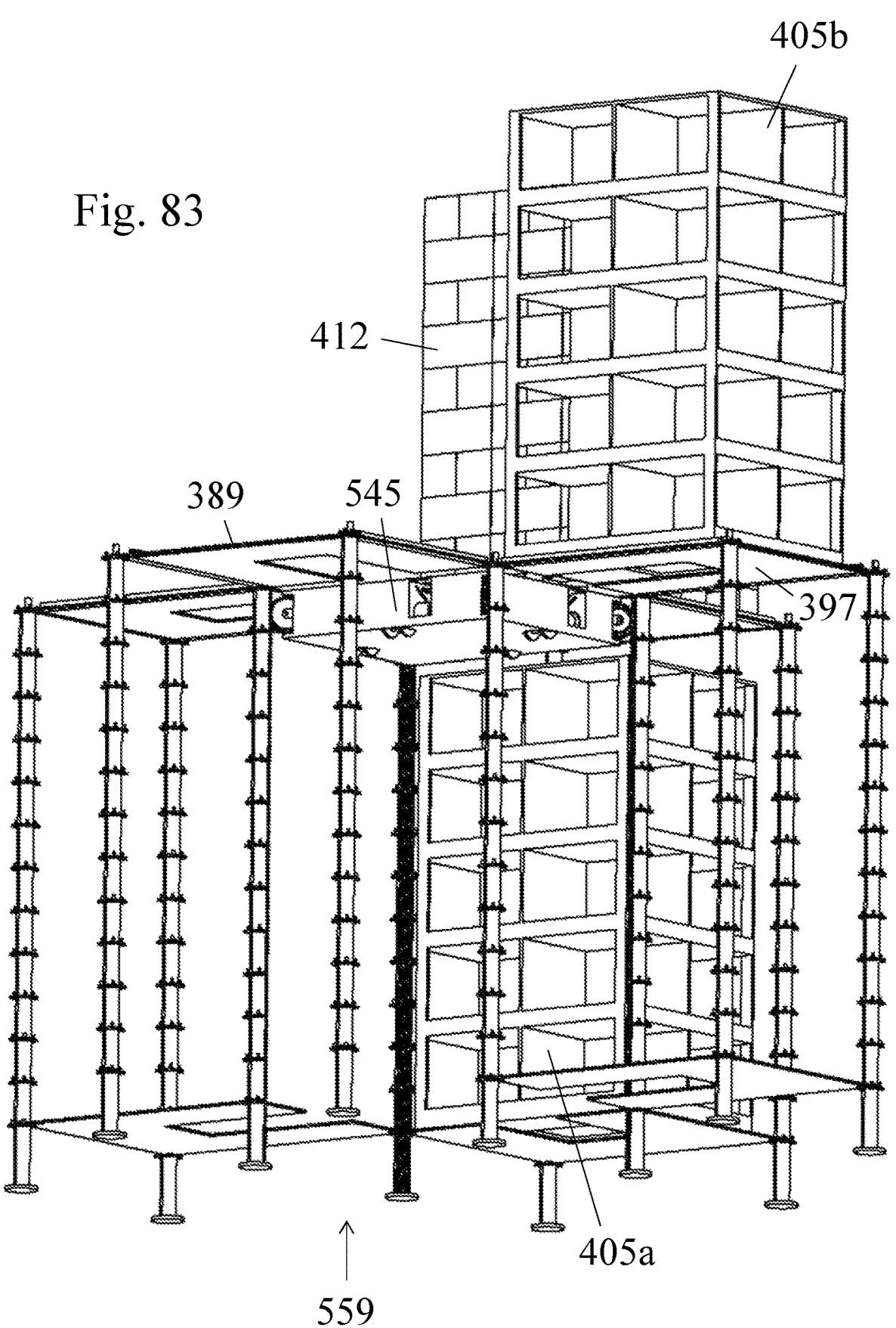
Figure 84:
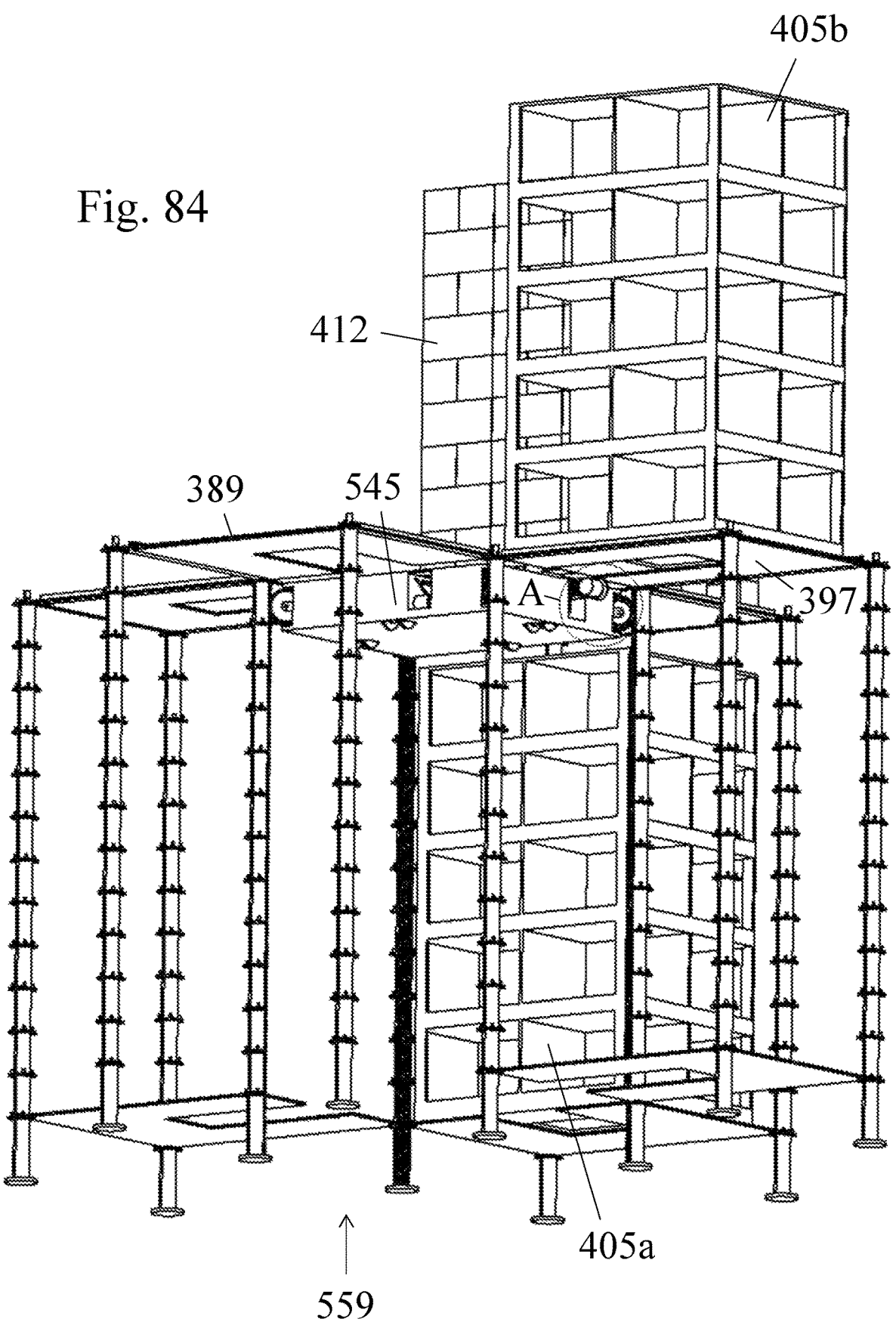
Figure 84A:
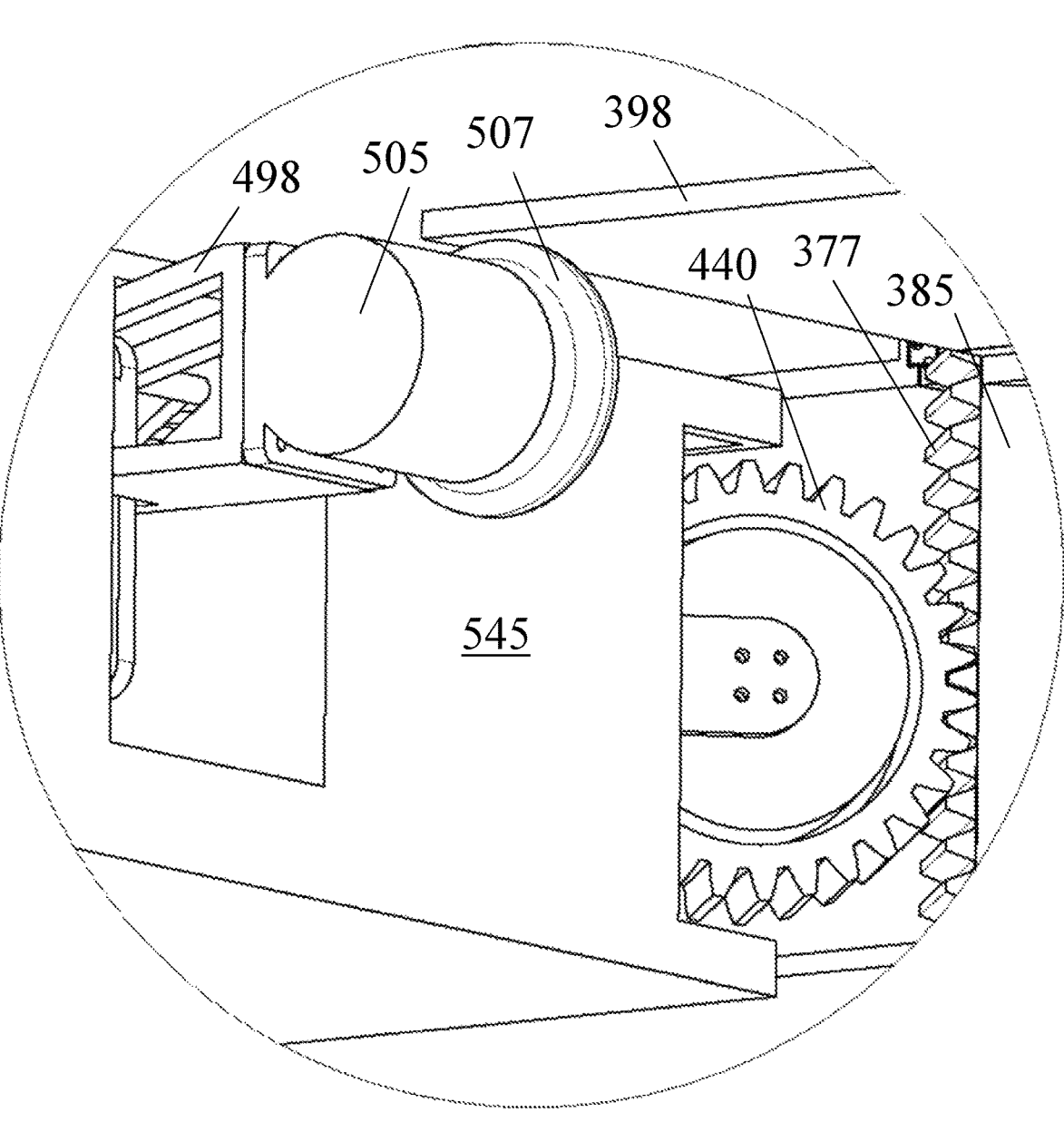
Figure 85:
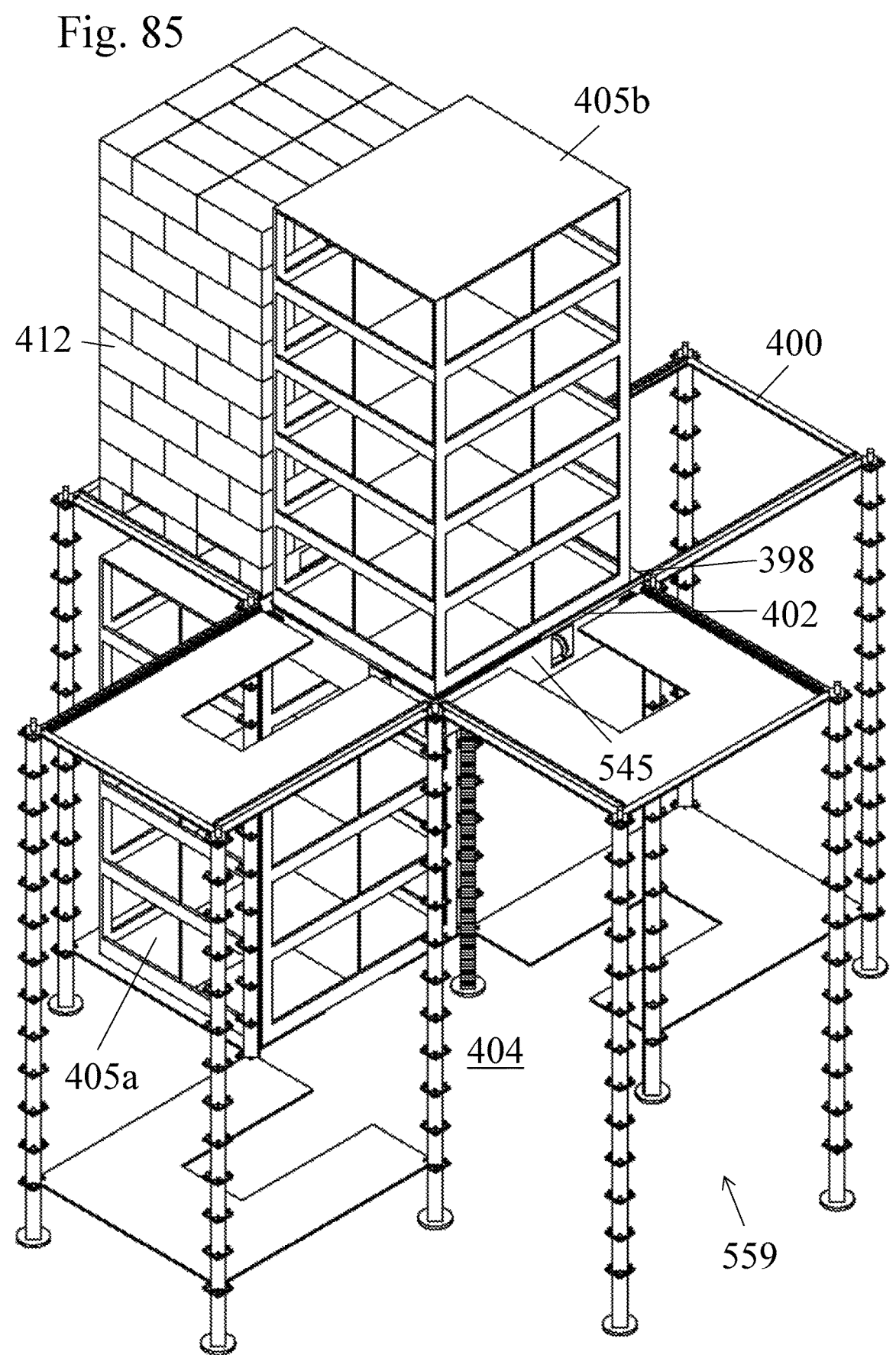
Figure 86:
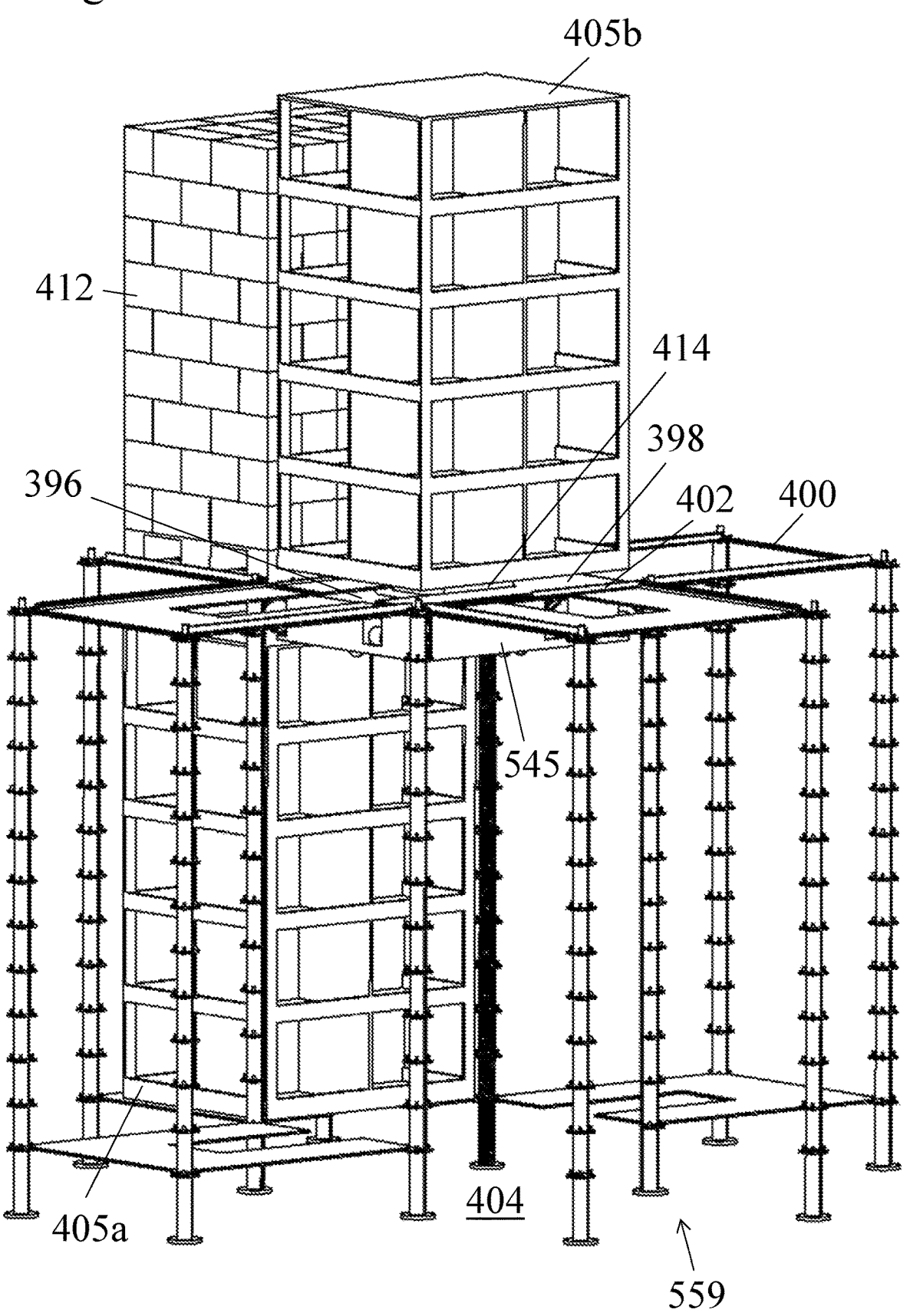
Figure 87:
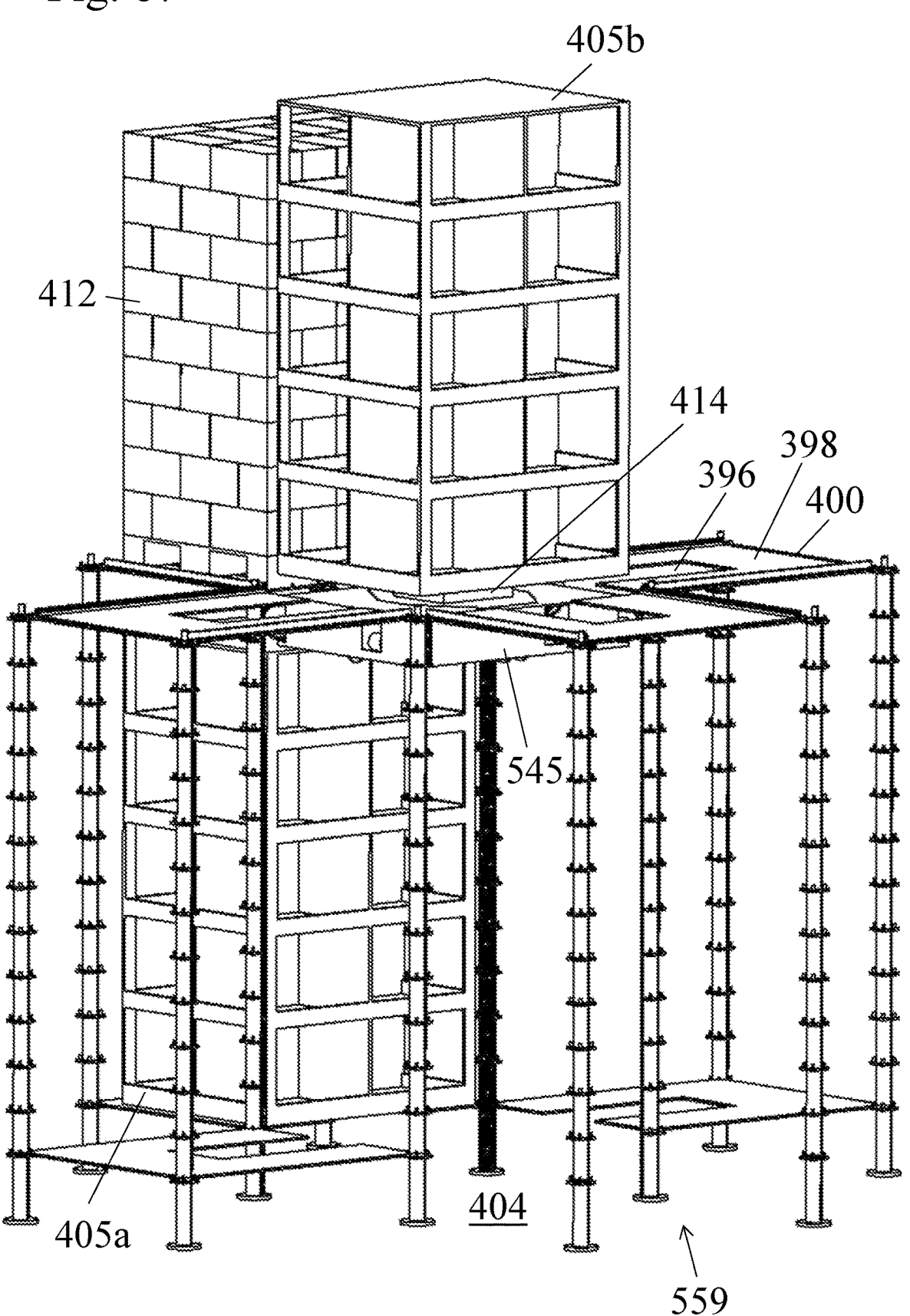
Figure 88:
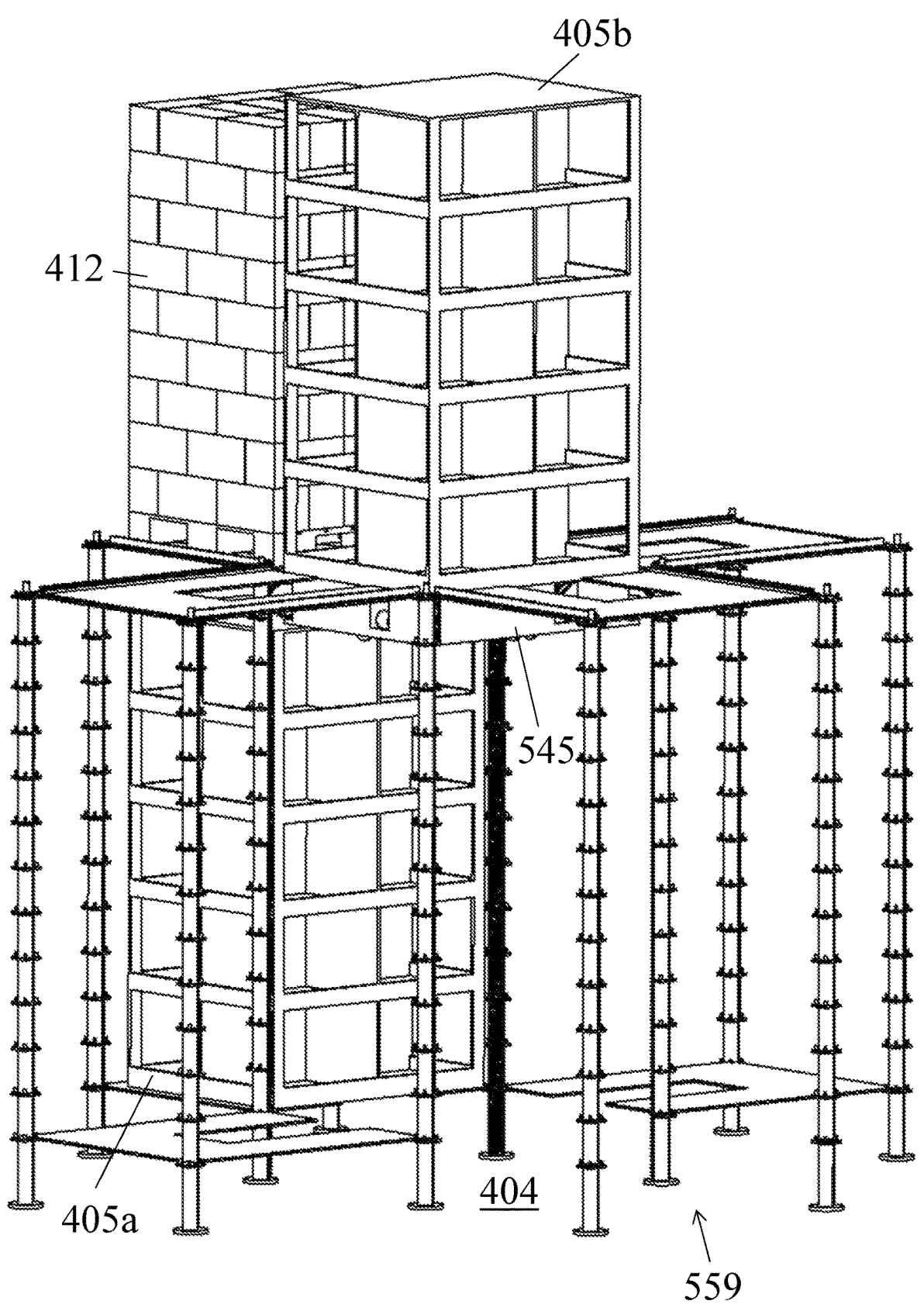
Figure 89:
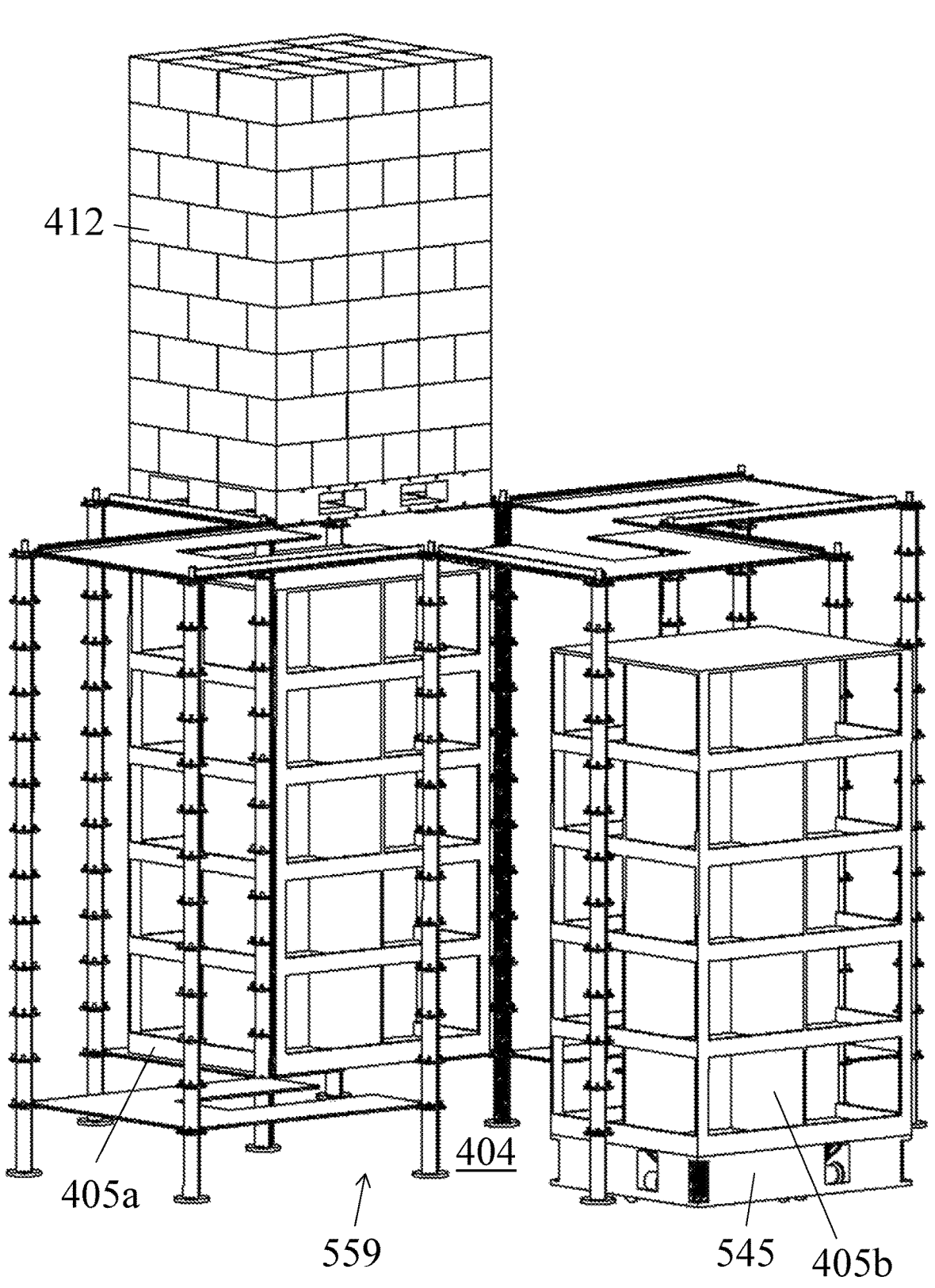
Figure 90:
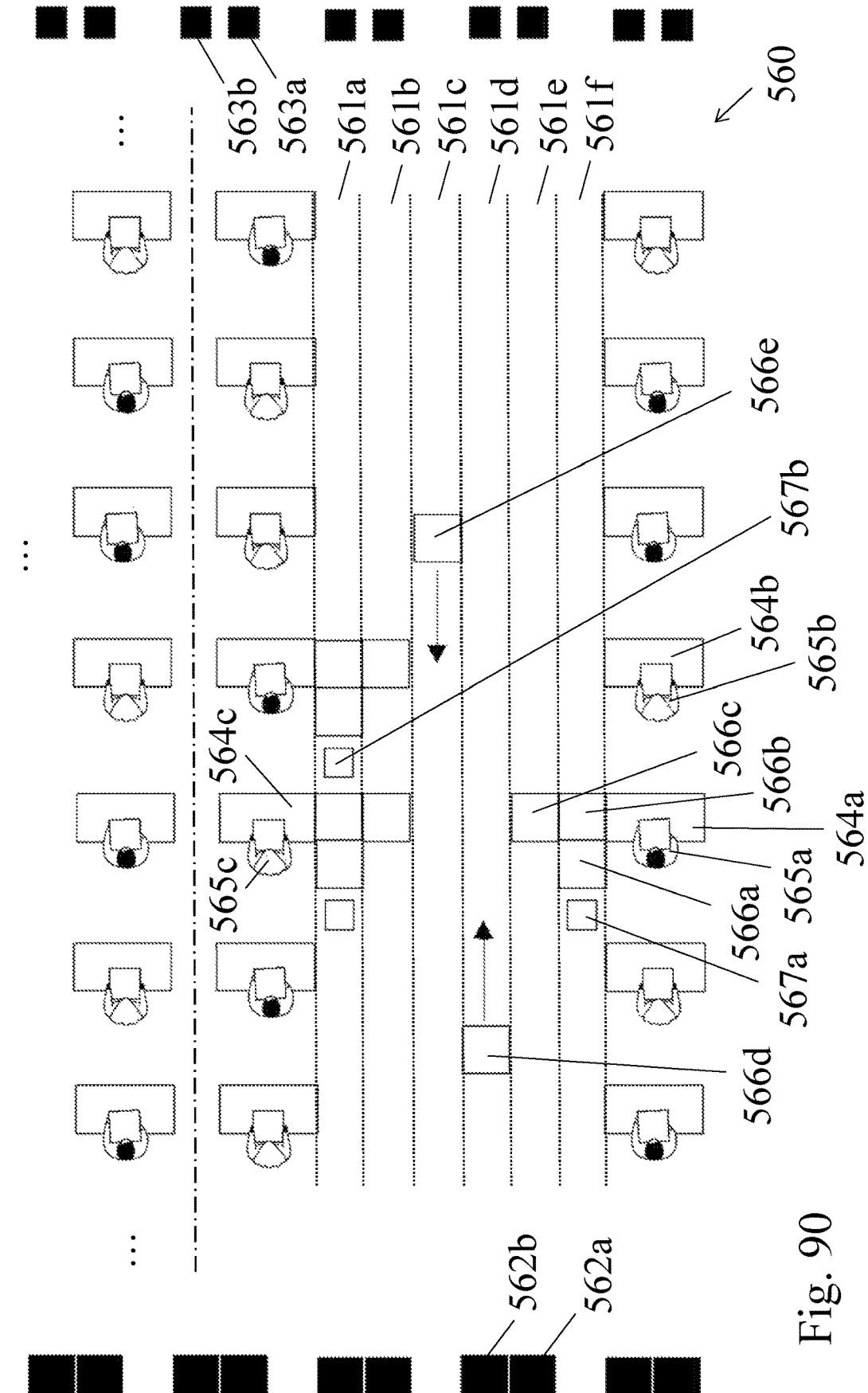
Figure 91:
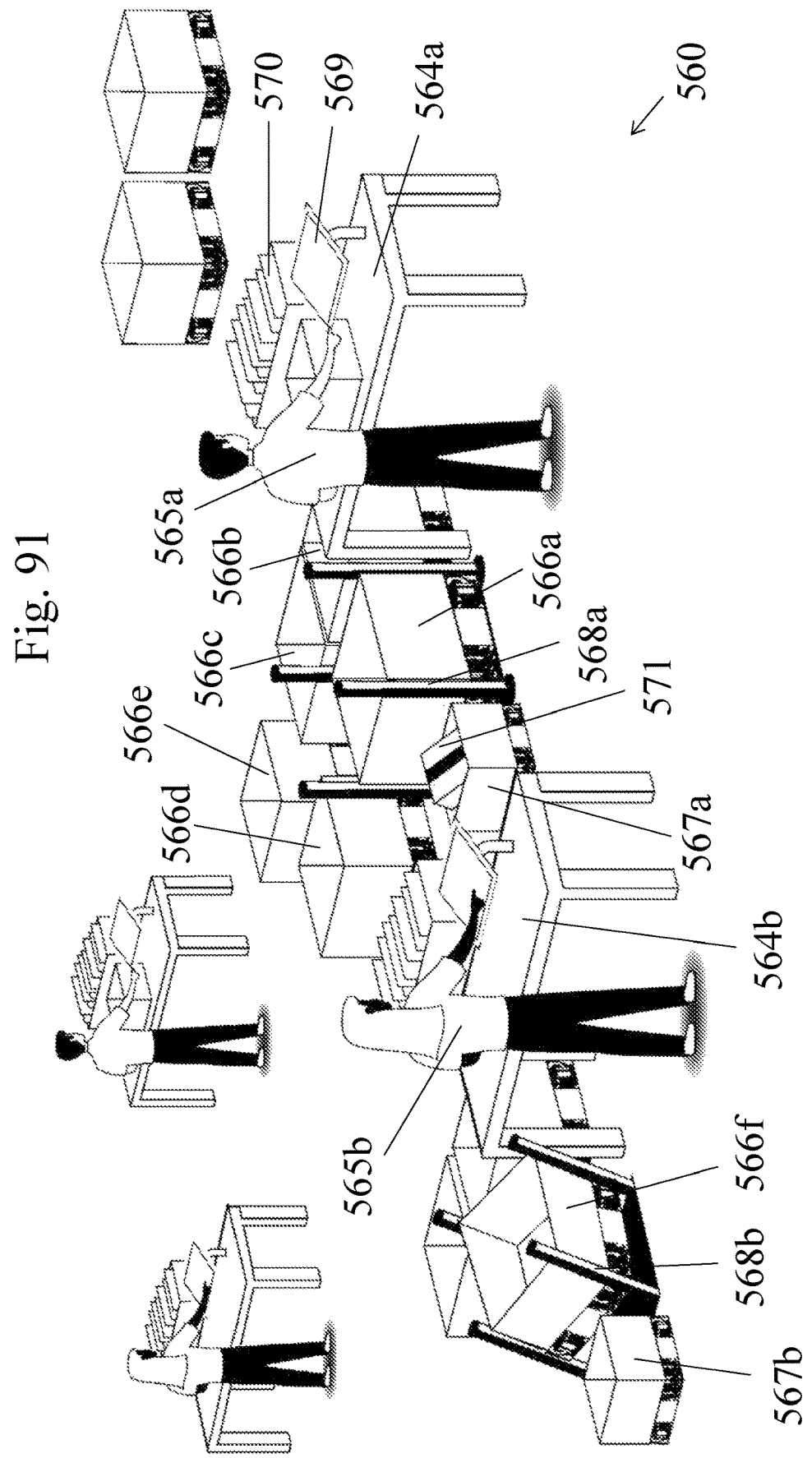
Figure 92:
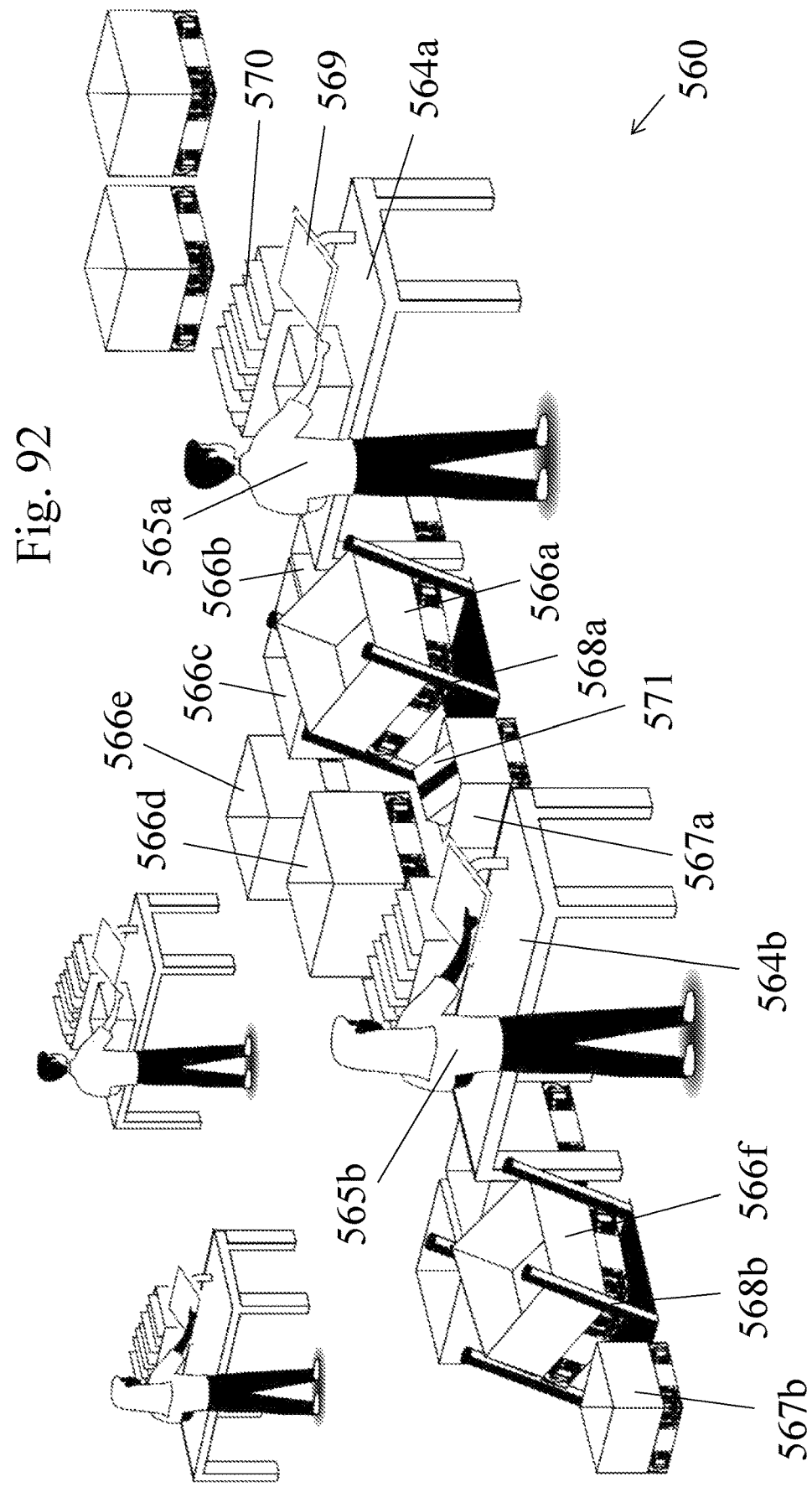

FIG. 51 is an isometric view of a first set of parts used to construct a second embodiment of the advanced warehouse of the present invention;

FIG. 52 is an isometric view of a second set of parts used to construct a second embodiment of the advanced warehouse of the present invention;

Detail FIG. 52A is an isometric view of the upper levels wider shelf slide;

Detail FIG. 52B is an isometric view of the upper levels longer shelf slide;

FIG. 53 is an isometric view of a first step of the construction of the second embodiment of the advanced warehouse of the present invention;

FIG. 54 is an isometric view of a second step of the construction of the second embodiment of the advanced warehouse of the present invention;

Detail FIG. 54A is an isometric view of the installation of the ground level wider shelf on the base short traction pole;

Detail FIG. 54B is an isometric view of the installation of the ground level longer shelf on the base short pole;

FIG. 55 is atop view of the ground level of the second embodiment of the advanced warehouse of the present invention showing the cross-track access shafts;

FIG. 56 is an isometric view of the ground level of the second embodiment of the advanced warehouse of the present invention fully loaded with full size containers;

FIG. 57 is an isometric view of an improved two level nine cell warehouse;

FIG. 58 is an isometric view of an improved six level nine cell warehouse;

FIG. 59 is an isometric view of the improved two level nine cell warehouse fully loaded with various items;

FIG. 60 is front view of the improved two level nine cell warehouse showing the differences in height of the different levels;

FIG. 61 is top view of the improved two level nine cell warehouse fully loaded with various items showing the access to the stored items via the cross-track access shafts;

Figure 62:
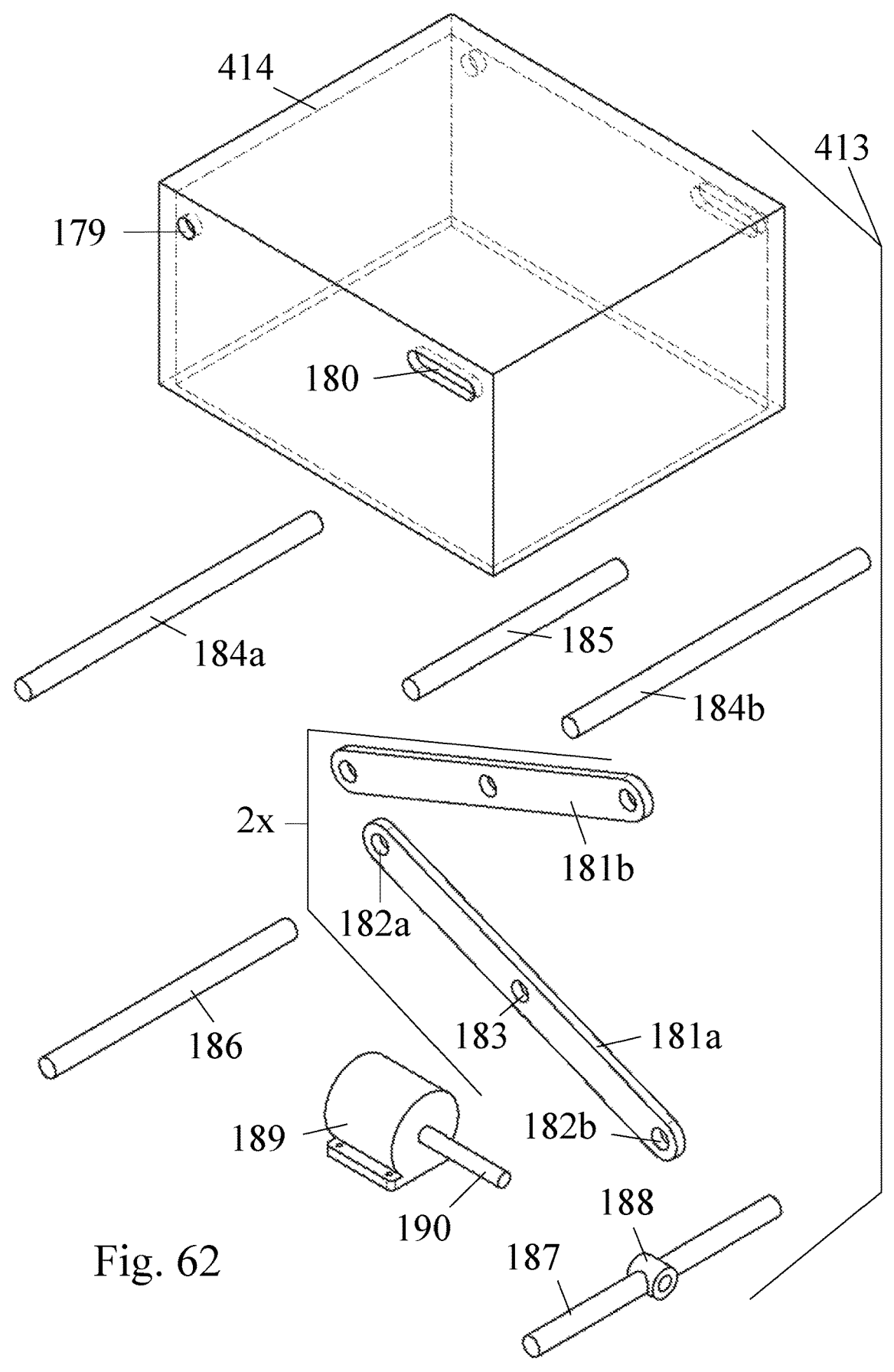

FIG. 62 is an isometric exploded view of the pantographic lift assembly;

FIG. 63 is an isometric exploded view of the short wheel assembly;

FIG. 64 is an isometric exploded view of the vertical sliding gear assembly used to support and position the hollow flat gear;

FIG. 65 is an isometric exploded view of the horizontal sliding gear assembly used to support and position the hollow tapered gear;

Detail FIG. 65A shows the tapered teeth of the hollow tapered gear in greater magnification;

FIG. 66 is an isometric exploded view of the vertical pivoting gear assembly used to support and position the hollow tapered gear;

FIG. 67 is an isometric exploded view of the fixed gear assembly used to support and position the hollow tapered gear;

FIG. 68 is an isometric exploded view of the roller positioning assembly;

FIG. 69 is an isometric view of one embodiment of a robot lid;

FIG. 70 is an isometric view of one embodiment of a standard robot case;

FIG. 71 is an isometric view of one embodiment of a standard robot;

FIG. 72 is an isometric view of one embodiment of a rack climbing robot case;

FIG. 73 is an isometric view of one embodiment of a rack climbing robot;

FIG. 74 is an isometric view of one embodiment of a warehouse climbing robot case;

FIG. 75 is an isometric view of one embodiment of a warehouse climbing robot;

FIG. 76 is an isometric view of one embodiment of a dual climbing robot case;

FIG. 77 is an isometric view of one embodiment of a dual climbing robot in a warehouse climbing position;

FIG. 78 is an isometric view of one embodiment of a dual climbing robot in a rack climbing position;

FIG. 79 is an isometric view of one embodiment of the warehouse climbing robot entering an improved two level single cell warehouse;

FIG. 80 is a top view of the warehouse climbing robot at the center of the cross-track access shaft of the improved two level single cell warehouse with retracted gears;

FIG. 81 is a top view of the warehouse climbing robot at the center of the cross-track access shaft of the improved two level single cell warehouse with extended gears;

FIG. 82 is an isometric view of the warehouse climbing robot at the center of the cross-track access shaft of a loaded improved two level single cell warehouse with retracted gears;

FIG. 83 is an isometric view of the warehouse climbing robot that has climbed to the first level of the loaded improved two level single cell warehouse;

FIG. 84 is an isometric view of the warehouse climbing robot at the first level of the loaded improved two level single cell warehouse showing one extended roller positioning assembly;

Detail FIG. 84A is an isometric view of the extended roller in contact with the upper levels longer shelf sliding base;

FIG. 85 is an isometric view of the warehouse climbing robot moving the upper levels longer shelf sliding base to retrieve one full size container;

FIG. 86 is an isometric view of the warehouse climbing robot lifting the full size container to displace it from the upper levels longer shelf sliding base;

FIG. 87 is an isometric view of the warehouse climbing robot moving the upper levels longer shelf sliding base back to its normal position to clear the full size container;

FIG. 88 is an isometric view of the warehouse climbing robot lowering the full size container to carry it on the top of its case;

FIG. 89 is an isometric view of the warehouse climbing robot carrying the full size container on top of its case getting out of the improved two level single cell warehouse;

FIG. 90 is a top view of one embodiment of a packer station showing six robot lanes, one set of warehouse access shafts, one set of shipment access shafts, and multiple packer workstations;

FIG. 91 is an isometric view of one embodiment of a packer station showing the packer workstations with the product carrying robot at the bottom of the ergonomic rack in a first position;

FIG. 92 is an isometric view of one embodiment of a packer station showing the packer workstations with the product carrying robot at the top of the ergonomic rack in a second position.

DETAILED DESCRIPTION OF EMBODIMENTS

The present invention is composed of multiple components that work together to allow the storage of goods in a warehouse and the transfer of goods to and from trucks with maximum efficiency.

While references may be made to upper, lower, vertical and horizontal, these terms are used merely to describe relationships and not to limit the operation or use of the present invention to any one orientation.

First Embodiment

Figure 1:
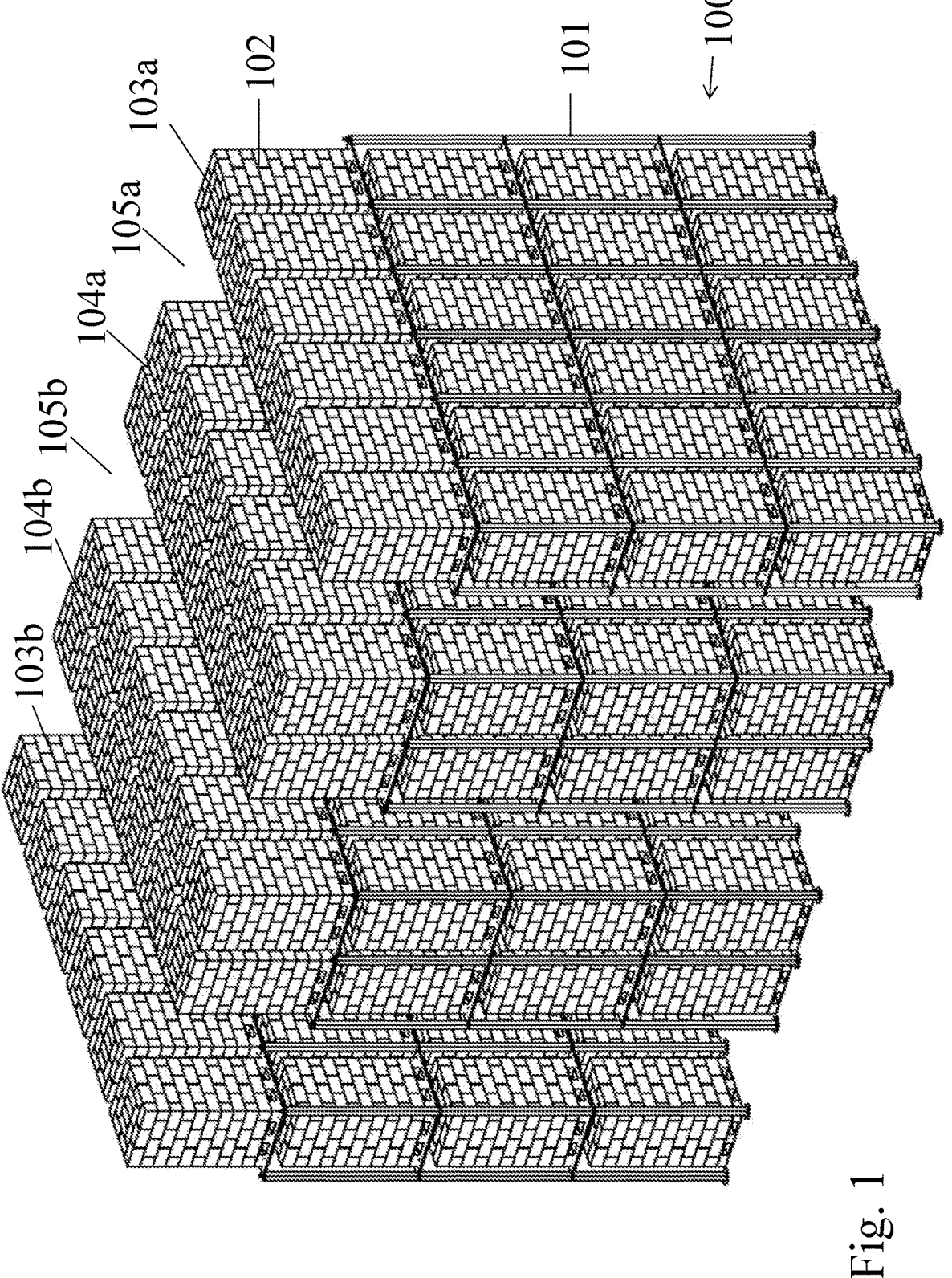
FIG. 1 is an isometric view of one example of a traditional warehouse design of the prior art.

FIG. 1 shows a traditional warehouse 100 of the prior art that is not part of the present invention and is shown for comparison purposes. The traditional warehouse 100 has a shelf structure 101 capable of holding a series of pallets 102 arranged in multiple levels and in rows. At both extremities, the pallets 102 are arranged in a single row 103a, 103b and in the rest of the structure, the pallets 102 are arranged in a series of back-to-back rows 104. To allow access to the pallets 102 a series of access rows 105a, 105b is placed between any two adjacent rows containing pallets 102.

Figure 2:
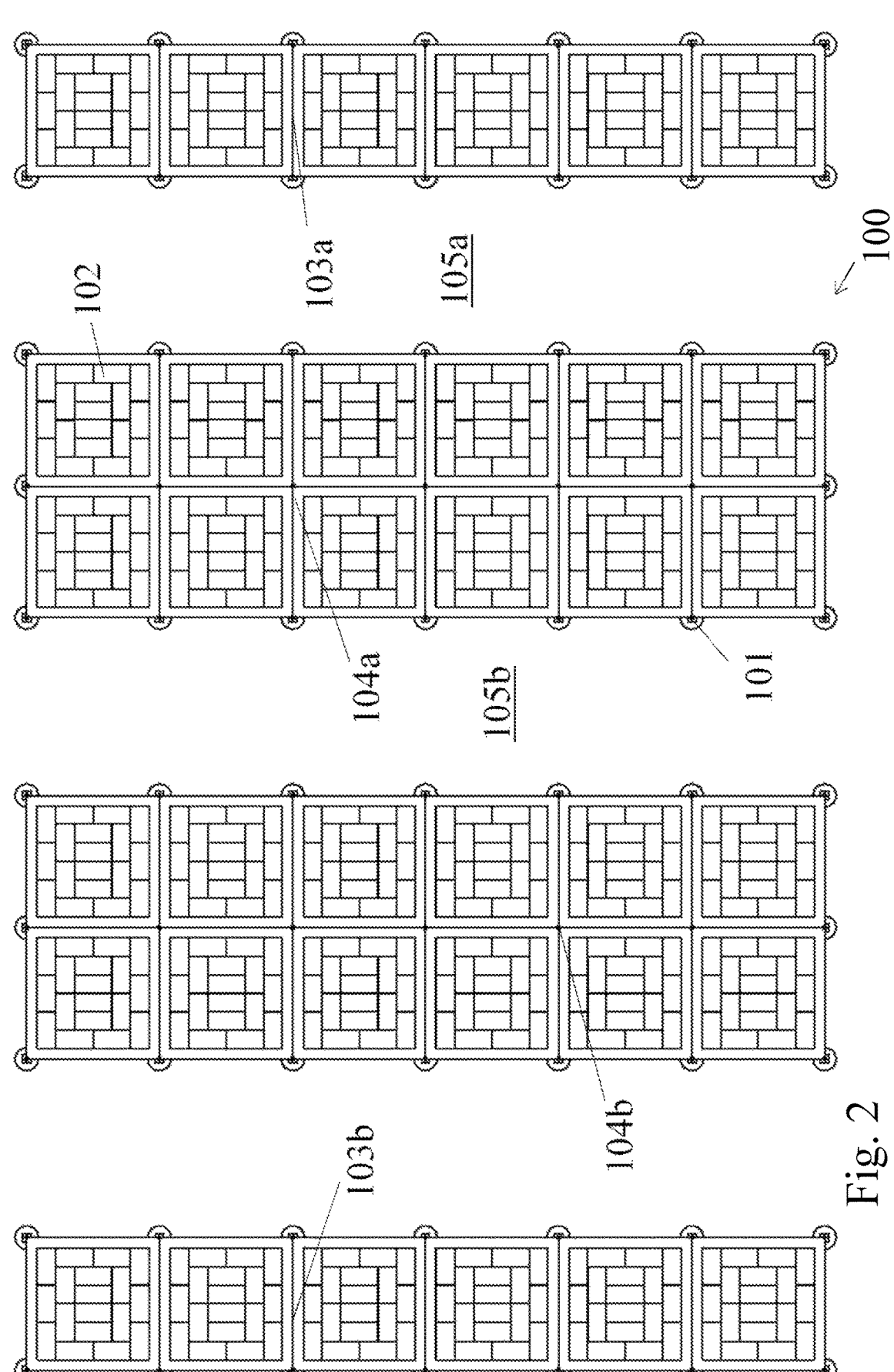
FIG. 2 is a top view of the example of the traditional warehouse design of the prior art of FIG. 1.

FIG. 2 shows a top view of the traditional warehouse 100 of the prior art to better illustrate the relative dimensions of the shelf structure 101. At both extremities, the pallets 102 are arranged in single rows 103a, and 103b and in the rest of the structure, the pallets 102 are arranged in back-to-back rows 104. To allow access to the pallets 102, access rows 105a, 105b are placed between any two adjacent rows containing pallets 102. Typically the access rows 105a, 105b have a width ranging from the width of one and a half pallets 102 to two pallets 102 to allow the movement of forklifts or stationary row robots.

The total area occupied by the traditional warehouse 100 of the prior art is the area occupied by the shelf structure 101 plus a considerable amount of additional area needed for the movement of robots, forklifts, etc. that are required for the proper operation of the warehouse. The need for this additional area as well as the inefficient use of the area occupied by access rows 105a, 105b negatively impacts the storage capacity and operational efficiency of the traditional warehouse 100.

Figures 3, 3A:
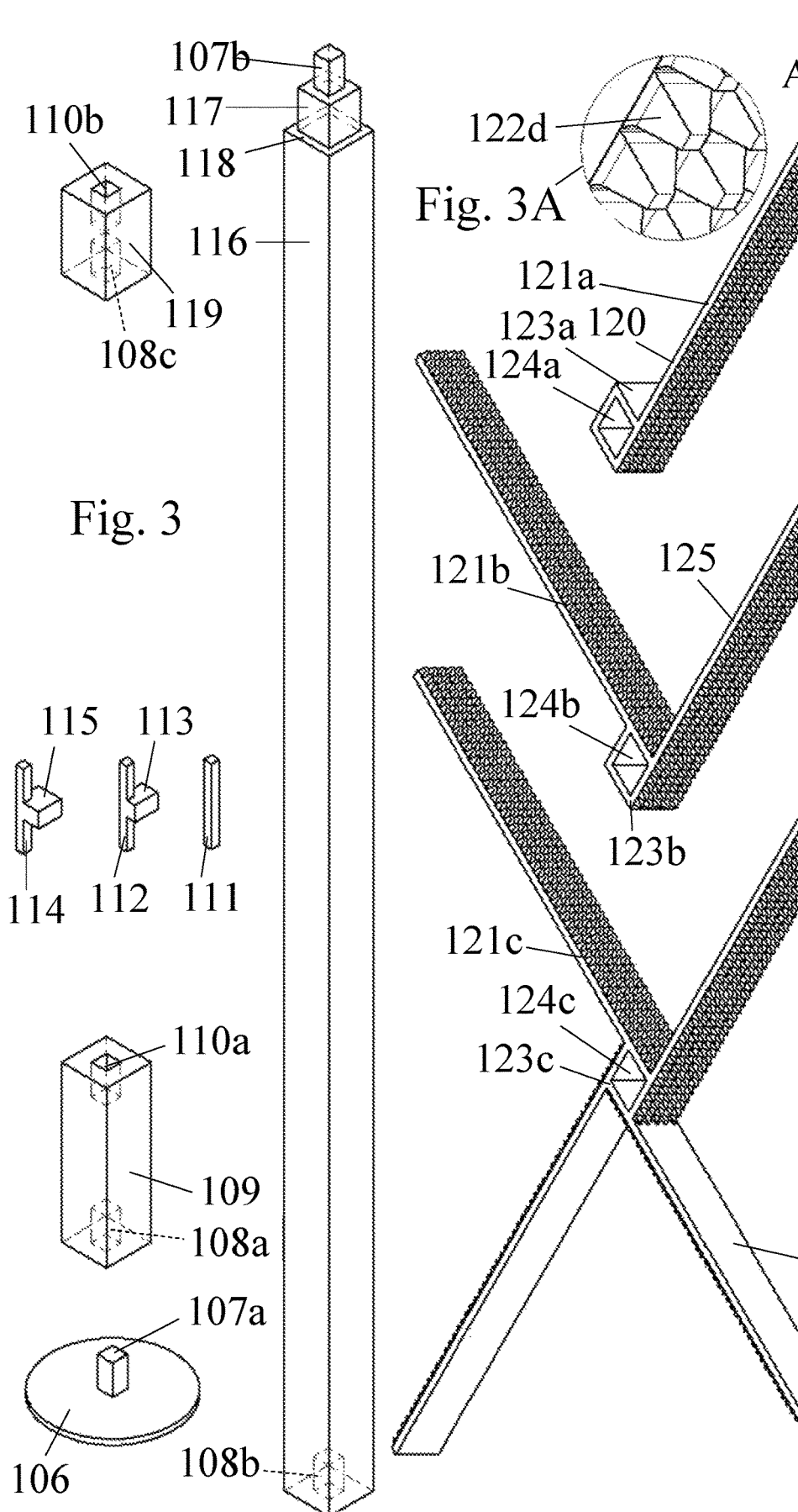
FIG. 3 is an isometric view of one embodiment of a first out of three sets of parts used to construct an advanced warehouse of the present invention.
FIG. 3A is an isometric view of the frustum shaped teeth used in some parts used to construct an advanced warehouse of the present invention.

FIG. 3 shows one embodiment of a first out of three sets of parts used to construct an advanced warehouse of the present invention. A base 106 consisting of a round circle with a guide pin 107a in the center is used to provide support and stability for the structure. For added stability, the base 106 may be fixated to a floor by adequate fixation bolts (not shown).

A base spacer 109 consisting of an adequate, relatively short length of a square profile with a centered, square guide pin notch 108a at the bottom and a centered, square shelf insertion notch 110a at the top is designed to be placed on top of the base 106 by means of fitting the guide pin notch 108a of the base spacer 109 into the guide pin 107a of the base 106. The base spacer 109 provides support at a short distance to ground level for other components of the structure of the advanced warehouse of the present invention.

Figures 8, 8A, 8B:
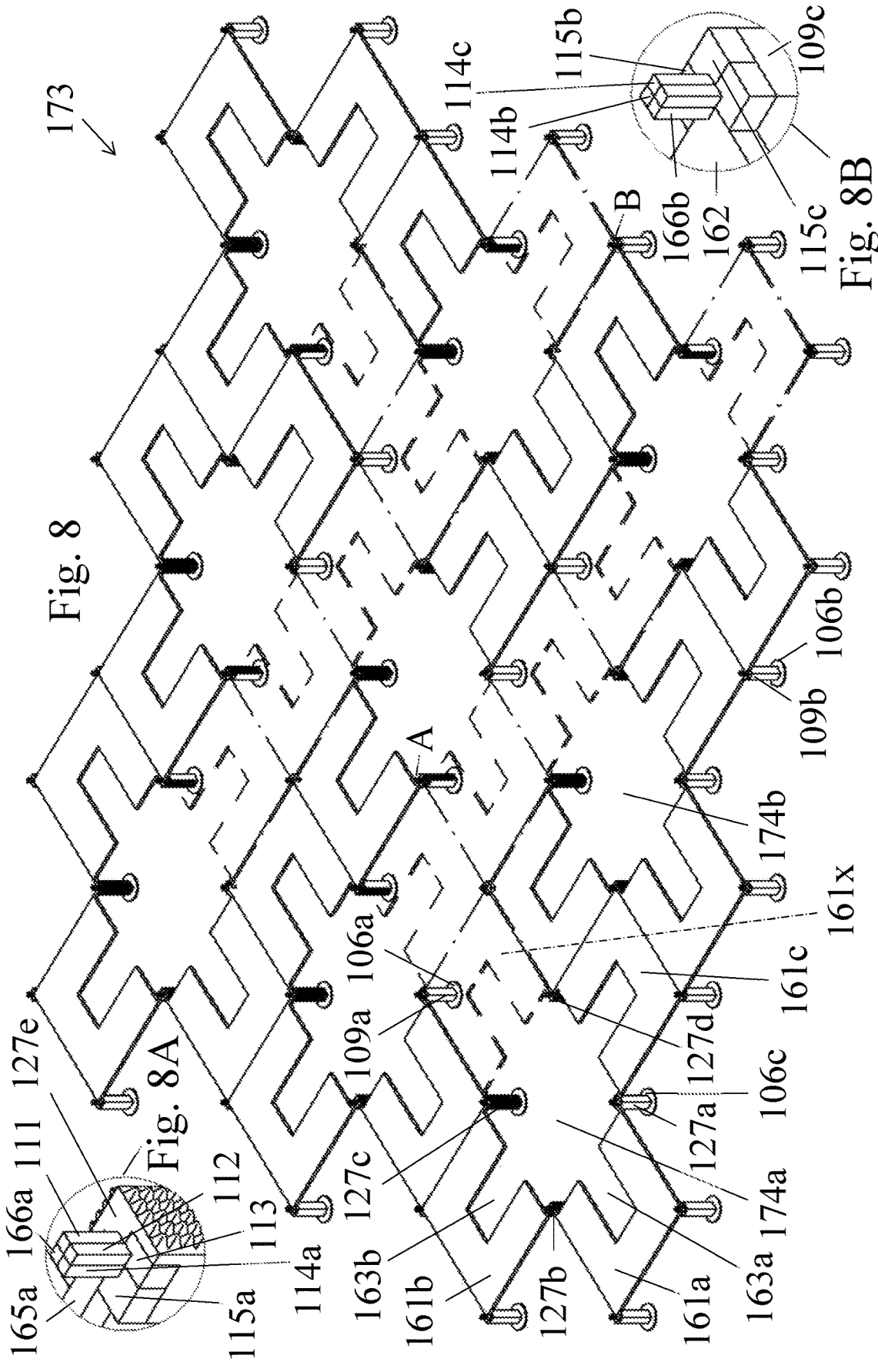
FIG. 8 is an isometric view of the third step of the assembly process of one embodiment of an advanced warehouse of the present invention using the parts shown in previous FIG. 3 through FIG. 5.
FIG. 8A is an isometric view of the base rack spacer after the insertion of the shelf and other components to better illustrate the assembly process of the advanced warehouse of the present invention shown in FIG. 8.
FIG. 8B is an isometric view of the base spacer after the insertion of the shelf and other components to better illustrate the assembly process of the advanced warehouse of the present invention shown in FIG. 8.

A plain blank 111 consisting of a short square profile bar with the width of one fourth of the shelf insertion notch 110 and appropriate length is used to fill one fourth of the shelf insertion notch 110 and preserve the alignment for structures placed on top in places where required (see detail FIG. 8A).

A shelf blank 112 consisting of a short square profile bar with the width of one fourth of the shelf insertion notch 110 and appropriate length with a shelf stub 113 located at the center is used to fill one fourth of the shelf insertion notch 110 and fill gaps to provide leveled support and preserve the alignment for structures placed on top in places where required (see detail FIG. 8A). If necessary, up to two shelf blanks 112 may be used simultaneously to fill space in one particular shelf insertion notch 110.

A quarter blank 114 consisting of a short square profile bar with the width of one fourth of the shelf insertion notch 110 and appropriate length with a quarter stub 115 located at the center is used to fill one fourth of the shelf insertion notch 110 and fill gaps to provide leveled support and preserve the alignment for structures placed on top in places where required (see detail FIG. 8A and detail FIG. 8B). If necessary, up to four quarter blanks 114 may be used simultaneously to fill space in one particular shelf insertion notch 110.

A plain pole 116 consisting of an adequate, relatively long length of a square profile with one centered, square guide pin notch 108b at the bottom and one centered, square guide pin 107b at the top is designed to provide support to other components of the structure at the necessary distance from the previous level to accommodate the pallets 102 intended to be stored in the advanced warehouse of the present invention.

The plain pole 116 has a plain pole neck 117 that starts at a pole horizontal rack plane 118 that is used to fit additional components required to complete the structure.

A plain top spacer 119 consisting of an adequate, relatively short length of a square profile with one centered, square guide pin notch 108c at the bottom and one centered, square shelf insertion notch 110b at the top is designed to be placed on top of the plain pole 116 by means of fitting the guide pin notch 108c of the plain top spacer 119 into the guide pin 107b of the plain pole 116. The plain top spacer 119 provides support at a short distance to the top of the plain pole 116 for other components of the structure of the advanced warehouse of the present invention.

A single rack piece 120 consisting of a standard rack track 121a that contains an array of frustum shaped teeth 122a in the outer side and has a square base 123a with a square base insertion hole 124a in the middle is designed to be placed on top of the plain pole 116 around the plain pole neck 117.

The square base insertion hole 124a has dimensions that allow the square base 123a to fit perfectly around the plain pole neck 117 and the height of the square base 123a matches the height of the plain pole neck 117 so when the single rack piece 120 is installed around the plain pole neck 117 on the top of the plain pole 116, the plain top spacer 119 can be installed on a flat surface the same size of its base.

A double standard rack piece 125 consists of two standard rack tracks 121b with frustum shaped teeth 122b in the outer sides and has one square base 123b with one square base insertion hole 124b in the middle. The double standard rack piece 125 is designed to be placed on top of the plain pole 116 around the plain pole neck 117. The double standard rack piece 125 shape is the same of two single rack pieces 120 merged together, with the second single rack piece 120 rotated 90 degrees in the counter clockwise direction.

A quadruple standard rack piece 126 consists of four standard rack tracks 121c with frustum shaped teeth 122c in the outer sides and has one square base 123c with one square base insertion hole 124c in the middle. The quadruple standard rack piece 126 is designed to be placed on top of the plain pole 116 around the plain pole neck 117. The quadruple standard rack piece 126 shape is the same of four single rack pieces 120 merged together, with each single rack piece 120 rotated 90 degrees in the counter clockwise direction with respect to the previous one.

Detail FIG. 3A shows the frustum shaped teeth 122c in greater magnification to allow a better visualization of their shape that is produced cutting a standard rack in one direction and then again in a second direction at an angle of 90 degrees to the first direction.

Figure 4:
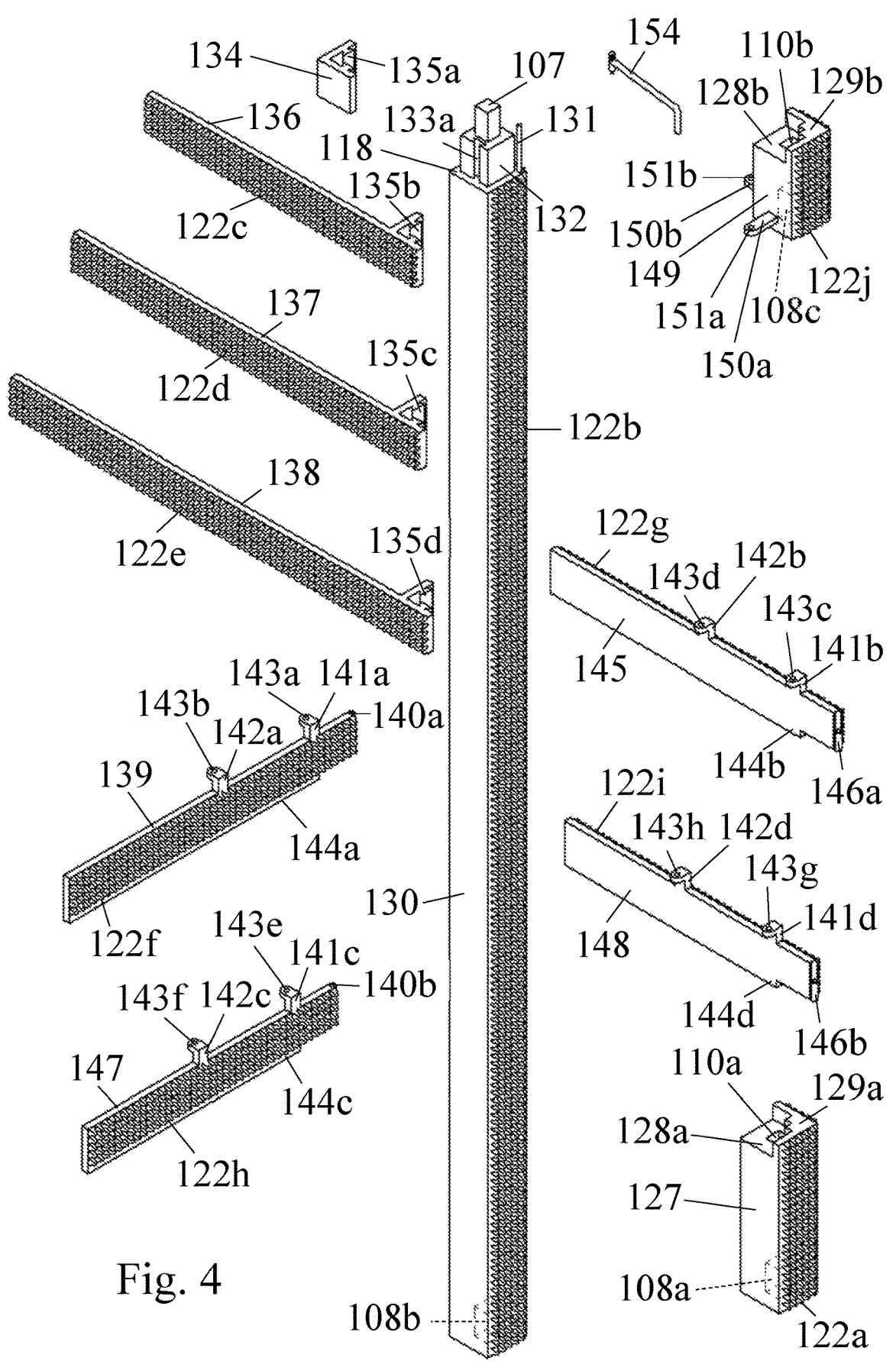
FIG. 4 is an isometric view of one embodiment of a second out of three set of parts used to construct an advanced warehouse of the present invention.

FIG. 4 shows one embodiment of a second out of three sets of parts used to construct an advanced warehouse of the present invention.

A base rack spacer 127 consisting of an adequate, relatively short length of a square profile with one centered, square guide pin notch 108a at the bottom and one centered, square shelf insertion notch 110a at the top is designed to be placed on top of the base 106 by means of fitting the guide pin notch 108a of the base rack spacer 127 into the guide pin 107a of the base 106 (see FIG. 3).

The base rack spacer 127 has a shelf support 128a plane at the same height of the length of the base spacer 109 that provides support at a short distance to ground level for other components of the structure of the advanced warehouse of the present invention. Differently from the base spacer 109 that has four plain faces, the base rack spacer 127 has frustum shaped teeth 122a in two faces at the front that extend all the way to the top forming a rack extension 129a that has the same width as the shelf stub 113 and the quarter stub 115 (see FIG. 3).

A rack pole 130 consisting of an adequate, relatively long length of a square profile with one centered, square guide pin notch 108b at the bottom and one centered, square guide pin 107 at the top is designed to provide support to other components of the structure at the necessary distance from the previous level to accommodate the pallets 102 intended to be stored in the advanced warehouse of the present invention.

The rack pole 130 has a hinge pin 131 and a rack pole neck 132 that starts at the pole horizontal rack plane 118 and has the same height as the plain pole neck 117 in the plain pole 116 (see FIG. 3). The rack pole neck 132 has a pair of dovetail notches 133a at the faces opposite to the hinge pin 131 that allow the fixation of additional components required to complete the structure.

Differently from the plain pole 116 that has four plain faces, the rack pole 130 has frustum shaped teeth 122b in two faces at the front that extend all the way to the pole horizontal rack plane 118. The rack pole 130 and the plain pole 116 have the same height and the rack pole neck 132 and the plain pole neck 117 are always aligned at the same level in the assembled structure. (see FIG. 3).

A rack pole neck cover 134 with the same height of the rack pole neck 132 and fitted with a pair of dovetail pins 135a configured to slide into the dovetail notches 133a in the rack pole neck 132 is used to cover the rack pole neck 132 at places in the structure where no other part is required.

A rack pole short fixed rack 136 with frustum shaped teeth 122c in the front face and the same height of the rack pole neck 132 and fitted with dovetail pins 135b configured to slide into the dovetail notches 133a in the rack pole neck 132 is used to provide an additional short fixed rack attached to the rack pole 130 at places in the structure where this is required.

A rack pole standard fixed rack 137 with frustum shaped teeth 122d in the front face and the same height of the rack pole neck 132 and fitted with dovetail pins 135c designed to slide into the dovetail notches 133a in the rack pole neck 132 is used to provide an additional standard fixed rack attached to the rack pole 130 at places in the structure where this is required.

A rack pole long fixed rack 138 with frustum shaped teeth 122e in the front face and the same height of the rack pole neck 132 and fitted with dovetail pins 135d designed to slide into the dovetail notches 133a in the rack pole neck 132 is used to provide an additional long fixed rack attached to the rack pole 130 at places in the structure where this is required.

A rack pole standard hinged rack A 139 is fitted with an array of frustum shaped teeth 122f in the front face with the same height of the rack pole neck 132 and has a hinge A 140a at one extremity. The frustum shaped teeth 122f in the rack pole standard hinged rack A 139 are so constructed that when the hinge A 140a is installed at the hinge pin 131 in the rack pole neck 132, the frustum shaped teeth 122f in the rack pole standard hinged rack A 139 align perfectly with the frustum shaped teeth 122b in the rack pole 130.

The rack pole standard hinged rack A 139 has a hinged rack internal lock fixture 141a fitted at a first fixed short distance to the hinge A 140a and a hinged rack external lock fixture 142a fitted at a second fixed distance to the hinged rack internal lock fixture 141a towards the extremity opposite to the hinge A 140a. The hinged rack internal lock fixture 141a has a hinged rack lock hole 143a and the hinged rack external lock fixture 142a has a hinged rack lock hole 143b at the top. A plain hinged rack hold bar 144a with no frustum shaped teeth runs from the extremity opposite to the hinge A 140a stopping short of the hinge A 140a in such a way that when the hinge A 140a is installed at the hinge pin 131, the hinged rack hold bar 144a stays outside the rack pole neck 132 and does not hit the rack pole 130.

A rack pole standard hinged rack B 145 is fitted with an array of frustum shaped teeth 122g in the front face with the same height of the rack pole neck 132 and has a hinge B 146a at one extremity. The frustum shaped teeth 122g in the rack pole standard hinged rack B 145 are so constructed that when the hinge B 146a is installed at the hinge pin 131 in the rack pole neck 132, the frustum shaped teeth 122g in the rack pole standard hinged rack B 145 align perfectly with the frustum shaped teeth 122b in the rack pole 130.

The rack pole standard hinged rack B 145 has one hinged rack internal lock fixture 141b fitted at a first fixed short distance to the hinge B 146a and one hinged rack external lock fixture 142b fitted at a second fixed distance to the hinged rack internal lock fixture 141b towards the extremity opposite to the hinge B 146a. The hinged rack internal lock fixture 141b has one hinged rack lock hole 143c and the hinged rack external lock fixture 142b has one hinged rack lock hole 143d at the top. One plain hinged rack hold bar 144b with no frustum shaped teeth runs from the extremity opposite to the hinge B 146a stopping short of the hinge B 146a in such a way that when the hinge B 146a is installed at the hinge pin 131, the hinged rack hold bar 144b stays outside the rack pole neck 132 and does not hit the rack pole 130.

Apart from the hinge A 140a and the hinge B 146a that are designed to fit, the rack pole standard hinged rack A 139 and the rack pole standard hinged rack B 145 are mirror images of each other.

A rack pole short hinged rack A 147 is fitted with an array of frustum shaped teeth 122h in the front face with the same height of the rack pole neck 132 and has one hinge A 140b at one extremity. The frustum shaped teeth 122h in the rack pole short hinged rack A 147 are so constructed that when the hinge A 140b is installed at the hinge pin 131 in the rack pole neck 132, the frustum shaped teeth 122h in the rack pole short hinged rack A 147 align perfectly with the frustum shaped teeth 122b in the rack pole 130.

The rack pole short hinged rack A 147 has one hinged rack internal lock fixture 141c fitted at a first fixed short distance to the hinge A 140b and one hinged rack external lock fixture 142c fitted at a second fixed distance to the hinged rack internal lock fixture 141c towards the extremity opposite to the hinge A 140b. The hinged rack internal lock fixture 141c has one hinged rack lock hole 143e and the hinged rack external lock fixture 142c has one hinged rack lock hole 143f at the top. One plain hinged rack hold bar 144c with no frustum shaped teeth runs from the extremity opposite to the hinge A 140b stopping short of the hinge A 140b in such a way that when the hinge A 140b is installed at the hinge pin 131, the hinged rack hold bar 144c stays outside the rack pole neck 132 and does not hit the rack pole 130.

A rack pole short hinged rack B 148 is fitted with an array of frustum shaped teeth 122i in the front face with the same height of the rack pole neck 132 and has one hinge B 146b at one extremity. The frustum shaped teeth 122i in the rack pole short hinged rack B 148 are so constructed that when the hinge B 146b is installed at the hinge pin 131 in the rack pole neck 132 the frustum shaped teeth 122i in the rack pole short hinged rack B 148 align perfectly with the frustum shaped teeth 122b in the rack pole 130.

The rack pole short hinged rack B 148 has one hinged rack internal lock fixture 141d fitted at a first fixed short distance to the hinge B 146b and one hinged rack external lock fixture 142d fitted at a second fixed distance to the hinged rack internal lock fixture 141d towards the extremity opposite to the hinge B 146b. The hinged rack internal lock fixture 141d has one hinged rack lock hole 143g and the hinged rack external lock fixture 142d has one hinged rack lock hole 143h at the top. One plain hinged rack hold bar 144d with no frustum shaped teeth runs from the extremity opposite to the hinge B 146b stopping short of the hinge B 146b in such a way that when the hinge B 146b is installed at the hinge pin 131, the hinged rack hold bar 144d stays outside the rack pole neck 132 and does not hit the rack pole 130.

Apart from the hinge A 140b and the hinge B 146b that are designed to fit, the rack pole short hinged rack A 147 and the rack pole short hinged rack B 148 are mirror images of each other.

The rack pole short hinged rack A 147 is a shorter, truncated version of the rack pole standard hinged rack A 139 with features and distances identical apart from the total length.

The rack pole short hinged rack B 148 is a shorter, truncated version of the rack pole standard hinged rack B 145 with features and distances identical apart from the total length.

A rack pole top cover 149 consisting of an adequate, relatively short length of a square profile with one centered, square guide pin notch 108c at the bottom and one centered, square shelf insertion notch 110b at the top is designed to be placed on top of the rack pole 130 by means of fitting the guide pin notch 108c of the rack pole top cover 149 into the guide pin 107 of the rack pole 130.

The rack pole top cover 149 has one shelf support 128b plane at the same height of the length of the plain top spacer 119 that provides support at a short distance to the top of the rack pole 130 for other components of the structure of the advanced warehouse of the present invention. Differently from the plain top spacer 119 that has four plain faces, the rack pole top cover 149 has frustum shaped teeth 122j in two faces at the front that extend all the way to the top forming one rack extension 129b that has the same width as the shelf stub 113 and the quarter stub 115 (see FIG. 3).

The rack pole top cover 149 has a pair of rack pole top lock fixtures 150a, 150b placed at the bottom of the two plain faces at the back. Each rack pole top lock fixture 150a, 150b is equipped with a respective rack pole top lock hole 151a, 151b.

A series of lock bars 154 are used in the assembled structure to lock the moving components. Each lock bar 154 is placed between one rack pole top lock hole 151 in the rack pole top lock fixture 150 in the rack pole top cover 149 and one hinged rack lock hole 143 either in the hinged rack internal lock fixture 141 or in the hinged rack external lock fixture 142.

Figure 4A:
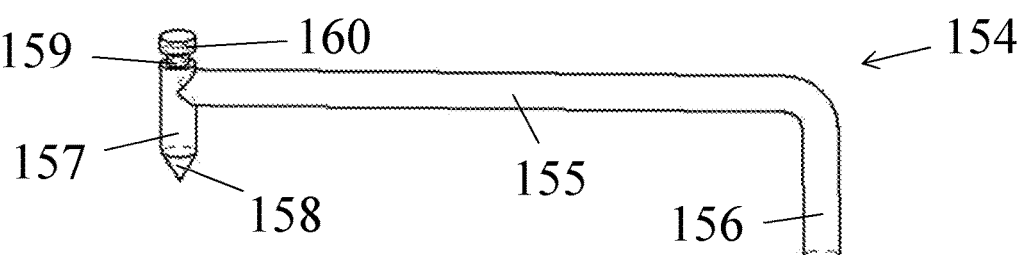
FIG. 4A is an isometric view of three of the parts shown in FIG. 4 to show additional features of the parts.

Detail FIG. 4A shows the rack pole 130, the rack pole top cover 149, and the lock bar 154 in greater magnification and from a different angle to show additional detail.

The rack pole 130 has frustum shaped teeth 122a in two faces at the front that extend all the way to the pole horizontal rack plane 118. The hinge pin 131 and the rack pole neck 132 with the dovetail notches 133b at the faces opposite to the hinge pin 131 that allow the fixation of additional components required to complete the structure are also visible. The centered, square guide pin 107 is located at the top of the rack pole 130.

The rack pole top cover 149 has a flat rack pole base 152 with a hinge pin hole 153 in the corner between the two faces with frustum shaped teeth 122b. When the rack pole top cover 149 is placed at the top of the rack pole 130 and the guide pin 107 of the rack pole 130 is fully inserted into the guide pin notch 108 at the bottom of the rack pole top cover 149, the hinge pin hole 153 aligns perfectly with the hinge pin 131 and covers the top part of the hinge pin 131 providing additional strength and stability to the hinge pin 131.

The two rack pole top lock fixtures 150a, 150b with the respective rack pole top lock holes 151a, 151b are also visible in greater detail.

The lock bar 154 is composed of a horizontal bar 155 that terminates in a centered vertical bar 156 in one extremity and in a pivoting vertical bar 157 in the other extremity. The centered vertical bar 156 is inserted into one rack pole top lock hole 151 in the rack pole top lock fixture 150 in the rack pole top cover 149 and remain inserted at all times, functioning as a fixed reference point around that the lock bar 154 can rotate when needed. The pivoting vertical bar 157 has a tapered end 158 to facilitate the insertion of the pivoting vertical bar 157 in one hinged rack lock hole 143 either in the hinged rack internal lock fixture 141 or in the hinged rack external lock fixture 142. A lock bar grabbing neck 159 at the top of the pivoting vertical bar 157 with a lock bar knob 160 provide a grabbing spot to manipulate the lock bar 154, allowing it to be raised and lowered and rotated around the pivoting vertical bar 157 (see FIG. 41B, FIG. 41C, FIG. 41D, FIG. 41E, and FIG. 41F).

Figure 5:
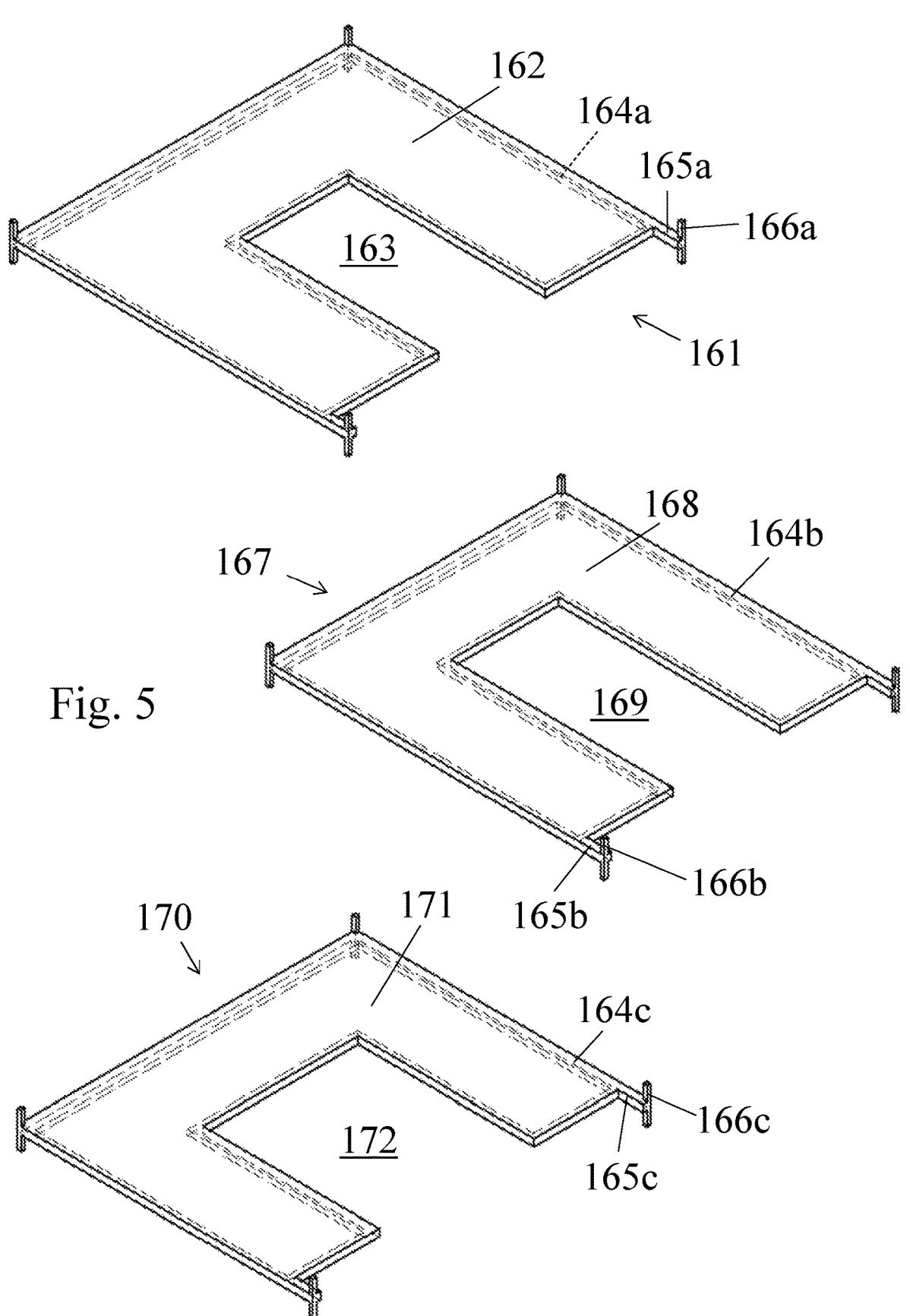
FIG. 5 is an isometric view of one embodiment of a third out of three set of parts used to construct an advanced warehouse of the present invention.

FIG. 5 shows embodiments of a third out of three sets of parts used to construct an advanced warehouse of the present invention.

In a first embodiment, a shelf 161 consists of a shelf base 162 in the shape of an U that has the same length and width with a shelf access channel 163 in the center. The shelf 161 has a rim reinforcement 164a around the shelf base 162 that provides additional reinforcement to support weight. The rim reinforcement 164a extends into a pair of shelf necks 165a that provides clearance to the front of the shelf 161. A set of four shelf fixation pins 166a, with one at each of the four corners of the shelf 161 provides a means to fixate the shelf 161 to the structure of the advanced warehouse of the present invention.

In a second embodiment, a longer shelf 167 consists of a longer shelf base 168 in the shape of an U that is longer than wider with a longer shelf access channel 169 in the center. The longer shelf 167 has one rim reinforcement 164b around the longer shelf base 168 that provides additional reinforcement to support weight. The rim reinforcement 164b extends into one pair of shelf necks 165b that provides clearance to the front of the longer shelf 167. One set of four shelf fixation pins 166b, with one at each of the four corners of the longer shelf 167 provides a means to fixate the longer shelf 167 to the structure of the advanced warehouse of the present invention.

In a third embodiment, a wider shelf 170 consists of a wider shelf base 171 in the shape of an U that is wider than longer with a wider shelf access channel 172 in the center. The wider shelf 170 has one rim reinforcement 164c around the wider shelf base 171 that provides additional reinforcement to support weight. The rim reinforcement 164c extends into one pair of shelf necks 165c that provides clearance to the front of the wider shelf 170. One set of four shelf fixation pins 166c, with one at each of the four corners of the wider shelf 170 provides a means to fixate the wider shelf 170 to the structure of the advanced warehouse of the present invention.

For each embodiment, the dimensions of the hinged rack lattice structure are adjusted to accommodate a longer shelf 167 or a wider shelf 170. The embodiment described using a shelf 161 not to limit the operation or use of the present invention to any one embodiment and other embodiments and within the scope of the present invention.

Figure 6:
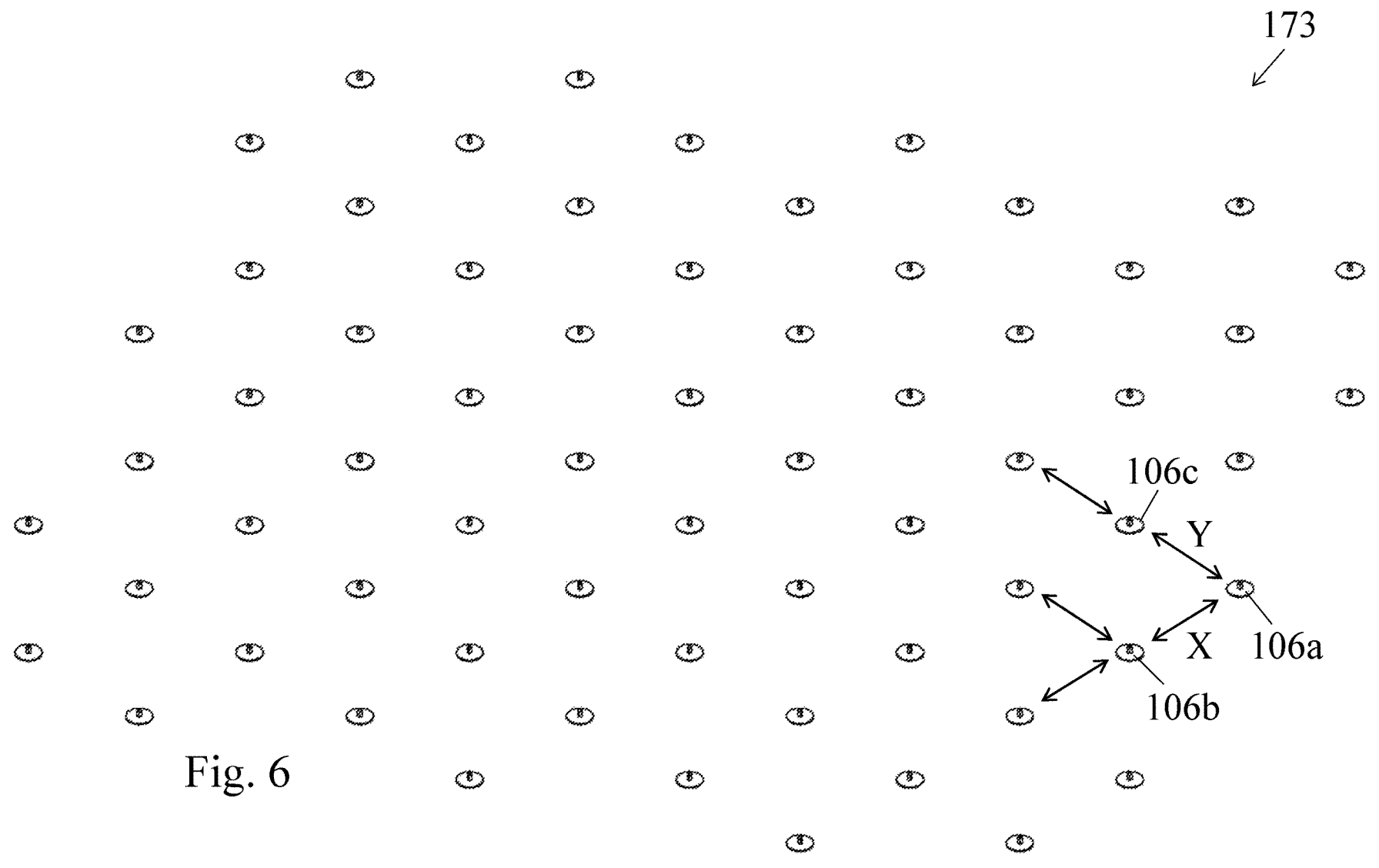

FIG. 6 shows the first step of a warehouse being assembled 173. One array of bases 106a, 106b, 106c, etc. with the bases 106a, 106b, 106c placed at the adequate distance from each other in the X and Y direction, is constructed.

Figures 7, 7A, 7B:
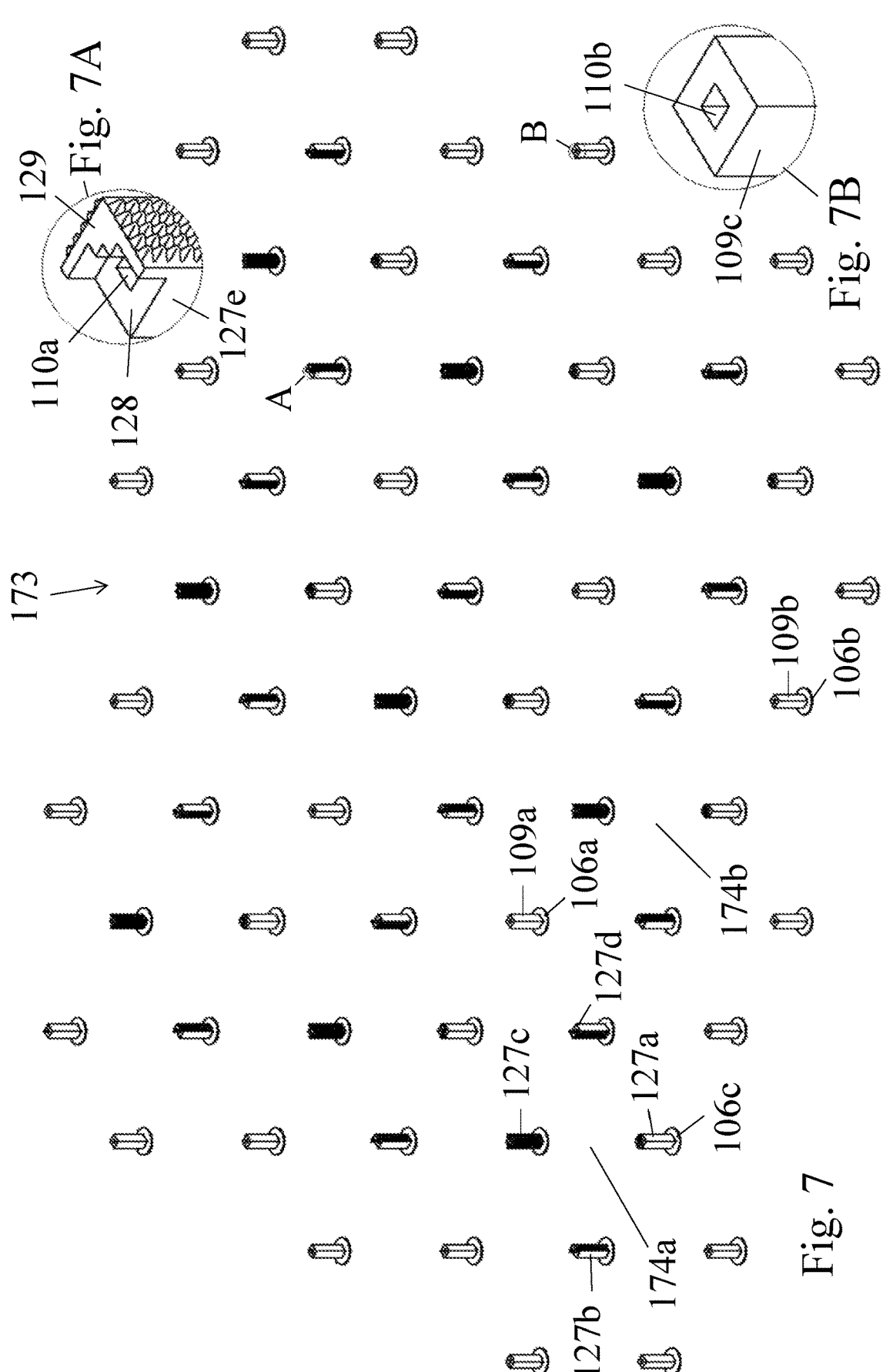
FIG. 7 is an isometric view of the second step of the assembly process of one embodiment of an advanced warehouse of the present invention using the parts shown in previous FIG. 3 through FIG. 5.
FIG. 7A is an isometric view of the base rack spacer to better illustrate the assembly process of the advanced warehouse of the present invention shown in FIG. 7.
FIG. 7B is an isometric view of the base spacer to better illustrate the assembly process of the advanced warehouse of the present invention shown in FIG. 7.

FIG. 7 shows the second step of the warehouse being assembled 173. At the correct places, the required number of base spacers 109a, 109b, etc. and base rack spacers 127a, 127b, 127c, 127d, etc. are placed on top of the corresponding bases 106a, 106b, 106c, etc. The base rack spacers 127a, 127b, 127c, 127d, are placed with the front faces facing each other creating a set of access shafts 174a, 174b, etc. that are regularly spaced.

Detail FIG. 7A shows one base rack spacer 127e in greater magnification to display the shelf insertion notch 110a that is used for the installation of shelves at a later stage. Also visible are the features of the shelf support 128 and the rack extension 129.

Detail FIG. 7B shows one base spacer 109c in greater magnification to display the shelf insertion notch 110b that is used for the installation of shelves at a later stage.

FIG. 8 shows the third step of the warehouse being assembled 173. One array of shelves 161a, 161b, 161c, etc. with each shelf placed at the right orientation is placed over the array of base spacers 109a, 109b, etc. and base rack spacers 127a, 127b, 127c, 127d, etc. that have been previously placed on top of the corresponding bases 106a, 106b, 106c, etc.

The orientation of one particular shelf 161a, 161b, 161c, etc. is defined by its relative position with respect to the access shaft 174a, 174b, etc. it is connected to. Each shelf 161a, 161b, etc. is placed with its shelf access channel 163a, 163b, etc. opening to the respective access shaft 174a, 174b, etc. it is connected to.

At the ground level, the layout of shelves is different than at the subsequent levels due to the necessity to provide access paths to the access shafts 174a, 174b, etc. to load and unload pallets. At the ground level, some shelves 161x (drawn in dash dot lines) are therefore not installed. More shelves may be removed or not installed at ground level to increase the number of access paths to the access shafts 174a, 174b, etc. eventually removing all shelves from the ground level to enable maximum access to all access shafts 174a, 174b, etc.

Where needed, plain blanks 111, shelf blanks 112, and quarter blanks 114 are installed to fill missing elements and ensure the stability of the structure (see detail FIG. 8A and detail FIG. 8B).

Detail FIG. 8A shows one base rack spacer 127e in greater magnification to display the shelf neck 165a and shelf fixation pin 166a from the corresponding shelf installed at this particular place and the plain blank 111, the shelf blank 112, and quarter blank 114a installed to complete the structure and fill the space left by missing elements that were not installed to provide access paths to the access shafts 174a, 174b, etc. The shelf stub 113 of the shelf blank 112 fills the space corresponding to one missing shelf neck from one missing shelf not installed at the access shaft that the base rack spacer 127e is connected. The quarter stub 115a of the quarter blank 114a fills the space of one missing shelf base from one missing shelf not installed at a neighboring access shaft.

Detail FIG. 8B shows one base spacer 109c in greater magnification to display the shelf base 162 and shelf fixation pin 166b from the corresponding shelf installed at this particular place and the quarter blanks 114b, 114c, etc. installed to complete the structure and fill the space left by missing elements that were not installed to provide access paths to the access shafts 174a, 174b, etc. and because the base spacer 109c is located on the edge of the structure.

The quarter stubs 115b, 115c, etc. of the quarter blanks 114b, 114c, etc. fill the space of missing shelf bases 162 left from missing shelves not installed.

Figure 9:
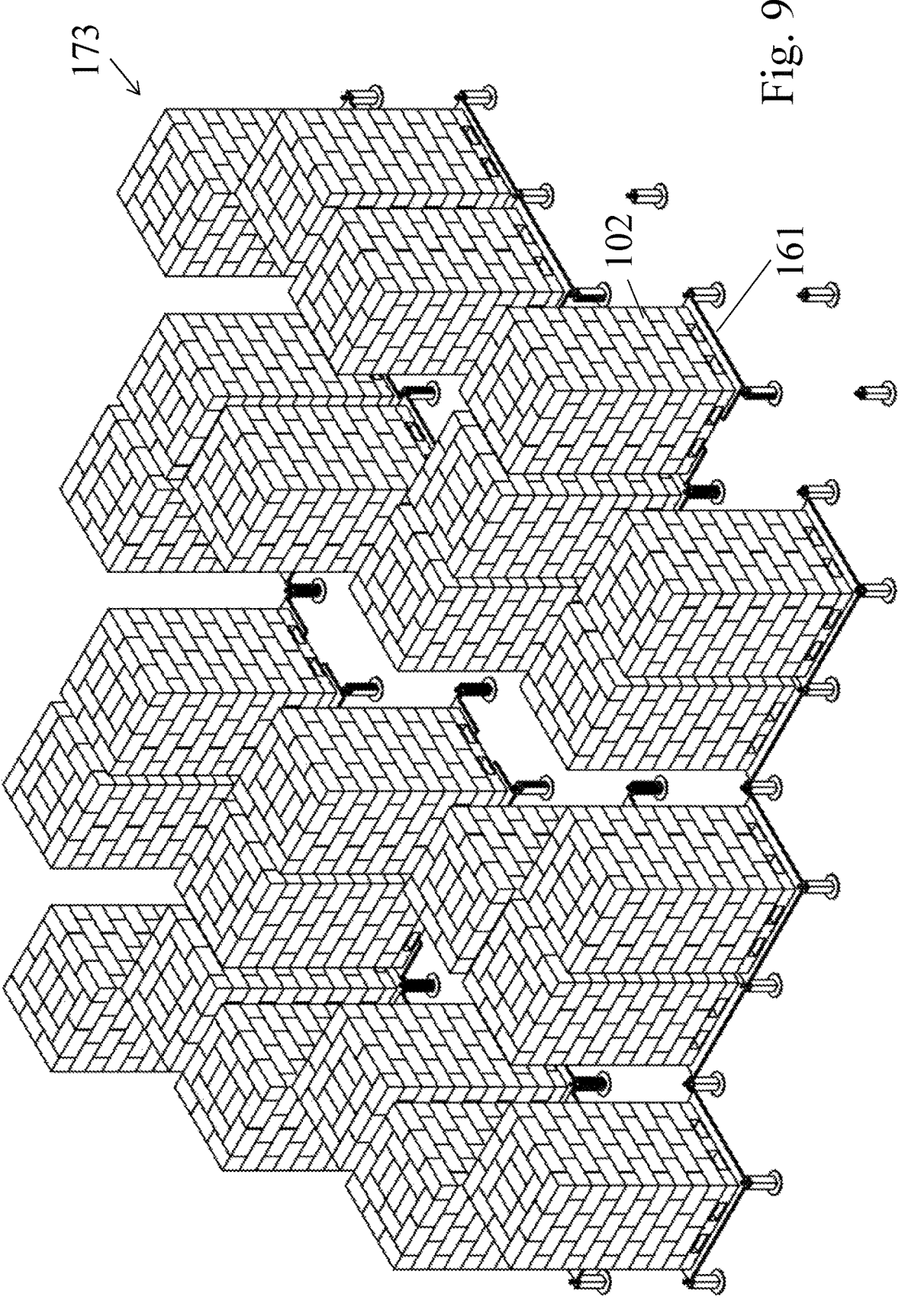
FIG. 9 is an isometric view of an intermediate stage of the assembly process of one embodiment of the advanced warehouse of the present invention with 9 access shafts showing pallets placed on the ground level.

FIG. 9 shows the warehouse being assembled 173 in an intermediate stage with pallets 102 placed on the ground level, each pallet 102 resting on its corresponding installed shelf 161.

Figure 10:
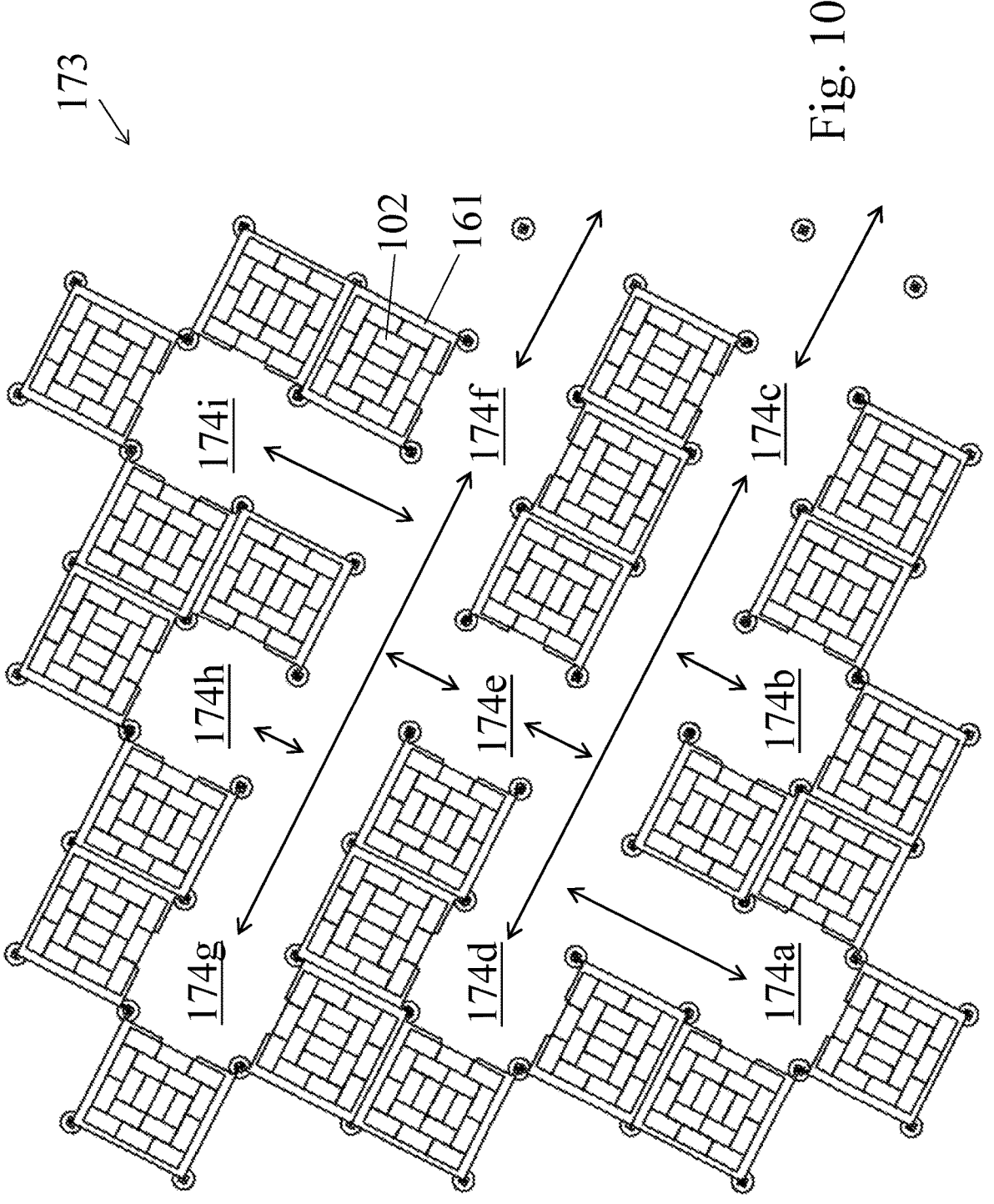
FIG. 10 is a top view of an intermediate stage of the assembly process of one embodiment of the advanced warehouse of the present invention with 9 access shafts showing pallets placed on the ground level and access routes to the access shafts.

FIG. 10 shows a top view of the warehouse being assembled 173 in an intermediate stage with pallets 102 placed on the ground level, each pallet 102 resting on its corresponding installed shelf 161. The access paths to all access shafts 174*a*, 174*b*, etc. produced by not installing shelves at convenient points of the structure are indicated using double arrowed lines.

Figures 11, 12:
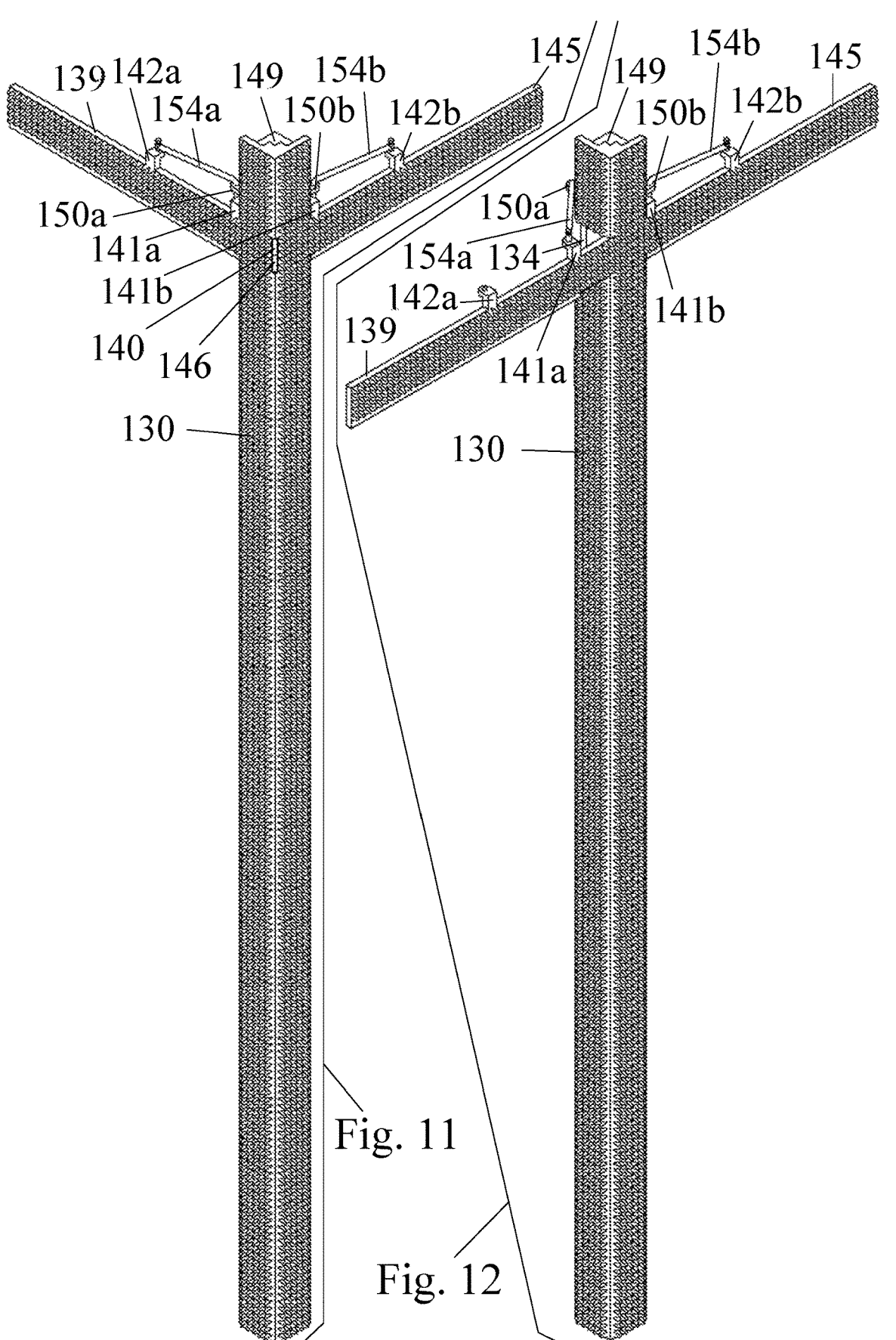
FIG. 11 is an isometric view of a first configuration of a rack pole assembly equipped with the required moving parts in a first position.
FIG. 12 is an isometric view of the first configuration of a rack pole assembly equipped with the required moving parts in a second position.

FIG. 11 shows a first configuration of components for a rack pole assembly with one rack pole 130, one rack pole standard hinged rack A 139, one rack pole standard hinged rack B 145, and one rack pole top cover 149 properly installed with moving components in a first position.

The rack pole standard hinged rack A 139 is held at a fixed position aligned to the left front face of the rack pole 130 by means of one lock bar 154*a* installed between the rack pole top lock fixture 150*a* and the hinged rack external lock fixture 142*a* of the rack pole standard hinged rack A 139 leaving the hinged rack internal lock fixture 141*a* unused.

The rack pole standard hinged rack B 145 is held at a fixed position aligned to the right front face of the rack pole 130 by means of one lock bar 154*b* installed between the rack pole top lock fixture 150*b* and the hinged rack external lock fixture 142*b* of the rack pole standard hinged rack B 145 leaving the hinged rack internal lock fixture 141*b* unused.

In this position and at the angle shown in FIG. 11, parts of the hinge A 140 and the hinge B 146 are visible.

FIG. 12 shows the same configuration of components for a rack pole assembly shown in FIG. 11 with one rack pole 130, one rack pole standard hinged rack A 139, one rack pole standard hinged rack B 145, and one rack pole top cover 149 properly installed with moving components in a second position.

The rack pole standard hinged rack A 139 is held at a fixed position aligned to the right front face of the rack pole 130 and to the rack pole standard hinged rack B 145 by means of one lock bar 154*a* installed between the rack pole top lock fixture 150*a* and the hinged rack internal lock fixture 141*a* of the rack pole standard hinged rack A 139 leaving the hinged rack external lock fixture 142*a* unused.

The rack pole standard hinged rack B 145 is held at a fixed position aligned to the right front face of the rack pole 130 by means of one lock bar 154*b* installed between the rack pole top lock fixture 150*b* and the hinged rack external lock fixture 142*b* of the rack pole standard hinged rack B 145 leaving the hinged rack internal lock fixture 141*b* unused.

In this position and at the angle shown in FIG. 12, parts of the rack pole neck cover 134 are visible.

Figures 13, 14:
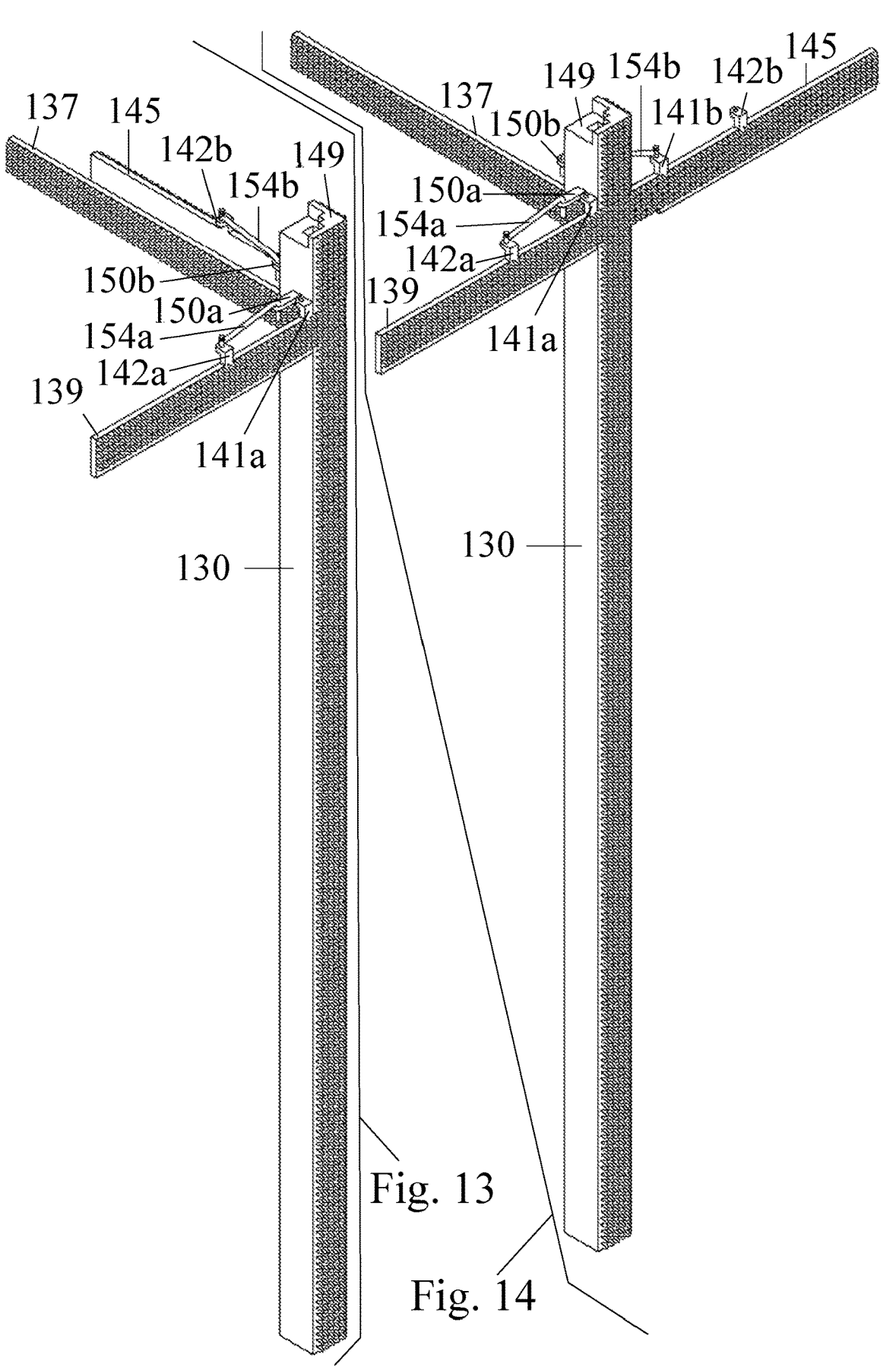
FIG. 13 is an isometric view of a second configuration of a rack pole assembly equipped with the required moving parts and an additional rack pole standard fixed rack with the moving parts in the first position as shown in FIG. 11 but seen from a different angle.
FIG. 14 is an isometric view of the second configuration of a rack pole assembly equipped with the required moving parts and an additional rack pole standard fixed rack with the moving parts in a third position.

FIG. 13 shows a second configuration of components for a rack pole assembly with one rack pole 130, one rack pole standard hinged rack A 139, one rack pole standard hinged rack B 145, one rack pole standard fixed rack 137 and one rack pole top cover 149 properly installed with moving components in the same first position shown in FIG. 11.

The rack pole standard hinged rack A 139 is held at a fixed position aligned to the left front face of the rack pole 130 by means of one lock bar 154*a* installed between the rack pole top lock fixture 150*a* and the hinged rack external lock fixture 142*a* of the rack pole standard hinged rack A 139 leaving the hinged rack internal lock fixture 141*a* unused.

The rack pole standard hinged rack B 145 is held at a fixed position aligned to the right front face of the rack pole 130 by means of one lock bar 154*b* installed between the rack pole top lock fixture 150*b* and the hinged rack external lock fixture 142*b* of the rack pole standard hinged rack B 145.

The rack pole standard fixed rack 137 is rigidly attached to the rack pole 130 and is therefore not affected by the movement of other components.

FIG. 14 shows the same second configuration of components for a rack pole assembly shown in FIG. 13 with one rack pole 130, one rack pole standard hinged rack A 139, one rack pole standard hinged rack B 145, one rack pole standard fixed rack 137, and one rack pole top cover 149 properly installed with moving components in a third position.

The rack pole standard hinged rack A 139 is held at a fixed position aligned to the left front face of the rack pole 130 by means of one lock bar 154*a* installed between the rack pole top lock fixture 150*a* and the hinged rack external lock fixture 142*a* of the rack pole standard hinged rack A 139 leaving the hinged rack internal lock fixture 141*a* unused.

The rack pole standard hinged rack B 145 is held at a fixed position aligned to the left front face of the rack pole 130 and to the rack pole standard hinged rack A 139 by means of one lock bar 154*b* installed between the rack pole top lock fixture 150*b* and the hinged rack internal lock fixture 141*b* of the rack pole standard hinged rack B 145 leaving the hinged rack external lock fixture 142*b* unused.

The rack pole standard fixed rack 137 is rigidly attached to the rack pole 130 and is therefore not affected by the movement of other components.

Figures 15, 15A:
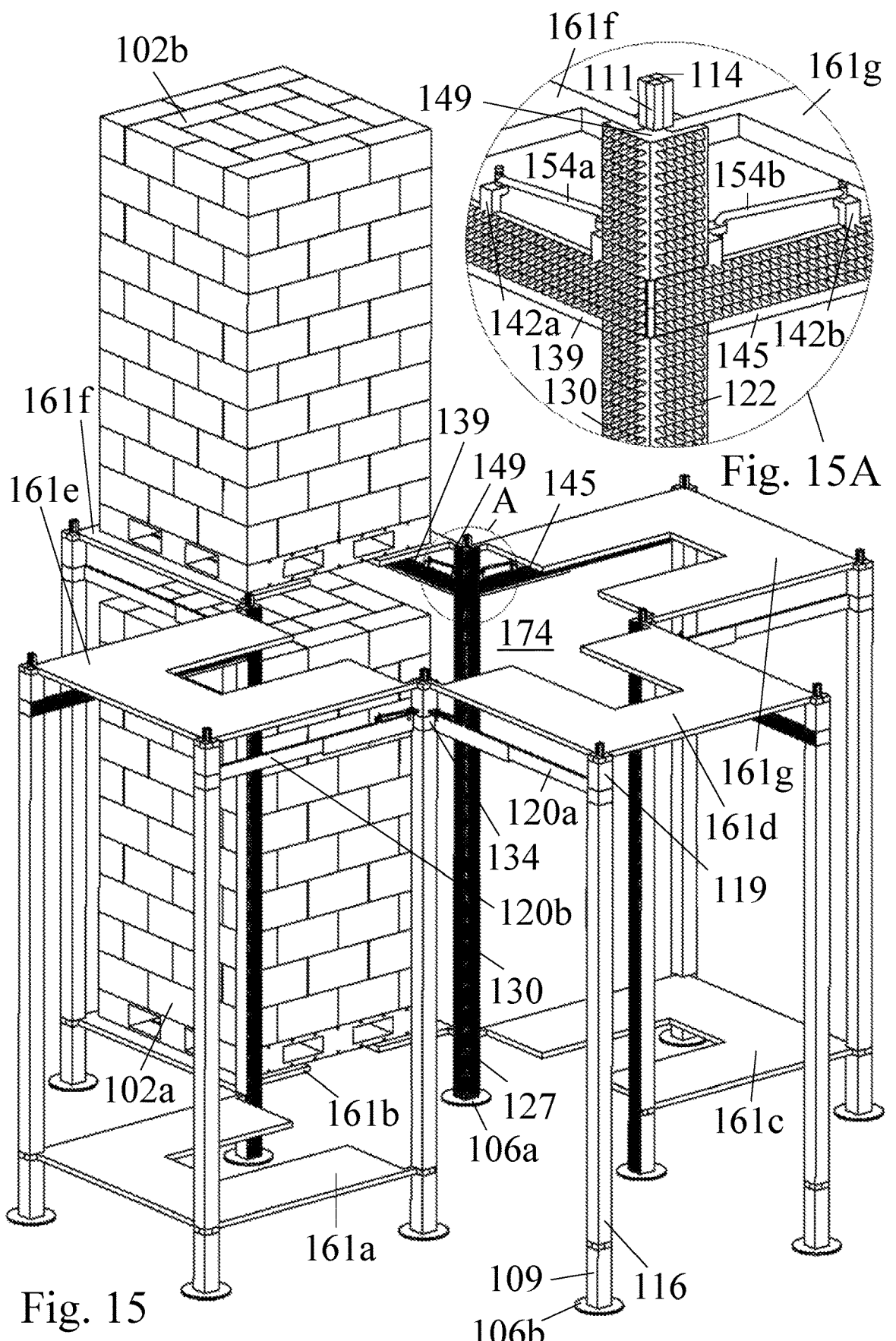
FIG. 15 is an isometric view of one embodiment of the advanced warehouse of the present invention showing a access shaft with two levels and with moving parts in a first position.
FIG. 15A is an isometric view of the moving parts in one rack pole of the access shaft of the advanced warehouse of the present invention with two levels and with moving parts in the first position.

FIG. 15 shows one embodiment of the advanced warehouse of the present invention showing one access shaft 174 with two levels and with moving parts in the first position.

One rack pole 130 equipped with one rack pole standard hinged rack A 139, one rack pole standard hinged rack B 145, and one rack pole top cover 149 properly installed is placed on top of each base rack spacer 127 and its corresponding base 106*a* at the proper orientation with the front faces of the base rack spacer 127 and the front faces of the rack pole 130 having frustum shaped teeth 122 facing towards the center of the access shaft 174.

Similarly, one plain pole 116 with one single rack piece 120*a* installed and fitted with one plain top spacer 119 at the top is placed on top of each base spacer 109 and its corresponding base 106*b* at the proper orientation with the single rack pieces 120*a*, 120*b*, etc. aligned with the corresponding shelf 161*d*, 161*e*, etc. above it.

One shelf has not been installed on the ground level to allow access to the access shaft 174, leaving the ground level with three shelves 161*a*, 161*b*, and 161*c*. The first level has all four shelves 161*d*, 161*e*, 161*f*, and 161*g* installed.

Only two pallets 102*a*, 102*b* of the total capacity of seven are shown as reference to avoid obstructing the view of other components of the structure.

In the first position shown in FIG. 15, the access shaft 174 is configured to allow vertical movement only and horizontal movement is not possible above the ground level. In the first position, the shelves 161*d*, 161*e*, 161*f*, and 161*g* in the first level are not accessible. The shelves 161*a*, 161*b*, and 161*c* that are at ground level are accessible and remain accessible at all times.

One rack pole neck cover 134 used when no fixed rack is attached to the rack pole 130 is also visible.

Detail FIG. 15A shows the rack pole 130 equipped with one rack pole standard hinged rack A 139, one rack pole standard hinged rack B 145, and one rack pole top cover 149 in greater magnification to display additional details including the shape of the structures containing frustum shaped teeth 122.

The rack pole standard hinged rack A 139 is held at a fixed position aligned to the left front face of the rack pole 130 using the lock bar 154*a* that is attached to the hinged rack external lock fixture 142*a* of the rack pole standard hinged rack A 139.

The rack pole standard hinged rack B 145 is held at a fixed position aligned to the right front face of the rack pole 130 using the lock bar 154*b* that is attached to the hinged rack external lock fixture 142*b* of the rack pole standard hinged rack B 145.

Detail FIG. 15A also shows the shelves 161*f,* and 161*g,* one plain blank 111, and one quarter blank 114 installed on the rack pole top cover 149 completing the structure and providing a proper place for the installation of one additional rack pole 130 to build another level of the structure.

Figures 16, 16A:
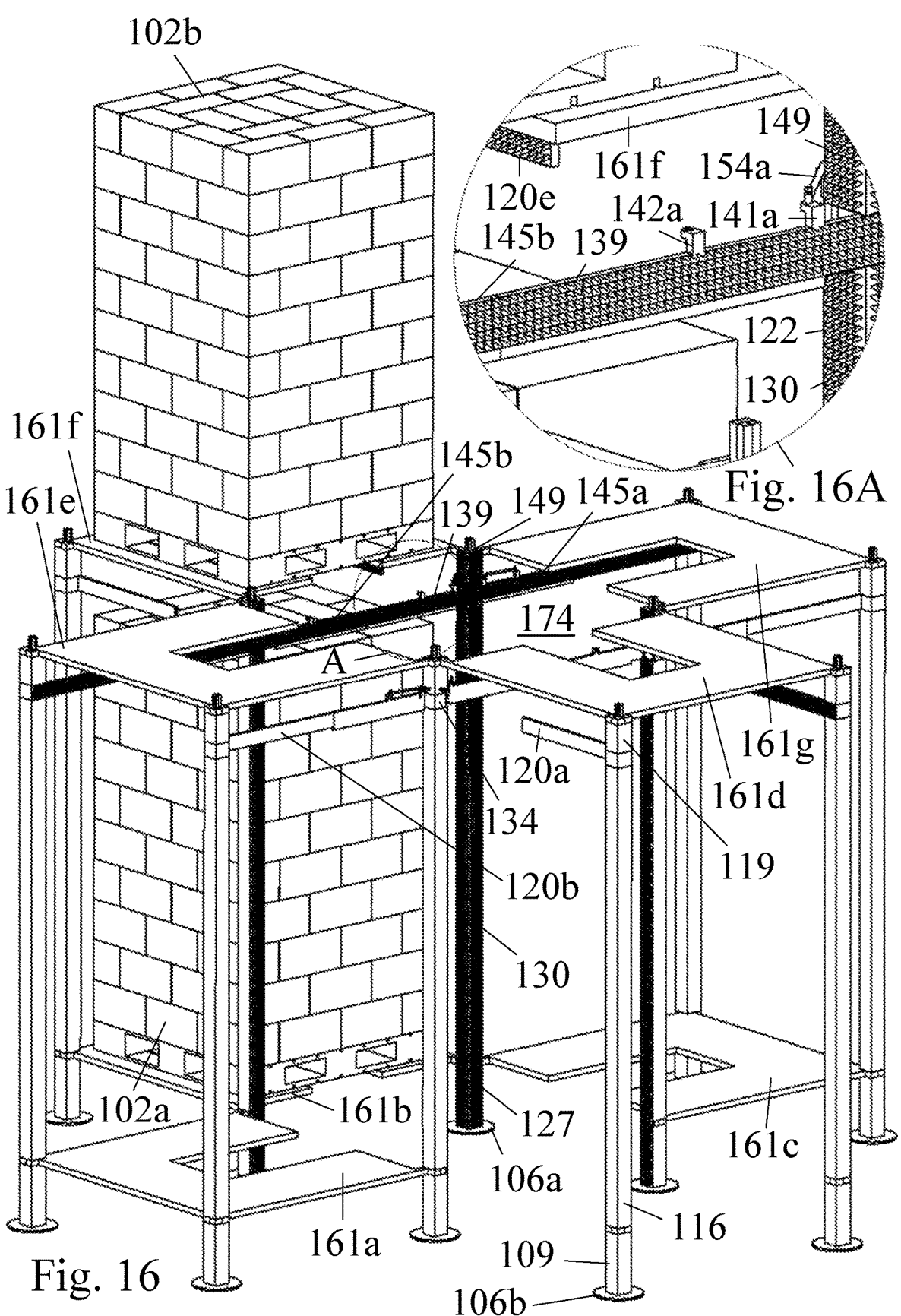
FIG. 16 is an isometric view of one embodiment of the advanced warehouse of the present invention showing a access shaft with two levels and with moving parts in a second position.
FIG. 16A is an isometric view of the moving parts in one rack pole of the access shaft of the advanced warehouse of the present invention with two levels and with moving parts in the second position.

FIG. 16 shows one embodiment of the advanced warehouse of the present invention showing one access shaft 174 with two levels and with moving parts in the second position.

One rack pole 130 equipped with one rack pole standard hinged rack A 139, one rack pole standard hinged rack B 145*a,* and one rack pole top cover 149 properly installed is placed on top of each base rack spacer 127 and its corresponding base 106*a* at the proper orientation with the front faces of the base rack spacer 127 and the front faces of the rack pole 130 having frustum shaped teeth 122 facing towards the center of the access shaft 174.

Similarly, one plain pole 116 with one single rack piece 120*a* installed and fitted with one plain top spacer 119 at the top is placed on top of each base spacer 109 and its corresponding base 106*b* at the proper orientation with the single rack pieces 120*a,* 120*b,* etc. aligned with the corresponding shelf 161*d,* 161*e,* etc. above it.

One shelf has not been installed on the ground level to allow access to the access shaft 174, leaving the ground level with three shelves 161*a,* 161*b,* and 161*c.* The first level has all four shelves 161*d,* 161*e,* 161*f,* and 161*g* installed.

Only two pallets 102*a,* 102*b* of the total capacity of seven are shown as reference to avoid obstructing the view of other components of the structure.

In the second position shown in FIG. 16, the access shaft 174 is configured to allow horizontal movement only and vertical movement is temporarily blocked. In the second position, the rack pole standard hinged rack A 139 and the rack pole standard hinged rack B 145*b* join at the edges to form a continuous seamless rack that bridges the gap in front of shelf 161*f* and continues in both directions all the way to the edges of the structure. Similarly, the gap in front of shelf 161*d* is also bridged. As a result, the shelves 161*e,* and 161*g* are accessible while the shelves 161*d,* and 161*f* are isolated from the access shaft 174. Components associated with the access to the shelves 161*d,* and 161*f* such as the single rack piece 120*a* remain disconnected from the rest of the rack structure.

One rack pole neck cover 134 used when no fixed rack is attached to the rack pole 130 is also visible.

Detail FIG. 16A shows the bridged region produced with the moving components in the second position in greater magnification to display additional details including the shape of the structures containing frustum shaped teeth 122.

The rack pole standard hinged rack A 139 and the rack pole standard hinged rack B 145*b* join at the edges to form a continuous seamless rack that bridges the gap in front of shelf 161*f* As the rack pole standard hinged rack A 139 moves to join with the rack pole standard hinged rack B 145*b,* the single rack piece 120*c* becomes disconnected from the rest of the rack structure.

The rack pole standard hinged rack A 139 is held at a fixed position aligned to the right front face of the rack pole 130 using the lock bar 154*a* that is attached to the hinged rack internal lock fixture 141*a* of the rack pole standard hinged rack A 139 leaving the hinged rack external lock fixture 142*a* unused.

Figures 17, 17A:
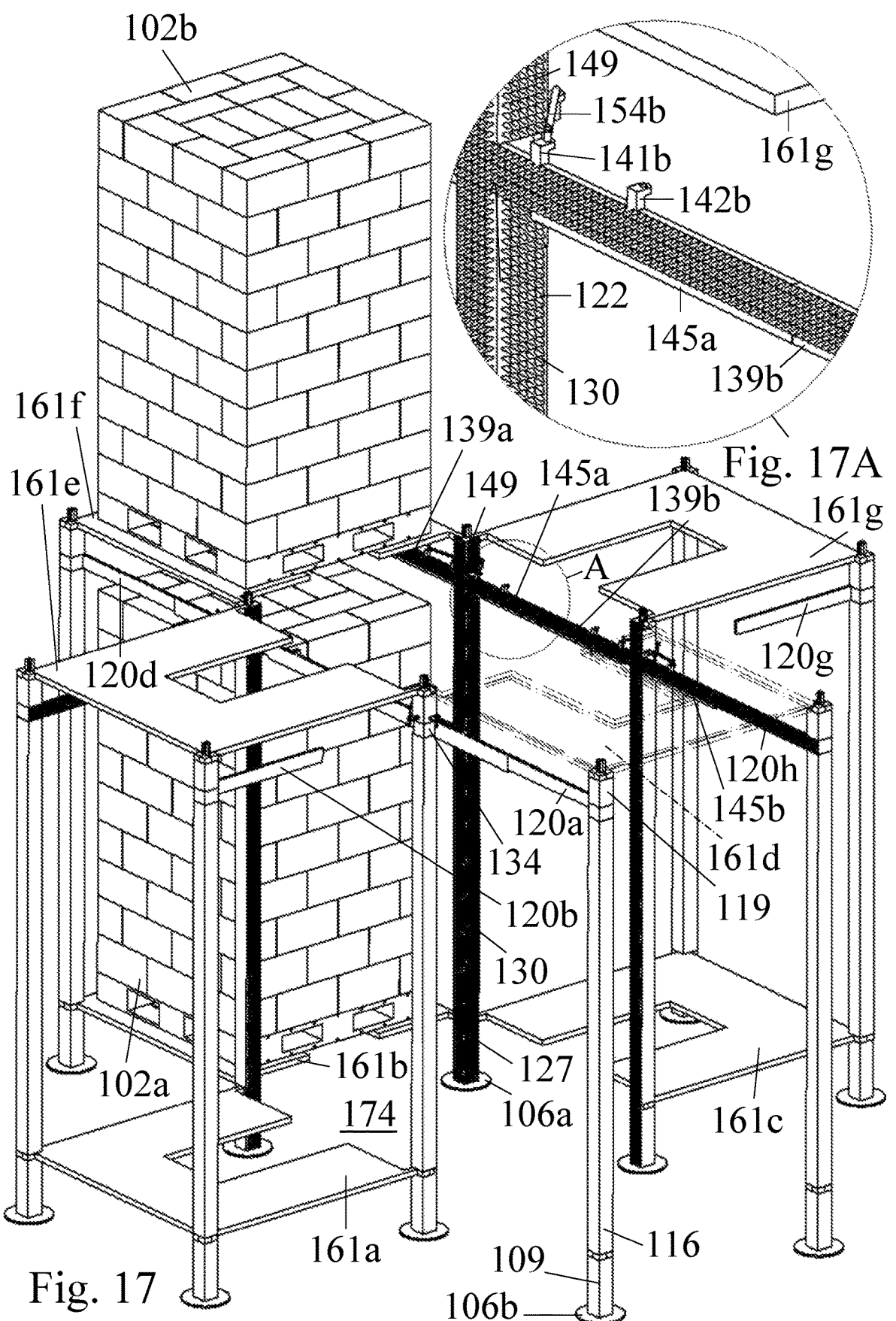
FIG. 17 is an isometric view of one embodiment of the advanced warehouse of the present invention showing a access shaft with two levels and with moving parts in a third position.
FIG. 17A is an isometric view of the moving parts in one rack pole of the access shaft of the advanced warehouse of the present invention with two levels and with moving parts in the third position.

FIG. 17 shows one embodiment of the advanced warehouse of the present invention showing one access shaft 174 with two levels and with moving parts in the third position.

One rack pole 130 equipped with one rack pole standard hinged rack A 139*a,* one rack pole standard hinged rack B 145*a,* and one rack pole top cover 149 properly installed is placed on top of each base rack spacer 127 and its corresponding base 106*a* at the proper orientation with the front faces of the base rack spacer 127 and the front faces of the rack pole 130 having frustum shaped teeth 122 facing towards the center of the access shaft 174.

Similarly, one plain pole 116 with one single rack piece 120*a* installed and fitted with one plain top spacer 119 at the top is placed on top of each base spacer 109 and its corresponding base 106*b* at the proper orientation with the single rack pieces 120*a,* 120*b,* etc. aligned with the corresponding shelf 161*d,* 161*e,* etc. above it.

One shelf has not been installed on the ground level to allow access to the access shaft 174, leaving the ground level with three shelves 161*a,* 161*b,* and 161*c.* The first level has all four shelves 161*d,* 161*e,* 161*f,* and 161*g* installed. For better visualization however, the shelf 161*d* is not shown and drawn in dash dotted lines for reference.

Only two pallets 102*a,* 102*b* of the total capacity of seven are shown as reference to avoid obstructing the view of other components of the structure.

In the third position shown in FIG. 17, the access shaft 174 is configured to allow horizontal movement only and vertical movement is temporarily blocked. In the third position, the rack pole standard hinged rack B 145*a* and the rack pole standard hinged rack A 139*b* join at the edges to form a continuous seamless rack that bridges the gap in front of shelf 161*g.* This continuous seamless rack extends in both directions until the edges of the structure, in one direction with the rack pole standard hinged rack B 145*b* and the single rack piece 120*h* and in the other direction with rack pole standard hinged rack A 139*a* and one additional single rack piece not visible as it is obstructed by the pallet 102*b.* The position of the single rack piece that is not visible can be determined though as it is the counterpart to the single rack piece 120*d* that is visible, the same way that the single rack piece 120*h* is the counterpart to the single rack piece 120*a.*

Similarly, the gap in front of shelf 161*e* is also bridged. As a result, the shelves 161*d,* and 161*f* are accessible while the shelves 161*e,* and 161*g* are isolated from the access shaft 174. Components associated with the access to the shelves 161*e,* and 161*g* such as the single rack piece 120*b,* 120*g,* etc. remain disconnected from the rest of the rack structure.

One rack pole neck cover 134 used when no fixed rack is attached to the rack pole 130 is also visible.

Detail FIG. 17A shows the bridged region produced with the moving components in the third position in greater magnification to display additional details including the shape of the structures containing frustum shaped teeth 122.

The rack pole standard hinged rack B 145*a* and the rack pole standard hinged rack A 139*b* join at the edges to form a continuous seamless rack that bridges the gap in front of shelf 161*g.*

The rack pole standard hinged rack B 145*a* is held at a fixed position aligned to the left front face of the rack pole 130 using the lock bar 154*b* that is attached to the hinged rack internal lock fixture 141*b* of the rack pole standard hinged rack B 145*a* leaving the hinged rack external lock fixture 142*b* unused.

Figure 18:
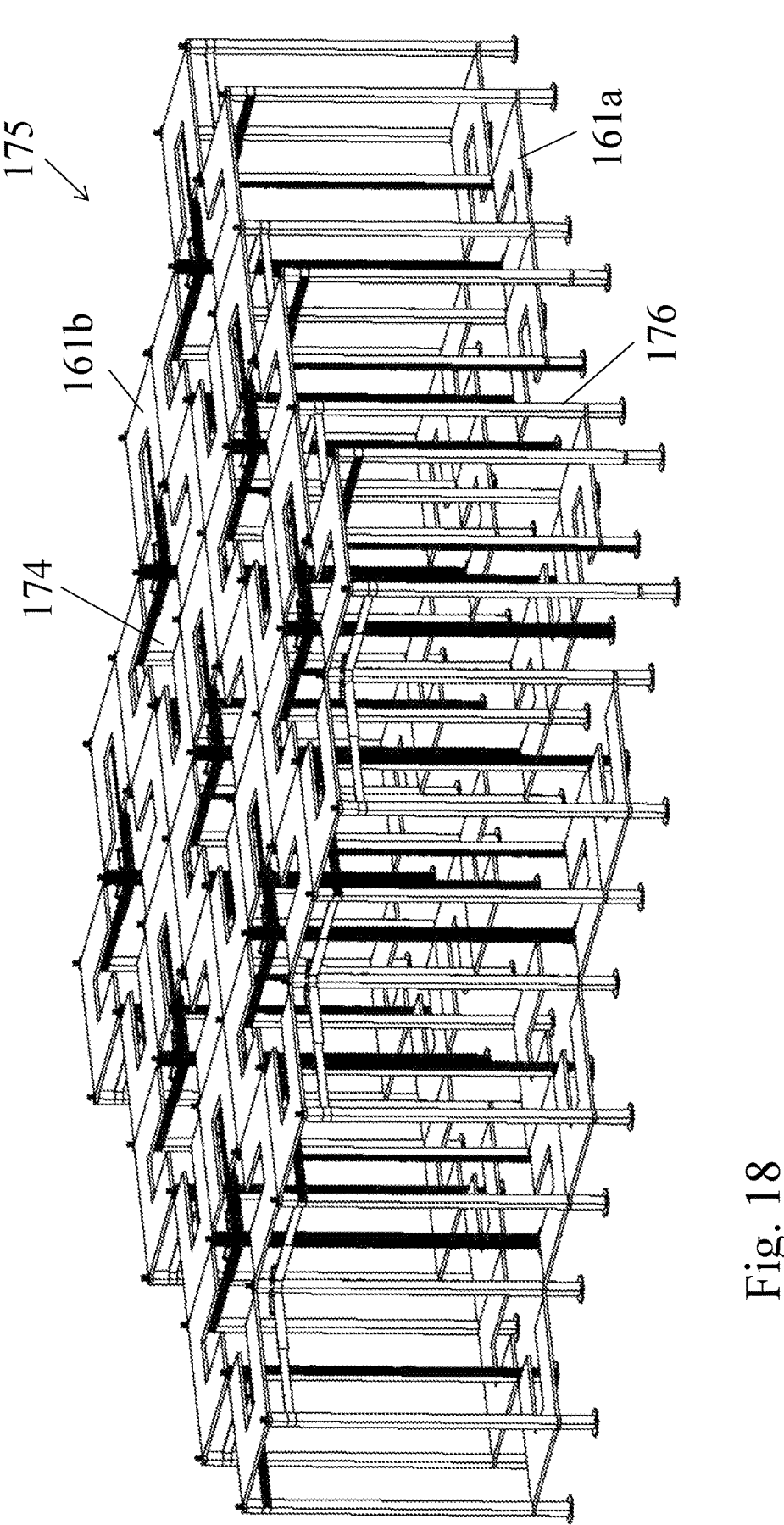
FIG. 18 is an isometric view of one embodiment of the advanced warehouse of the present invention with 9 access shafts, two levels and with moving parts in a first position.

FIG. 18 shows a complete two level nine cell warehouse 175 that has a warehouse structure 176 and is equipped with shelves 161*a* at ground level and shelves 161*b* at the first level. The warehouse structure 176 of the two level nine cell warehouse 175 is shown in the first position, allowing vertical movement in the access shafts 174.

Figure 19:
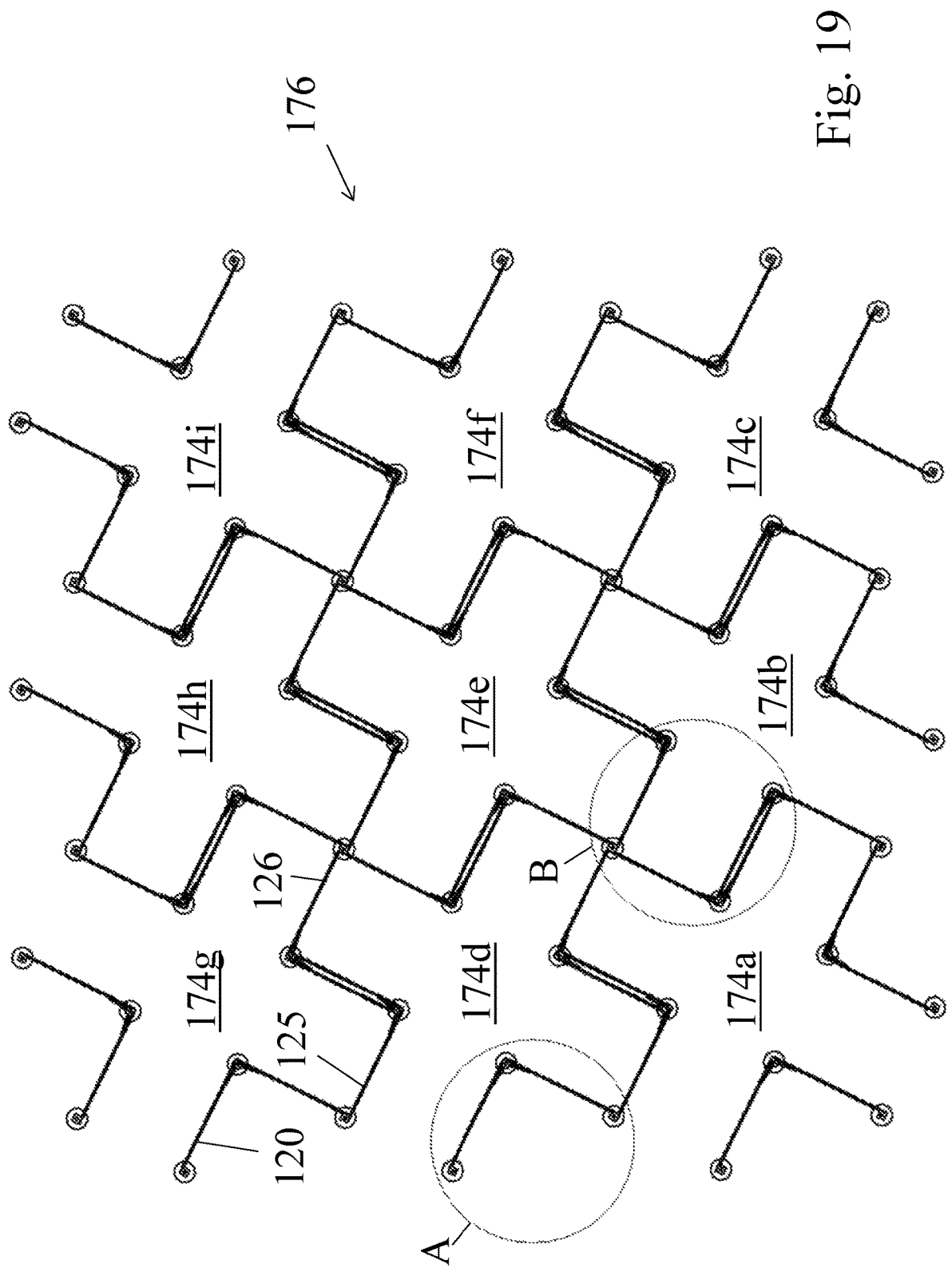
FIG. 19 is a top view of one embodiment of an advanced warehouse of the present invention with 9 access shafts and moving parts in a first position, not showing any shelf to show details of the warehouse structure.

FIG. 19 shows a top view of the warehouse structure 176 without shelves to allow a better view of the structure. The warehouse structure 176 is shown in the first position, allowing vertical movement in the access shafts 174a, 174b, etc.

The warehouse structure 176 requires the usage of different components depending on the location they are installed. At places in the edge of the warehouse structure 176 that are adjacent to only one access shaft 174g, the single rack piece 120 is installed. At places of the warehouse structure 176 that are adjacent to two access shafts 174d, and 174g the double standard rack piece 125 is installed and at places at the center of the warehouse structure 176 that are adjacent to four access shafts 174d, 174e, 174g, and 174h the quadruple standard rack piece 126 is installed.

Figure 19A:
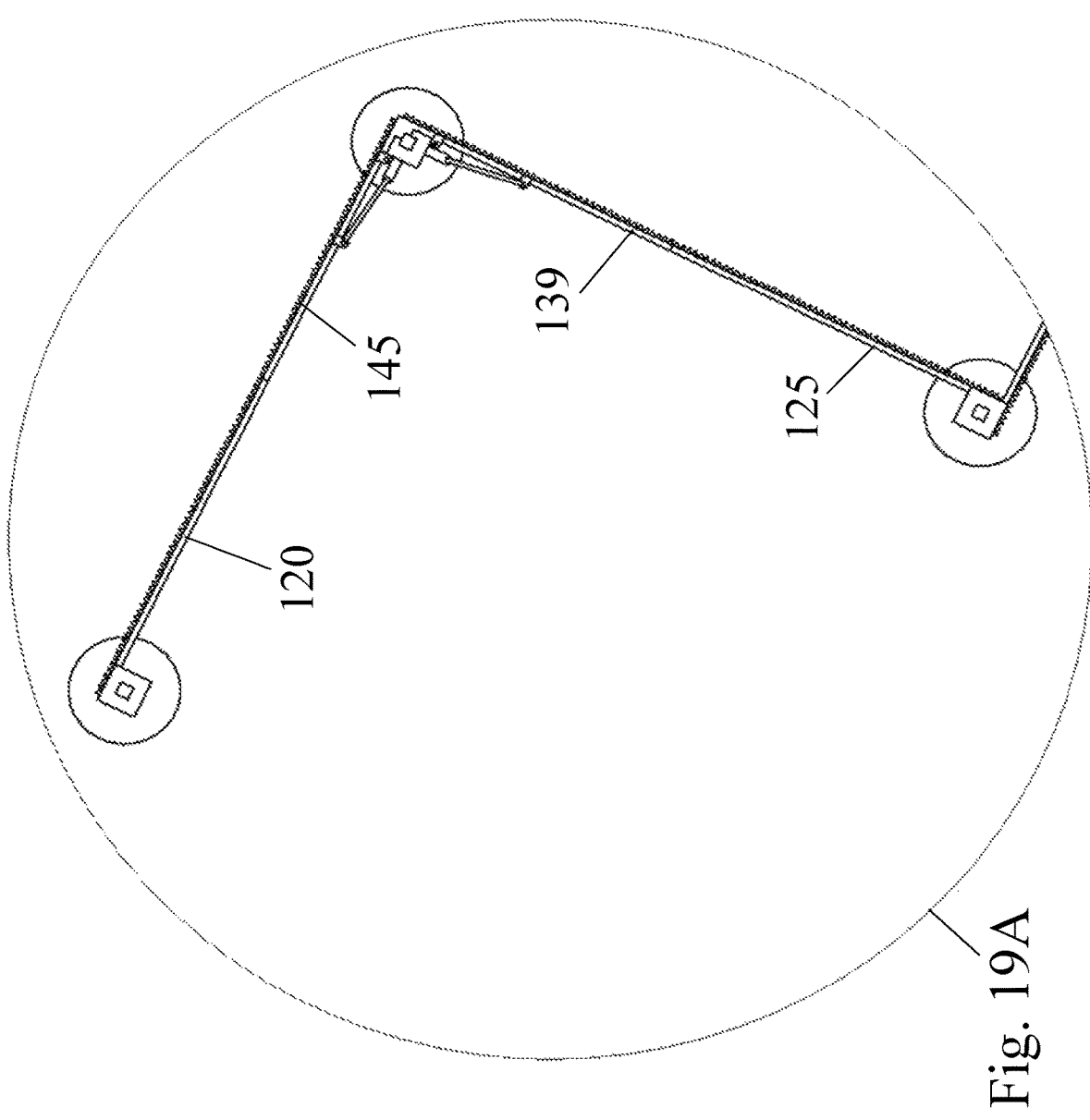
FIG. 19A is a top view of a first configuration of the warehouse structure.

Detail FIG. 19A shows one rack pole standard hinged rack B 145 and one rack pole standard hinged rack A 139 in the first position. In the first position, the rack pole standard hinged rack B 145 is in alignment with one single rack piece 120 at the top left and both parts make a continuous seamless rack. Similarly, in the first position the rack pole standard hinged rack A 139 is in alignment with one arm of one double standard rack piece 125 at the bottom and both parts make a continuous seamless rack.

Figure 19B:
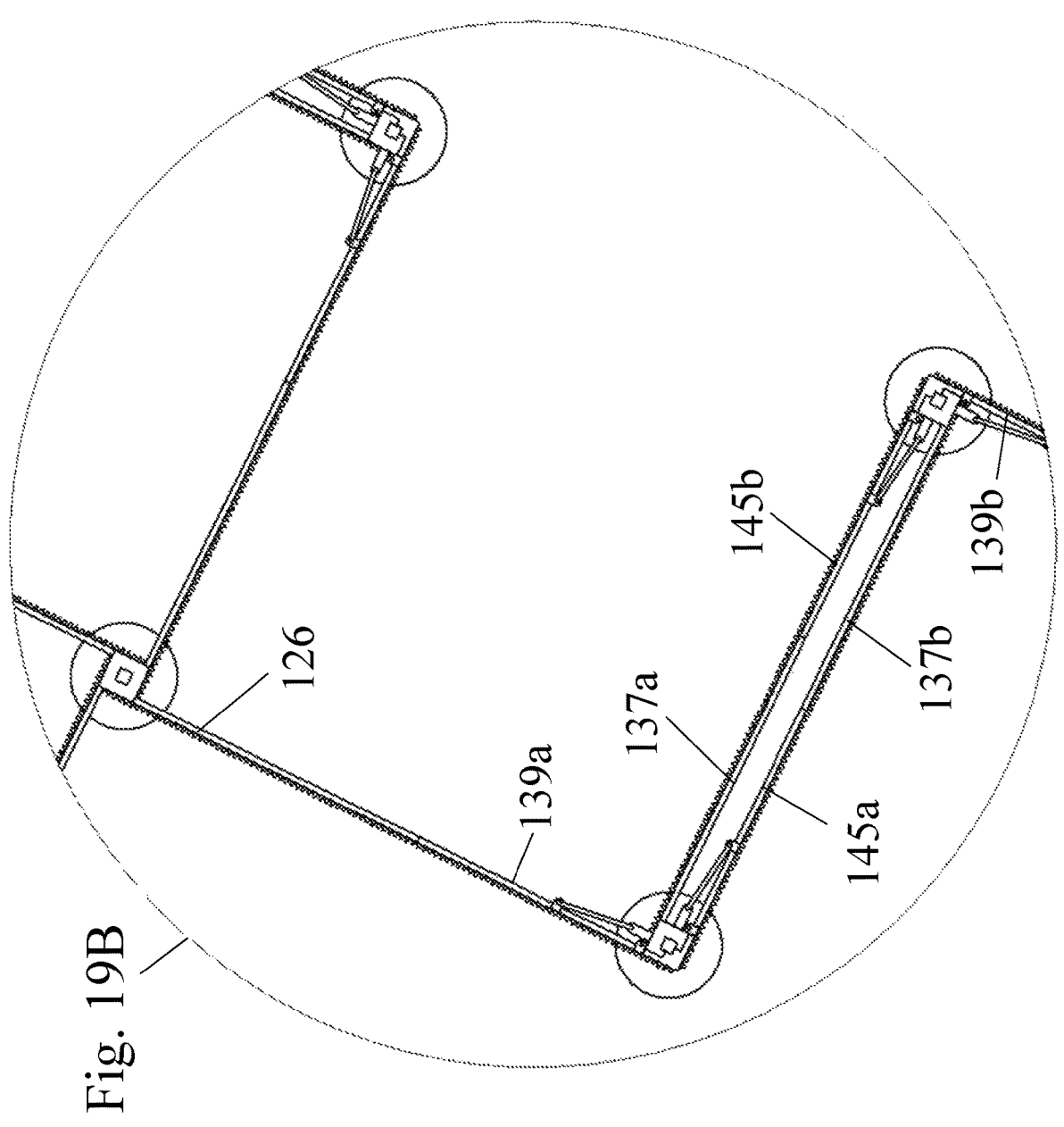
FIG. 19B is a top view of a second configuration of the warehouse structure.

Detail FIG. 19B shows a part of the warehouse structure 176 that requires the installation of rack pole standard fixed racks 137a, 137b to complete the structure.

The rack pole standard hinged rack A 139a and the rack pole standard hinged rack B 145a at the left and the rack pole standard hinged rack A 139b and the rack pole standard hinged rack B 145b at the right are both shown in the first position.

The rack pole standard hinged rack B 145a at the bottom left is in alignment with the rack pole standard fixed rack 137b at the bottom right and both parts make a continuous seamless rack. Similarly, the rack pole standard hinged rack B 145b at the right is in alignment with the rack pole standard fixed rack 137a at the left and both parts make a continuous seamless rack. The rack pole standard hinged rack A 139 in alignment with one arm of the quadruple standard rack piece 126 at the top right and both parts make a continuous seamless rack.

Figure 20:
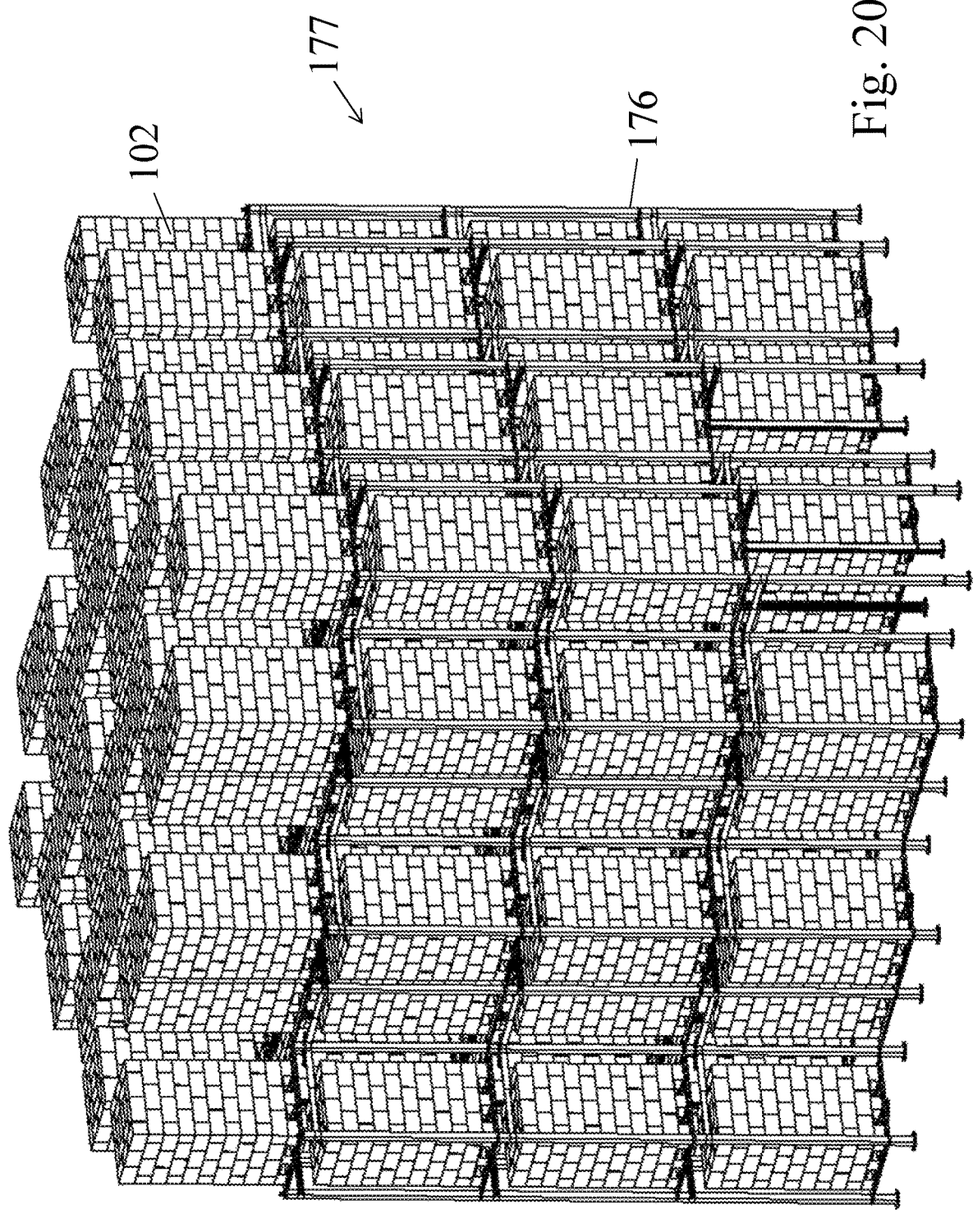
FIG. 20 is an isometric view of one embodiment of the advanced warehouse of the present invention with nine access shafts, four levels and with moving parts in a first position.

FIG. 20 shows a four level nine cell warehouse 177 with the corresponding four level warehouse structure 176 fully loaded with pallets 102.

Figure 21:
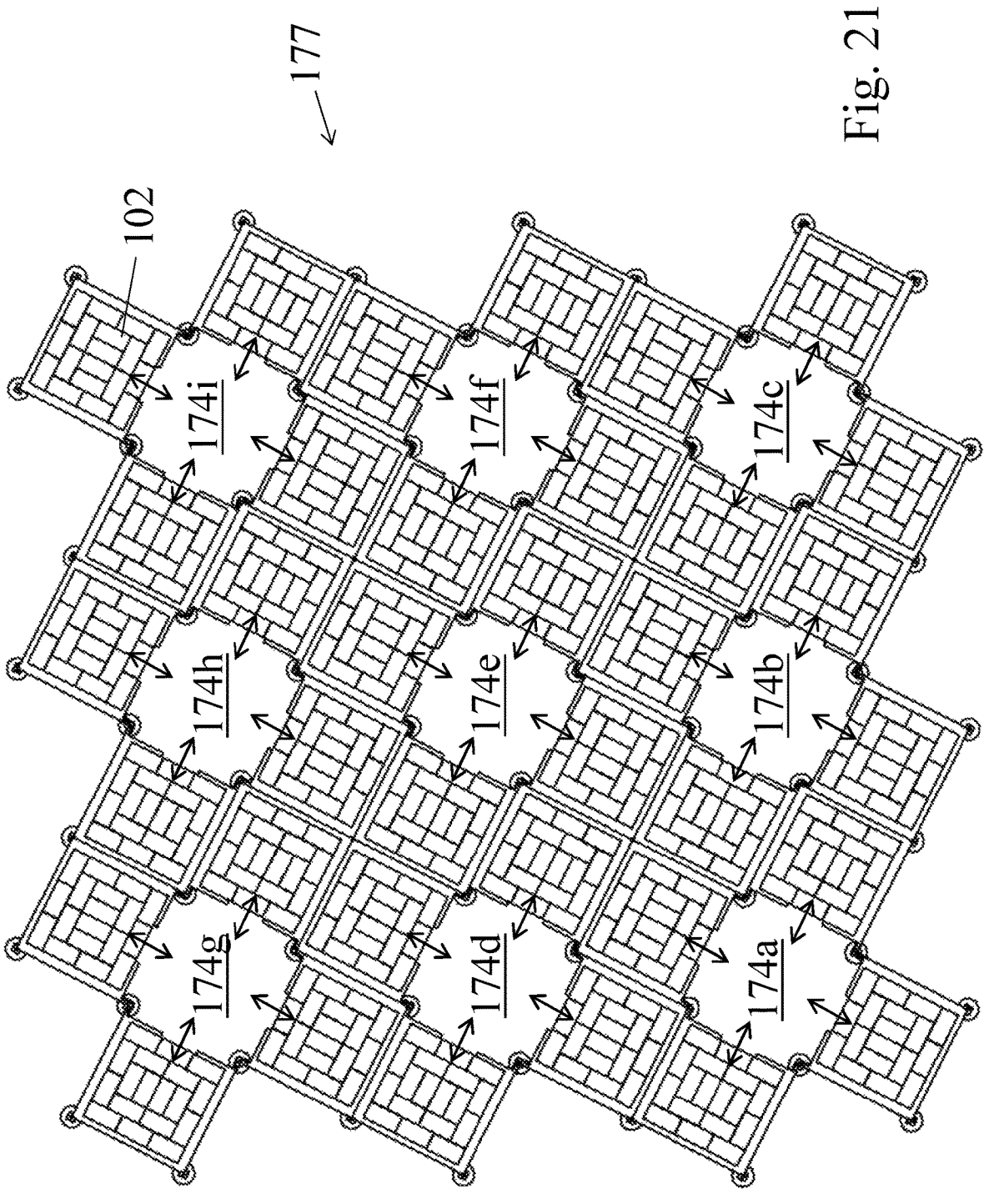
FIG. 21 is a top view of one embodiment of the advanced warehouse of the present invention with nine access shafts showing the accessibility of the pallets stored.

FIG. 21 shows a top view of the four level nine cell warehouse 177 fully loaded with pallets 102 to illustrate the accessibility of individual pallets 102. Each access shaft 174a, 174b, etc. provides access to four pallets 102 as indicated by the double arrowed lines. Any pallet 102 is accessible through only one specific access shaft.

Figure 22:
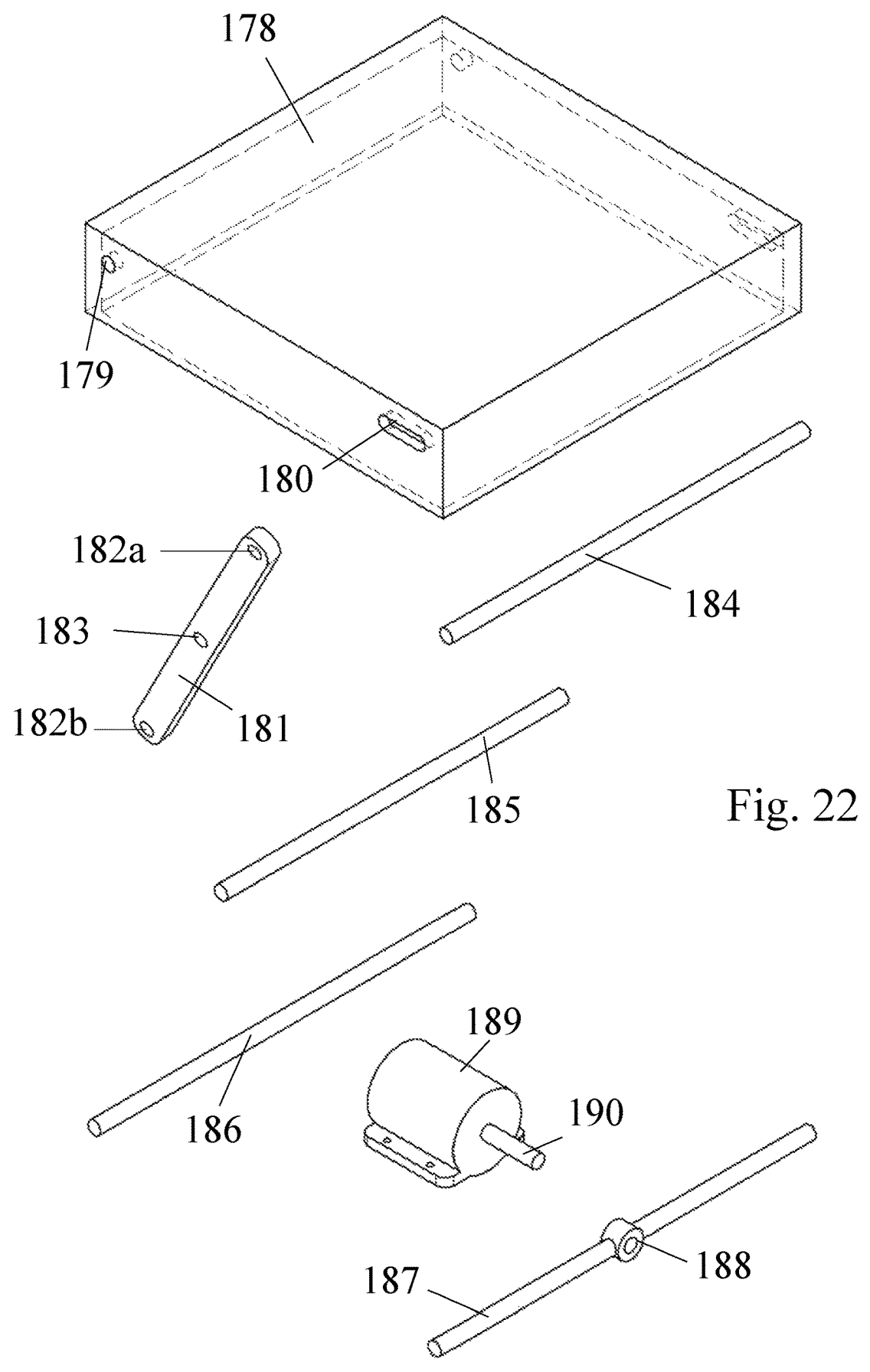
Figure 32:
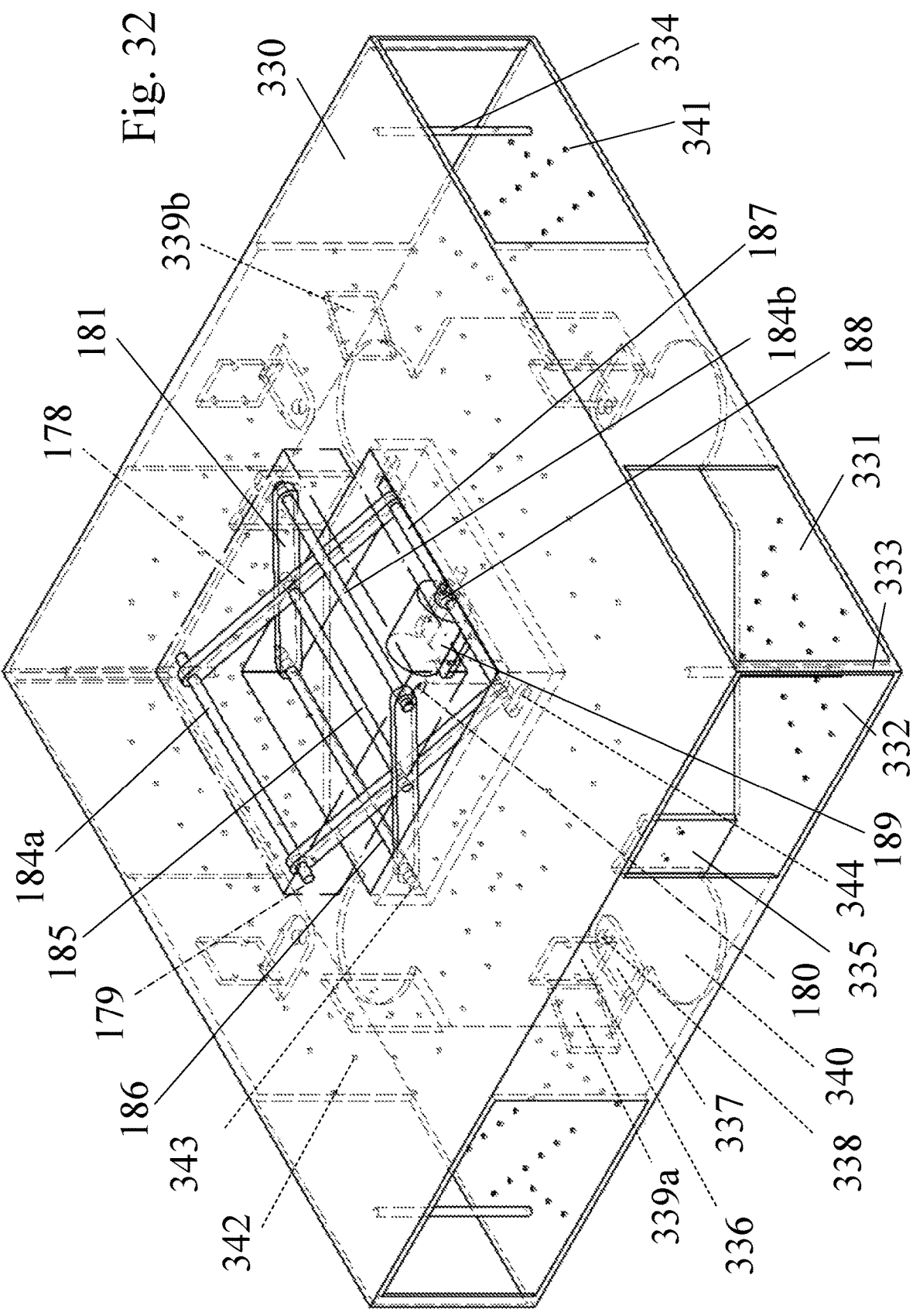
FIG. 32 is an isometric view of one embodiment of a pantographic lift assembled in the autonomous mobile lift robot case.

FIG. 22 shows components used to construct a pantographic lift (see FIG. 32).

A pantographic lift platform 178 has the shape of a parallelogram that is hollow and does not have the face at the bottom. The pantographic lift platform 178 has a platform fixed axis hole 179 located near the top face, parallel to the top face that goes all the way through from one side to the other side of the pantographic lift platform 178. The pantographic lift platform 178 also has a platform moving axis slot 180 that is parallel to the top face and is located at the same distance of the top face of the pantographic lift platform 178 as the platform fixed axis hole 179 and goes all the way through from one side to the other side of the pantographic lift platform 178.

A pantographic bar 181 is composed of a straight bar with a pair of outer axis holes 182a, 182b one at each end of the bar and a center axis hole 183 located at the center of the bar. Four pantographic bars 181 are required to build the pantographic lift. Two pantographic bars 181 are installed linked at the middle forming a "X" at each side of the pantographic lift platform 178 (see FIG. 32).

A top axis 184 is a simple rod with the same width as the outer wall of the pantographic lift platform 178. Two top axis 184 are required to build the pantographic lift, one installed at platform fixed axis hole 179 that remains fixed and another installed at the platform moving axis slot 180 that is able to slide the length of the platform moving axis slot 180.

The outer axis holes 182a of the pantographic bars 181 are inserted into the two top axis 184 before the top axis 184 are fully inserted into their corresponding places of installation. Matching sides of the top arms of the two "X" shapes constructed with the four pantographic bars 181 are inserted at each top axis 184 so that each top axis 184 is inserted into two pantographic bars 181, one from each "X" shape that are at the same side of the "X" shapes (see FIG. 32).

A center axis 185 is a simple rod with the width as the inner wall of the pantographic lift platform 178. The center axis 185 is installed connecting the center axis holes 183 of all the four pantographic bars 181 used to construct the pantographic lift and that are arranged in two "X" shapes, one "X" shape at each side of the pantographic lift platform 178 (see FIG. 32).

A bottom fixed axis 186 is a simple rod longer than the width as the outer wall of the pantographic lift platform 178 to allow it to be installed at an anchoring point.

A bottom moving axis 187 is a simple rod with the same length of the bottom fixed axis 186 that has a bottom moving axis nut 188 at the center.

A pantographic motor 189 with a pantographic motor axis 190 of suitable length that has a thread with the same gage as the bottom moving axis nut 188 is used to engage the bottom moving axis nut 188 and move the bottom moving axis 187 closer or further away from the pantographic motor 189. Embodiments of the present invention comprise suitable electronics are provided within the scope of the present invention to establish connection to one or more digital devices such as computers, laptops, cellphones, tablets or other, may be connected wirelessly, using Wi-Fi, Bluetooth, cellular, radio-frequency, and other bandwidths for communication to have the one or more digital devices control the pantographic motor 189 to direct operation and movement or for scheduling of operations using one or more software applications.

Figure 23:
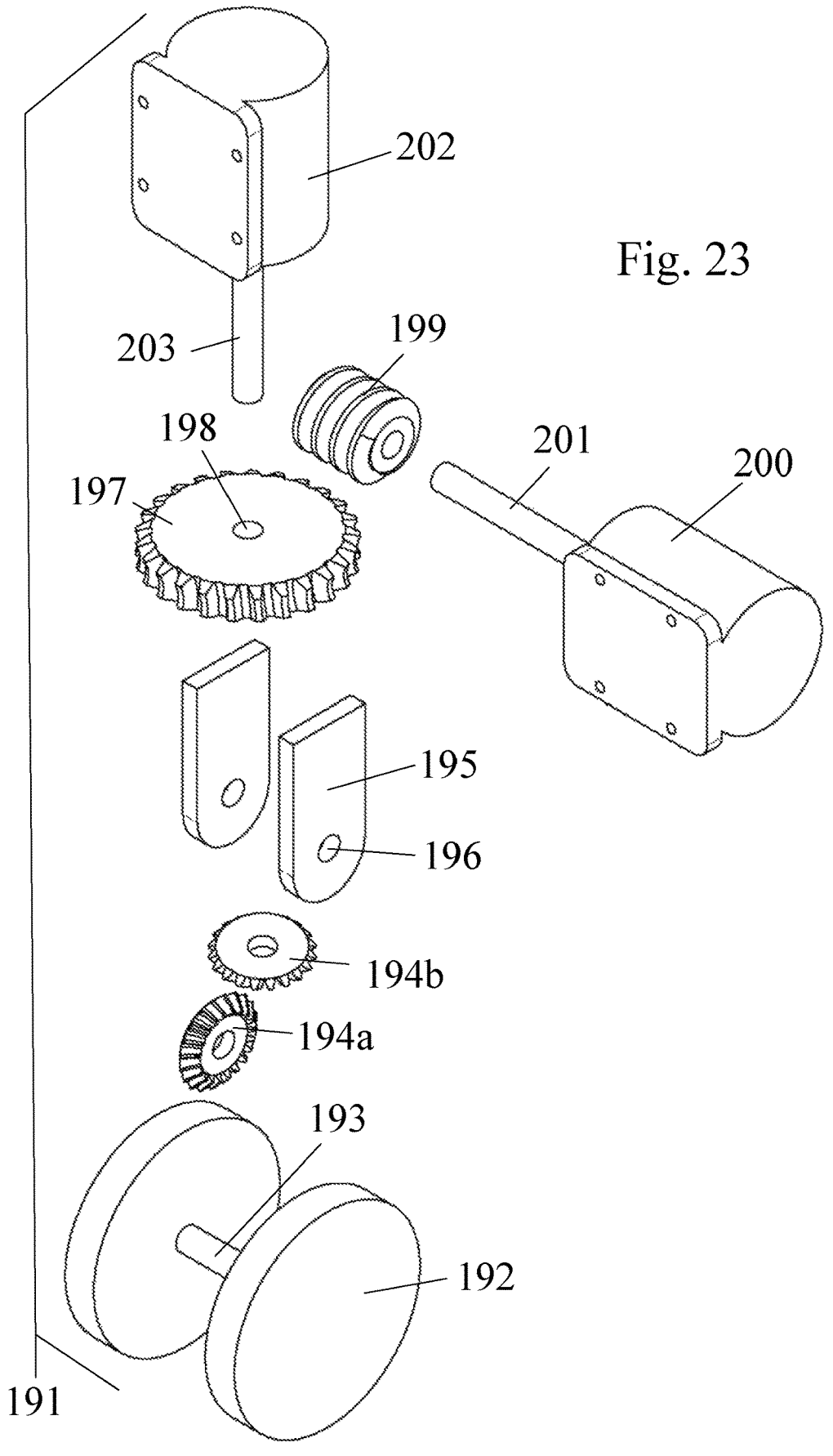
FIG. 23 is an isometric view of one embodiment of the parts used in the wheel assembly.

FIG. 23 shows an exploded view of one embodiment of a wheel assembly 191 of the present invention. The wheel assembly 191 is composed of a pair of wheels 192 that are connected by a wheel axis 193 that is supported by a wheel support 195 that has a pair of wheel support axis holes 196 that match the wheel axis 193.

A pair of wheel driving bevels 194a, and 194b with the first wheel driving bevel 194a placed at the wheel axis 193 to drive the wheel axis 193 and the second wheel driving bevel 194b placed at a 90 degrees angle to the first wheel driving bevel 194a is used to drive the wheels 192.

The wheel support 195 is attached to a wheel directional gear 197 that has a wheel directional gear center passage 198. The wheel directional gear 197 is able to rotate altering the orientation of the wheel support 195 and as a consequence of the wheels 192 by means of a wheel directional worm 199 that is fixed to a wheel directional motor shaft 201 of a wheel directional motor 200.

A wheel driving motor 202 with a wheel driving axle 203 of suitable length passes through the wheel directional gear center passage 198 and reaches the wheel driving bevel 194b. The wheel driving bevel 194a is fixated to the wheel driving axle 203 so when the wheel driving motor 202 drives the wheel driving axle 203 the movement is transferred to the wheels 192.

Figures 24, 24A:
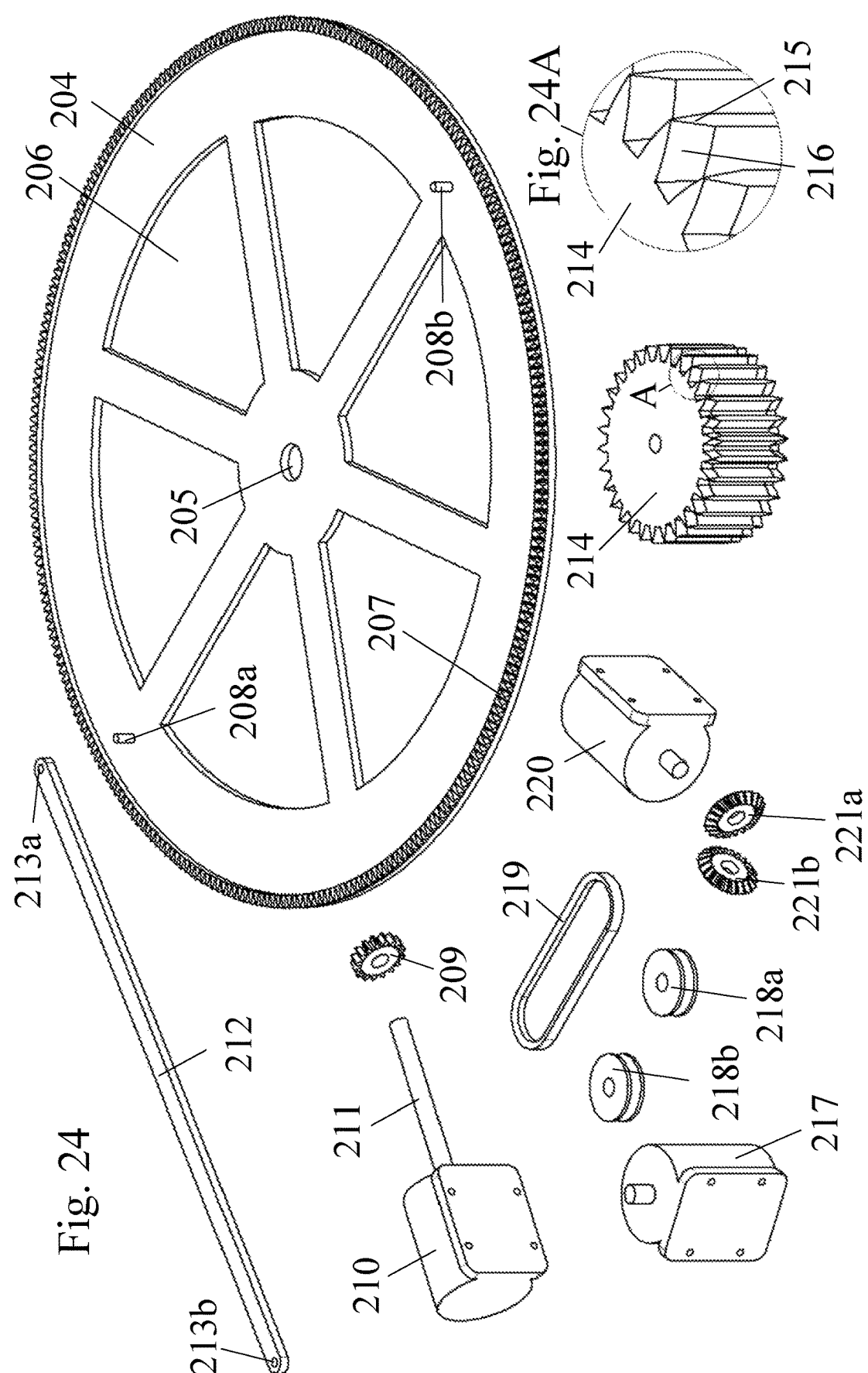
FIG. 24 is an isometric view of one embodiment of the parts used to drive other components in the autonomous mobile lift robot.
FIG. 24A is a detail view of the tapered teeth in the tapered teeth gear.

FIG. 24 shows one embodiment of parts used to drive other components of the present invention.

A control disk 204 is made out of a flat disk with a control disk central axis 205 and a set of six weight reduction cuts 206 equally spaced to reduce weight. The control disk 204 has a complete circle of control disk beveled teeth 207 around its perimeter and a pair of control disk attachment pins 208a, and 208b that are opposite to each other, symmetrical with respect to the control disk central axis 205.

A control disk actuator beveled gear 209 with matching teeth to the control disk beveled teeth 207 in the control disk 204, driven by an actuator beveled gear driving motor shaft 211 of an actuator beveled gear driving motor 210 is used to drive the control disk 204.

A gear position control bar 212 has a pair of gear position control bar attachment holes 213a, and 213b, one at each end of the gear position control bar 212. Two gear position control bars 212 oriented at opposite directions are attached to the control disk 204 by fitting one gear position control bar attachment hole 213a of each gear position control bar 212 to one of the control disk attachment pins 208a of the control disk 204. This arrangement converts the rotational movement of the control disk 204 into symmetrical linear movement of the two gear position control bars 212 attached.

FIG. 24 also shows a tapered teeth gear 214 that has tapered teeth at both faces (see detail FIG. 24A).

A horizontal gear driving motor 217 in conjunction with a pair of horizontal gear driving pulleys 218a, and 218b and a matching horizontal gear driving belt 219 is used to drive the tapered teeth gears 214 that are mounted horizontally.

A vertical gear driving motor 220 in conjunction with a pair of vertical gear driving bevels 221a, and 221b is used to drive the tapered teeth gears 214 that are mounted vertically.

Detail FIG. 24A shows the tapered teeth gear 214 edge at greater magnification. The tapered teeth gear 214 has a set of tapered teeth 215 at both faces to accommodate eventual variations in the surface in situations where the tapered teeth gear 214 slides at a direction parallel to its axis. The tapered teeth 215 have a matching tapered teeth edge face 216 at each side that makes the transition to the regular teeth thickness at the body of the tapered teeth gear 214.

Figure 25:
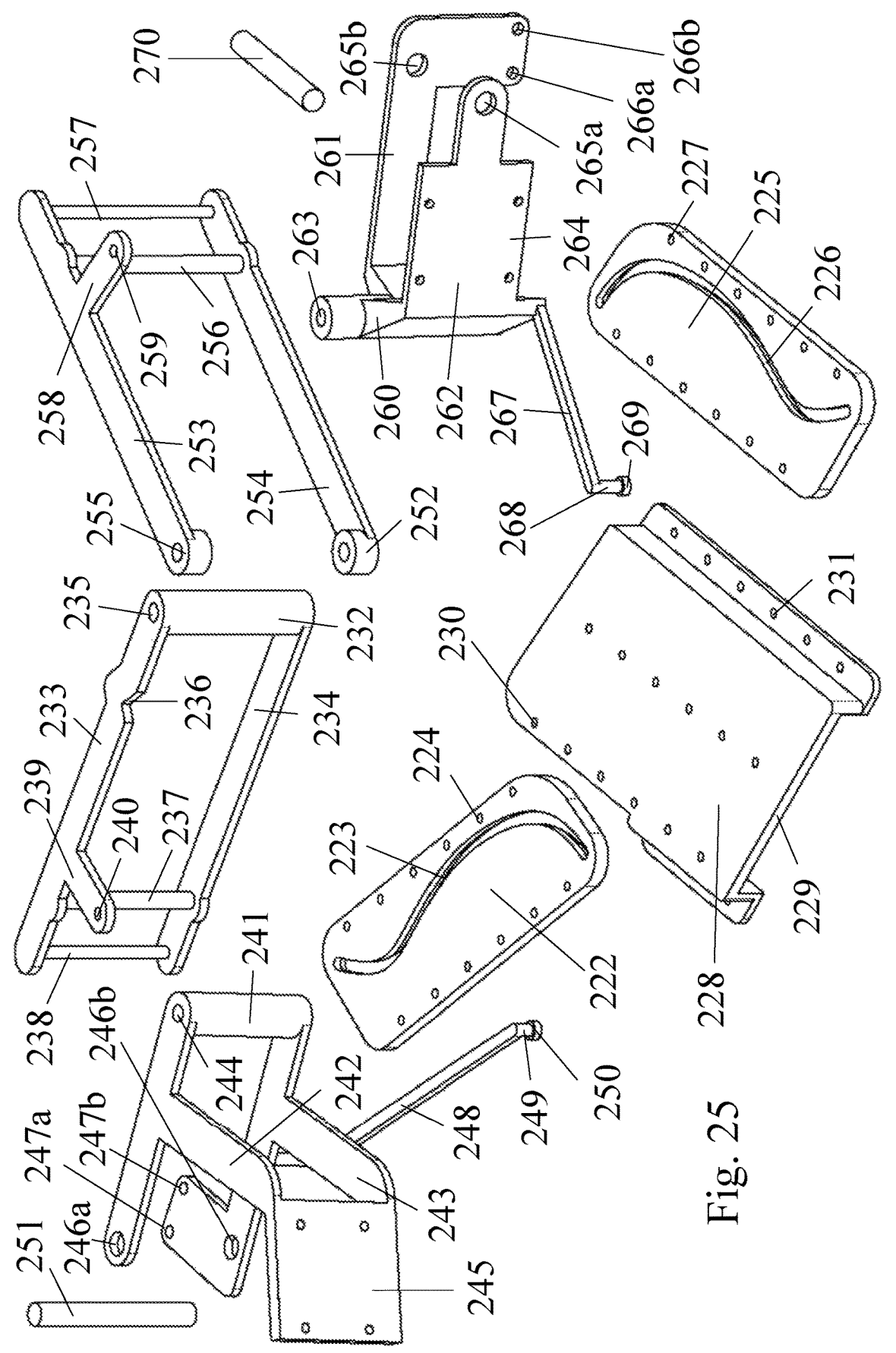
FIG. 25 is an isometric view of one embodiment of the parts used to support and position the tapered teeth gear of the autonomous mobile lift robot.

FIG. 25 is an isometric view of one embodiment of the parts used to support and position the tapered teeth gear 214 of the present invention.

A horizontal angle control guide 222 is composed of a plate of suitable size with a horizontal angle control guide track 223 at the center and a series of horizontal angle control guide fixation holes 224 to allow it to be fixated.

A vertical angle control guide 225 is composed of a plate of suitable size with a vertical angle control guide track 226 at the center and a series of vertical angle control guide fixation holes 227 to allow it to be fixated.

A vertical angle control support 228 is composed of a vertical angle control support raised platform 229 that contains a series of vertical angle control support angle control guide fixation holes 230 that match the vertical angle control guide fixation holes 227 to allow the fixation of the vertical angle control guide 225 at the raised position with a small offset to one side of the vertical angle control support 228.

The vertical angle control support 228 also has a series of vertical angle control support fixation holes 231 that allow the vertical angle control support 228 itself to be fixated to its intended place for installation.

The horizontal angle control guide 222 and the vertical angle control guide 225 are symmetrical to each other and installed at symmetrical positions. Because of the geometry, to respect the symmetry, the horizontal angle control guide 222 and the vertical angle control guide 225 need to be installed at different heights, the vertical angle control guide 225 on top of the vertical angle control support 228 while the horizontal angle control guide 222 is installed underneath the vertical angle control support raised platform 229 of the vertical angle control support 228 with part of the structure of the horizontal angle control guide 222 staying below the vertical angle control support 228 (see FIG. 33 and FIG. 35).

A horizontal pivoting support 232 is composed of a horizontal pivoting support top bar 233 with a horizontal pivoting support notch 236 and a horizontal pivoting support bottom bar 234 that are connected at one side by a horizontal pivoting support main axis 235 and at the other side by a horizontal pivoting support gear support axis 237 and a horizontal pivoting support action bar 238.

The horizontal pivoting support top bar 233 has a horizontal pivoting support top bar extension 239 with a horizontal pivoting support actuator reference hole 240.

The horizontal pivoting support 232 is driven at the horizontal pivoting support action bar 238 and rotates around the horizontal pivoting support main axis 235. As the horizontal pivoting support 232 rotates, the horizontal pivoting support gear support axis 237 and the horizontal pivoting support actuator reference hole 240 describe an arch carrying the components attached to them.

A horizontal gear support 241 is composed of a horizontal gear support top plate 242 and a horizontal gear support bottom plate 243 that are connected by a horizontal gear support axis 244 and a horizontal gear support motor support 245.

The horizontal gear support 241 has a pair of horizontal gear support gear shaft holes 246a, and 246b. The horizontal gear support gear shaft hole 246a is located in the horizontal gear support top plate 242 and the horizontal gear support gear shaft hole 246b is located in the horizontal gear support bottom plate 243.

The horizontal gear support bottom plate 243 also has a pair of horizontal gear support actuator insertion holes 247a, 247b and a horizontal gear support guide bar 248. The horizontal gear support guide bar 248 has a horizontal gear support guide pin 249 at the end and terminates in a horizontal gear support guide knob 250.

The horizontal gear support axis 244 is inserted into the horizontal pivoting support gear support axis 237 and allows the horizontal gear support 241 to vary its angle as it is driven by the horizontal pivoting support gear support axis 237.

This is accomplished using the horizontal gear support guide pin 249 that is inserted into the horizontal angle control guide track 223 in the horizontal angle control guide 222 and the horizontal gear support guide knob 250 that fits in the underside of the horizontal angle control guide 222 preventing the horizontal gear support guide pin 249 from escaping the horizontal angle control guide track 223.

Figure 35:
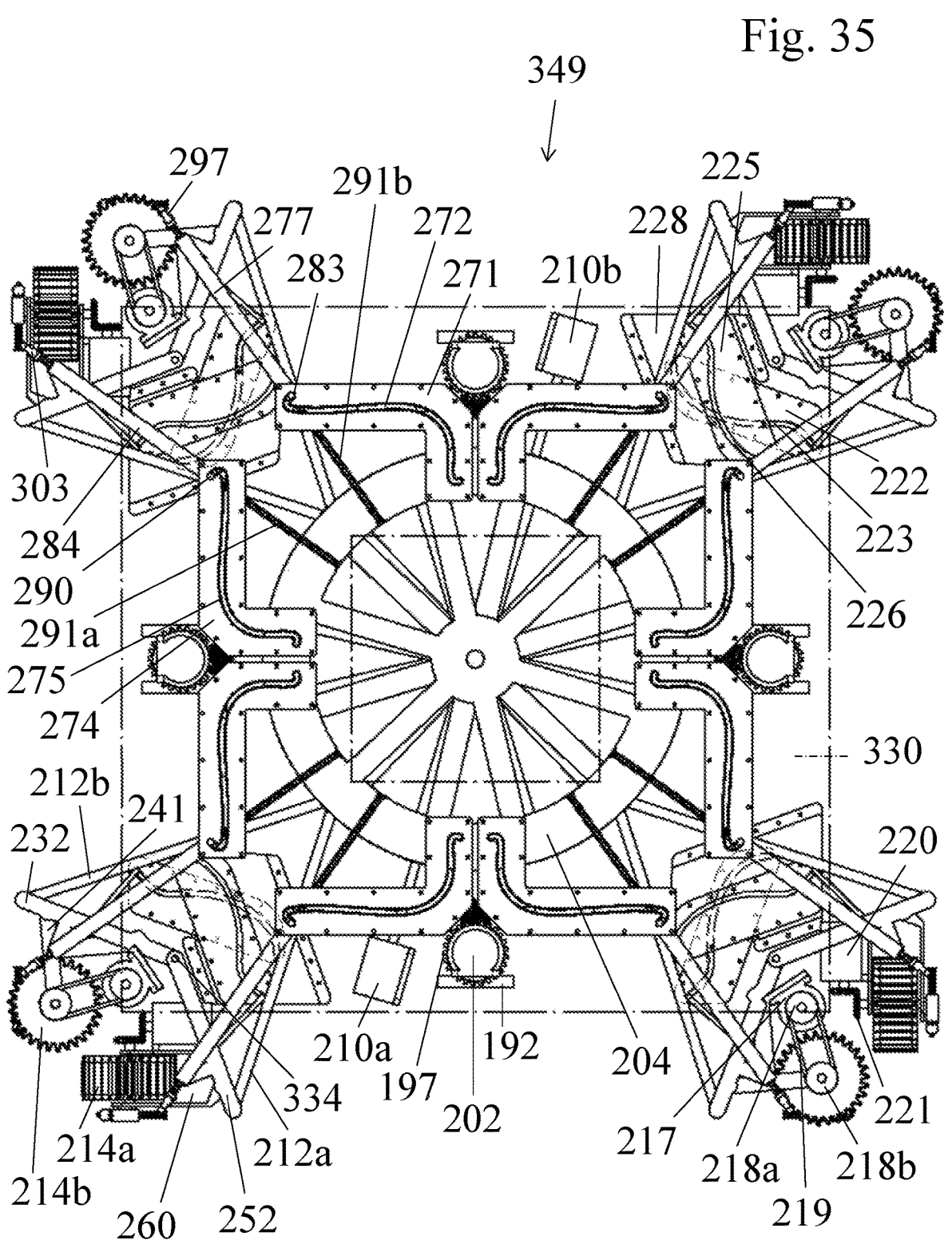
FIG. 35 is a top view of one embodiment of the autonomous mobile lift robot of the present invention with each of the first and second perpendicularly mounted tapered teeth gears in the extended position.

As the horizontal pivoting support 232 rotates around the horizontal pivoting support main axis 235, the horizontal pivoting support gear support axis 237 carries the horizontal gear support 241 and the horizontal gear support guide pin 249 slides in the horizontal angle control guide track 223 forcing the horizontal gear support 241 to rotate more or less around the horizontal pivoting support gear support axis 237 providing angle adjustment for the horizontal gear support 241 (see FIG. 35).

A horizontal gear shaft 251 with the correct size is inserted into the horizontal gear support gear shaft holes 246a, and 246b.

The horizontal pivoting support notch 236 is needed as due to standardization of components, the horizontal gear driving motor 217 may be longer than the available space between the horizontal pivoting support top bar 233 and the horizontal pivoting support bottom bar 234. The horizontal pivoting support notch 236 allows some extra space in the extended and in the retracted positions, when the horizontal gear support 241 installed at the horizontal pivoting support gear support axis 237 is fully to the right and the horizontal gear driving motor 217 that is installed at the horizontal gear support motor support 245 would otherwise hit the horizontal pivoting support top bar 233 (see FIG. 24, FIG. 35, and FIG. 36).

A vertical pivoting support 252 is composed of a vertical pivoting support top bar 253 and a vertical pivoting support bottom bar 254 with a vertical pivoting support main axis 255 on one side and a vertical pivoting support gear support axis 256 and a vertical pivoting support action bar 257 at the other side.

The vertical pivoting support top bar 253 and the vertical pivoting support bottom bar 254 of the vertical pivoting support 252 are connected by the vertical pivoting support gear support axis 256 and the vertical pivoting support action bar 257.

The vertical pivoting support main axis 255 has the correct size to allow it to be installed in the same axis as the horizontal pivoting support main axis 235, the vertical pivoting support main axis 255 perfectly fitting the extremities of the horizontal pivoting support main axis 235.

The vertical pivoting support top bar 253 has a vertical pivoting support top bar extension 258 with a vertical pivoting support actuator reference hole 259.

The vertical pivoting support 252 is driven at the vertical pivoting support action bar 257 and rotates around the vertical pivoting support main axis 255. As vertical pivoting support 252 rotates, the vertical pivoting support gear support axis 256 and the vertical pivoting support actuator reference hole 259 describe an arch carrying the components attached to them.

A vertical gear support 260 is composed of a vertical gear support left plate 261 and a vertical gear support right plate 262 that are connected by a vertical gear support axis 263. The vertical gear support right plate 262 has a vertical gear support motor support 264 and a vertical gear support gear shaft hole 265a. The vertical gear support left plate 261 has one vertical gear support gear shaft hole 265b and a pair of vertical gear support actuator insertion holes 266a, and 266b.

The vertical gear support 260 also has a vertical gear support guide bar 267 attached to the vertical gear support 260 near the vertical gear support right plate 262. The vertical gear support guide bar 267 has a vertical gear support guide pin 268 at the end and terminates in a vertical gear support guide knob 269.

The vertical gear support axis 263 is inserted into the vertical pivoting support gear support axis 256 and allows the vertical gear support 260 to vary its angle as it is driven by the vertical pivoting support gear support axis 256.

This is accomplished using the vertical gear support guide pin 268 that is inserted into the vertical angle control guide track 226 in the vertical angle control guide 225 and the vertical gear support guide knob 269 that fits in the underside of the vertical angle control guide 225 preventing the vertical gear support guide pin 268 from escaping the vertical angle control guide track 226.

As the vertical pivoting support 252 rotates around the vertical pivoting support main axis 255, the vertical pivoting support gear support axis 256 carries the vertical gear support 260 and the vertical gear support guide pin 268 slides in the vertical angle control guide track 226 forcing the vertical gear support 260 to rotate more or less around the vertical pivoting support gear support axis 256 providing angle adjustment for the vertical gear support 260 (see FIG. 35).

A vertical gear shaft 270 with the correct size is inserted into the vertical gear support gear shaft hole 265a, and 265b.

Figures 26, 26A:
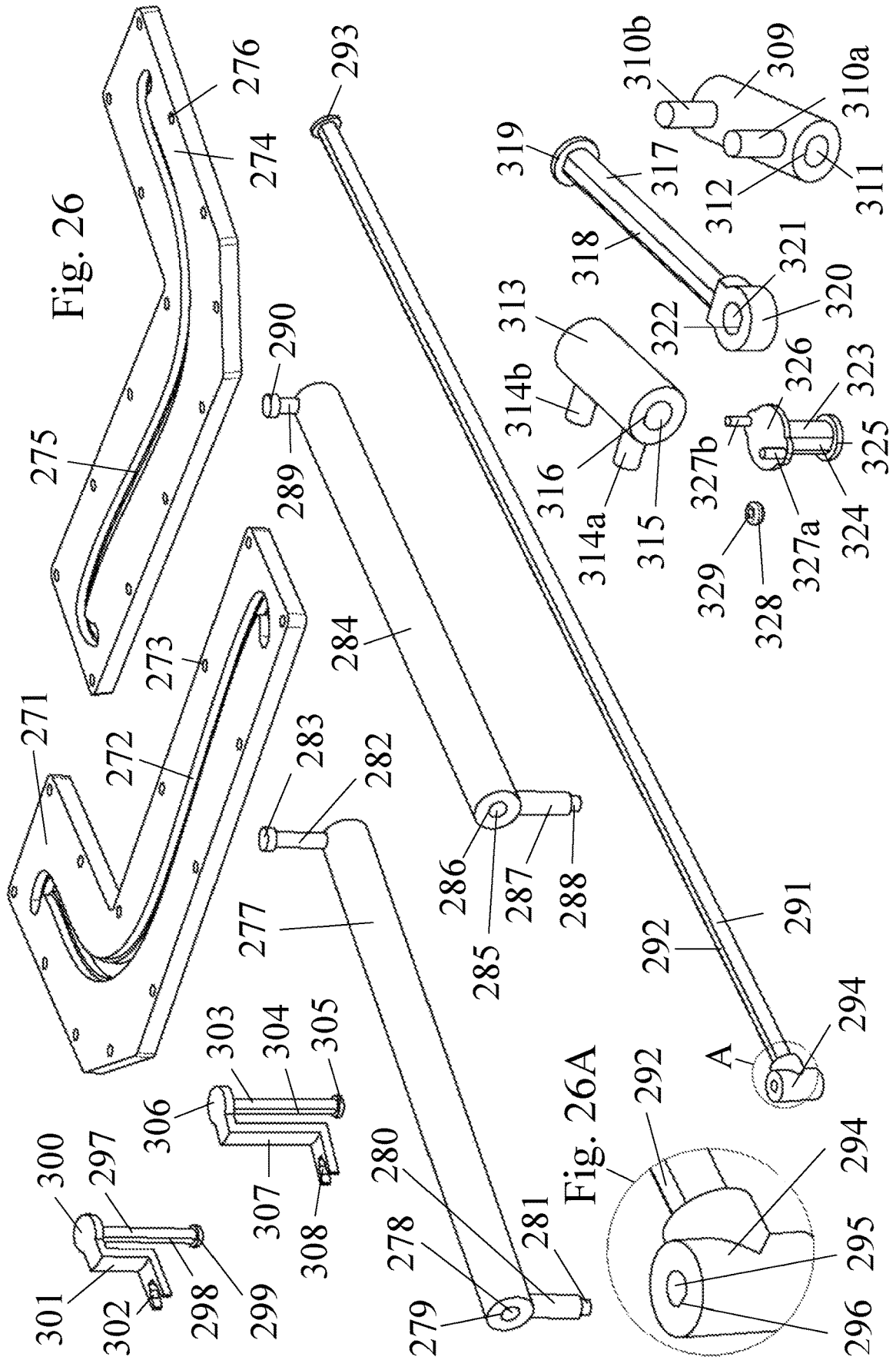
FIG. 26 is an isometric view of one embodiment of the parts used to manipulate parts outside the autonomous mobile lift robot.
FIG. 26A is a detail view of an actuator hand.

FIG. 26 shows components used for manipulating moving parts in the advanced warehouse of the present invention.

A horizontal actuator angle control guide 271 is made of a flat plate with a horizontal actuator angle control track 272 in the center and a set of horizontal actuator angle control guide fixation holes 273 for fixation.

A vertical actuator angle control guide 274 is made of a flat plate with a vertical actuator angle control track 275 in the center and a set of vertical actuator angle control guide fixation holes 276 for fixation. The horizontal actuator angle control guide 271 and the vertical actuator angle control guide 274 are constructed as mirror images of each other.

A horizontal arm actuator 277 is made of a cylinder with a horizontal arm actuator center hole 278 that has a horizontal arm actuator center hole key 279 on top. The horizontal arm actuator 277 has a horizontal arm actuator fixation bar 280 with a horizontal arm actuator fixation pin 281 projecting downwards in one end and a horizontal arm actuator sliding bar 282 with a horizontal arm actuator sliding knob 283 projecting upwards in the other end.

The horizontal arm actuator sliding bar 282 is inserted into the horizontal actuator angle control track 272 of the horizontal actuator angle control guide 271 that is fixated above the horizontal arm actuator 277 and the horizontal arm actuator sliding knob 283 keeps the horizontal arm actuator sliding bar 282 from falling from the horizontal actuator angle control track 272. The horizontal arm actuator fixation pin 281 is fixated to the horizontal pivoting support actuator reference hole 240 of the horizontal pivoting support 232.

As the horizontal pivoting support 232 rotates around the horizontal pivoting support main axis 235, the horizontal pivoting support actuator reference hole 240 rotates and carries the horizontal arm actuator 277 forcing the horizontal arm actuator sliding bar 282 to slide inside the horizontal actuator angle control track 272 that in turn produces the desired orientation angle for the horizontal arm actuator 277 throughout the excursion of the horizontal pivoting support 232.

A vertical arm actuator 284 is made of a cylinder with a vertical arm actuator center hole 285 that has a vertical arm actuator center hole key 286 on top. The vertical arm actuator 284 has a vertical arm actuator fixation bar 287 with a vertical arm actuator fixation pin 288 projecting downwards in one end and a vertical arm actuator sliding bar 289 with a vertical arm actuator sliding knob 290 projecting upwards in the other end.

The vertical arm actuator sliding bar 289 is inserted into the vertical actuator angle control track 275 of the vertical actuator angle control guide 274 that is fixated above the vertical arm actuator 284 and the vertical arm actuator sliding knob 290 keeps the vertical arm actuator sliding bar 289 from falling from the vertical actuator angle control track 275. The vertical arm actuator fixation pin 288 is fixated to the vertical pivoting support actuator reference hole 259 of the vertical pivoting support 252.

As the vertical pivoting support 252 rotates around the vertical pivoting support main axis 255, the vertical pivoting support actuator reference hole 259 rotates and carries the vertical arm actuator 284 forcing the vertical arm actuator sliding bar 289 to slide inside the vertical actuator angle control track 275 that in turn produces the desired orientation angle for the vertical arm actuator 284 throughout the excursion of the vertical pivoting support 252.

An actuator arm 291 composed of a metal rod with an actuator arm key 292 that is a narrow flat plane in the full extension of the top of the metal rod terminates at an actuator arm stopper 293 at one side and an actuator hand 294 on the other side.

The actuator arm 291 has the same diameter of the horizontal arm actuator center hole 278 and the vertical arm actuator center hole 285 and the actuator arm key 292 matches the horizontal arm actuator center hole key 279 and the vertical arm actuator center hole key 286 so that only one version of the actuator arm 291 is needed and can be installed at both the horizontal arm actuator 277 and the vertical arm actuator 284.

The horizontal arm actuator sliding bar 282 is longer than the vertical arm actuator sliding bar 289 to offset the position of the horizontal arm actuator 277 and the vertical arm actuator 284 to prevent the actuator arms 291 installed at the horizontal arm actuator center hole 278 and the vertical arm actuator center hole 285 from hitting each other allowing horizontal arm actuators 277 and vertical arm actuators 284 to be installed in proximity and move without interfering with each other.

A horizontal actuator hand 297 composed of a metal rod with a horizontal actuator hand key 298 that is a narrow flat plane in the full extension of the front of the metal rod terminates at a horizontal actuator stopper 299 at the bottom and a horizontal actuator hand top 300 on the top.

The horizontal actuator hand 297 has a horizontal actuator hand finger 301 connected to the horizontal actuator hand top 300 that terminates in a horizontal actuator hand grabbing tip 302 that is a partially flexible metal fork that is able to snap into a metal rod of appropriate matching diameter and hold it with a relatively small force but sufficient to move the rod safely if there is no opposition to the movement and releases the rod when some opposition is present.

A vertical actuator hand 303 composed of a metal rod with a vertical actuator hand key 304 that is a narrow flat plane in the full extension of the front of the metal rod terminates at a vertical actuator stopper 305 at the bottom and a vertical actuator hand top 306 on the top.

The vertical actuator hand 303 has a vertical actuator hand finger 307 connected to the vertical actuator hand top 306 that terminates in a vertical actuator hand grabbing tip 308 that is a partially flexible metal fork that is able to snap into a metal rod of appropriate matching diameter and hold it with a relatively small force but sufficient to move the rod safely if there is no opposition to the movement and releases the rod when some opposition is present.

A horizontal hinged rack actuator 309 is made of a cylinder with a pair of horizontal hinged rack actuator attachment bars 310a, and 310ba at the top for fixation. The horizontal hinged rack actuator 309 has a horizontal hinged rack actuator center hole 311 with a horizontal hinged rack actuator center hole key 312 on top.

A vertical hinged rack actuator 313 is made of a cylinder with a pair of vertical hinged rack actuator attachment bars 314a, and 314b at the left for fixation. The vertical hinged rack actuator 313 has a vertical hinged rack actuator center hole 315 with a vertical hinged rack actuator center hole key 316 on top.

A hinged rack arm 317 composed of a metal rod with a hinged rack arm key 318 that is a narrow flat plane in the full extension of the top of the metal rod terminates at a hinged rack arm stopper 319 at one side and a hinged rack arm hand actuator 320 on the other side.

The hinged rack arm 317 has the same diameter of the horizontal hinged rack actuator center hole 311 and the vertical hinged rack actuator center hole 315 and the hinged rack arm key 318 matches the horizontal hinged rack actuator center hole key 312 and the vertical hinged rack actuator center hole key 316 so that only one version of the hinged rack arm 317 is needed and can be installed at both the horizontal hinged rack actuator 309 and the vertical hinged rack actuator 313.

A hinged rack hand 323 composed of a metal rod with a hinged rack hand key 324 that is a narrow flat plane in the full extension of the front of the metal rod terminates at a hinged rack hand stopper 325 at the bottom and a hinged rack hand base 326 on the top.

The hinged rack hand 323 has a pair of hinged rack hand fingers 327a, and 327b connected to the hinged rack hand base 326. A hinged rack hand roller 328 is installed on each hinged rack hand finger 327a, 327b by means of inserting a hinged rack hand roller center hole 329 in the center of the hinged rack hand roller 328 into the corresponding hinged rack hand finger 327a, 327b allowing the hinged rack hand rollers 328 to rotate freely around the hinged rack hand fingers 327a, 327b.

Detail FIG. 26A shows the actuator hand 294 in greater magnification to better display its features. The actuator hand 294 is composed of a cylinder with an actuator hand center hole 295 in the center with an actuator hand center hole key 296 in the front. The actuator arm key 292 that is a flat plane on top of the actuator arm 291 is also visible.

Figures 27, 28, 29, 30:
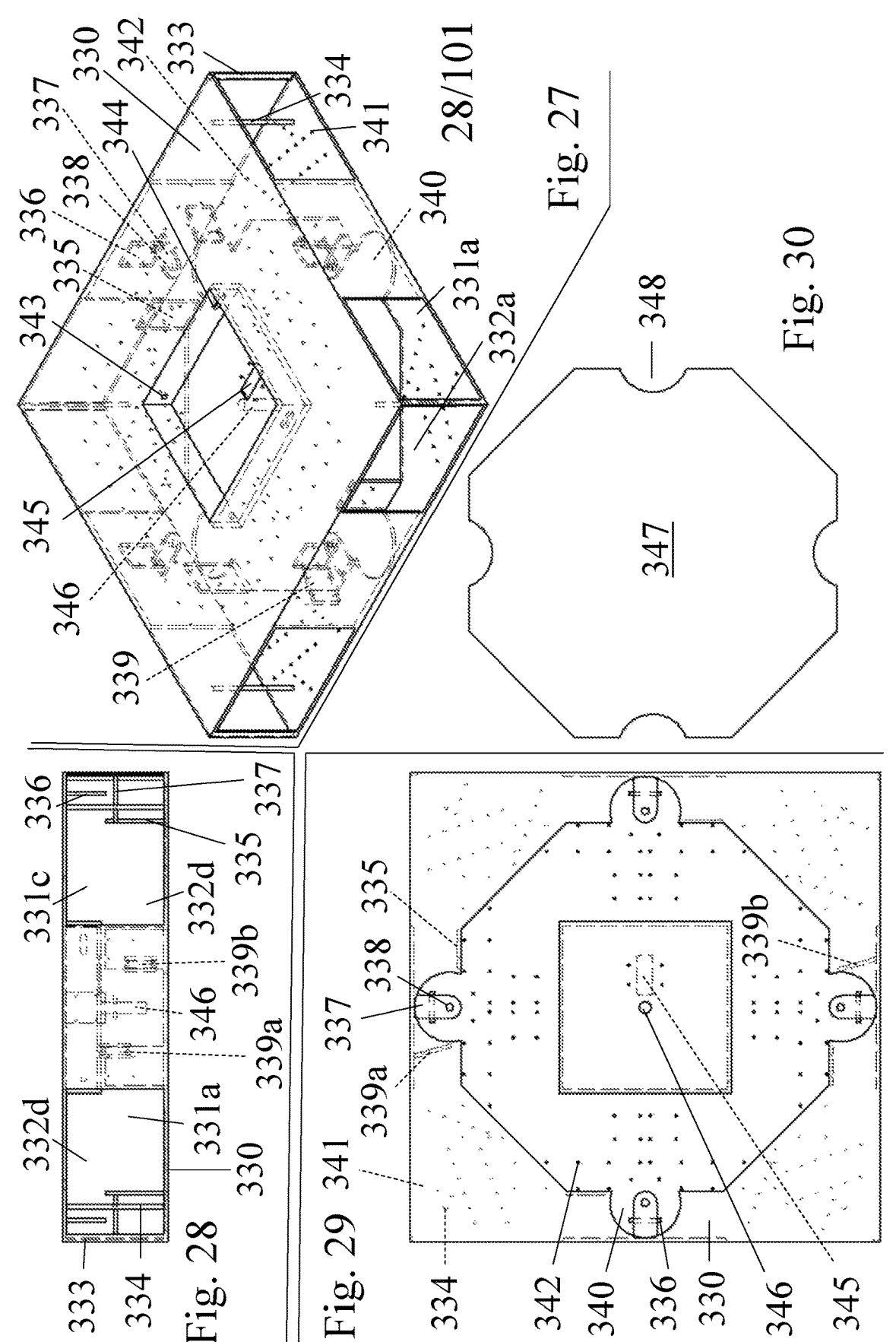
FIG. 27 is an isometric view of the embodiment of an autonomous mobile lift robot case.
FIG. 28 is a front view of one embodiment of an autonomous mobile lift robot case.
FIG. 29 is a bottom view of the embodiment of an autonomous mobile lift robot case.
FIG. 30 is a top view of the embodiment of a bottom lid.

FIG. 27 shows an isometric view of one embodiment of an autonomous mobile lift robot case 330 of the present invention that provides the support for the installation of the components described in FIG. 22 through FIG. 26. The autonomous mobile lift robot case 330 has an opening A 331a and an opening B 332b at each corner making a total of 8 corner openings. A separation bar 333 is located at each corner to provide additional structural integrity and prevent the warping of the autonomous mobile lift robot case 330 around any opening A 331a or opening B 332b.

A pivoting axis 334 is located at a short distance from each separation bar 333. In total, there are four pivoting axis 334 located at points in the diagonals of the autonomous mobile lift robot case 330 at the same distance from each corner. One pair of one horizontal pivoting support 232 and one vertical pivoting support 252 is installed with their respective horizontal pivoting support main axis 235 and vertical pivoting support main axis 255 around each pivoting axis 334.

The autonomous mobile lift robot case 330 has four sets of three different supports one set at each side of the autonomous mobile lift robot case 330 that are designed to support components of the wheel assembly 191. A directional motor support 335 is designed to support the wheel directional motor 200; a wheel motor support 336 is designed to support the wheel driving motor 202; and a wheel assembly support 337 with a wheel driving axis passage hole 338 is designed to support the wheel directional gear 197 and allow the wheel driving axle 203 to pass through.

The autonomous mobile lift robot case 330 also has a pair of extension motor supports 339, one in the front and the other at the back of the autonomous mobile lift robot case 330 designed to support two actuator beveled gear driving motors 210.

On the bottom of the autonomous mobile lift robot case 330 a set of four wheel openings 340 provide access for the wheels 192 to reach the floor and rotate freely and a set of bottom fixation holes 341 provide the place for the installation of four sets of one horizontal angle control guide 222 and one vertical angle control support 228.

On the top of the autonomous mobile lift robot case 330 a set of top fixation holes 342 provide the place for the installation of four sets of one horizontal actuator angle control guide 271 and one vertical actuator angle control guide 274.

The autonomous mobile lift robot case 330 also has a pair of pantographic fixed axis holes 343 for the installation of the bottom fixed axis 186, a pair of pantographic moving axis slots 344 for the installation of the bottom moving axis 187, and a pantographic motor niche 345 for the installation of the pantographic motor 189.

A case central axis 346 provides the place for the installation of four control disks 204.

FIG. 28 shows a front view of one embodiment of the autonomous mobile lift robot case 330 of the present invention to provide another angle for the visualization of its features.

The opening A 331a from the first corner and the opening B 332b from the fourth corner and the opening B 332b from the second corner and opening A 331c from the third corner at the corresponding other sides of the autonomous mobile lift robot case 330 provide a clear view through the autonomous mobile lift robot case 330.

The separation bar 333 is located at each corner to provide additional structural integrity and prevent the warping of the autonomous mobile lift robot case 330 around the openings A and B.

The pivoting axis 334 is located at a short distance from the separation bar 333 at points in the diagonals of the autonomous mobile lift robot case 330 at the same distance from each corner. One pair of one horizontal pivoting support 232 and one vertical pivoting support 252 is installed with their respective horizontal pivoting support main axis 235 and vertical pivoting support main axis 255 around each pivoting axis 334.

The autonomous mobile lift robot case 330 has four sets of three different supports one set at each side of the autonomous mobile lift robot case 330 that are designed to support components of the wheel assembly 191. The directional motor support 335 is designed to support the wheel directional motor 200; the wheel motor support 336 is designed to support the wheel driving motor 202; and the wheel assembly support 337 is designed to support the wheel directional gear 197.

The case central axis 346 provides the place for the installation of four control disks 204. To drive the control disks 204, the autonomous mobile lift robot case 330 has two extension motor supports 339a, and 339b designed to support two actuator beveled gear driving motors 210. The extension motor supports 339a are located in the front of the autonomous mobile lift robot case 330 at a slightly higher level to drive the first two control disks 204, and the extension motor support 339b is located at the back of the autonomous mobile lift robot case 330 at a slightly lower level to drive the last two control disks 204.

FIG. 29 shows a bottom view of one embodiment of the autonomous mobile lift robot case 330 of the present invention to provide yet another angle for the visualization of its features.

The autonomous mobile lift robot case 330 has four sets of three different supports one set at each side of the autonomous mobile lift robot case 330 that are designed to support components of the wheel assembly 191. The directional motor support 335 is designed to support the wheel directional motor 200; the wheel motor support 336 is designed to support the wheel driving motor 202; and the wheel assembly support 337 with the wheel driving axis passage hole 338 is designed to support the wheel directional gear 197 and allow the wheel driving axle 203 to pass through.

The pivoting axis 334 is located at points in the diagonals of the autonomous mobile lift robot case 330 at a short distance from each corner. One pair of one horizontal pivoting support 232 and one vertical pivoting support 252 is installed with their respective horizontal pivoting support main axis 235 and vertical pivoting support main axis 255 around each pivoting axis 334.

On the bottom of the autonomous mobile lift robot case 330 the wheel openings 340 provide access for the wheels 192 to reach the floor and rotate freely and the bottom fixation holes 341 provide the place for the installation of four sets of one horizontal angle control guide 222 and one vertical angle control support 228.

On the top of the autonomous mobile lift robot case 330 the top fixation holes 342 provide the place for the installation of four sets of one horizontal actuator angle control guide 271 and one vertical actuator angle control guide 274.

The case central axis 346 provides the place for the installation of four control disks 204. To drive the control disks 204, the autonomous mobile lift robot case 330 has two extension motor supports 339a, and 339b designed to support two actuator beveled gear driving motors 210. The extension motor supports 339a is located in the front of the autonomous mobile lift robot case 330 at a slightly higher level to drive the first two control disks 204, and the extension motor support 339b is located at the back of the autonomous mobile lift robot case 330 at a slightly lower level to drive the last two control disks 204.

The pantographic motor niche 345 is the place for the installation of the pantographic motor 189.

FIG. 30 shows a bottom lid 347 with a set of four bottom lid wheel openings 348 that complete the wheel openings 340 once the bottom lid 347 is installed closing the bottom of the autonomous mobile lift robot case 330.

Figure 31:
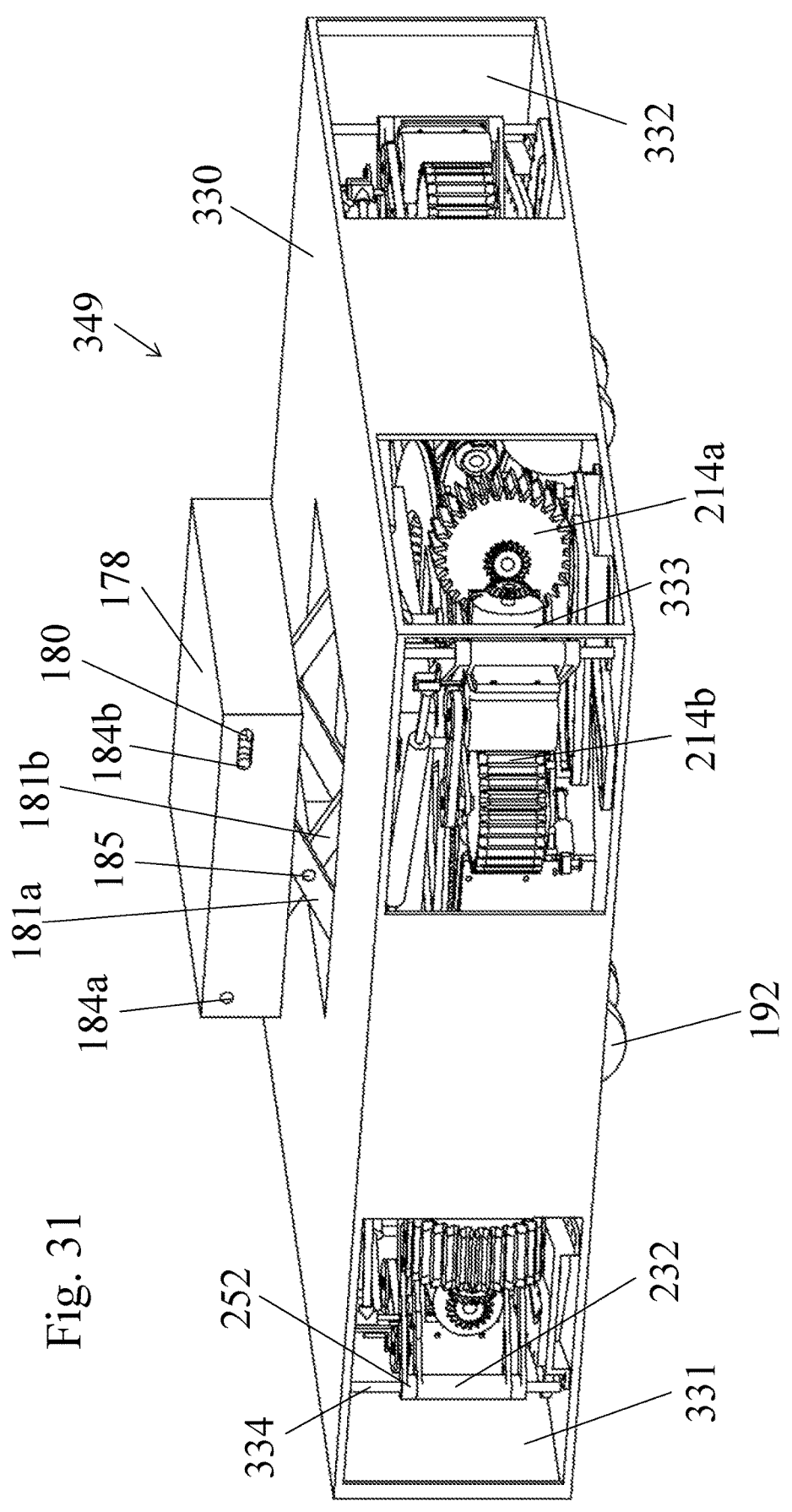
FIG. 31 is an isometric view of one embodiment of the autonomous mobile lift robot of the present invention having a first tapered teeth gear mounted perpendicularly to a second tapered teeth gear in each corner.

FIG. 31 shows an isometric view of one embodiment of an autonomous mobile lift robot 349 of the present invention. The pantographic lift platform 178 is shown in the extended position revealing the pantographic bars 181a, 181b that are installed linked at the middle by the center axis 185 forming a "X" at each side of the pantographic lift platform 178 and the two top axis 184a, and 184b. The top axis 184*a* is installed in the platform fixed axis hole 179 and the top axis 184*b* in the platform moving axis slot 180.

The separation bar 333 is located at each corner to provide additional structural integrity and prevent the warping of the autonomous mobile lift robot case 330 around any opening A 331 or opening B 332.

The pivoting axis 334 is located at points in the diagonals of the autonomous mobile lift robot case 330 at a short distance from each corner. One pair of one horizontal pivoting support 232 and one vertical pivoting support 252 is installed around each pivoting axis 334.

The tapered teeth gear 214*a* mounted in the vertical position perpendicularly to the tapered teeth gear 214*b* mounted in the horizontal position and the wheels 192 are also visible.

FIG. 32 shows an isometric view of the autonomous mobile lift robot case 330 to display its features and additional details on the installation of the pantographic lift. For better visualization, the pantographic lift platform 178 is drawn transparent in dash dotted lines.

The autonomous mobile lift robot case 330 has four sets of three different supports one set at each side of the autonomous mobile lift robot case 330 that are designed to support the wheel assembly 191. The directional motor support 335 is designed to support the wheel directional motor 200; the wheel motor support 336 is designed to support the wheel driving motor 202; and the wheel assembly support 337 with the wheel driving axis passage hole 338 is designed to support the wheel directional gear 197 and allow the wheel driving axle 203 to pass through.

The autonomous mobile lift robot case 330 has one opening A 331 and one opening B 332 at each corner making a total of eight corner openings. One separation bar 333 is located at each corner to provide additional structural integrity and prevent the warping of the autonomous mobile lift robot case 330 around any opening A 331 or opening B 332.

The pivoting axis 334 is located at points in the diagonals of the autonomous mobile lift robot case 330 at a short distance from each corner. One pair of one horizontal pivoting support 232 and one vertical pivoting support 252 is installed with their respective horizontal pivoting support main axis 235 and vertical pivoting support main axis 255 around each pivoting axis 334.

On the bottom of the autonomous mobile lift robot case 330 the wheel openings 340 provide access for the wheels 192 to reach the floor and rotate freely and the bottom fixation holes 341 provide the place for the installation of four sets of one horizontal angle control guide 222 and one vertical angle control support 228.

On the top of the autonomous mobile lift robot case 330 the top fixation holes 342 provide the place for the installation of four sets of one horizontal actuator angle control guide 271 and one vertical actuator angle control guide 274.

The extension motor supports 339*a* is located in the front of the autonomous mobile lift robot case 330 at a slightly higher level and the extension motor support 339*b* is located at the back of the autonomous mobile lift robot case 330 at a slightly lower level.

The autonomous mobile lift robot case 330 has two pantographic fixed axis holes 343 for the installation of the bottom fixed axis 186 and two pantographic moving axis slots 344 for the installation of the bottom moving axis 187.

The pantographic lift platform 178 has one platform fixed axis hole 179 located near the top face, parallel to the top face that goes all the way through from one side to the other side of the pantographic lift platform 178. The pantographic lift platform 178 also has one platform moving axis slot 180 that is parallel to the top face and is located at the same distance of the top face of the pantographic lift platform 178 as the platform fixed axis hole 179 and goes all the way through from one side to the other side of the pantographic lift platform 178.

Two pantographic bars 181 are installed linked at the middle by the center axis 185 forming a "X" at each side of the pantographic lift platform 178. One top axis 184*a* is installed at the platform fixed axis hole 179 that remains fixed and another top axis 184*b* is installed at the platform moving axis slot 180 and is able to slide the length of the platform moving axis slot 180.

The pantographic motor 189 engages the bottom moving axis nut 188 and moves the bottom moving axis 187 closer or further away from the pantographic motor 189 causing the pantographic lift platform 178 to rise or drop accordingly.

Figure 33:
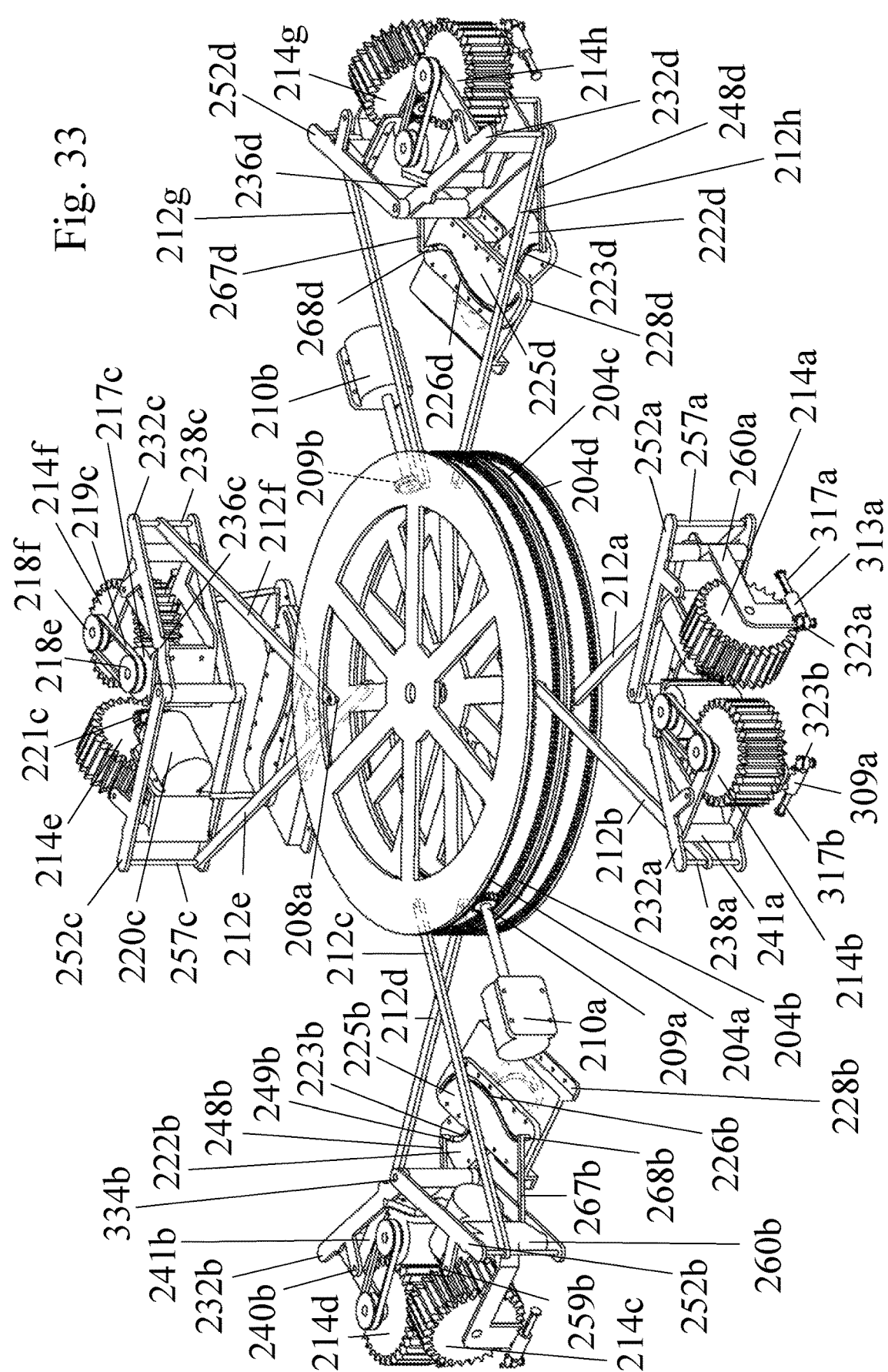
FIG. 33 is an isometric view of one embodiment of the tapered teeth gear support and positioning mechanism for each first tapered teeth gear mounted perpendicularly to each second tapered teeth gear in the autonomous mobile lift robot of the present invention.

FIG. 33 is an isometric view of one embodiment of the tapered teeth gear support and positioning mechanism for each first and second perpendicularly mounted tapered teeth gears installed in each corner of the autonomous mobile lift robot 349 of the present invention.

Four control disks 204*a*, 204*b*, 204*c*, and 204*d* arranged in two groups of two control disks 204*a*, and 204*b* and control disks 204*c*, and 204*d* mounted back to back are installed around the case central axis 346. The control disks 204*a*, and 204*b* are driven by the control disk actuator beveled gear 209*a* and the actuator beveled gear driving motor 210*a* and the control disks 204*c*, and 204*d* are driven by the control disk actuator beveled gear 209*b* and the actuator beveled gear driving motor 210*b*.

The gear position control bars 212*b*, and 212*f* are mounted at opposite control disk attachment pins 208*a* of the control disk 204*b*; and the gear position control bars 212*c*, and 212*g* are mounted at opposite control disk attachment pins 208 of the control disk 204*a*. Similarly, the gear position control bars 212*a*, and 212*e* are mounted at opposite control disk attachment pins 208 of the control disk 204*d*; and the gear position control bars 212*d*, and 212*h* are mounted at opposite control disk attachment pins 208 of the control disk 204*c*.

Because the control disks 204*a*, and 204*b* are mounted back to back, as the control disk actuator beveled gear 209*a* rotates clockwise, the control disk 204*a* is turned clockwise and the control disk 204*b* is turned counter clockwise and vice versa. The same applies to the control disks 204*c*, and 204*d* and the control disk actuator beveled gear 209*b*.

As a result, the gear position control bars 212*b*, and 212*f* and the gear position control bars 212*d*, and 212*h* extend or retract simultaneously, depending on the direction the control disk actuator beveled gear 209*a* rotates, extending if the control disk actuator beveled gear 209*a* rotates clockwise and retracting if the control disk actuator beveled gear 209*a* rotates counter clockwise. Similarly, the gear position control bars 212*a*, and 212*e* and the gear position control bars 212*c*, and 212*g* extend or retract simultaneously, depending on the direction the control disk actuator beveled gear 209*b* rotates, extending if the control disk actuator beveled gear 209*b* rotates clockwise and retracting if the control disk actuator beveled gear 209*b* rotates counter clockwise.

The gear position control bars 212*b*, and 212*f* transmit the movement to the horizontal pivoting supports 232*a*, and 232*c* respectively that result in movement of the tapered teeth gears 214*b*, and 214*f* that are in the same face of the autonomous mobile lift robot case 330. Similarly, the gear position control bars 212*d*, and 212*h* transmit the movement to the vertical pivoting supports 252b, and 252d respectively that in turn result in movement of the tapered teeth gears 214d, and 214h that are on the same face, opposite to the face where the tapered teeth gears 214b, and 214f are located.

Likewise, the gear position control bars 212a, and 212e transmit the movement to the vertical pivoting supports 252a, and 252c respectively that result in movement of the tapered teeth gears 214a, and 214e that are in the same face of the autonomous mobile lift robot case 330. Similarly, the gear position control bars 212c, and 212g transmit the movement to the horizontal pivoting supports 232b, and 232d respectively that result in movement of the tapered teeth gears 214c, and 214g that are on the same face, opposite to the face where the tapered teeth gears 214a, and 214e are located.

This mechanism allows for the positioning of all tapered teeth gears 214 in one pair of two opposite corners simultaneously with one actuator beveled gear driving motor 210a, and all tapered teeth gears 214 in the other pair of two opposite corners with the other actuator beveled gear driving motor 210b.

The exact positioning of a particular tapered teeth gear 214 is also affected by the angle control mechanism. The process is the same for all four pairs of the first and second perpendicularly mounted gears so it will be explained only once for concision, mostly for the pair of tapered teeth gears 214c, and 214d, exceptions made if other gear pairs offer a better angle for visualization. As the components are the same in all four sets of gears pairs, it is possible to identify the correspondent components in other gear pairs.

The gear position control bar 212a drives the vertical pivoting support 252a at the vertical pivoting support action bar 257a and the vertical pivoting support 252a carries the vertical gear support 260a that holds the tapered teeth gears 214a.

Likewise, the gear position control bar 212b drives the horizontal pivoting support 232a at the horizontal pivoting support action bar 238a and the horizontal pivoting support 232a carries the horizontal gear support 241a that holds the tapered teeth gears 214b.

As the control disk 204a moves the gear position control bar 212c, the movement is transferred to the vertical pivoting support 252b that rotates around the pivoting axis 334b and carries the vertical gear support 260b. As the vertical gear support 260b moves, the movement is transferred to the vertical gear support guide bar 267b and the vertical gear support guide pin 268b is forced to follow the geometry of the vertical angle control guide track 226b of the vertical angle control guide 225b installed on top of the vertical angle control support 228b. As the vertical gear support guide pin 268b slides in the vertical angle control guide track 226b, the vertical gear support 260b is forced to rotate accordingly to accommodate the geometry providing angle adjustment for the tapered teeth gear 214c to have the tapered teeth 215 adjust and align within the frustum shaped teeth 122 providing the traction necessary to move the autonomous mobile lift robot case 330 along the frustum shaped teeth 122 of the rack lattice structure in a vertical direction.

Likewise, as the control disk 204c moves the gear position control bar 212d, the movement is transferred to the horizontal pivoting support 232b that rotates around the pivoting axis 334b and carries the horizontal gear support 241b. As the horizontal gear support 241b moves, the movement is transferred to the horizontal gear support guide bar 248b and the horizontal gear support guide pin 249b is forced to follow the geometry of the horizontal angle control guide track 223b of the horizontal angle control guide 222b. As the horizontal gear support guide pin 249b slides in the horizontal angle control guide track 223b, the horizontal gear support 241b is forced to rotate accordingly to accommodate the geometry providing angle adjustment for the tapered teeth gear 214d to have the tapered teeth 215 adjust and align within the frustum shaped teeth 122 providing the traction necessary to move the autonomous mobile lift robot case 330 along the frustum shaped teeth 122 of the rack lattice structure in a horizontal direction.

The horizontal angle control guide 222b and the vertical angle control guide 225b are symmetrical to each other and installed at symmetrical positions. Because of the geometry, to respect the symmetry, the horizontal angle control guide 222b and the vertical angle control guide 225b need to be installed at different heights, the vertical angle control guide 225b on top of the vertical angle control support 228b while the horizontal angle control guide 222b is installed underneath the vertical angle control support 228b. The parts of the structure of the horizontal angle control guide 222b that are below the vertical angle control support 228b are drawn in dashed lines.

The vertical gear driving motor 220 and the vertical gear driving bevels 221e, and 221f that drive the tapered teeth gear 214e are seen on their installed positions.

The horizontal gear driving motor 217c, the horizontal gear driving pulleys 218e, and 218f and the horizontal gear driving belt 219c that drive the tapered teeth gears 214f are seen on their installed positions.

The horizontal pivoting support notch 236c provides additional space to accommodate the horizontal gear driving motor 217c that due to standardization of components may be longer than the available space in the horizontal pivoting support 232c.

The vertical hinged rack actuator 313a with the hinged rack arm 317a and the hinged rack hand 323a are seen on their installed position on the vertical gear support 260a. The horizontal hinged rack actuator 309a with the hinged rack arm 317b and the hinged rack hand 323b are seen on their installed position on the horizontal gear support 241a.

Figure 34:
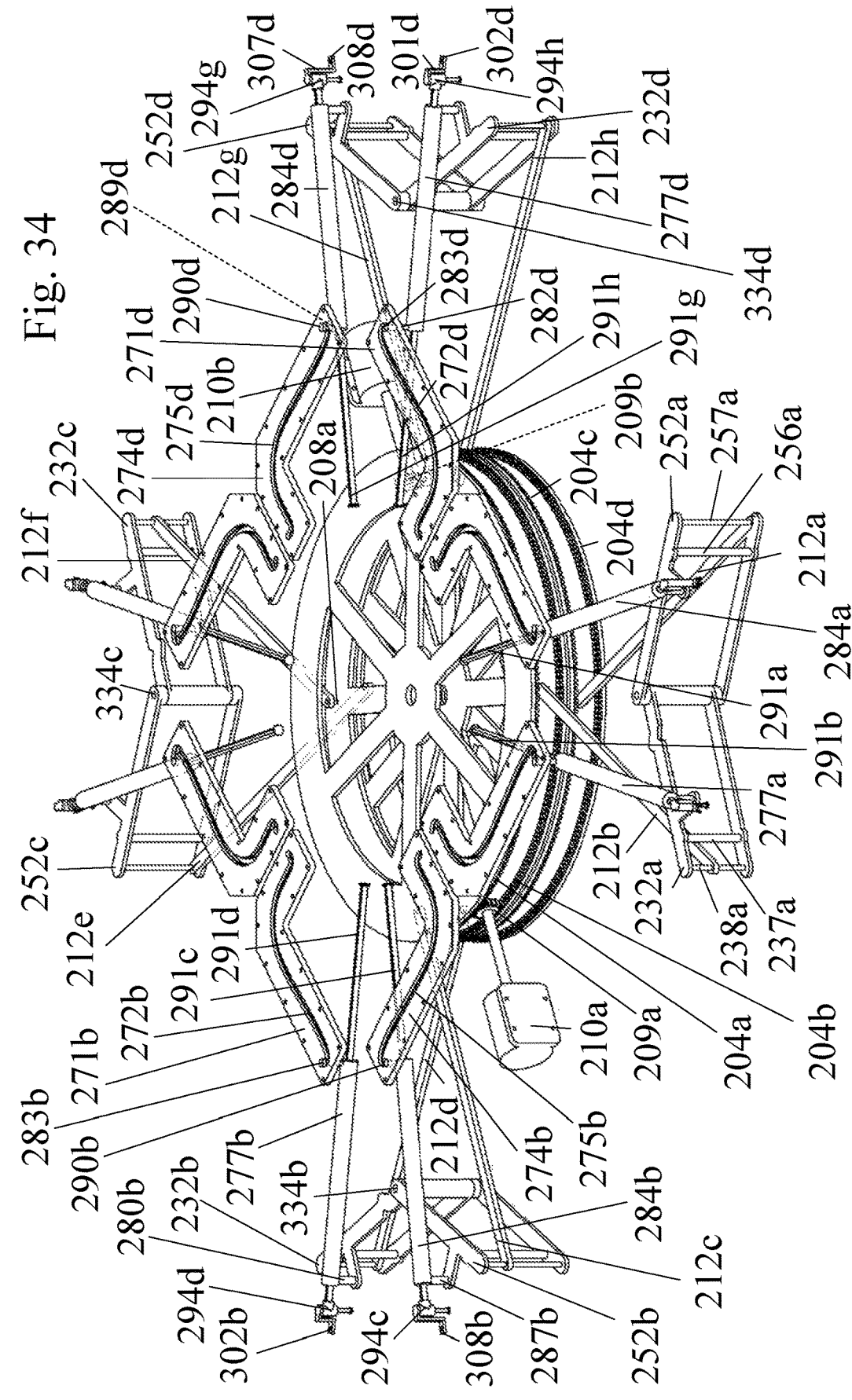
FIG. 34 is an isometric view of one embodiment of the actuator positioning control mechanism used in the autonomous mobile lift robot of the present invention.

The horizontal pivoting support actuator reference hole 240b is indicated in the horizontal pivoting support 232c and the vertical pivoting support actuator reference hole 259b is indicated in the vertical pivoting support 252a as reference for FIG. 34 that describes the actuator positioning control mechanism.

FIG. 34 shows an isometric view of one embodiment of the actuator positioning control mechanism used in the autonomous mobile lift robot 349 of the present invention.

The mechanism controlling the positioning of the vertical pivoting supports 252a, 252b, 252c, and 252d and the horizontal pivoting supports 232a, 232b, 232c, and 232d is described in FIG. 33.

The control disks 204a, 204b, 204c, and 204d; the control disk attachment pin 208a; the control disk actuator beveled gears 209a, and 209b; the actuator beveled gear driving motor 210a, and 210b; the gear position control bar 212a, through 212h; the horizontal pivoting support action bar 238a; and the vertical pivoting support action bar 257a have been drawn and indicated as reference and to facilitate the correspondence with the explanation in FIG. 33. Additionally, the horizontal pivoting support gear support axis 237a where the horizontal gear support 241a is installed and the vertical pivoting support gear support axis 256a where the vertical gear support 260*a* is installed are indicated to provide additional details related to the explanation of the FIG. 25 and FIG. 33.

FIG. 34 describes the components involved in the actuator positioning control mechanism used in the autonomous mobile lift robot 349 of the present invention. The positioning of a particular actuator is affected by the position of the pivoting support it is fixated to and the angle control guide it is linked to. The process is the same for all four pairs of pivoting supports so it will be explained only once for concision, mostly referring to the pair of pivoting supports 232*b*, and 252*b* and to the pair of pivoting supports 232*d*, and 252*d* exceptions made if other pivoting support pairs offer a better angle for visualization. As the components are the same in all four sets of pivoting support pairs, it is possible to identify the correspondent components in other pivoting support pairs.

The horizontal arm actuator 277*b* is installed in the horizontal pivoting support 232*b* fixating the horizontal arm actuator fixation pin 281*b* at the tip of the horizontal arm actuator fixation bar 280*b* in the horizontal pivoting support actuator reference hole 240*b*. The vertical arm actuator 284*b* is installed in the vertical pivoting support 252*b* fixating the vertical arm actuator fixation pin 288*b* at the tip of the vertical arm actuator fixation bar 287*b* in the vertical pivoting support actuator reference hole 259*b* (see FIG. 26 and FIG. 33).

The horizontal arm actuator sliding bar 282*d* is inserted into the horizontal actuator angle control track 272*d* of the horizontal actuator angle control guide 271*d* that is fixated above the horizontal arm actuator 277*d* and the horizontal arm actuator sliding knob 283*d* keeps the horizontal arm actuator sliding bar 282*d* from falling from the horizontal actuator angle control track 272*d*.

As the horizontal pivoting support 232*d* rotates around the pivoting axis 334*d*, the horizontal arm actuator sliding bar 282*d* slides inside the horizontal actuator angle control track 272*d* that in turn produces the desired orientation angle for the horizontal arm actuator 277*d* throughout the excursion of the horizontal pivoting support 232*d*.

The vertical arm actuator sliding bar 289*d* is inserted into the vertical actuator angle control track 275*d* of the vertical actuator angle control guide 274*d* that is fixated above the vertical arm actuator 284*d* and the vertical arm actuator sliding knob 290*d* keeps the vertical arm actuator sliding bar 289*d* from falling from the vertical actuator angle control track 275*d*.

As the vertical pivoting support 252*d* rotates around the pivoting axis 334*d*, the vertical arm actuator sliding bar 289*d* slides inside the vertical actuator angle control track 275*d* that in turn produces the desired orientation angle for the vertical arm actuator 284*d* throughout the excursion of the vertical pivoting support 252*d*.

The actuator arm 291*g* is installed in the vertical arm actuator 284*d* and the actuator arm 291*h* is installed in the horizontal arm actuator 277*d*.

The horizontal arm actuator sliding bar 282*d* is longer than the vertical arm actuator sliding bar 289*d* to offset the position of the horizontal arm actuator 277*d* and the vertical arm actuator 284*d* to prevent the actuator arms 291*h*, and 291*g* from hitting each other allowing the horizontal arm actuator 277*d* and the vertical arm actuator 284*d* to be installed in proximity and move without interfering with each other.

Due to the offset in the position of the vertical arm actuator 284*d* and the horizontal arm actuator 277*d*, the actuator hand 294*g* is higher than the actuator hand 294*h*. To compensate that, the vertical actuator hand finger 307*d* is longer than the horizontal actuator hand finger 301*d* to align the vertical actuator hand grabbing tip 308*d* with the horizontal actuator hand grabbing tip 302*d* in the same level.

FIG. 35 shows a top view of one embodiment of the autonomous mobile lift robot 349 of the present invention with the tapered teeth gears in the extended position showing the gear positioning mechanism and other internal components affected by the gear positioning mechanism and the clearances to other internal components.

The actuator beveled gear driving motors 210*a*, and 210*b* drive the control disks 204 that in turn drive the gear position control bars 212*a*, and 212*b* that extend the horizontal pivoting supports 232 and the vertical pivoting supports 252 that pivot around the pivoting axis 334 to the extended position. Embodiments of the present invention comprise suitable electronics are provided within the scope of the present invention to establish connection to one or more digital devices such as computers, laptops, cellphones, tablets or other, may be connected wirelessly, using Wi-Fi, Bluetooth, cellular, radio-frequency, and other bandwidths for communication to have the one or more digital devices control the actuator beveled gear driving motors 210 to direct operation and movement or for scheduling of operations using one or more software applications.

The vertical pivoting supports 252 hold the vertical gear supports 260 that hold the tapered teeth gears 214*a* that are mounted vertically. The horizontal pivoting supports 232 hold the horizontal gear supports 241 that hold the tapered teeth gears 214*b* that are mounted horizontally.

The vertical gear driving motors 220 in conjunction with two vertical gear driving bevels 221 drive the tapered teeth gears 214*a* that are mounted vertically. The horizontal gear driving motor 217 in conjunction with the horizontal gear driving pulleys 218*a*, and 218*b* and the horizontal gear driving belt 219 drive the tapered teeth gears 214*b* that are mounted horizontally. Embodiments of the present invention comprise suitable electronics are provided within the scope of the present invention to establish connection to one or more digital devices such as computers, laptops, cellphones, tablets or other, may be connected wirelessly, using Wi-Fi, Bluetooth, cellular, radio-frequency, and other bandwidths for communication to have the one or more digital devices control the vertical gear driving motors 220 and the horizontal gear driving motor 217 to direct operation and movement or for scheduling of operations using one or more software applications.

The horizontal angle control guide tracks 223 in the horizontal angle control guides 222 provide angle adjustment for the tapered teeth gears 214*b* that are mounted horizontally to have the tapered teeth 215 adjust and align within the frustum shaped teeth 122 providing the traction necessary to move the autonomous mobile lift robot case 330 along the frustum shaped teeth 122 of the rack lattice structure in a horizontal direction. The vertical angle control guide tracks 226 in the vertical angle control guides 225 mounted in the vertical angle control supports 228 provide angle adjustment for the tapered teeth gears 214*a* that are mounted vertically to have the tapered teeth 215 adjust and align within the frustum shaped teeth 122 providing the traction necessary to move the autonomous mobile lift robot case 330 along the frustum shaped teeth 122 of the rack lattice structure in a vertical direction.

In the extended position, the vertical arm actuator sliding knobs 290 move to the nearest end to the corners of the autonomous mobile lift robot case 330 of the vertical actuator angle control tracks 275 of the vertical actuator angle control guides 274 defining the alignment of the vertical arm actuators 284, the actuator arms 291*a*, and the vertical actuator hands 303.

Likewise, in the extended position, the horizontal arm actuator sliding knobs 283 move to the nearest end to the corners of the autonomous mobile lift robot case 330 of the horizontal actuator angle control tracks 272 of the horizontal actuator angle control guides 271 defining the alignment of the horizontal arm actuators 277, the actuator arms 291*b*, and the horizontal actuator hands 297.

The wheels 192, the wheel directional gear 197, and the wheel driving motor 202 are also visible in the center of each of the four faces of the autonomous mobile lift robot 349.

Figure 36:
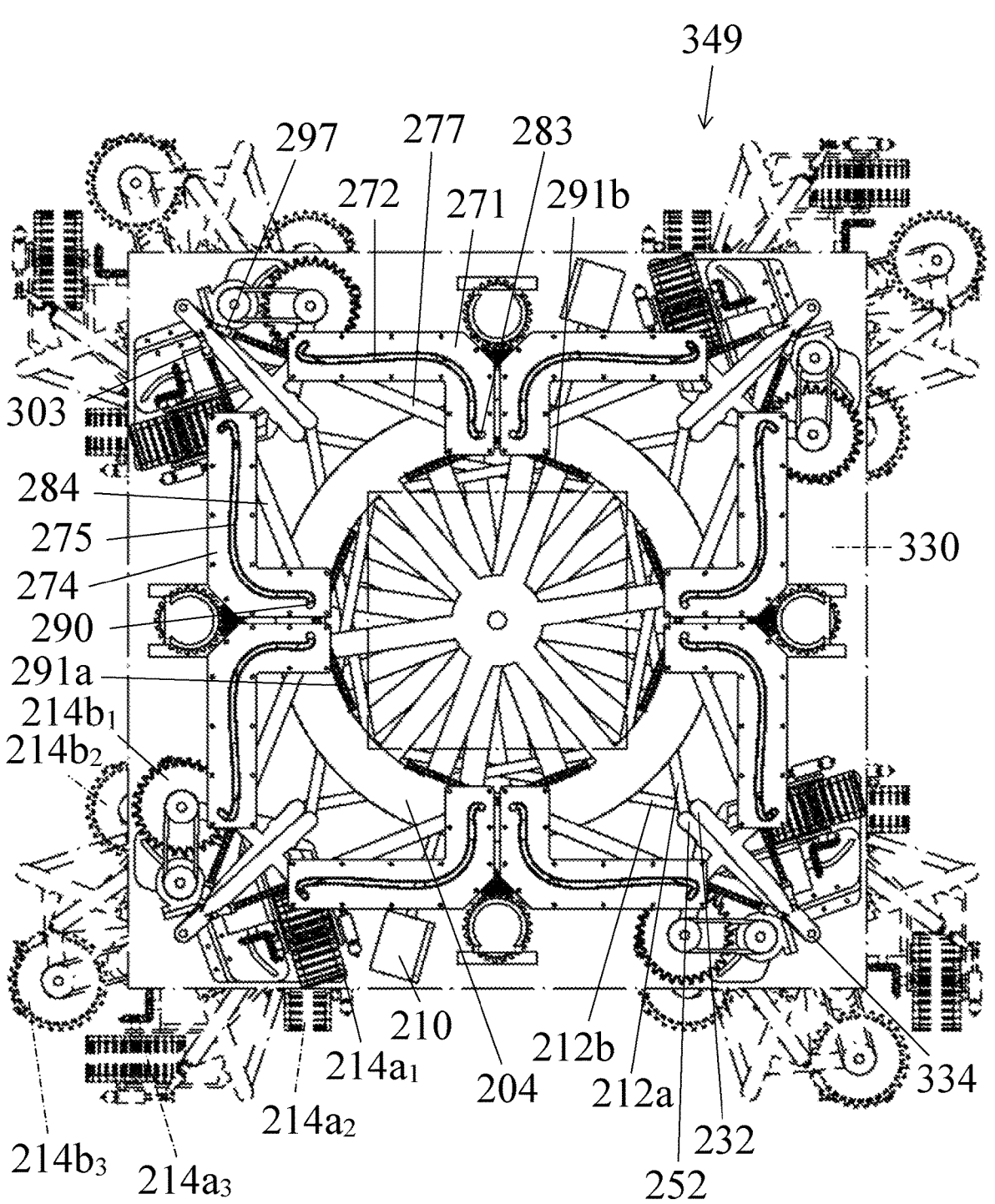
FIG. 36 is a top view of one embodiment of the autonomous mobile lift robot of the present invention with each of the first and second perpendicularly mounted tapered teeth gears in the retracted position overlayed with the views of each of the first and second perpendicularly mounted tapered teeth gears in the parallel and in the extended positions.

FIG. 36 shows a top view of one embodiment of the autonomous mobile lift robot 349 of the present invention with the tapered teeth gears in the retracted position overlayed with the views of the tapered teeth gears in the parallel and in the extended positions.

The actuator beveled gear driving motors 210 drive the control disks 204 that in turn drive the gear position control bars 212*a*, and 212*b* that retract the horizontal pivoting supports 232 and the vertical pivoting supports 252 that pivot around the pivoting axis 334 to the retracted position.

The positions of the vertically mounted tapered teeth gear 214*a*$_1$, 214*a*$_2$, and 214*a*$_3$ are shown in the retracted position, the parallel position, and the extended position respectively. The positions of horizontally mounted tapered teeth gear 214*b*$_1$, 214*b*$_2$, and 214*b*$_3$ are in the retracted position, the parallel position, and the extended position respectively.

In the retracted position, the vertical arm actuator sliding knobs 290 move to the farthest end to the corners of the autonomous mobile lift robot case 330 of the vertical actuator angle control tracks 275 of the vertical actuator angle control guides 274 defining the alignment of the vertical arm actuators 284, the actuator arms 291*a*, and vertical actuator hands 303.

Likewise, in the retracted position, the horizontal arm actuator sliding knobs 283 move to the farthest end to the corners of the autonomous mobile lift robot case 330 of the horizontal actuator angle control tracks 272 of the horizontal actuator angle control guides 271 defining the alignment of the horizontal arm actuators 277, the actuator arms 291*b*, and the horizontal actuator hands 297.

Figure 37:
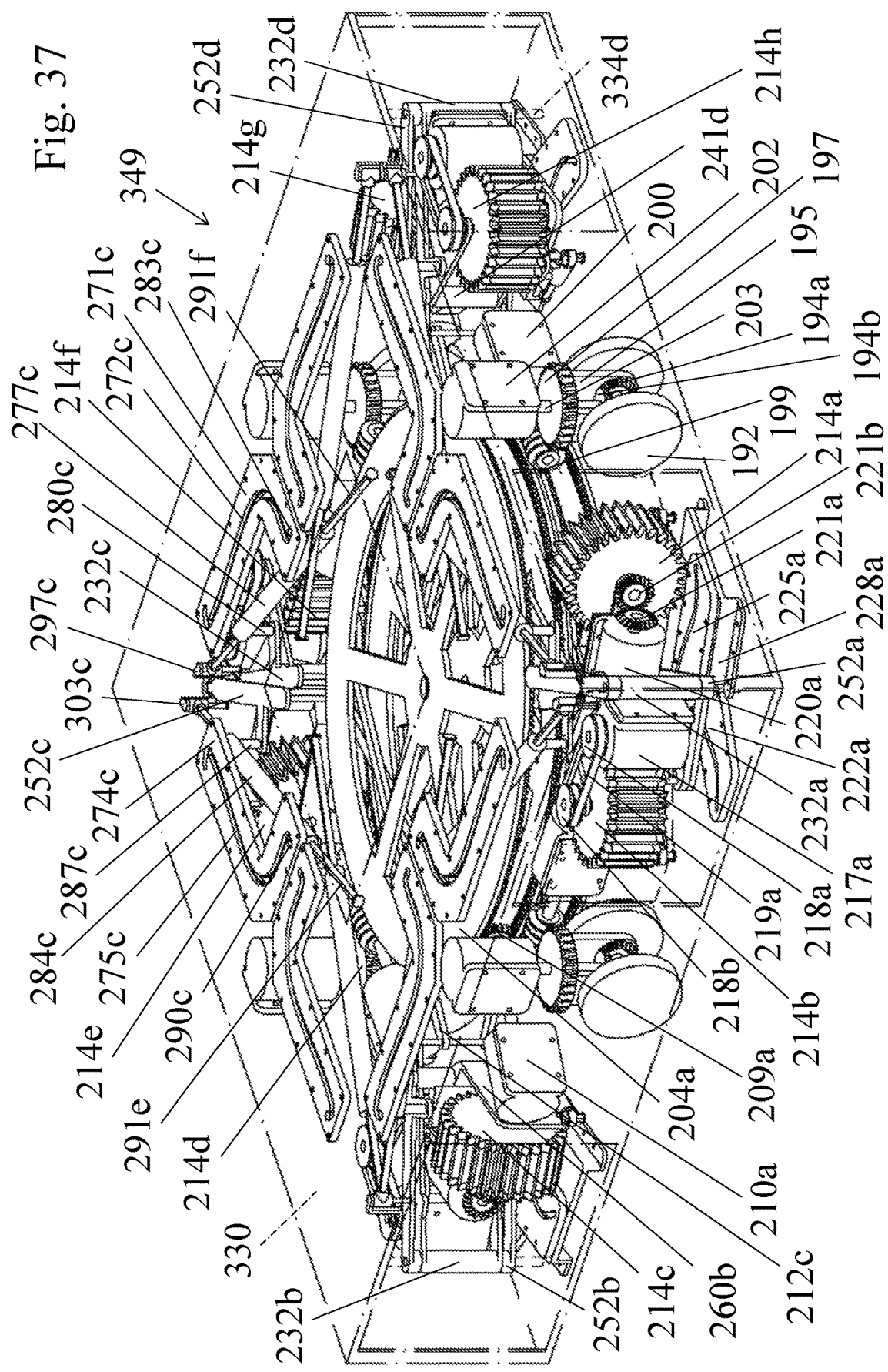
FIG. 37 is an isometric view of one embodiment of the autonomous mobile lift robot of the present invention with each of the first and second perpendicularly mounted tapered teeth gears in the retracted position showing internal components.

FIG. 37 shows an isometric view of one embodiment of the autonomous mobile lift robot 349 of the present invention with the tapered teeth gears in each corner in the retracted position and with the autonomous mobile lift robot case 330 drawn transparent in dash dotted lines to display details of the internal components and provide an overall picture of the components location inside the autonomous mobile lift robot 349.

The numbering pattern is the same used in FIG. 33 and FIG. 34 that are in the extended position, with same components located in the same place using the same differentiation letters to facilitate the identification of a particular component in all figures.

As FIG. 37 displays the autonomous mobile lift robot 349 in the retracted position, the gear position control bars 212*c*, etc. are mostly inside the control disks 204*a*, etc. that are located at the center of the autonomous mobile lift robot case 330. The actuator beveled gear driving motor 210*b* and the control disk actuator beveled gear 209*a* that drive the control disks 204*a*, and 204*b* on top are also visible, however, most of the positioning mechanism is partially obstructed from view by the other components and can be better seen in the extended position in FIG. 33 and FIG. 34.

FIG. 37 shows the horizontal pivoting support 232*d* and the vertical pivoting supports 252*d* installed around the pivoting axis 334*d*, with the horizontal gear support 241*d* indicated on its installed position in the horizontal pivoting support 232*d*. For better visualization angle, the vertical gear support 260*b* is indicated on its installed position in the vertical pivoting supports 252*b*.

The horizontal angle control guide 222*a* is installed at the bottom of the autonomous mobile lift robot case 330 and the vertical angle control guide 225*a* is installed on top of the vertical angle control support 228*a* that is installed at the bottom of the autonomous mobile lift robot case 330.

The vertical gear driving motor 220*a* and the vertical gear driving bevels 221*a*, and 221*b* that drive the vertical tapered teeth gear 214*a* are seen on their installed positions.

The horizontal gear driving motor 217*a*, the horizontal gear driving pulleys 218*a*, and 218*b* and the horizontal gear driving belt 219*a* that drive the horizontal tapered teeth gear 214*b* are seen on their installed positions.

FIG. 37 also shows the positioning arrangement of tapered teeth gears in each side of the autonomous mobile lift robot 349 allowing for a better understanding of the positioning mechanism.

The tapered teeth gears 214*b* and 214*c* are located in the side facing opposite to the side facing where the tapered teeth gears 214*f* and 214*g* are installed; and tapered teeth gears 214*d* and 214*e* are located in the side facing opposite to the side facing where the tapered teeth gears 214*h* and 214*a* are installed.

The positioning mechanism moves the horizontal pivoting supports 232*a*, and 232*c* together with the vertical pivoting support 252*b*, and 252*d*. This results in simultaneous movement of the tapered teeth gears 214*b*, and 214*f* together with the tapered teeth gears 214*c*, and 214*g* to configure the positioning of these gears on the two sides facing opposite to each other.

Similarly, the positioning mechanism moves the horizontal pivoting supports 232*b*, and 232*d* together with the vertical pivoting support 252*a*, and 252*c*. This results in simultaneous movement of the tapered teeth gears 214*d*, and 214*h* together with the tapered teeth gears 214*a*, and 214*e* to configure the positioning of these gears on the two other sides facing opposite to each other (see FIG. 33). Embodiments of the present invention comprise suitable electronics are provided within the scope of the present invention to establish connection to one or more digital devices such as computers, laptops, cellphones, tablets or other, may be connected wirelessly, using Wi-Fi, Bluetooth, cellular, radio-frequency, and other bandwidths for communication to have the one or more digital devices control the positioning mechanism to direct operation and movement or for scheduling of operations using one or more software applications.

The horizontal arm actuator 277*c* is installed fixating the horizontal arm actuator fixation bar 280*c* in the horizontal pivoting support 232*c*. The horizontal arm actuator sliding knob 283*c* keeps the horizontal arm actuator sliding bar 282*c* from falling from the horizontal actuator angle control track 272*c* in the horizontal actuator angle control guide 271*c* that is installed at the top of the autonomous mobile lift robot case 330.

The vertical arm actuator 284*c* is installed fixating the vertical arm actuator fixation bar 287*c* in the vertical pivoting support 252*c*. The vertical arm actuator sliding knob 290*c* keeps the vertical arm actuator sliding bar 289*c* from falling from the vertical actuator angle control track 275*c* in the vertical actuator angle control guide 274c that is installed at the top of the autonomous mobile lift robot case 330.

The actuator arm 291f with the horizontal actuator hand 297c in the end is installed in the horizontal arm actuator 277c and the actuator arm 291e with the vertical actuator hand 303c in the end is installed in the vertical arm actuator 284c.

The wheels 192 are supported by the wheel support 195 that is attached to the wheel directional gear 197. The wheel directional motor 200 drives the wheel directional worm 199 that turns the wheel directional gear 197 adjusting the direction of movement.

The wheel driving axle 203 of the wheel driving motor 202 passes through the center of the wheel directional gear 197 and drives the wheel driving bevel 194b that transfers the movement to the wheel driving bevel 194a that drives the wheels 192. Embodiments of the present invention comprise suitable electronics are provided within the scope of the present invention to establish connection to one or more digital devices such as computers, laptops, cellphones, tablets or other, may be connected wirelessly, using Wi-Fi, Bluetooth, cellular, radio-frequency, and other bandwidths for communication to have the one or more digital devices control the wheel directional motor 200 and wheel driving motor 202 to direct operation and movement or for scheduling of operations using one or more software applications.

Figure 38:
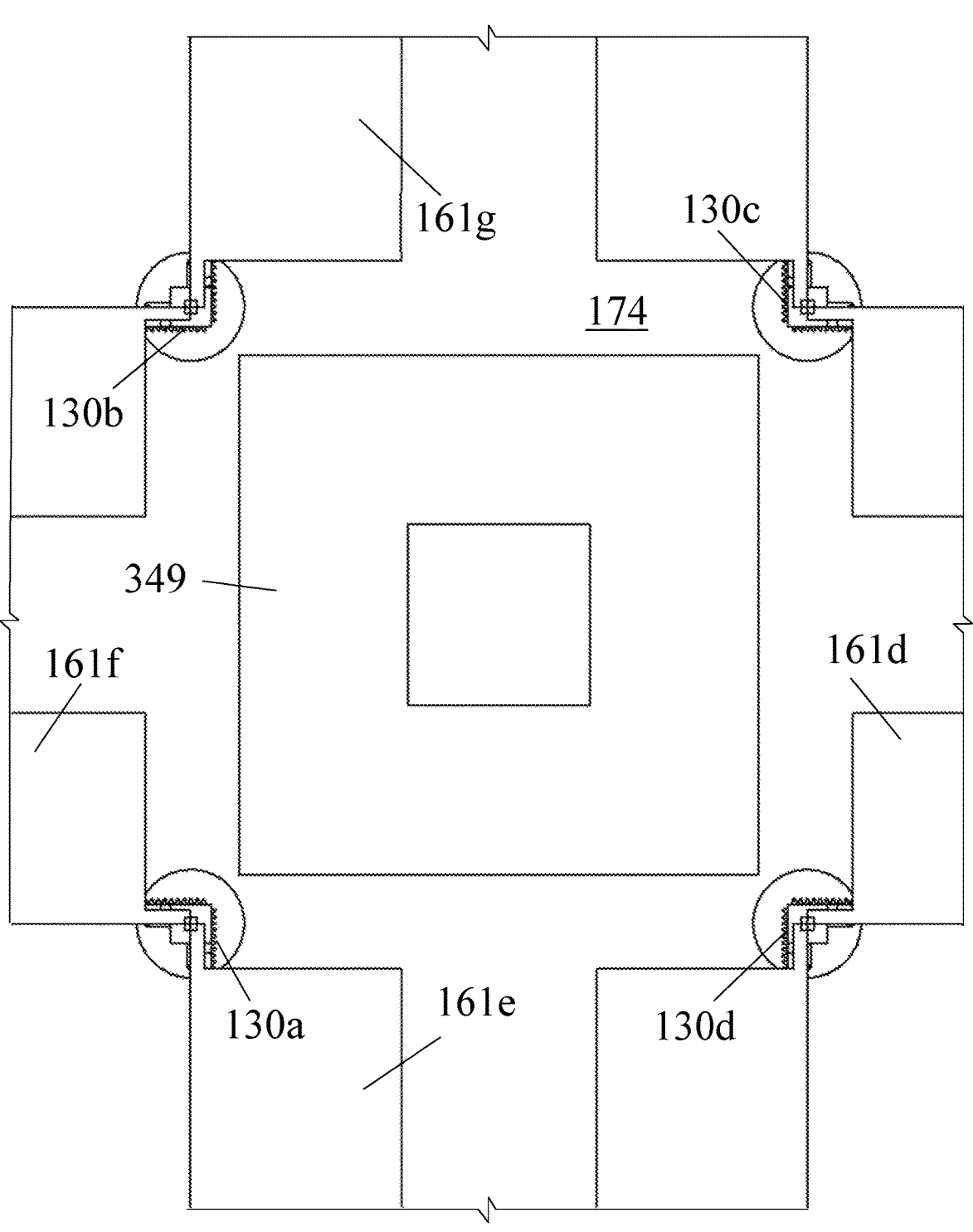
FIG. 38 is a top view of one embodiment of the autonomous mobile lift robot of the present invention with each of the first and second perpendicularly mounted tapered teeth gears in the retracted position at the center of a access shaft.

FIG. 38 is a top view of the autonomous mobile lift robot 349 in the retracted position standing on the floor in middle of one access shaft 174 with two levels to show the clearances to the rack poles 130a, 130b, 130c, and 130d and the shelves 161d, 161e, 161f, and 161g (see FIG. 15, FIG. 16, and FIG. 17).

Figure 39:
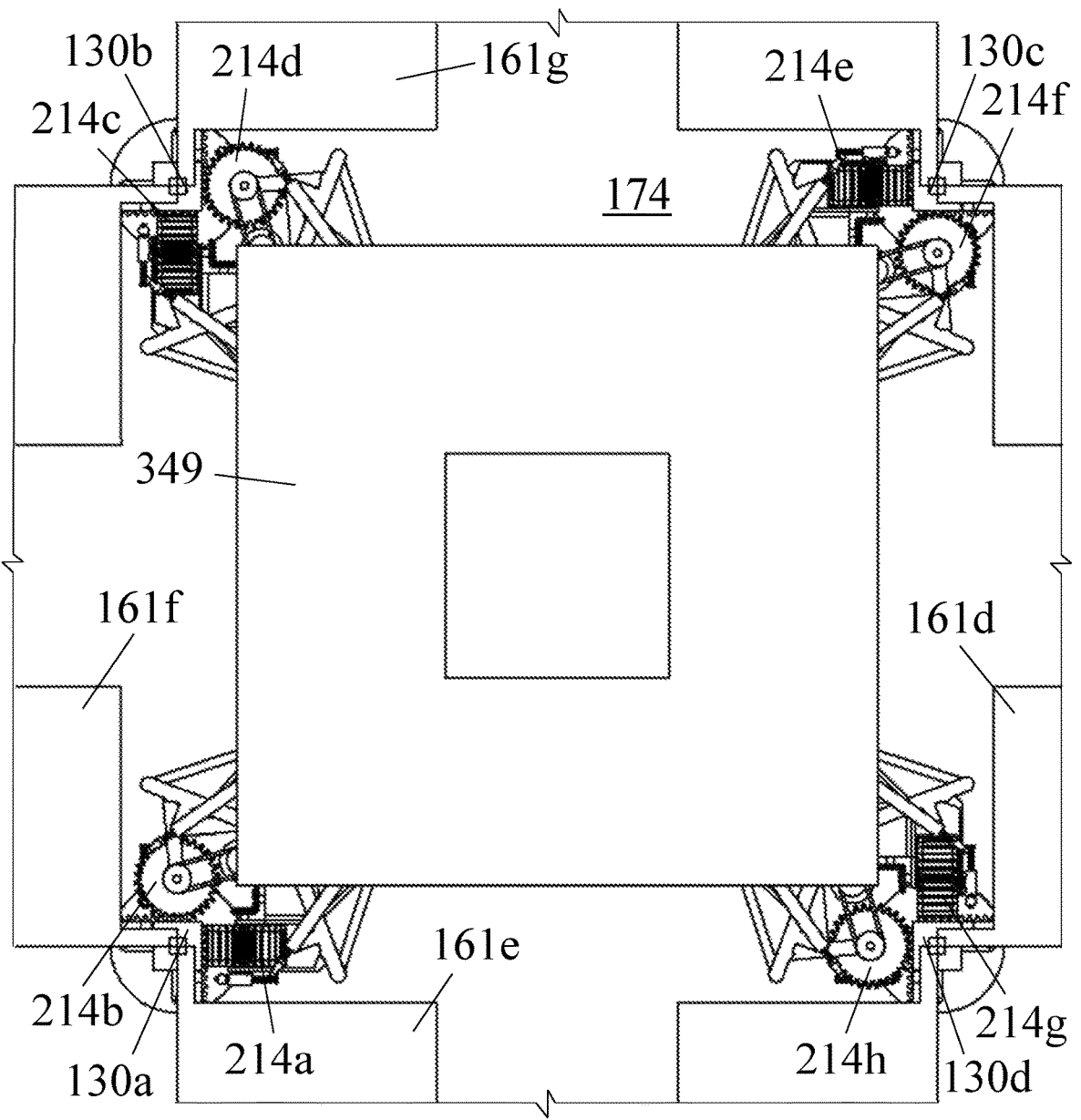
FIG. 39 is a top view of one embodiment of the autonomous mobile lift robot of the present invention with each of the first and second perpendicularly mounted tapered teeth gears in the extended position at the center of a access shaft.

FIG. 39 is a top view of the autonomous mobile lift robot 349 in the extended position in the middle of one access shaft 174 with two levels. In the extended position, the tapered teeth gears 214a, through 214h engage the rack poles 130a, 130b, 130c, and 130d allowing the autonomous mobile lift robot 349 to climb the rack poles.

As the autonomous mobile lift robot 349 climbs the rack poles 130a, 130b, 130c, and 130d, the vertically mounted tapered teeth gears 214a, 214c, 214e, and 214g rotate and drive the autonomous mobile lift robot 349 up or down. The horizontally mounted tapered teeth gears 214b, 214d, 214f, and 214h remain stationary and slide along the frustum shaped teeth 122 providing a reference to keep the autonomous mobile lift robot 349 steady in the center of the access shaft 174. The clearances to shelves 161d, 161e, 161f, and 161g are visible in FIG. 39 (see FIG. 15, FIG. 16, and FIG. 17).

Figures 40, 40A:
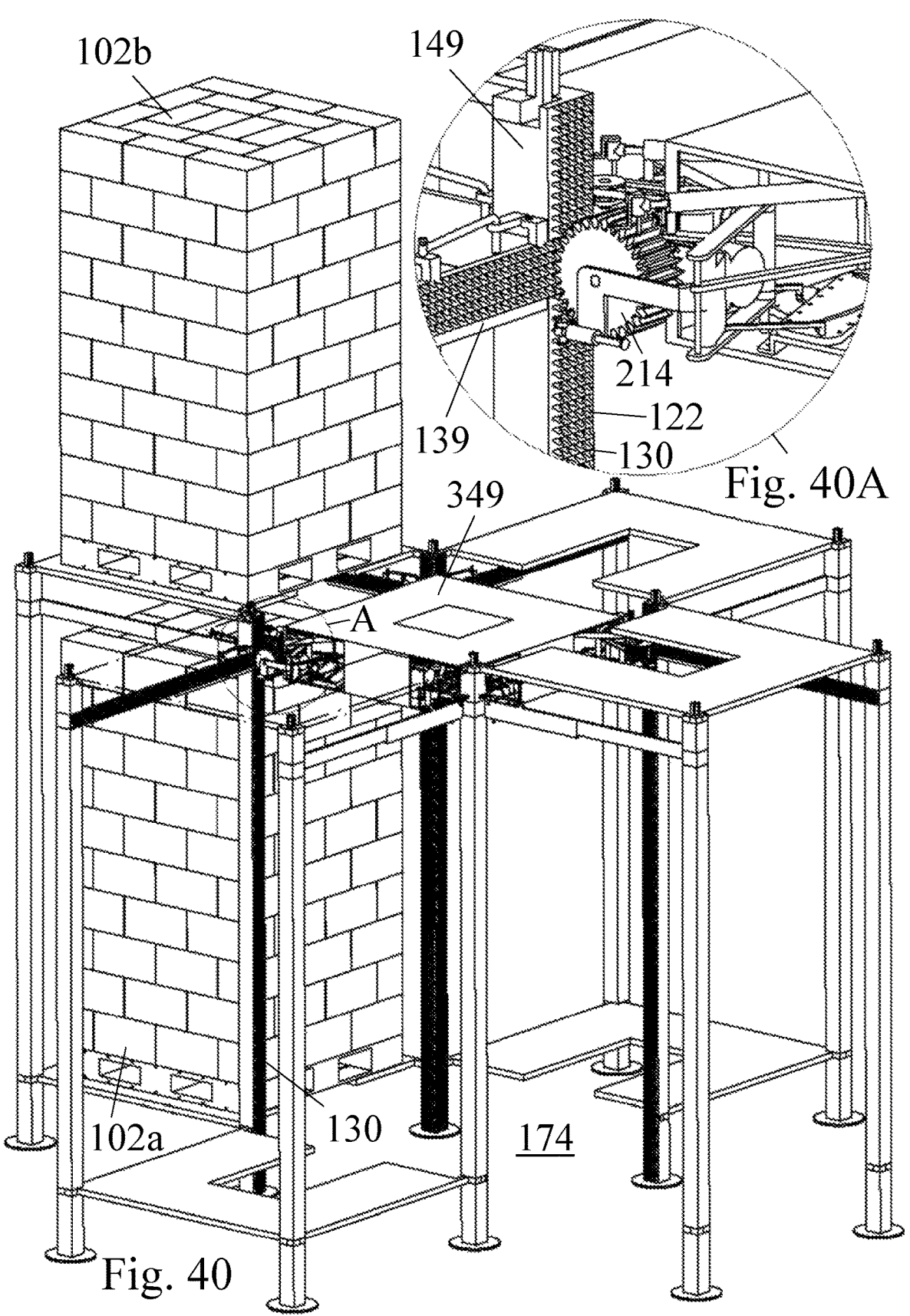
FIG. 40 is an isometric view of one embodiment of the autonomous mobile lift robot of the present invention with each of the first and second perpendicularly mounted tapered teeth gears in the extended position at the first level of a access shaft.
FIG. 40A is an isometric view of one of the first and second perpendicularly mounted tapered teeth gears engaging the rack pole and other rack components.

FIG. 40 shows the autonomous mobile lift robot 349 that has climbed the rack poles 130 and reached the first level of the access shaft 174 in preparation to retrieve the pallet 102b stored in the first level exactly above the pallet 102a that is on the ground level.

Detail FIG. 40A shows a zoomed view of the tapered teeth gear 214 engaging the frustum shaped teeth 122 in the rack pole 130, in the rack pole standard hinged rack A 139, and in the rack pole top cover 149 and stopping at the center of the rack pole standard hinged rack A 139 in preparation to unlock and move the rack pole standard hinged rack A 139 to gain access to the pallet 102b.

FIG. 41 shows the autonomous mobile lift robot 349 in position for unlocking and moving the required components to gain access to the pallet 102b (see FIG. 40). To facilitate the view of more details, a reduced number of affected components and components needed to better illustrate the procedure are drawn: the rack poles 130a, through 130d; the rack pole standard hinged rack A 139a, through 139d; the rack pole standard hinged rack B 145a, trough 145d; and the rack pole top cover 149a, through 149d.

To access the pallet 102b the autonomous mobile lift robot 349 needs to move the rack pole standard hinged rack A 139a, and 139c and the rack pole standard hinged rack B 145b, and 145d. The process is the same for all parts, so it is explained only once for the rack pole standard hinged rack A 139a.

Detail FIG. 41A shows a first position with the tapered teeth gear 214 engaging the frustum shaped teeth 122 in the rack pole standard hinged rack A 139. The lock bar 154 is firmly placed between the rack pole top lock fixture 150a of the rack pole top cover 149 and the hinged rack external lock fixture 142 of the rack pole standard hinged rack A 139. The hinged rack internal lock fixture 141 of the rack pole standard hinged rack A 139 is left unused.

The gear position control bar 212 attached to the vertical pivoting support action bar 257 keeps the vertical pivoting support 252 in the extended position. The vertical arm actuator fixation bar 287 fixated to the vertical pivoting support 252 puts the vertical arm actuator 284 in the extended position ensuring the proper alignment of the vertical arm actuator 284 (see FIG. 34).

In the extended position, the vertical gear support guide pin 268 is at the extremity of the vertical angle control guide track 226 adjusting the angle of the vertical gear support 260 so that the tapered teeth gear 214 is in full contact with the frustum shaped teeth 122 in the rack pole standard hinged rack A 139.

The vertical hinged rack actuator 313 is installed at the vertical gear support 260 and aligned perpendicularly to the rack pole standard hinged rack A 139. The hinged rack arm 317 is retracted and the hinged rack arm stopper 319 is further to the right. The hinged rack arm hand actuator 320, the hinged rack hand 323, and the hinged rack hand rollers 328 remain at a distance, not engaging the hinged rack hold bar 144 of the rack pole standard hinged rack A 139.

The hinged rack hand 323 is retracted and the hinged rack hand stopper 325 is further to the bottom to keep the hinged rack hand rollers 328 below the hinged rack hold bar 144.

The vertical arm actuator 284 and the actuator arm 291 are aligned with the position of lock bar grabbing neck 159 and the lock bar knob 160. The vertical actuator hand 303 is in a low position in the actuator hand 294 causing the vertical actuator hand grabbing tip 308 to be at exactly the same level of the lock bar grabbing neck 159. As the actuator arm 291 is retracted, the vertical actuator hand grabbing tip 308 stays at a distance and does not engage the lock bar grabbing neck 159.

Detail FIG. 41B shows a second position with the tapered teeth gear 214 engaging the frustum shaped teeth 122 in the rack pole standard hinged rack A 139. The lock bar 154 is firmly placed between the rack pole top lock fixture 150a of the rack pole top cover 149 and the hinged rack external lock fixture 142 of the rack pole standard hinged rack A 139. The hinged rack internal lock fixture 141 of the rack pole standard hinged rack A 139 is left unused.

The gear position control bar 212 attached to the vertical pivoting support action bar 257 keeps the vertical pivoting support 252 in the extended position. The vertical arm actuator fixation bar 287 fixated to the vertical pivoting support 252 puts the vertical arm actuator 284 in the extended position ensuring the proper alignment of the vertical arm actuator 284 (see FIG. 34).

In the extended position, the vertical gear support guide pin 268 is at the extremity of the vertical angle control guide track 226 adjusting the angle of the vertical gear support 260 so that the tapered teeth gear 214 is in full contact with the frustum shaped teeth 122 in the rack pole standard hinged rack A 139.

The vertical hinged rack actuator 313 is installed at the vertical gear support 260 and aligned perpendicularly to the rack pole standard hinged rack A 139. The hinged rack arm 317 is extended and the hinged rack arm stopper 319 is in contact with the vertical hinged rack actuator 313. The hinged rack arm hand actuator 320, the hinged rack hand 323, and the hinged rack hand rollers 328 are exactly below the hinged rack hold bar 144 of the rack pole standard hinged rack A 139.

As the hinged rack hand 323 is retracted and the hinged rack hand stopper 325 is further to the bottom the hinged rack hand rollers 328 are not in contact with the hinged rack hold bar 144 of the rack pole standard hinged rack A 139.

The vertical arm actuator 284 and the actuator arm 291 are aligned with the position of lock bar grabbing neck 159 and the lock bar knob 160. The actuator arm 291 is extended and the vertical actuator hand 303 is in a low position in the actuator hand 294 causing the vertical actuator hand grab-bing tip 308 to engage the lock bar grabbing neck 159.

Detail FIG. 41C shows a third position with the tapered teeth gear 214 engaging the frustum shaped teeth 122 in the rack pole standard hinged rack A 139. The lock bar 154 is lifted and free to rotate around the rack pole top lock fixture 150a of the rack pole top cover 149. The hinged rack hand rollers 328 of the hinged rack hand 323 are in contact with both sides of the hinged rack hold bar 144 of the rack pole standard hinged rack A 139 and hold the rack pole standard hinged rack A 139 in place. The hinged rack internal lock fixture 141 and the hinged rack external lock fixture 142 of the rack pole standard hinged rack A 139 are not used.

The gear position control bar 212 attached to the vertical pivoting support action bar 257 keeps the vertical pivoting support 252 in the extended position. The vertical arm actuator fixation bar 287 fixated to the vertical pivoting support 252 puts the vertical arm actuator 284 to the extended position ensuring the proper alignment of the vertical arm actuator 284 (see FIG. 34).

In the extended position, the vertical gear support guide pin 268 is at the extremity of the vertical angle control guide track 226 adjusting the angle of the vertical gear support 260 so that the tapered teeth gear 214 is in full contact with the frustum shaped teeth 122 in the rack pole standard hinged rack A 139, with the tapered teeth 215 parallel to the rack pole standard hinged rack A 139.

The tapered teeth edge face 216 help the tapered teeth 215 to adjust to eventual minor variations in the frustum shaped teeth 122 individual positions when the tapered teeth gear 214 needs to slide horizontally against the rack pole standard hinged rack A 139 (see detail FIG. 41D).

The vertical hinged rack actuator 313 is installed at the vertical gear support 260 and aligned perpendicularly to the rack pole standard hinged rack A 139. The hinged rack arm 317 is extended and the hinged rack arm stopper 319 is in contact with the vertical hinged rack actuator 313.

The hinged rack arm hand actuator 320 is exactly below the hinged rack hold bar 144 and the hinged rack hand 323 is extended with the hinged rack hand stopper 325 in contact with the hinged rack arm hand actuator 320. The hinged rack hand rollers 328 in both sides of the hinged rack hand 323 are in contact with the hinged rack hold bar 144 holding the rack pole standard hinged rack A 139 in contact with the tapered teeth gear 214.

The vertical arm actuator 284 and the actuator arm 291 are aligned with the position of lock bar grabbing neck 159 and the lock bar knob 160. The actuator arm 291 is extended and the vertical actuator hand 303 is in a raised position in the actuator hand 294 causing the vertical actuator hand grab-bing tip 308 engaged to the lock bar grabbing neck 159 to lift the lock bar knob 160 and the lock bar 154 until the tapered end 158 clears the hinged rack external lock fixture 142 of the rack pole standard hinged rack A 139.

To avoid losing the grip on the rack pole standard hinged rack A 139 the hinged rack hand 323 is extended before the vertical actuator hand 303 is raised.

The gear position control bar 212 attached to the vertical pivoting support action bar 257 then retracts and pulls the vertical pivoting support 252 to the parallel position. The vertical arm actuator fixation bar 287 fixated to the vertical pivoting support 252 pushes the vertical arm actuator 284 to the parallel position and the alignment of the vertical arm actuator 284 changes according to the profile of the vertical actuator angle control track 275 of the vertical actuator angle control guide 274 that is made to ensure that the movement of the vertical actuator hand grabbing tip 308 matches the lock bar grabbing neck 159 as the lock bar 154 rotates around the rack pole top lock fixture 150a of the rack pole top cover 149 (see FIG. 34).

At the same time, the vertical gear support guide pin 268 slides in the vertical angle control guide track 226 that has the profile needed to adjust the angle of the vertical gear support 260 so that the tapered teeth gear 214 remains in full contact with the frustum shaped teeth 122 in the rack pole standard hinged rack A 139, with the tapered teeth 215 parallel to the rack pole standard hinged rack A 139 at all times until the tapered teeth gear 214 reaches the parallel position.

Because the pivoting axes are different, the change in the positions of the rack pole standard hinged rack A 139 and the tapered teeth gear 214 requires a change in the relative position of the rack pole standard hinged rack A 139 and the tapered teeth gear 214. In case of a horizontally mounted tapered teeth gear 214 the tapered teeth gear 214 can just rotate. A vertically mounted tapered teeth gear 214 on the other hand has to slide horizontally against the rack pole standard hinged rack A 139. The tapered teeth edge face 216 helps the tapered teeth 215 to adjust to eventual minor variations in the frustum shaped teeth 122 individual posi-tions throughout the length of the rack pole standard hinged rack A 139 where the slide takes place. As reference, the initial position of the tapered teeth gear 214 is in this example, a little to the right of the hinged rack internal lock fixture 141 (see detail FIG. 41D).

Detail FIG. 41D shows a fourth position with the rack pole standard hinged rack A 139 already moved to align with the rack pole standard hinged rack B 145. The lock bar 154 is lifted and free to rotate around the rack pole top lock fixture 150a of the rack pole top cover 149. The hinged rack hand rollers 328 of the hinged rack hand 323 are in contact with both sides of the hinged rack hold bar 144 of the rack pole standard hinged rack A 139 and hold the rack pole standard hinged rack A 139 in place. The hinged rack internal lock fixture 141 and the hinged rack external lock fixture 142 of the rack pole standard hinged rack A 139 are not used.

The vertical arm actuator fixation bar 287 fixated to the vertical pivoting support 252 puts the vertical arm actuator 284 in the parallel position and the alignment of the vertical arm actuator 284 is adjusted according to the profile of the vertical actuator angle control track 275 of the vertical actuator angle control guide 274 that ensures that at the parallel position, the position of the vertical actuator hand grabbing tip 308 matches the position of the hinged rack internal lock fixture 141 of the rack pole standard hinged rack A 139.

In the parallel position, the vertical gear support guide pin 268 sliding in the vertical angle control guide track 226 adjusts the angle of the vertical gear support 260 so that the tapered teeth gear 214 is in full contact with the frustum shaped teeth 122 in the rack pole standard hinged rack A 139.

The vertical hinged rack actuator 313 is installed at the vertical gear support 260 and aligned perpendicularly to the rack pole standard hinged rack A 139. The hinged rack arm 317 is extended and the hinged rack arm stopper 319 is in contact with the vertical hinged rack actuator 313.

The hinged rack arm hand actuator 320 is exactly below the hinged rack hold bar 144 and the hinged rack hand 323 is extended with the hinged rack hand stopper 325 in contact with hinged rack arm hand actuator 320. The hinged rack hand rollers 328 in both sides of the hinged rack hand 323 are in contact with the hinged rack hold bar 144 holding the rack pole standard hinged rack A 139 in contact with the tapered teeth gear 214.

The vertical arm actuator 284 and the actuator arm 291 are aligned with the position of lock bar grabbing neck 159 and the lock bar knob 160. The actuator arm 291 is extended and the vertical actuator hand 303 is in a high position in the actuator hand 294 causing the vertical actuator hand grabbing tip 308 engaged to the lock bar grabbing neck 159 to hold the lock bar 154 in a high position in such a way that the tapered end 158 aligns with and stays above the hinged rack internal lock fixture 141 of the rack pole standard hinged rack A 139.

As the tapered teeth gear 214 reaches the final position of the horizontal slide a little to the left of hinged rack external lock fixture 142 of the rack pole standard hinged rack A 139 the length of the horizontal slide during the pivoting of the rack pole standard hinged rack A 139 can be ascertained comparing the position of the tapered teeth gear 214 in detail FIG. 41D with the position of the tapered teeth gear 214 in detail FIG. 41C.

Detail FIG. 41E shows a fifth position with the rack pole standard hinged rack A 139 aligned with the rack pole standard hinged rack B 145. The lock bar 154 is firmly placed between the rack pole top lock fixture 150a of the rack pole top cover 149 and the hinged rack internal lock fixture 141 of the rack pole standard hinged rack A 139. The hinged rack external lock fixture 142 of the rack pole standard hinged rack A 139 is left unused.

The vertical arm actuator fixation bar 287 fixated to the vertical pivoting support 252 puts the vertical arm actuator 284 in the parallel position and the alignment of the vertical arm actuator 284 is adjusted according to the profile of the vertical actuator angle control track 275 of the vertical actuator angle control guide 274 that ensures that at the parallel position, the position of the vertical actuator hand grabbing tip 308 matches the position of the hinged rack internal lock fixture 141 of the rack pole standard hinged rack A 139.

In the parallel position, the vertical gear support guide pin 268 sliding in the vertical angle control guide track 226 adjusts the angle of the vertical gear support 260 so that the tapered teeth gear 214 is in full contact with the frustum shaped teeth 122 in the rack pole standard hinged rack A 139.

The vertical hinged rack actuator 313 is installed at the vertical gear support 260 and aligned perpendicularly to the rack pole standard hinged rack A 139. The hinged rack arm 317 is extended and the hinged rack arm hand actuator 320, the hinged rack hand 323, and the hinged rack hand rollers 328 are exactly below the hinged rack hold bar 144 of the rack pole standard hinged rack A 139.

As the hinged rack hand 323 has retracted, the hinged rack hand stopper 325 is located further to the bottom and the hinged rack hand rollers 328 are no longer in contact with the hinged rack hold bar 144 of the rack pole standard hinged rack A 139.

The vertical arm actuator 284 and the actuator arm 291 are aligned with the position of lock bar grabbing neck 159 and the lock bar knob 160. The actuator arm 291 is extended and the actuator hand 294 has lowered the position of the vertical actuator hand 303 causing the vertical actuator hand grabbing tip 308 engaged in the lock bar grabbing neck 159 to lower the lock bar knob 160 and the lock bar 154 so that the tapered end 158 fits into the hinged rack internal lock fixture 141 of the rack pole standard hinged rack A 139. The conical profile of the tapered end 158 helps to compensate for minor variations in the positioning and ensures a successful insertion of the lock bar 154 into the hinged rack internal lock fixture 141 of the rack pole standard hinged rack A 139.

To avoid losing the grip on the rack pole standard hinged rack A 139 the vertical actuator hand 303 is lowered before the hinged rack hand 323 is retracted.

Detail FIG. 41F shows a sixth position with the rack pole standard hinged rack A 139 aligned with the rack pole standard hinged rack B 145. The lock bar 154 is firmly placed between the rack pole top lock fixture 150a of the rack pole top cover 149 and the hinged rack internal lock fixture 141 of the rack pole standard hinged rack A 139. The hinged rack external lock fixture 142 of the rack pole standard hinged rack A 139 is left unused.

The vertical arm actuator fixation bar 287 fixated to the vertical pivoting support 252 puts the vertical arm actuator 284 in the parallel position and the alignment of the vertical arm actuator 284 is adjusted according to the profile of the vertical actuator angle control track 275 of the vertical actuator angle control guide 274 that ensures that at the parallel position, the position of the vertical actuator hand grabbing tip 308 matches the position of the hinged rack internal lock fixture 141 of the rack pole standard hinged rack A 139.

In the parallel position, the vertical gear support guide pin 268 sliding in the vertical angle control guide track 226 adjusts the angle of the vertical gear support 260 so that the tapered teeth gear 214a is in full contact with the frustum shaped teeth 122 in the rack pole standard hinged rack A 139.

The vertical hinged rack actuator 313 is installed at the vertical gear support 260 and aligned perpendicularly to the rack pole standard hinged rack A 139. The hinged rack arm 317 is retracted and hinged rack arm hand actuator 320, the hinged rack hand 323, and the hinged rack hand rollers 328 remain at a distance, not engaging the hinged rack hold bar 144 of the rack pole standard hinged rack A 139 and clear of other structures.

The hinged rack hand 323 is retracted and the hinged rack hand stopper 325 is further to the bottom keeping the hinged rack hand rollers 328 below the hinged rack hold bar 144.

The vertical arm actuator 284 and the actuator arm 291 are aligned with the position of lock bar grabbing neck 159 and the lock bar knob 160. As the actuator arm 291 retracts, the vertical actuator hand grabbing tip 308 disengages the lock bar grabbing neck 159 and moves back and stays clear of other structures. The vertical actuator hand 303 is in a low position in the actuator hand 294 and the vertical actuator hand grabbing tip 308 remains at the same level of the lock bar grabbing neck 159.

The tapered teeth gear 214b remains stationary at the same position throughout the process of pivoting the rack pole standard hinged rack A 139. Once the process of pivoting the rack pole standard hinged rack A 139 is complete, the tapered teeth gear 214b is able to rotate to propel the autonomous mobile lift robot case 330 horizontally. The tapered teeth gear 214a perpendicularly mounted to the tapered teeth gear 214b does not rotate but slides along the rack pole standard hinged rack A 139 and the rack pole standard hinged rack B 145. As the tapered teeth gear 214a slides, the engaged teeth function as guides to keep the autonomous mobile lift robot case 330 at the desired level.

FIG. 42 shows the autonomous mobile lift robot 349 at the first level of the access shaft 174 positioned to retrieve the pallet 102b stored in the first level exactly above the pallet 102a that is on the ground level.

The single rack piece 120, the rack pole standard hinged rack A 139a, and the rack pole standard hinged rack B 145a installed at the rack pole 130a and the rack pole standard hinged rack A 139b, and the rack pole standard hinged rack B 145b installed at the rack pole 130b are all aligned and form a single seamless rack. The same occurs at the other side of the access shaft 174 allowing the autonomous mobile lift robot 349 to leave the center of the access shaft 174 and move to the retrieving position below the pallet 102b.

Detail FIG. 42A shows the autonomous mobile lift robot 349 under the pallet 102b that is still resting on the shelf 161. A storage gap 350 between the pallet 102a and the pallet 102b provides sufficient space for the autonomous mobile lift robot 349 to fit in and the single rack piece 120, the rack pole standard hinged rack B 145a and the rack pole standard hinged rack A 139a provide a continuous rack that supports the autonomous mobile lift robot 349.

FIG. 43 shows the autonomous mobile lift robot 349 with the pantographic lift platform 178 raised at the first level of the access shaft 174 retrieving the pallet 102b stored in the first level exactly above the pallet 102a that is on the ground level.

The single rack piece 120, the rack pole standard hinged rack A 139, and the rack pole standard hinged rack B 145 are all aligned and form a single seamless rack.

Detail FIG. 43A shows the autonomous mobile lift robot 349 with the pantographic lift platform 178 raised and supporting the pallet 102b that is no longer resting on the shelf 161. The storage gap 350 between the pallet 102a and the pallet 102b provides sufficient space for the autonomous mobile lift robot 349 to fit in and the single rack piece 120, the rack pole standard hinged rack B 145 and the rack pole standard hinged rack A 139 provide a continuous rack that supports the autonomous mobile lift robot 349.

FIG. 44 shows the autonomous mobile lift robot 349 with the pantographic lift platform 178 raised and carrying the pallet 102b that was retrieved from the shelf 161 on the first level. The shelf access channel 163 provides the path to allow the raised pantographic lift platform 178 to pass and remove the pallet 102b from the shelf 161.

The rack pole standard hinged rack A 139 and the rack pole standard hinged rack B 145 are aligned and form a single seamless rack that supports the autonomous mobile lift robot 349 as it moves back to the center of the access shaft 174.

Detail FIG. 44A shows the autonomous mobile lift robot 349 with the pantographic lift platform 178 raised and supporting the pallet 102b that is no longer above the pallet 102a. The rack pole standard hinged rack A 139 and the rack pole standard hinged rack B 145 are aligned and form a single seamless rack that supports the autonomous mobile lift robot 349 as it moves back to the center of the access shaft 174.

FIG. 45 shows a loaded autonomous mobile lift robot 351 configured with a half size pallet 352 loaded on top of the autonomous mobile lift robot 349 with the pantographic lift platform 178 raised and the tapered teeth gears 214a, and 214b in the front face and the corresponding tapered teeth gears 214e, and 214f on the opposite face on the back in the parallel position and the tapered teeth gears 214g, and 214h in the right face and the corresponding tapered teeth gears 214c, and 214d in the left face in the retracted position.

FIG. 46 shows a fast loading truck 353 that has a flatbed chassis 354. The fast loading truck 353 has a standard cargo bay 355 with a right door 356 and a left door 357 at the rear that are seen closed.

FIG. 47 shows the fast loading truck 353 with the flatbed chassis 354 and the standard cargo bay 355 with the right door 356 and the left door 357 open. With the doors open, a cargo bay center division 358 that divides the cargo bay 355 in two from top to bottom can be seen. A door rack 359 is seen installed at the right door 356 and a mirror version of the door rack 359 is installed at the left door 357.

A cargo bay center rack 360 is installed at both sides of the cargo bay center division 358 that divides the cargo bay 355. A cargo bay side rack 361 is installed at the right side of the cargo bay 355 that is aligned with the door rack 359 when the right door 356 is open and a mirror version of the cargo bay side rack 361 is installed at the left side of the cargo bay 355 that is aligned with the mirror version of the door rack 359 installed at the left door 357 when the left door 357 is open (see detail FIG. 48A).

A middle division 362 is seen on its stored position folded to one side of the cargo bay 355. The middle division 362 has a middle division rack 363 at both sides of the middle division 362 that aligns with the cargo bay center rack 360 installed at both sides of the cargo bay center division 358 when the middle division 362 is on its open position.

FIG. 47 also shows a group of lower shelves 364 and a group of upper shelves 365 that are installed at appropriate heights to hold half size pallets 352 on two levels.

FIG. 48 shows the fast loading truck 353 with the flatbed chassis 354 and the standard cargo bay 355 with the right door 356, the left door 357, and the middle division 362 open parked at a truck loading bay 367.

A pair of right door lock bar 368a and 368b is installed between the right door 356 and the middle division 362 and a pair of left door lock bar 369a and 369b is installed between the left door 357 and the middle division 362. The right door 356, the left door 357, and the middle division 362 are kept parallel to each other and at a fixed distance to each other.

With the middle division 362 open, the cargo bay center rack 360 installed on both sides of the cargo bay center division 358 and the middle division rack 363 installed on both sides of the middle division 362 form a continuous seamless rack.

Likewise, with the doors open, the cargo bay side rack 361 installed at the right side of the cargo bay 355 is aligned with the door rack 359 installed at the right door 356 and the mirror version of the cargo bay side rack 361 installed at the left side of the cargo bay 355 is aligned with the mirror version of the door rack 359 installed at the left door 357.

The portions of the lower shelves 364a, and 364b and the upper shelves 365a, 365b that are installed on both sides of the cargo bay center division 358 that are inside the cargo bay 355 have been drawn in dashed lines to enable the visualization of an access path 366a, 366b, 366c, and 366d in the middle of the lower shelves 364a, and 364b and the upper shelves 365a, 365b that runs all the way from the door to the front of the cargo bay 355.

The truck loading bay 367 is at the same level of a truck floor 370 that runs all the way from the doors until the front of the cargo bay 355.

Detail FIG. 48A shows the cargo bay center rack 360 installed on both sides of the cargo bay center division 358 and the middle division rack 363a, 363b, and 363c installed on both sides of the middle division 362 in greater magnification to enable the visualization of the frustum shaped teeth 122 and a smooth, seamless rack interface 371 between the cargo bay center rack 360 and the middle division rack 363a, 363b, and 363c.

The middle division rack 363a, 363b, and 363c has three branches, the horizontal branch 363a that interfaces with the cargo bay center rack 360 and two vertical branches 363b, and 363c at the correct distance to match the distance between a pair of tapered teeth gears 214 on one face of the autonomous mobile lift robot 349.

The upper shelves 365a, 365b installed on both sides of the cargo bay center division 358, the left door lock bar 369a, and a short portion of the cargo bay side rack 361 are also visible.

FIG. 49 shows the fast loading truck 353 being loaded with several loaded autonomous mobile lift robots 351a, through 351x that climb the rack structure on the right door 356, the left door 357, and the middle division 362 and continue into the rack structure in the cargo bay 355. The right door lock bars 368a and 368b and the left door lock bars 369a and 369b hold the right door 356, the left door 357, and the middle division 362 at the proper distance and keep the rack structure accessible to the loaded autonomous mobile lift robots.

The loaded autonomous mobile lift robots 351a, through 351x coming from the truck loading bay 367 climb the rack structure and move inside the cargo bay 355 in pairs one after the other at both sides of the middle division 362 and move forward towards the front of the cargo bay 355 to make space for the subsequent pair of loaded autonomous mobile lift robots. This strategy allows for the loading of the entire first level of the fast loading truck 353 in one step.

FIG. 49 shows the last loaded autonomous mobile lift robots 351w, and 351x about to start climbing the rack structure on the right door 356, the left door 357, and the middle division 362 while the other loaded autonomous mobile lift robots 351a, through 351v that are already inside the cargo bay 355 are moving towards the front of the cargo bay 355.

Once all the loaded autonomous mobile lift robots 351a, through 351x are inside the cargo bay 355, the loaded autonomous mobile lift robots 351a, through 351x lower their pantographic lift platforms 178 deposit their half size pallets 352 in the corresponding upper shelves 365a and the loaded autonomous mobile lift robots 351a, through 351x leave, with the last pair of loaded autonomous mobile lift robots 351w, and 351x that went in being the first pair to leave until all loaded autonomous mobile lift robots 351a, through 351x have left.

FIG. 50 shows the fast loading truck 353 with a loaded upper level 372 being loaded at the ground level with several loaded autonomous mobile lift robots 351a, through 351d that run from the truck loading bay 367 directly into the cargo bay 355 using the truck floor 370.

To avoid unnecessary clutter, only four loaded autonomous mobile lift robots 351a, through 351d have been drawn, but as seen in FIG. 49, the exact number of loaded autonomous mobile lift robots necessary to load the entire ground level of the fast loading truck 353 may be used, entering the cargo bay 355 in pairs until they reach the front of the cargo bay 355, then lower their pantographic lift platforms 178 to deposit their half size pallets 352 in the corresponding lower shelves 364a and leave, with the last pair of loaded autonomous mobile lift robots that went in being the first pair to leave until all loaded autonomous mobile lift robots have left. Alternatively, all or some of the loaded autonomous mobile lift robots 351 may remain on the fast loading truck 353 for deployment and delivery of each of the half size pallets 352. Through mapping and scheduling, the loaded autonomous mobile lift robots 351 may load the fast loading truck 353 in the proper order with each of the half size pallets 352 having the proper goods for delivery to each mapped location along the designated route of the fast loading truck 353. Depending on the height of the fast loading truck 353 and the height of the pallets, additional levels may be needed, and the rack structure is made accordingly.

Second Embodiment

FIG. 51 shows a first set of parts used to construct a second embodiment of the advanced warehouse of the present invention including some parts used in the first embodiment for completion and to facilitate the understanding.

The base 106 consisting of a round circle with one centered, square guide pin 107a in the center is used to provide support and stability for the structure. For added stability, the base 106 may be fixated to a floor by adequate fixation bolts (not shown).

A base short pole 373 consisting of an adequate, relatively short length of a square profile with one centered, square guide pin notch 108a at the bottom and one centered, square guide pin 107b at the top is designed to be placed on top of the base 106 by means of fitting the guide pin notch 108a of the base short pole 373 into the guide pin 107a of the base 106.

The base short pole 373 provides support at a short distance to ground level for other components of the structure of the advanced warehouse of the present invention by means of a set of four shelf supports 374a, with each shelf support 374a fitted with a shelf support fixation bolt 375a at the middle.

A base short traction pole 376 consisting of an adequate, relatively short length of a square profile with one centered, square guide pin notch 108b at the bottom and one centered, square guide pin 107c at the top is designed to be placed on top of the base 106 by means of fitting the guide pin notch 108b of the base short traction pole 376 into the guide pin 107a of the base 106.

The base short traction pole 376 provides support at a short distance to ground level for other components of the structure of the advanced warehouse of the present invention by means of three shelf supports 374e, with each shelf support 374e fitted with one shelf support fixation bolt 375e at the middle.

The base short traction pole 376 has a set of straight flat teeth 377a on the fourth side that covers the entire side from bottom to top and the length of the base short traction pole 376 and the straight flat teeth 377a is adjusted in such a way that the length of an integer number of straight flat teeth 377a corresponds to the length of the base short traction pole 376 providing a smooth and seamless transition from the straight flat teeth 377a on the base short traction pole 376 and subsequent straight flat teeth 377 of other rack pieces placed on top of the base short traction pole 376.

An one quarter size pole 378 consisting of an adequate length of a square profile with one centered, square guide pin notch 108c at the bottom and one centered, square guide pin 107d at the top is designed to be placed on top of other rack pieces by means of fitting the guide pin notch 108c of the one quarter size pole 378 into the guide pin 107 of the other pole beneath.

The one quarter size pole 378 provides support for other components of the structure of the advanced warehouse of the present invention by means of three sets separated by regular intervals of four shelf supports 374h, with each shelf support 374h fitted with one shelf support fixation bolt 375h at the middle.

An one quarter size traction pole 379 consisting of an adequate length of a square profile with one centered, square guide pin notch 108d at the bottom and one centered, square guide pin 107e at the top is designed to be placed on top of other racks by means of fitting the guide pin notch 108d of the one quarter size traction pole 379 into the guide pin 107 of the other rack beneath.

The one quarter size traction pole 379 provides support for other components of the structure of the advanced warehouse of the present invention by means of three sets separated by regular intervals of three shelf supports 374m, with each shelf support 374m fitted with one shelf support fixation bolt 375m at the middle.

The one quarter size traction pole 379 has straight flat teeth 377b on the fourth side that covers the entire side from bottom to top and the length of the one quarter size traction pole 379 and the straight flat teeth 377b is adjusted in such a way that the length of an integer number of straight flat teeth 377b corresponds to the length of the one quarter size traction pole 379 providing a smooth and seamless transition from the straight flat teeth 377b on the one quarter size traction pole 379 and subsequent straight flat teeth 377 of other rack pieces placed on top of the one quarter size traction pole 379.

Other pole parts and traction pole parts are also foreseen as a means to provide a flexible set of parts to construct an advanced warehouse suitable to store different items with different heights.

The poles and traction poles of the different heights are hence forth also called rack pieces.

Rack pieces such as the one third size pole 380, the half size pole 382, and the full size pole 384 are constructed with the same features as the base short pole 373 and the one quarter size pole 378, the only difference being the length of the pole and the number of shelf supports 374 fitted with shelf support fixation bolts 375. As the length of the rack pieces increases so does the number of shelf supports 374 fitted with shelf support fixation bolts 375 as they are fitted at the same fixed regular intervals. So the one third size pole 380 has four sets of shelf supports 374 fitted with shelf support fixation bolts 375, the half size pole 382 has six sets of shelf supports 374 fitted with shelf support fixation bolts 375 and the full size pole 384 has twelve sets of shelf supports 374 fitted with shelf support fixation bolts 375.

Depending on the specific needs and dimensions of pallets and/or containers, other variations of intervals and number of sets can be made.

An one third size traction pole 381, a half size traction pole 383, and a full size traction pole 385 are constructed with the same features as the base short traction pole 376 and the one quarter size traction pole 379, the only difference being the length of the rack piece and the number of shelf supports 374 fitted with shelf support fixation bolts 375. As the length of the rack piece increases so does the number of shelf supports 374 fitted with shelf support fixation bolts 375 as they are fitted at the same fixed regular intervals and the length of the straight flat teeth 377b is adjusted in such a way that the length is an integer number of straight flat teeth 377b corresponding to the length of the rack piece to provide a smooth transition of the straight flat teeth 377b from one rack piece to the next rack piece. So the one third size traction pole 381 has four sets of shelf supports 374 fitted with shelf support fixation bolts 375, the half size traction pole 383 has six sets of shelf supports 374 fitted with shelf support fixation bolts 375 and the full size traction pole 385 has twelve sets of shelf supports 374 fitted with shelf support fixation bolts 375. Depending on the specific needs and dimensions of pallets and/or containers, other variations of intervals and number of sets can be made.

FIG. 52 shows a second set of parts used to construct a second embodiment of the advanced warehouse of the present invention.

A ground level wider shelf 386 has a single flat surface with a 45 degree cut and a shelf insertion hole 387a at each corner to match the shape of the shelf supports 374 fitted with shelf support fixation bolts 375 in the poles and racks. The ground level wider shelf 386 also has a wider shelf access opening 388a in the center that produces a wide C shape form that has the base longer then the arms.

An upper levels wider shelf 389 is made of three components: an upper levels wider shelf sliding base 390, an upper levels wider shelf rim 392, and a pair of upper levels wider shelf slides 394 (see detail FIG. 52A).

The upper levels wider shelf sliding base 390 is a wide C shaped structure with the same shape as the inner part of the ground level wider shelf 386, that can be obtained removing the material from the ground level wider shelf 386 that lies outside imaginary lines connecting the inner edges of the 45 degree corners of the ground level wider shelf 386. The other features of the upper levels wider shelf sliding base 390 are the wider shelf access opening 388b at the center and a pair of upper levels wider shelf sliding base rails 391 at both sides (see detail FIG. 52A).

The upper levels wider shelf rim 392 is a narrow C shaped structure with the same shape as the outer part of the ground level wider shelf 386, that can be obtained removing the material from the ground level wider shelf 386 that lies inside imaginary lines connecting the inner edges of the 45 degree corners of the ground level wider shelf 386. The other features of the upper levels wider shelf rim 392 are one shelf insertion hole 387f at each corner and a pair of upper levels wider shelf rim rails 393 at both sides (see detail FIG. 52A).

A ground level longer shelf 395 has a single flat surface with a 45 degree cut and shelf insertion holes 387k at each corner to match the shape of the shelf supports 374 fitted with shelf support fixation bolts 375 in the poles and racks. The ground level longer shelf 395 also has a longer shelf access opening 396a in the center that produces a long C shape form that has the arms along the sides of the longer shelf access opening 396a that are longer than the base along the end of the longer shelf access opening 396a.

An upper levels longer shelf 397 is made of three components: an upper levels longer shelf sliding base 398, an upper levels longer shelf rim 400, and a pair of upper levels wider shelf slides 402 (see detail FIG. 52A).

The upper levels longer shelf sliding base 398 is a C shaped structure with the same shape as the inner part of the ground level longer shelf 395, that can be obtained removing the material from the ground level longer shelf 395 that lies outside imaginary lines connecting the inner edges of the 45 degree corners of the ground level longer shelf 395. The other features of the upper levels longer shelf sliding base 398 are the longer shelf access opening 396*b* at the center and a pair of upper levels longer shelf sliding base rails 399 at both sides (see detail FIG. 52B).

The upper levels longer shelf rim 400 is a C shaped structure with the same shape as the outer part of the ground level longer shelf 395, that can be obtained removing the material from the ground level longer shelf 395 that lies inside imaginary lines connecting the inner edges of the 45 degree corners of the ground level longer shelf 395. The other features of the upper levels longer shelf rim 400 are one shelf insertion hole 387*n* at each corner and a pair of upper levels longer shelf rim rails 401 at both sides (see detail FIG. 52B).

Detail FIG. 52A shows the interface between the upper levels wider shelf sliding base 390 and the upper levels wider shelf rim 392 in greater magnification to display additional detail.

The upper levels wider shelf slide 394 slides between the upper levels wider shelf sliding base rail 391 at the edge of the upper levels wider shelf sliding base 390 and the upper levels wider shelf rim rail 393 at the edge of the upper levels wider shelf rim 392 because ball bearings of adequate size that fit inside the semicircular rails at the edges of the upper levels wider shelf sliding base rail 391, the upper levels wider shelf rim rail 393, and the upper levels wider shelf slide 394 are in place. As a result, the upper levels wider shelf slide 394 moves at half the pace as the upper levels wider shelf sliding base 390 moves in relation to the upper levels wider shelf rim 392 providing support for the upper levels wider shelf sliding base 390 as it moves.

The shelf insertion hole 387*e* at the corner of the upper levels wider shelf rim 392 is also visible.

Detail FIG. 52B shows the interface between the upper levels longer shelf sliding base 398 and the upper levels longer shelf rim 400 in greater magnification to display additional detail.

The upper levels wider shelf slide 402 slides between the upper levels longer shelf sliding base rail 399 at the edge of the upper levels longer shelf sliding base 398 and the upper levels longer shelf rim rail 401 at the edge of the upper levels longer shelf rim 400 because ball bearings of adequate size that fit inside the semicircular rails at the edges of the upper levels longer shelf sliding base rail 399, the upper levels longer shelf rim rail 401, and the upper levels wider shelf slide 402 are in place. As a result, the upper levels wider shelf slide 402 moves at half the pace as the upper levels longer shelf sliding base 398 moves in relation to the upper levels longer shelf rim 400 providing support for the upper levels longer shelf sliding base 398 as it moves.

The shelf insertion hole 387*m* at the corner of the upper levels longer shelf rim 400 is also visible.

FIG. 53 shows the first step of an improved warehouse being assembled 403. One array of bases 106*a*, 106*b*, 106*c*, etc. with the bases 106*a*, 106*b*, 106*c* placed at the adequate distance from each other in the X and Y direction, is constructed.

On top of each base 106 either one base short pole 373 or one base short traction pole 376*a* is installed according to the pattern shown in FIG. 53. At regular intervals, four base short traction pole 376*a*, 376*b*, 376*c*, and 376*d*, etc. are placed with the face containing the straight flat teeth 377 facing each other towards the center, defining a cross-track access shaft 404*a*, 404*b*, etc. (see FIG. 54).

FIG. 54 the second step of the improved warehouse being assembled 403. One array of ground level wider shelves 386*a* and ground level longer shelves 395*a* each one at the adequate place is installed on top of the array of bases 106, base short poles 373, and base short traction poles 376 previously laid out (see FIG. 53).

All ground level wider shelves 386*a* are installed with their respective wider shelf access openings 388 oriented towards their respective cross-track access shaft 404*a*. Likewise, all ground level longer shelves 395*a* are installed with their respective longer shelf access opening 396 oriented towards their respective cross-track access shaft 404*a*.

At convenient places, some ground level wider shelves 386*x* and ground level longer shelves 395*x* (drawn in dash dotted lines) are not installed to create access paths to the cross-track access shafts 404*a*, 404*b*, etc. The number of ground level wider shelves 386*x* and ground level longer shelves 395*x* not installed at construction time may be increased or some installed may be removed later on to increase the number of access paths to the cross-track access shafts 404*a*, 404*b*, etc. up to the limit of removing all ground level wider shelves 386*x* and ground level longer shelves 395*x* from the structure for maximum access to the cross-track access shafts 404*a*, 404*b*, etc.

For clarity, the expression ground level is used to refer to shelves installed at a short distance to the ground floor, where the bases are placed. It counts as the first level in the structure and the terms ground level and first level are used with the same meaning and are interchangeable henceforth.

Detail FIG. 54A shows the ground level wider shelf 386*b* installed at one of the shelf supports 374*a* of the base short traction pole 376. The ground level wider shelf 386*b* is locked in place by means of inserting the shelf insertion hole 387*a* of the ground level wider shelf 386*b* into the shelf support fixation bolt 375*a* of the base short traction pole 376. A simple bolt nut (not drawn) may be used to fasten the ground level wider shelf 386*b* in place and provide additional stability to the structure.

Detail FIG. 54B shows the ground level longer shelf 395*b* installed at one of the shelf supports 374*b* of the base short poles 373. The ground level longer shelf 395*b* is locked in place by means of inserting the shelf insertion hole 387*b* of the ground level longer shelf 395*b* into the shelf support fixation bolt 375*b* of the base short traction pole 376. A simple bolt nut (not drawn) may be used to fasten the ground level longer shelf 395*b* in place and provide additional stability to the structure.

FIG. 55 shows a top view of the improved warehouse being assembled 403 to better display the access paths to the cross-track access shafts 404*a*, 404*b*, etc. One ground level wider shelf 386 and one ground level longer shelf 395 are indicated to illustrate their difference in shape and how they fit in the structure, with one side of one shelf matching the base of the other shelf and vice versa.

FIG. 56 shows the improved warehouse being assembled 403 fully loaded with all shelves installed at ground level occupied by a full size container 405.

FIG. 57 shows an isometric view of an improved two level nine cell warehouse 406. An improved warehouse structure 407 of the improved two level nine cell warehouse

406 is constructed containing one array of ground level wider shelves 386 and ground level longer shelves 395 that are installed only at ground level and one array of upper levels wider shelves 389 and upper levels longer shelves 397 that are installed at all other levels above ground level.

Differently from the ground level where some ground level wider shelves 386 and ground level longer shelves 395 are not installed, at subsequent levels all upper levels wider shelves 389 and all upper levels longer shelves 397 are installed to maximize available storage space.

The improved warehouse structure 407 also contains bases 106, base short poles 373, and base short traction poles 376 at the adequate locations between the ground floor and the ground level or first level.

To ensure that any item can be taken into and removed from the improved warehouse through the access paths (see FIG. 55), full size poles 384 and full size traction poles 385 are used at the adequate locations between the ground level or first level and the second level. Subsequent levels of the warehouse may be constructed using rack pieces of shorter sizes but the distance between the first level and the second level must be equal or greater than the longest distance between any subsequent levels in the rest of the improved warehouse.

FIG. 58 shows an isometric view of another example with an improved six level nine cell warehouse 408. The improved warehouse structure 407 of the improved six level nine cell warehouse 408 is constructed containing one array of ground level wider shelves 386 and ground level longer shelves 395 that are installed only at ground level and one array of upper levels wider shelves 389 and upper levels longer shelves 397 that are installed at all other levels above the ground level.

FIG. 59 shows an isometric view of the improved six level nine cell warehouse 408 fully loaded with various items that can be stored in the improved warehouse structure 407 at their intended levels.

In the example of FIG. 59 the full size containers 405 occupy the first and the second levels. An array of half size pallets 409 occupies the third level, an array of third size boxes 410 occupies the fourth level, an array of quarter size boxes 411 occupies the fifth level and an array of full size pallets 412 occupies the sixth and last level.

FIG. 60 shows a front view of the improved six level nine cell warehouse 408 with one or two of the various items that can be stored in the improved warehouse structure 407 at their intended levels for a better view of the relative sizes and storage possibilities that the design of the improved warehouse of the present invention offers.

The full size containers 405a and 405b occupy the first and the second levels that are constructed using full size poles 384 and full size traction poles 385. Because the full size container 405 is the tallest item, any other item could be stored in the first and second levels in a position replacing one full size container 405 such as the full size pallet 412a albeit wasting some storage space. As a general rule, any item can be stored in a level not originally intended to store such item provided that the item height is less than the available heigh at the level it is intended to be stored.

The half size pallet 409 occupies the third level that is constructed using half size poles 382 and half size traction poles 383. The third size box 410 occupies the fourth level that is constructed using one third size poles 380 and one third size traction poles 381. The quarter size box 411 occupies the fifth level that is constructed using one quarter size poles 378 the one quarter size traction poles 379, and the full size pallet 412b occupies the sixth and last level.

FIG. 61 shows a top view of the improved six level nine cell warehouse 408 fully loaded, with full size pallets 412 at the top to display the accessibility of all the stored items through the various cross-track access shafts 404a, 404b, etc. Any item is accessible by one and only one cross-track access shaft 404 and each cross-track access shaft 404 enables access to four stored items on a particular level.

FIG. 62 shows an isometric exploded view of components used to construct a further embodiment of a pantographic lift assembly 413 (see FIG. 71).

A taller pantographic lift platform 414 has the shape of a parallelogram that is hollow and does not have the face at the bottom. The taller pantographic lift platform 414 has one platform fixed axis holes 179 located near the top face, parallel to the top face that goes all the way through from one side to the other side of the taller pantographic lift platform 414. The taller pantographic lift platform 414 also has one platform moving axis slot 180 that is parallel to the top face and is located at the same distance of the top face of the taller pantographic lift platform 414 as the platform fixed axis hole 179 and goes all the way through from one side to the other side of the taller pantographic lift platform 414.

The pantographic bar 181a is composed of a straight bar with one pair of outer axis holes 182a, 182b one at each end of the bar and one center axis hole 183 located at the center of the bar. Four pantographic bars 181a, 181b, etc. are required to build the pantographic lift. Two groups of two pantographic bars 181a, and 181b are installed linked at the middle forming a "X", one group at each side of the taller pantographic lift platform 414 (see FIG. 71).

The top axis 184a is a simple rod with the same width as the outer wall of the pantographic lift platform 178. Two top axis 184a, and 184b are required to build the pantographic lift, one installed at platform fixed axis hole 179 that remains fixed and another installed at the platform moving axis slot 180 that is able to slide the length of the platform moving axis slot 180.

The outer axis holes 182a of the pantographic bars 181 are inserted into the two top axis 184a, and 184b before the top axis 184a, and 184b are fully inserted into their corresponding places of installation. Matching sides of the top arms of the two "X" shapes constructed with the four pantographic bars 181a, and 181b, etc. are inserted at each top axis 184 so that each top axis 184 is inserted into two pantographic bars 181, one from each "X" shape that are at the same side of the "X" shapes (see FIG. 71).

The center axis 185 is a simple rod with the width as the inner wall of the taller pantographic lift platform 414. The center axis 185 is installed connecting the center axis holes 183 of all the four pantographic bars 181 used to construct the pantographic lift and that are arranged in two "X" shapes, one "X" shape at each side of the taller pantographic lift platform 414 (see FIG. 71).

The bottom fixed axis 186 is a simple rod of suitable length that is installed at an anchoring point (see FIG. 71).

The bottom moving axis 187 is a simple rod with the same length of the bottom fixed axis 186 that has one bottom moving axis nut 188 at the center.

The pantographic motor 189 with one pantographic motor axis 190 of suitable length that has a thread with the same gage as the bottom moving axis nut 188 is used to engage the bottom moving axis nut 188 and move the bottom moving axis 187 closer or further away from the pantographic motor 189. Embodiments of the present invention comprise suitable electronics are provided within the scope of the present invention to establish connection to one or more digital devices such as computers, laptops, cellphones, tablets or other, may be connected wirelessly, using Wi-Fi, Bluetooth, cellular, radio-frequency, and other bandwidths for communication to have the one or more digital devices control the pantographic motor 189 to direct operation and movement or for scheduling of operations using one or more software applications.

FIG. 63 shows an exploded view of one embodiment of a short wheel assembly 415. The short wheel assembly 415 is composed of one pair of wheels 192 that are connected by the wheel axis 193 that is supported by the wheel support 195 that has one pair of wheel support axis holes 196 that matches the wheel axis 193.

One pair of wheel driving bevels 194a, and 194b with the first wheel driving bevel 194a placed at the wheel axis 193 to drive the wheel axis 193 and the second wheel driving bevel 194b placed at a 90 degrees angle to the first wheel driving bevel 194a is used to drive the wheels 192.

The wheel support 195 is attached to the wheel directional gear 197 that has one wheel directional gear center passage 198. The wheel directional gear 197 is able to rotate altering the orientation of the wheel support 195 and as a consequence of the wheels 192 by means of the wheel directional worm 199 that is fixed to the wheel directional motor shaft 201 of the wheel directional motor 200.

The wheel driving motor 202 is fitted with a short wheel driving axle 416 of suitable length that passes through the wheel directional gear center passage 198 and reaches the wheel driving bevel 194b. The wheel driving bevel 194a is fixated to the short wheel driving axle 416 so when the wheel driving motor 202 drives the short wheel driving axle 416 the movement is transferred to the wheels 192.

FIG. 64 shows a vertical sliding gear assembly 417 composed by a pair of vertical sliding gear support rails 418a, and 418b; a vertical sliding gear support 424; a vertical sliding gear support actuator 433; a hollow gear drive motor 437; and a hollow flat gear 440.

The vertical sliding gear support rail 418a, 418b has a flat base of oval shape with a pair of vertical sliding gear support rail cut edges 419 at one extremity, a pair of vertical sliding gear support rail front insertion holes 420a, and 420b near the edges of the vertical sliding gear support rail 418a, 418b at about two thirds of the length of the vertical sliding gear support rail 418a, 418b and a vertical sliding gear support rail rear insertion hole 421 at the center near one extremity of the vertical sliding gear support rail 418a, 418b.

The vertical sliding gear support rail 418a, 418b also has a vertical sliding gear support rail guide slot 422 at the center that spans about two thirds of the length of the vertical sliding gear support rail 418a, 418b and a set of vertical sliding gear support rail fixation holes 423 around the edges for fixation to its installation location.

The vertical sliding gear support 424 is composed of a vertical sliding gear support holder 425 and a set of two vertical sliding gear support cross bars 426a, 426b. Each vertical sliding gear support cross bar 426a, 426b has a vertical sliding gear support front pin 427a, and 427b respectively and a vertical sliding gear support rear pin 428a, and 428b respectively. The vertical sliding gear support holder 425 has a set of vertical sliding gear support gear motor fixation holes 429 at one side and a vertical sliding gear support gear axle insertion hole 430 at the other side. A vertical sliding gear support control rod 431 is attached to the back of the vertical sliding gear support 424 at the opposite side of the vertical sliding gear support holder 425 slightly offset towards the top of the vertical sliding gear support 424.

The vertical sliding gear support control rod 431 terminates in a vertical sliding gear support control rod stopper 432 that is bolted to the vertical sliding gear support control rod 431.

The vertical sliding gear support actuator 433 is composed of a body in the shape of a cylinder with a vertical sliding gear support actuator central hole 434, a pair of vertical sliding gear support actuator front pins 435a, 435b, 435c, and 435d and a vertical sliding gear support actuator rear pin 436a, 436b that extend for both sides of the vertical sliding gear support actuator 433.

To match the offset towards the top that the vertical sliding gear support control rod 431 of the vertical sliding gear support 424 has, the portion of the vertical sliding gear support actuator front pins 435a, 435b below the body of the vertical sliding gear support actuator 433 is slightly longer than the portion of the vertical sliding gear support actuator front pins 435c, 435d above the body of the vertical sliding gear support actuator 433. Likewise, the portion of the vertical sliding gear support actuator rear pin 436a below the body of the vertical sliding gear support actuator 433 is slightly longer than the portion of the vertical sliding gear support actuator rear pin 436b above the body of the vertical sliding gear support actuator 433.

The vertical sliding gear support control rod 431 is inserted into the vertical sliding gear support actuator central hole 434 of the vertical sliding gear support actuator 433 and the vertical sliding gear support control rod stopper 432 is attached to the extremity of the vertical sliding gear support control rod 431 to lock it inside the vertical sliding gear support actuator 433.

The vertical sliding gear support front pin 427a and the vertical sliding gear support rear pin 428a are inserted into the vertical sliding gear support rail guide slot 422, the vertical sliding gear support actuator front pins 435a, 435b are inserted into the respective vertical sliding gear support rail front insertion holes 420a, 420b and the vertical sliding gear support actuator rear pin 436a is inserted into the vertical sliding gear support rail rear insertion hole 421 of the vertical sliding gear support rail 418a that is placed below.

Likewise the vertical sliding gear support front pin 427b and the vertical sliding gear support rear pin 428b are inserted into the vertical sliding gear support rail guide slot 422, the vertical sliding gear support actuator front pins 435c, 435d are inserted into the respective vertical sliding gear support rail front insertion holes 420a, 420b and the vertical sliding gear support actuator rear pin 436b is inserted into the vertical sliding gear support rail rear insertion hole 421 of a second vertical sliding gear support rail 418b that is placed above.

The hollow gear drive motor 437 has the shape of a short cylinder with a set of hollow gear drive motor fixation holes 438 at one side and a hollow gear drive motor main axis 439 at the other side.

The hollow flat gear 440 has a short hollow flat gear outer shaft 441 extending from the center of the solid side of the hollow flat gear 440 and a hollow flat gear inner shaft 442 at the opposite side, where the hollow flat gear 440 has a hollow flat gear cavity 443 of an appropriate size to contain the hollow gear drive motor 437. The hollow flat gear inner shaft 442 has a length shorter than the thickness of the hollow flat gear 440 so that the hollow flat gear inner shaft 442 is inserted into the hollow gear drive motor main axis 439, the hollow gear drive motor 437 fits inside the hollow tapered gear cavity 466. The hollow flat gear 440 has standard hollow flat gear straight teeth 444.

The hollow gear drive motor 437 is installed into the vertical sliding gear support 424 using bolts of appropriate size in the vertical sliding gear support gear motor fixation holes 429 and the hollow gear drive motor fixation holes 438. The hollow flat gear outer shaft 441 of the hollow flat gear 440 is inserted into the vertical sliding gear support gear axle insertion hole 430 of the vertical sliding gear support 424.

FIG. 65 shows a horizontal sliding gear assembly 445 composed of a pair of horizontal sliding gear support rails 446a, and 446b; a horizontal sliding gear support 451; a horizontal sliding gear support actuator 459; one hollow gear drive motor 437 and a hollow tapered gear 463.

The horizontal sliding gear support rail 446a, 446b is composed of a flat base of oval shape with a pair of horizontal sliding gear support rail front insertion holes 447a, and 447b near the edges of the horizontal sliding gear support rail 446a, 446b at about two thirds of the length of the horizontal sliding gear support rail 446a, 446b and a horizontal sliding gear support rail rear insertion hole 448 at the center near one extremity of the horizontal sliding gear support rail 446a, 446b.

The horizontal sliding gear support rail 446a, 446b also has a horizontal sliding gear support rail guide slot 449 at the center that spans about two thirds of the length of the horizontal sliding gear support rail 446a, 446b and a set of horizontal sliding gear support rail fixation holes 450 around the edges for fixation to its installation location.

The horizontal sliding gear support 451 is composed of a horizontal sliding gear support holder 452 that has a set of two horizontal sliding gear support front pins 453a, and 453b and a set of two horizontal sliding gear support rear pins 454a, and 454b. The horizontal sliding gear support holder 452 also has a set of horizontal sliding gear support motor fixation holes 455 at the bottom, a horizontal sliding gear support gear axle insertion hole 456 at the top and a horizontal sliding gear support control rod 457 attached to the back slightly offset towards the bottom of the horizontal sliding gear support holder 452.

The horizontal sliding gear support control rod 457 terminates in a horizontal sliding gear support control rod stopper 458 that is bolted to the horizontal sliding gear support control rod 457.

The horizontal sliding gear support actuator 459 is composed of a body in the shape of a cylinder with a horizontal sliding gear support actuator hollow shaft 460, a pair of horizontal sliding gear support actuator front pins 461a, 461b, 461c, and 461d and a horizontal sliding gear support actuator rear pin 462a, 462b that extend for both sides of the horizontal sliding gear support actuator 459.

To match the offset towards the bottom that the horizontal sliding gear support control rod 457 of the horizontal sliding gear support 451 has, the portion of the horizontal sliding gear support actuator front pins 461a, 461b below the body of the horizontal sliding gear support actuator 459 is slightly shorter than the portion of the horizontal sliding gear support actuator front pins 461c, 461d above the body of the horizontal sliding gear support actuator 459. Likewise, the portion of the horizontal sliding gear support actuator rear pin 462a below the body of the horizontal sliding gear support actuator 459 is slightly shorter than the portion of the horizontal sliding gear support actuator rear pin 462b above the body of the horizontal sliding gear support actuator 459.

The horizontal sliding gear support control rod 457 is inserted into the horizontal sliding gear support actuator hollow shaft 460 of the horizontal sliding gear support actuator 459 and the horizontal sliding gear support control rod stopper 458 is attached to the extremity of the horizontal sliding gear support control rod 457 to lock it inside the horizontal sliding gear support actuator 459.

The horizontal sliding gear support front pin 453a and the horizontal sliding gear support rear pin 454a are inserted into the horizontal sliding gear support rail guide slot 449, the horizontal sliding gear support actuator front pins 461a, 461b are inserted into the respective horizontal sliding gear support rail front insertion holes 447a, and 447b and the horizontal sliding gear support actuator rear pin 462a is inserted into the horizontal sliding gear support rail rear insertion hole 448 of the horizontal sliding gear support rail 446a that is placed below.

Likewise the horizontal sliding gear support front pin 453b and the horizontal sliding gear support rear pin 454b are inserted into the horizontal sliding gear support rail guide slot 449, the horizontal sliding gear support actuator front pins 461c, 461d are inserted into the respective horizontal sliding gear support rail front insertion holes 447a, and 447b and the horizontal sliding gear support actuator rear pin 462b is inserted into the horizontal sliding gear support rail rear insertion hole 448 of a second horizontal sliding gear support rail 446b that is placed above.

The hollow gear drive motor 437 has the shape of a short cylinder with one set of hollow gear drive motor fixation holes 438 at one side and one hollow gear drive motor main axis 439 at the other side.

The hollow tapered gear 463 is a straight teeth gear that has a short hollow tapered gear outer shaft 464 extending from the center of the solid side of the hollow tapered gear 463 and a hollow tapered gear inner shaft 465 at the opposite side, where the hollow tapered gear 463 has a hollow tapered gear cavity 466 of an appropriate size to contain the hollow gear drive motor 437. The hollow tapered gear inner shaft 465 has a length shorter than the thickness of the hollow tapered gear 463 so that the hollow tapered gear inner shaft 465 is inserted into the hollow gear drive motor main axis 439, the hollow gear drive motor 437 fits inside the hollow tapered gear cavity 466.

The hollow tapered gear 463 is made with tapered teeth 215 to facilitate the sliding of the hollow tapered gear 463 in a linear direction parallel to its axis with the tapered teeth 215 engaged in an appropriate frustum shaped teeth rack.

The hollow gear drive motor 437 is installed into the horizontal sliding gear support 451 using bolts of appropriate size in the horizontal sliding gear support motor fixation holes 455 and the hollow gear drive motor fixation holes 438. The hollow tapered gear outer shaft 464 of the hollow tapered gear 463 is inserted into the horizontal sliding gear support gear axle insertion hole 456 of the horizontal sliding gear support 451.

Detail FIG. 65A shows the tapered teeth 215 of the hollow tapered gear 463 in greater magnification to display the tapered teeth edge face 216 of the tapered teeth 215.

FIG. 66 shows a vertical pivoting gear assembly 467 composed of a pivoting support plate 468; one vertical sliding gear support 424; one vertical sliding gear support actuator 433; an angle control bevel 477; an angle control motor 479; and a mirrored vertical sliding gear pivoting support rail 481.

The pivoting support plate 468 is composed of a flat surface with a pivoting support plate center hole 469 that goes through the entire width of the pivoting support plate 468. The pivoting support plate center hole 469 is surrounded by a pivoting support plate center hole holder 470 that is a hole with a bigger diameter than the pivoting support plate center hole 469 that goes through only the top half of the width of the pivoting support plate 468.

A pivoting support plate angle guide slot 471 is a circular slot spanning a 45 degree arch that goes through the entire width of the pivoting support plate 468. The pivoting support plate angle guide slot 471 is surrounded by a pivoting support plate angle guide slot holder 472 that is a circular slot with bigger diameter and spanning the same 45 degree arch as the pivoting support plate angle guide slot 471 but that goes through only the top half of the width of the pivoting support plate 468.

The pivoting support plate 468 also has a pivoting support plate bevel gear 473 at one side spanning an arch of 55 degrees, with 5 degrees extra span for each side beyond the 45 degrees of the pivoting support plate angle guide slot 471 and the pivoting support plate angle guide slot holder 472.

The other features of the pivoting support plate 468 are a pair of pivoting support plate front insertion holes 474a, 474b, a pivoting support plate rear insertion hole 475 and a pivoting support plate guide slot 476 that have the same shape and dimensions as the vertical sliding gear support rail front insertion holes 420a, 420b, the vertical sliding gear support rail rear insertion hole 421, and the vertical sliding gear support rail guide slot 422 respectively.

The angle control bevel 477 is a bevel gear that engages the pivoting support plate bevel gear 473 to turn the pivoting support plate 468 around the pivoting support plate center hole 469 clockwise or counterclockwise until the total travel of 45 degrees allowed by the pivoting support plate angle guide slot 471 is reached.

The angle control bevel 477 has an angle control bevel center hole 478 that fits into an angle control motor shaft 480 driven by the angle control motor 479.

FIG. 66 also shows the vertical sliding gear support 424 that is composed by the vertical sliding gear support holder 425 and two vertical sliding gear support cross bars 426a, 426b. Each vertical sliding gear support cross bar 426a, 426b has one vertical sliding gear support front pin 427a, and 427b respectively and one vertical sliding gear support rear pin 428a, and 428b respectively. The vertical sliding gear support holder 425 has one set of vertical sliding gear support gear motor fixation holes 429 at one arm and one vertical sliding gear support gear axle insertion hole 430 at the other arm. The vertical sliding gear support control rod 431 is attached to the back of the vertical sliding gear support 424 at the opposite side of the vertical sliding gear support holder 425 slightly offset towards the top of the vertical sliding gear support 424.

The vertical sliding gear support control rod 431 terminates in the vertical sliding gear support control rod stopper 432 that is bolted to the vertical sliding gear support control rod 431.

The vertical sliding gear support actuator 433 is composed of a body in the shape of a cylinder with one vertical sliding gear support actuator central hole 434, one pair of vertical sliding gear support actuator front pins 435a, 435b, 435c, and 435d and one vertical sliding gear support actuator rear pin 436a, 436b that extend for both sides of the vertical sliding gear support actuator 433.

To match the offset towards the top that the vertical sliding gear support control rod 431 of the vertical sliding gear support 424 has, the portion of the vertical sliding gear support actuator front pins 435a, 435b below the body of the vertical sliding gear support actuator 433 is slightly longer than the portion of the vertical sliding gear support actuator front pins 435c, 435d above the body of the vertical sliding gear support actuator 433. Likewise, the portion of the vertical sliding gear support actuator rear pin 436a below the body of the vertical sliding gear support actuator 433 is slightly longer than the portion of the vertical sliding gear support actuator rear pin 436b above the body of the vertical sliding gear support actuator 433.

The vertical sliding gear support control rod 431 is inserted into the vertical sliding gear support actuator central hole 434 of the vertical sliding gear support actuator 433 and the vertical sliding gear support control rod stopper 432 is attached to the extremity of the vertical sliding gear support control rod 431 to lock it inside the vertical sliding gear support actuator 433.

The vertical sliding gear support front pin 427a and the vertical sliding gear support rear pin 428a are inserted into the pivoting support plate guide slot 476, the vertical sliding gear support actuator front pins 435a, 435b are inserted into the respective pivoting support plate front insertion holes 474a, 474b, and the vertical sliding gear support actuator rear pin 436a is inserted into the pivoting support plate rear insertion hole 475 of the pivoting support plate 468 that is placed below as drawn.

Likewise the vertical sliding gear support front pin 427b and the vertical sliding gear support rear pin 428b are inserted into the pivoting support plate guide slot 476, the vertical sliding gear support actuator front pins 435c, 435d are inserted into the respective pivoting support plate front insertion holes 474a, 474b, and the vertical sliding gear support actuator rear pin 436b is inserted into the pivoting support plate rear insertion hole 475 of the mirrored vertical sliding gear pivoting support rail 481 that is placed above. The mirrored vertical sliding gear pivoting support rail 481 is a mirror image of the pivoting support plate 468 and has the same features only inverted to be able to fit the assembly.

The positions of the pivoting support plate 468 and the mirrored vertical sliding gear pivoting support rail 481 are swapped to produce a mirrored version of the same assembly described above. The angle control bevel 477 is however only used to drive the pivoting rail at the bottom and where the positions are swapped, the angle control bevel 477. Drives the pivoting support plate bevel gear 473 of the mirrored vertical sliding gear pivoting support rail 481 (see FIG. 77 and FIG. 78).

FIG. 66 also shows the hollow gear drive motor 437 that has the shape of a short cylinder with one set of hollow gear drive motor fixation holes 438 at one side and one hollow gear drive motor main axis 439 at the other side.

The hollow tapered gear 463 is a straight teeth gear that has one short hollow tapered gear outer shaft 464 extending from the center of the solid side of the hollow tapered gear 463 and one hollow tapered gear inner shaft 465 at the opposite side, where the hollow tapered gear 463 has one hollow tapered gear cavity 466 of an appropriate size to contain the hollow gear drive motor 437. The hollow tapered gear inner shaft 465 has a length shorter than the thickness of the hollow tapered gear 463 so that the hollow tapered gear inner shaft 465 is inserted into the hollow gear drive motor main axis 439, the hollow gear drive motor 437 fits inside the hollow tapered gear cavity 466.

The hollow tapered gear 463 is made with tapered teeth 215 to facilitate the sliding of the hollow tapered gear 463 in a linear direction parallel to its axis with the tapered teeth 215 engaged in an appropriate tapered shaped teeth rack.

The hollow gear drive motor 437 is installed into the vertical sliding gear support 424 using bolts of appropriate size in the vertical sliding gear support gear motor fixation holes 429 and the hollow gear drive motor fixation holes 438. The hollow tapered gear outer shaft 464 of the hollow tapered gear 463 is inserted into the vertical sliding gear support gear axle insertion hole 430 of the vertical sliding gear support 424.

FIG. 67 shows a fixed gear assembly 482 composed of a fixed hollow gear drive motor support 483; a fixed hollow gear support 486; one hollow gear drive motor 437; and one hollow tapered gear 463.

The fixed hollow gear drive motor support 483 is a simple L shaped folded metal sheet with a set of fixed hollow gear drive motor support fixation holes 484 in one side and a set of fixed hollow gear drive motor support motor fixation holes 485 at the other.

The fixed hollow gear support 486 is a simple L shaped folded metal sheet with a set of fixed hollow gear support fixation holes 487 in one side and a fixed hollow gear support gear shaft insertion hole 488 at the other side.

The hollow gear drive motor 437 is installed into the fixed hollow gear drive motor support 483 using bolts of appropriate size in the fixed hollow gear drive motor support motor fixation holes 485 and the hollow gear drive motor fixation holes 438. The hollow tapered gear outer shaft 464 of the hollow tapered gear 463 is inserted into the fixed hollow gear support gear shaft insertion hole 488 of the fixed hollow gear support 486.

FIG. 68 shows the components used to build a roller positioning assembly 489. The roller positioning assembly 489 is composed of a roller positioning motor 490 that has a roller positioning motor center hole 491. A roller positioning screw 492 of adequate length with a roller positioning screw shaft 493 is installed into the roller positioning motor center hole 491 of the roller positioning motor 490.

A roller positioning device 494 is composed of a central body with a pair of roller positioning device arms 495a, 495b, one at each side. Each roller positioning device arm 495a, 495b, has a roller positioning device arm slot 496a, 496b. A roller positioning device nut 497 matching the roller positioning screw 492 is located at the middle of the central body of the roller positioning device 494.

A roller positioning motor support 498 is composed of a roller positioning motor support base 499 that has a roller positioning motor support hole 500 and a roller positioning motor support base guide pin 501a, 501b extending from both sides of the roller positioning motor support base 499. A pair of roller positioning motor support arms 502a, 502b extends from the roller positioning motor support 498 and terminates in a pair of roller positioning motor support arm guide pins 503a, 503b one at each side and with a void in the middle to accommodate the roller positioning device 494.

A set of roller positioning motor support motor fixation holes 504 provides the fixation points for a roller positioning driving motor 505 that has a short roller positioning driving motor shaft 506. A roller 507 with a roller center hole 508 is installed in the roller positioning driving motor shaft 506 and is directly driven by the roller positioning driving motor 505.

The roller positioning motor support arm guide pins 503a, 503b of the roller positioning motor support 498 are inserted into the corresponding roller positioning device arm slots 496a, 496b of the roller positioning device 494. As the roller positioning motor 490 turns the roller positioning screw 492, the roller positioning device nut 497 transforms the rotational movement of the roller positioning screw 492 into linear movement of the roller positioning device 494. The roller positioning device 494 transmits the linear movement to the roller positioning motor support 498 with the added degree of freedom of the vertical slide motion of the roller positioning motor support arm guide pins 503a, 503b in the corresponding roller positioning device arm slots 496a, 496b allowing the roller positioning motor support 498 to move in a direction at an angle with respect to the direction of movement of the roller positioning device 494.

FIG. 69 shows a robot lid 509 composed of a lid top 510 made of a flat rectangular surface with a set of four lid corner cuts 511 at the corners and a lid central opening 512 in the middle. The lid central opening 512 is surrounded by a pair of lid long walls 513 that extend to the full length and a pair of lid short walls 514 that are shorter in length allowing access to the lid central opening 512 from below.

FIG. 70 shows a standard robot case 515 composed of a hollow parallelogram with a robot case top 516 that has a robot case lid opening 517 in the same shape as the robot lid 509 (see FIG. 69).

Inside the bottom of the standard robot case 515 a pair of pantographic lift base long supports 518a, 518b each with a corresponding pantographic lift base long support slot 519a, 519a, a pair of pantographic lift base short supports 520a, 520a each with a corresponding pantographic lift base short support hole 521a, 521a, and a set of pantographic lift base motor fixation holes 522 provide the installation fixtures for the installation of the pantographic lift assembly 413.

The bottom moving axis 187 is installed into the pantographic lift base long support slots 519a, 519a of the pantographic lift base long supports 518a, 518b; the bottom fixed axis 186 is installed into the pantographic lift base short support holes 521a, 521a of the pantographic lift base short supports 520a, 520a; and the pantographic motor 189 is installed into the pantographic lift base motor fixation holes 522.

The standard robot case 515 also has a set of four robot case base wheel openings 523, a set of four wheel directional gear supports 524, each with a wheel directional gear support center hole 525, a set of four wheel driving motor supports 526, and a set of four wheel directional motor supports 527. Each of the four sets provides the installation fixtures for the installation of one short wheel assembly 415.

The wheel driving motor 202 is installed into the wheel driving motor support 526; the wheel directional motor 200 is installed into the wheel directional motor support 527 and the wheel directional gear support 524 provides support for the wheel directional gear 197 while the wheel directional gear support center hole 525 allows the short wheel driving axle 416 to go through the wheel directional gear support 524.

FIG. 71 shows a standard robot 528 composed of the standard robot case 515 and the robot lid 509 and all its internal components installed: the pantographic lift assembly 413 shown in the extended position and four short wheel assemblies 415.

In the pantographic lift assembly 413 raised position, the top axis 184 moves to the centermost extreme of the platform moving axis slot 180 in the taller pantographic lift platform 414 causing the pantographic bars 181 to raise the taller pantographic lift platform 414.

FIG. 72 shows a rack climbing robot case 529 that has all the basic features of the standard robot case 515 and is likewise composed of a hollow parallelogram with one robot case top 516 that has one robot case lid opening 517 in the same shape as the robot lid 509 (see FIG. 69).

Inside the bottom of the rack climbing robot case 529 one pair of pantographic lift base long supports 518a, 518b each with the corresponding pantographic lift base long support slot 519a, 519a, one pair of pantographic lift base short supports 520a, 520a each with the corresponding pantographic lift base short support hole 521a, 521a, and one set of pantographic lift base motor fixation holes 522 provide the installation fixtures for the installation of the pantographic lift assembly 413.

The bottom moving axis 187 is installed into the pantographic lift base long support slots 519a, 519a of the pantographic lift base long supports 518a, 518b; the bottom fixed axis 186 is installed into the pantographic lift base short support holes 521a, 521a of the pantographic lift base short supports 520a, 520a; and the pantographic motor 189 is installed into the pantographic lift base motor fixation holes 522.

The rack climbing robot case 529 also has one set of four robot case base wheel openings 523, one set of four wheel directional gear supports 524, each with one wheel directional gear support center hole 525, one set of four wheel driving motor supports 526, and one set of four wheel directional motor supports 527. Each of the four sets provides the installation fixtures for the installation of one short wheel assembly 415.

The wheel driving motor 202 is installed into the wheel driving motor support 526; the wheel directional motor 200 is installed into the wheel directional motor support 527 and the wheel directional gear support 524 provides support for the wheel directional gear 197 while the wheel directional gear support center hole 525 allows the short wheel driving axle 416 to go through the wheel directional gear support 524.

Additionally to the fixtures in common with the standard robot case 515, the rack climbing robot case 529 has a set of four vertical gear openings 530a, 530b, etc. and a set of two horizontal gear openings 531. Each gear opening has a pair of fixed support fixation holes 532a, 532b, etc. one at each side for fixation of one fixed hollow gear drive motor support 483 and one fixed hollow gear support 486 one at each side.

FIG. 73 shows a rack climbing robot 533 composed of the rack climbing robot case 529 and the robot lid 509 and all its internal components installed: the pantographic lift assembly 413 shown in the retracted position and four short wheel assemblies 415.

Additionally to the components in common with the standard robot 528, the rack climbing robot 533 has six fixed gear assemblies 482. Two hollow tapered gears 463a are mounted horizontally and four hollow tapered gears 463b are mounted vertically. Each hollow tapered gear 463 has one associated hollow gear drive motor 437 to drive it. The hollow tapered gears 463 are held in place by one fixed hollow gear support 486 and the hollow gear drive motor 437 are held in place by one fixed hollow gear drive motor support 483.

The rack climbing robot 533 can operate in racks constructed using frustum shaped teeth 122 used in the fast loading truck 353 and move in and out, up and down in rail rack shafts in buildings.

FIG. 74 shows a warehouse climbing robot case 534 that has all the basic features of the standard robot case 515 and is likewise composed of a hollow parallelogram with one robot case top 516 that has one robot case lid opening 517 in the same shape as the robot lid 509 (see FIG. 69).

Inside the bottom of the warehouse climbing robot case 534 one pair of pantographic lift base long supports 518 each with the corresponding pantographic lift base long support slot 519, one pair of pantographic lift base short supports 520 each with the corresponding pantographic lift base short support hole 521, and one set of pantographic lift base motor fixation holes 522 provide the installation fixtures for the installation of the pantographic lift assembly 413.

The bottom moving axis 187 is installed into the pantographic lift base long support slots 519 of the pantographic lift base long supports 518; the bottom fixed axis 186 is installed into the pantographic lift base short support holes 521 of the pantographic lift base short supports 520; and the pantographic motor 189 is installed into the pantographic lift base motor fixation holes 522.

The warehouse climbing robot case 534 also has four robot case base wheel openings 523, four wheel directional gear supports 524, each with one wheel directional gear support center hole 525, four wheel driving motor supports 526, and four wheel directional motor supports 527. Each set provides the installation fixtures for the installation of one short wheel assembly 415.

The wheel driving motor 202 is installed into the wheel driving motor support 526; the wheel directional motor 200 is installed into the wheel directional motor support 527 and the wheel directional gear support 524 provides support for the wheel directional gear 197 while the wheel directional gear support center hole 525 allows the short wheel driving axle 416 to go through the wheel directional gear support 524.

Additionally to the fixtures in common with the standard robot case 515, the warehouse climbing robot case 534 has a set of four robot case corner openings 535a, through 535d and a set of four roller assembly openings 538a, through 538d.

Aligned to each robot case corner opening 535, the warehouse climbing robot case 534 has a set of robot case vertical sliding gear support rail bottom fixation holes 536 and a set of robot case vertical sliding gear support rail top fixation holes 537 for fixation of two vertical sliding gear support rails 418 one at the top and the other at the bottom of the warehouse climbing robot case 534.

At the right side of each roller assembly opening 538, the warehouse climbing robot case 534 has a roller assembly support A 539 that has an inclined roller assembly support A slot 540 that begins near the bottom and terminates near the top of the warehouse climbing robot case 534. The roller assembly support A 539 also has a roller assembly support A cut 541 at the bottom of the warehouse climbing robot case 534.

At the left side of each roller assembly opening 538, the warehouse climbing robot case 534 has a roller assembly support B 542 that has an inclined roller assembly support B slot 543 that runs parallel to the roller assembly support A slot 540 in the roller assembly support A 539 and likewise begins near the bottom and terminates near the top of the warehouse climbing robot case 534. The roller assembly support B 542 also has a roller assembly support B motor support 544 at the top of the warehouse climbing robot case 534.

The roller positioning motor support 498 is installed in the warehouse climbing robot case 534 placing the roller positioning motor support base guide pin 501a, 501b and the roller positioning motor support arm guide pins 503a, 503b into the roller assembly support A slot 540 at the right side and into the roller assembly support B slot 543 at the left side. In that way, the roller positioning motor support 498 is able to move upwards when extending out of the warehouse climbing robot case 534 and downwards when retracting into the warehouse climbing robot case 534 according to the movement of the roller positioning device 494 (see FIG. 68 and detail FIG. 84A). The roller positioning motor 490 is installed at the roller assembly support B motor support 544.

FIG. 75 shows a warehouse climbing robot 545 composed of the warehouse climbing robot case 534 and the robot lid 509 and all its internal components installed: the pantographic lift assembly 413 shown in the retracted position and four short wheel assemblies 415.

Additionally to the components in common with the standard robot 528, the warehouse climbing robot 545 has four roller positioning assemblies 489, one assembly at each side of the warehouse climbing robot case 534 and four vertical sliding gear assemblies 417 each containing two vertical sliding gear support rails 418a, 418b, one vertical sliding gear support 424, one vertical sliding gear support actuator 433, one hollow flat gear 440, and one hollow gear drive motor 437, one assembly at each corner of the warehouse climbing robot case 534.

The roller positioning assembly 489 is shown in the retracted position with the roller positioning device 494 close to the roller positioning motor 490. The vertical sliding gear support 424 is shown in the extended position, with the vertical sliding gear support front pin 427 at the outer end of the vertical sliding gear support rail guide slot 422, the vertical sliding gear support control rod stopper 432 in contact with the vertical sliding gear support actuator 433 and the hollow flat gear 440 extending out of the corner of the warehouse climbing robot case 534.

FIG. 76 shows a dual climbing robot case 546 that has all the basic features of the standard robot case 515 and is likewise composed of a hollow parallelogram with one robot case top 516 that has one robot case lid opening 517 in the same shape as the robot lid 509 (see FIG. 69).

Inside the bottom of the dual climbing robot case 546 one pair of pantographic lift base long supports 518 each with the corresponding pantographic lift base long support slot 519, one pair of pantographic lift base short supports 520 each with the corresponding pantographic lift base short support hole 521, and one set of pantographic lift base motor fixation holes 522 provide the installation fixtures for the installation of the pantographic lift assembly 413.

The bottom moving axis 187 is installed into the pantographic lift base long support slots 519 of the pantographic lift base long supports 518; the bottom fixed axis 186 is installed into the pantographic lift base short support holes 521 of the pantographic lift base short supports 520; and the pantographic motor 189 is installed into the pantographic lift base motor fixation holes 522.

The dual climbing robot case 546 also has four robot case base wheel openings 523, four wheel directional gear supports 524, each with one wheel directional gear support center hole 525, four wheel driving motor supports 526, and four wheel directional motor supports 527. Each set provides the installation fixtures for the installation of one short wheel assembly 415.

The wheel driving motor 202 is installed into the wheel driving motor support 526; the wheel directional motor 200 is installed into the wheel directional motor support 527 and the wheel directional gear support 524 provides support for the wheel directional gear 197 while the wheel directional gear support center hole 525 allows the short wheel driving axle 416 to go through the wheel directional gear support 524.

Additionally to the fixtures in common with the standard robot case 515, the dual climbing robot case 546 has four robot case corner openings 535a through 535d, four roller assembly openings 538a through 538d, four vertical gear openings 530a, 530b, etc. and two horizontal gear openings 531.

At the right side of each roller assembly opening 538, the dual climbing robot case 546 has one roller assembly support A 539 that has one inclined roller assembly support A slot 540 that begins near the bottom and terminates near the top of the dual climbing robot case 546. The roller assembly support A 539 also has one roller assembly support A cut 541 at the bottom of the dual climbing robot case 546.

At the left side of each roller assembly opening 538, the dual climbing robot case 546 has one roller assembly support B 542 that has one inclined roller assembly support B slot 543 that runs parallel to the roller assembly support A slot 540 in the roller assembly support A 539 and likewise begins near the bottom and terminates near the top of the dual climbing robot case 546. The roller assembly support B 542 also has one roller assembly support B motor support 544 at the top of the dual climbing robot case 546.

The roller positioning motor support 498 is installed in the dual climbing robot case 546 placing the roller positioning motor support base guide pin 501a, 501b and the roller positioning motor support arm guide pins 503a, 503b into the roller assembly support A slot 540 at the right side and into the roller assembly support B slot 543 at the left side. In that way, the roller positioning motor support 498 is able to move upwards when extending out of the dual climbing robot case 546 and downwards when retracting into the dual climbing robot case 546 according to the movement of the roller positioning device 494 (see FIG. 68 and detail FIG. 84A). The roller positioning motor 490 is installed at the roller assembly support B motor support 544.

Next to each robot case corner opening 535, the dual climbing robot case 546 has a bottom central pivot 547 with a bottom central knob 548 and a bottom angle control pin 549 with a bottom angle control knob 550 on the bottom and a top central pivot 551 with a top central knob 552 and a top angle control pin 553 with a top angle control knob 554 on the top.

The bottom central pivot 547 works as a pivoting axis for the installation of the pivoting support plate center hole 469 of the pivoting support plate 468 or the mirrored vertical sliding gear pivoting support rail 481 on the bottom of the dual climbing robot case 546 depending on the corner of the dual climbing robot case 546 (see FIG. 77 and FIG. 78). The bottom central knob 548 fits the pivoting support plate center hole holder 470 and keeps the pivoting support plate 468 or the mirrored vertical sliding gear pivoting support rail 481 in place.

The bottom angle control pin 549 fits the pivoting support plate angle guide slot 471 and the bottom angle control knob 550 fits the pivoting support plate angle guide slot holder 472 holding the pivoting support plate 468 or the mirrored vertical sliding gear pivoting support rail 481 in place.

Likewise, the top central pivot 551 works as a pivoting axis for the installation of the pivoting support plate center hole 469 of the pivoting support plate 468 or the mirrored vertical sliding gear pivoting support rail 481 on the top of the dual climbing robot case 546 depending on the corner of the dual climbing robot case 546 (see FIG. 77 and FIG. 78). The top central knob 552 fits the pivoting support plate center hole holder 470 and keeps the pivoting support plate 468 or the mirrored vertical sliding gear pivoting support rail 481 in place.

The top angle control pin 553 fits the pivoting support plate angle guide slot 471 and the top angle control knob 554 fits the pivoting support plate angle guide slot holder 472 holding the pivoting support plate 468 or the mirrored vertical sliding gear pivoting support rail 481 in place.

Four sets of angle control motor fixation holes 555a, through 555d provide the fixtures for the installation of each angle control motor 479 at the bottom of the dual climbing robot case 546.

Aligned to the center of each horizontal gear openings 531, the dual climbing robot case 546 has a set of robot case horizontal sliding gear support rail bottom fixation holes 556 and a set of robot case horizontal sliding gear support rail top fixation holes 557 that provide the fixtures for the installation of two horizontal sliding gear support rails 446, one at the top and the other at the bottom of the dual climbing robot case 546.

FIG. 77 shows a dual climbing robot 558 in the warehouse climbing position. In the warehouse climbing position, the dual climbing robot 558 can operate in warehouses containing cross-track access shafts 404 constructed using straight flat teeth 377.

The dual climbing robot 558 is composed of the dual climbing robot case 546 and the robot lid 509 and all its internal components installed: the pantographic lift assembly 413 shown in the retracted position and four short wheel assemblies 415.

Additionally to the components in common with the standard robot 528, the dual climbing robot 558 has four roller positioning assemblies 489, one assembly at each side of the dual climbing robot case 546, four vertical pivoting gear assemblies 467; and four horizontal sliding gear assemblies 445.

Each vertical pivoting gear assembly 467 has one pivoting support plate 468 and one mirrored vertical sliding gear pivoting support rail 481, one angle control bevel 477, one angle control motor 479, one vertical sliding gear support 424, one vertical sliding gear support actuator 433, one hollow tapered gear 463*b*, and one hollow gear drive motor 437, one assembly at each corner of the dual climbing robot case 546. The pivoting support plate 468 and the mirrored vertical sliding gear pivoting support rail 481 alternate positions at the bottom or at the top of the dual climbing robot case 546 depending on the corner that the assembly is installed.

Each horizontal sliding gear assembly 445 has two horizontal sliding gear support rails 446, one horizontal sliding gear support 451, one horizontal sliding gear support actuator 459, one hollow tapered gear 463*a*, and one hollow gear drive motor 437, one assembly at the front and one at the back of the dual climbing robot case 546.

The roller positioning assembly 489 is shown in the retracted position.

The vertical pivoting gear assembly 467 is in the corner extended position, with the angle control bevel 477 at one end of the pivoting support plate bevel gear 473 rotating the pivoting support plate 468 and the mirrored vertical sliding gear pivoting support rail 481 to align the hollow tapered gear 463*b* to the robot case corner opening 535 at the corner of the dual climbing robot case 546. The vertical sliding gear support front pin 427 is at one end of the pivoting support plate angle guide slot 471, the vertical sliding gear support control rod stopper 432 is in contact with the vertical sliding gear support actuator 433 and the hollow tapered gear 463 is extending out of the robot case corner opening 535 at the corner of the dual climbing robot case 546.

The horizontal sliding gear assembly 445 is in the retracted position with the horizontal sliding gear support rear pin 454 at the end of the horizontal sliding gear support rail guide slot 449, the horizontal sliding gear support control rod 457 fully retracted and the horizontal sliding gear support control rod stopper 458 at the farthest from the horizontal sliding gear support actuator 459.

FIG. 78 shows the dual climbing robot 558 in the rack climbing position. In the rack climbing position, the dual climbing robot 558 can operate in racks constructed using frustum shaped teeth 122 used in the fast loading truck 353 and rail rack shafts in buildings.

The dual climbing robot 558 is composed of the dual climbing robot case 546 and the robot lid 509 and all its internal components installed: the pantographic lift assembly 413 shown in the retracted position and four short wheel assemblies 415.

Additionally to the components in common with the standard robot 528, the dual climbing robot 558 has four roller positioning assemblies 489, one assembly at each side of the dual climbing robot case 546, four vertical pivoting gear assemblies 467; and four horizontal sliding gear assemblies 445.

Each vertical pivoting gear assembly 467 has one pivoting support plate 468 and one mirrored vertical sliding gear pivoting support rail 481, one angle control bevel 477, one angle control motor 479, one vertical sliding gear support 424, one vertical sliding gear support actuator 433, one hollow tapered gear 463*b*, and one hollow gear drive motor 437, one assembly at each corner of the dual climbing robot case 546. The pivoting support plate 468 and the mirrored vertical sliding gear pivoting support rail 481 alternate positions at the bottom or at the top of the dual climbing robot case 546 depending on the corner that the assembly is installed.

Each horizontal sliding gear assembly 445 has two horizontal sliding gear support rails 446, one horizontal sliding gear support 451, one horizontal sliding gear support actuator 459, one hollow tapered gear 463*a*, and one hollow gear drive motor 437, one assembly at the front and one at the back of the dual climbing robot case 546.

The roller positioning assembly 489 is shown in the retracted position.

The vertical pivoting gear assembly 467 is in the center extended position, with the angle control bevel 477 at the end of the pivoting support plate bevel gear 473 rotating the pivoting support plate 468 and the mirrored vertical sliding gear pivoting support rail 481 to align the hollow tapered gear 463*b* to the vertical gear opening 530 at the side of the dual climbing robot case 546. The vertical sliding gear support front pin 427 is near one end of the pivoting support plate angle guide slot 471, the vertical sliding gear support control rod stopper 432 is close but not in contact with the vertical sliding gear support actuator 433 and the hollow tapered gear 463 is extending out of the vertical gear openings 530 at the corner of the dual climbing robot case 546.

The horizontal sliding gear assembly 445 is in the extended position with the horizontal sliding gear support front pin 453 at one end of the horizontal sliding gear support rail guide slot 449, the horizontal sliding gear support control rod 457 fully extended and the horizontal sliding gear support control rod stopper 458 in contact with the horizontal sliding gear support actuator 459.

In the center extended position, the hollow tapered gear 463*a* in the horizontal sliding gear support 451 and the hollow tapered gear 463*a* in the vertical sliding gear support 424 are aligned to work together in a frustum shaped teeth rack.

FIG. 79 shows an improved two level single cell warehouse 559 with one warehouse climbing robot 545 entering the cross-track access shaft 404.

The improved two level single cell warehouse 559 is assembled using twelve bases 106*a*, 106*b*, eight base short poles 373, four base short traction poles 376, eight full size poles 384, and four full size traction pole 385.

The structure of the improved two level single cell warehouse 559 also has at the ground level or first level one ground level wider shelf 386 and two ground level longer shelves 395. One ground level wider shelf 386 was not installed to allow an access route to the warehouse climbing robot 545. The improved two level single cell warehouse 559 can also be assembled using two ground level wider shelves 386 and one ground level longer shelf 395 creating an alternative access route to the warehouse climbing robot 545.

Completing the structure of the improved two level single cell warehouse 559 at the second level two upper levels wider shelves 389 and two upper levels longer shelves 397 are installed.

FIG. 80 shows a top view of the improved two level single cell warehouse 559 with the warehouse climbing robot 545 in the retracted position at the center of the cross-track access shaft 404.

The upper levels wider shelves 389 and the upper levels longer shelves 397 are also indicated for reference.

FIG. 81 shows a top view of the improved two level single cell warehouse 559 with the warehouse climbing robot 545 in the extended position with the hollow flat gears 440 engaging the straight flat teeth 377 allowing the warehouse climbing robot 545 to climb the cross-track access shaft 404.

The upper levels wider shelves 389 and the upper levels longer shelves 397 are also indicated for reference.

FIG. 82 shows the warehouse climbing robot 545 in the extended position with the hollow flat gears 440 engaging the straight flat teeth 377 at the center of the cross-track access shaft 404 of the loaded improved two level single cell warehouse 559.

The improved two level single cell warehouse 559 is assembled using twelve bases 106a, 106b, eight base short poles 373, four base short traction poles 376, eight full size poles 384, and four full size traction pole 385.

The structure of the improved two level single cell warehouse 559 also has at the ground level or first level one ground level wider shelf 386 and two ground level longer shelves 395. One ground level wider shelf 386 was not installed to allow an access route to the warehouse climbing robot 545. The improved two level single cell warehouse 559 can also be assembled using two ground level wider shelves 386 and one ground level longer shelf 395 creating an alternative access route to the warehouse climbing robot 545.

Completing the structure of the improved two level single cell warehouse 559 at the second level two upper levels wider shelves 389 and two upper levels longer shelves 397 are installed. The improved two level single cell warehouse 559 is loaded with one full size pallet 412 and two full size containers 405a and 405b to illustrate the item retrieval process.

FIG. 83 shows the warehouse climbing robot 545 at the center of the cross-track access shaft 404 positioned right below the upper levels wider shelves 389 and upper levels longer shelves 397 at the second level of the loaded improved two level single cell warehouse 559 ready to retrieve the full size container 405b.

The full size pallet 412 and two full size containers 405a and 405b are indicated as reference to facilitate the understating of the retrieval process as different view angles are used in subsequent figures.

FIG. 84 shows the warehouse climbing robot 545 at the center of the cross-track access shaft 404 positioned right below the upper levels wider shelves 389 and upper levels longer shelves 397 at the second level of the loaded improved two level single cell warehouse 559 initiating the process to retrieve the full size container 405b.

To initiate the retrieval process, the warehouse climbing robot 545 extends the appropriate roller positioning assembly 489 below upper levels longer shelf 397 where the full size container 405b that will be retrieved is placed to engage and move the upper levels longer shelf 397 (see detail FIG. 84A).

Detail FIG. 84A shows the warehouse climbing robot 545 with the roller positioning assembly 489 extended. The roller positioning motor support 498 reaches its full extension out of the warehouse climbing robot case 534 and positions the roller positioning driving motor 505 so that the roller 507 engages the upper levels longer shelf sliding base 398 of the upper levels longer shelf 397 where the full size container 405b that will be retrieved is placed.

Also visible in detail FIG. 84A are the hollow flat gear 440 engaging the straight flat teeth 377 of the full size traction pole 385.

FIG. 85 shows the warehouse climbing robot 545 at the center of the cross-track access shaft 404 of the improved two level single cell warehouse 559 with the moved upper levels longer shelf sliding base 398 containing the full size container 405b positioned above the warehouse climbing robot 545.

The upper levels wider shelf slide 402 slides out of the upper levels longer shelf rim 400 providing support for the upper levels longer shelf sliding base 398.

FIG. 86 shows the warehouse climbing robot 545 at the center of the cross-track access shaft 404 of the improved two level single cell warehouse 559 with the moved upper levels longer shelf sliding base 398 positioned above the warehouse climbing robot 545.

The pantographic lift assembly 413 is extended and the full size container 405b is no longer resting on top of the upper levels longer shelf sliding base 398 but on the taller pantographic lift platform 414 enabling the upper levels longer shelf sliding base 398 to be moved back to its resting place. The longer shelf access opening 396b that allows the upper levels longer shelf sliding base 398 to move past the extended taller pantographic lift platform 414 is also visible.

The upper levels wider shelf slide 402 is still extended out of the upper levels longer shelf rim 400 providing support for the upper levels longer shelf sliding base 398.

FIG. 87 shows the warehouse climbing robot 545 at the center of the cross-track access shaft 404 of the improved two level single cell warehouse 559 carrying the full size container 405b on top of the taller pantographic lift platform 414 with the upper levels longer shelf sliding base 398 moved back to its resting position next to the upper levels longer shelf rim 400.

The longer shelf access opening 396b that allows the upper levels longer shelf sliding base 398 to move past the extended taller pantographic lift platform 414 is also indicated for reference.

FIG. 88 shows the warehouse climbing robot 545 at the center of the cross-track access shaft 404 of the improved two level single cell warehouse 559 after retracting the taller pantographic lift platform 414 carrying the full size container 405b at the top of the warehouse climbing robot case 534.

FIG. 89 shows the warehouse climbing robot 545 exiting the improved two level single cell warehouse 559 after descending from the cross-track access shaft 404 carrying the full size container 405b at the top of the warehouse climbing robot case 534.

FIG. 90 shows a top view of one embodiment of a packer station 560. The packer station 560 is composed of at least one floor with at least one unit cell. Each unit cell is composed of a set of robot lanes 561a, 561b, 561c, 561d, 561e, and 561f at the center, a set of warehouse access shafts 562a, 562b, etc. at one side, a set of shipment access shafts 563a, 563b, etc. at the other side, and a set of packer workstations 564a, 564b, 564c etc. located between the warehouse access shafts 562a, 562b, etc. and the shipment access shafts 563a, 563b, etc. with the packer workstations placed adjacent to the robot lanes 561a, 561b, 561c, 561d, 561e, and 561f at both sides of the robot lanes.

Each packer workstation 564a, 564b, 564c, etc. provides the work space, materials and access to instructions to a packer 565a, 565b, 565c, etc. that is tasked to fulfil incoming customer orders.

The robot lanes 561a, 561b, 561c, 561d, 561e, and 561f allow a set of product carrying robots 566a, through 566e and a set of package carrying robots 567a, 567b, etc. to move and wait at adequate positions to assist the packers 565a, 565b, etc. The product carrying robots 566a, through 566e carry boxes or other containers from the central storage, the boxes or containers containing products that need to be packed to fulfil an specific order.

The package carrying robots 567a, 567b, etc. are constructed using the rack climbing robot 533 design. The product carrying robots 566a, through 566e are constructed using the rack climbing robot 533 or the dual climbing robot 558 design. The rack climbing robot 533 and the dual climbing robot 558 design are able to move in and out, up and down in the warehouse access shafts 562a, 562b, etc. and the shipment access shafts 563a, 563b, etc. constructed using frustum shaped teeth 122.

The robot lanes 561a, 561b, 561c, 561d, 561e, and 561f are organized so that robot lanes 561a, 561b, 561e, and 561f provide space for robots standing by at specific places close to the packers they are tasked to assist. The robot lanes 561c, and 561d allow for robots to move in and out. In the particular example of FIG. 90, the robot lanes 561c is used by robots moving from right to left and robot lanes 561d is used by robots moving from left to right.

The number and purpose of the robot lanes can be altered. Additional robot lanes can be allocated to increase mobility and/or increase the number of standby robots and robot lanes can be eliminated to save floor space provided that at least two robot lanes 561a, and 561f are available for stand by robots and at least two robot lanes 561c, and 561d are available for the movement of robots.

The product carrying robots 566a, through 566e come from and return to the central storage area through the warehouse access shafts 562a, 562b, etc. The warehouse access shafts 562a, 562b, etc. are organized in pairs with one warehouse access shaft 562a for robots going up and one warehouse access shaft 562b for robots going down.

Similarly the package carrying robots 567a, 567b, etc. come from and return to the shipment area through the shipment access shafts 563a, 563b, etc. The shipment access shafts 563a, 563b, etc. are organized in pairs with one shipment access shaft 563a for robots going up and one shipment access shafts 563b for robots going down.

The product carrying robot 566a positions itself at a convenient spot and at an ergonomic position next to the corresponding packer 565a tasked to pack the particular order containing the product that product carrying robot 566a is carrying so that the packer can reach for the specific product.

Once the packer 565a has collected the required amount of products carried by the product carrying robot 566a, the product carrying robot 566a leaves its spot and returns to the central storage area using one warehouse access shaft 562b. As soon as it leaves its spot, the product carrying robot 566a is replaced by the product carrying robot 566b that is standing by next to product carrying robot 566a. Similarly product carrying robot 566c takes the spot vacated by the product carrying robot 566d and one more product carrying robot 566d coming from the warehouse access shaft 562a moves in to fill the spot vacated by product carrying robot 566c ensuring that there are always sufficient product carrying robots standing by on a queue to provide required products to fulfil orders without loss of time.

The package carrying robot 567a collects the fulfilled order and take it to the shipment area. As soon as the loaded package carrying robot 567a leaves its spot towards the shipment access shafts 563a, 563b, etc. it is replaced by another empty package carrying robot coming from the shipment access shafts 563a, 563b, etc. (see FIG. 91 and FIG. 92).

The packer station 560 may span multiple floors that are connected by the warehouse access shafts 562 and the shipment access shafts 563 constructed using frustum shaped teeth 122. The product carrying robots 566 and the package carrying robots 567 are able to move in and out, up and down the warehouse access shafts 562 and the shipment access shafts 563 respectively and reach any packer workstation 564 at the required floor.

The size of one floor of the packer station 560 can be increased by means of increasing the number of packer workstations 564a, 564b, 564c etc. between the warehouse access shafts 562a, 562b, etc. and the shipment access shafts 563a, 563b, etc. according to the availability of space, resulting in an increase of the size of the unit cell.

The size of one floor of the packer station 560 can also be increased by means of having multiple copies of the unit cell placed side by side in both directions perpendicular to the robot lanes. In FIG. 90 the dash dotted line separates two subsequent unit cells.

The number of warehouse access shafts 562a, 562b, etc. and the number of shipment access shafts 563a, 563b, etc. are calculated to allow sufficient space for the movement of the required number of robots that enable the efficient operation of the packer station 560 considering the existing number of packers spread over multiple floors and allow for future expansions.

FIG. 91 shows an isometric view of one embodiment of one portion of the packer station 560.

The packer workstations 564a, 564b, etc. provide the work space for the packers 565a, 565b, etc. that are tasked to fulfil incoming customer orders.

The product carrying robots 566a, 566b, and 566c bring specific boxes containing product to the packer 565a. The product carrying robot 566a positions itself in the center of a short ergonomic rack 568a in preparation to climb it enabling the packer 565a to reach for the product in the best possible ergonomic position.

A packer display 569 located at the packer workstation 564a allows the packer 565a to receive information regarding the type and amount of product that must be retrieved from the product carrying robot 566a. While the packer 565a reaches for the appropriate size of package from an assortment of packing materials 570 as instructed in the packer display 569, the product carrying robot 566a climbs the ergonomic rack 568a that then tilts for optimum access of the product (see FIG. 92).

The product carrying robot 566f serving the packer 565b is shown already at the appropriate height in the ergonomic rack 568b that tilted to provide optimum ergonomic reach for the packer 565b as determined by the height of packer 565b.

The package carrying robots 567a contains a package 571 that the packer 565a has completed previously and just placed on the package carrying robots 567a to be transported to the shipment area.

Once the packer 565a has collected the required amount of products carried by the product carrying robot 566a, the product carrying robot 566a leaves its spot and returns to the central storage area. As soon as it leaves its spot, the product carrying robot 566a is replaced by the product carrying robot 566b that is standing by next to product carrying robot 566a. Similarly product carrying robot 566c takes the spot vacated by the product carrying robot 566d and one more product carrying robot 566d coming from the warehouse access shaft 562a moves in to fill the spot vacated by product carrying robot 566c ensuring that there are always sufficient product carrying robots standing by on a queue to provide required products to fulfil orders without loss of time (see FIG. 90).

The package carrying robot 567a collects the package 571 and take it to the shipment area. As soon as the loaded package carrying robot 567a leaves its spot towards the shipment access shafts 563a, 563b, etc. it is replaced by another empty package carrying robot coming from the shipment access shafts 563a, 563b, etc. (see FIG. 90).

FIG. 92 shows an isometric view of one embodiment of one portion of the packer station 560.

The packer workstations 564a, 564b, etc. provide the work space for the packers 565a, 565b, etc. that are tasked to fulfil incoming customer orders.

The product carrying robots 566a, 566b, and 566c bring specific boxes containing product to the packer 565a. The product carrying robot 566a has climbed the ergonomic rack 568a that has tilted towards the packer 565a, enabling the packer 565a to reach for the product in the best possible ergonomic position as determined by the height of packer 565a.

The packer display 569 located at the packer workstation 564a allows the packer 565a to receive information regarding the type and amount of product that must be retrieved from the product carrying robot 566a. The packer 565a reaches for the appropriate size of package from the assortment of packing materials 570 as instructed in the packer display 569 and reaches for the product inside the box carried by the product carrying robot 566a to fulfil the customer order.

The product carrying robot 566f serving the packer 565b is shown at the appropriate height in the ergonomic rack 568b that tilted to provide optimum ergonomic reach for the packer 565b as determined by the height of packer 565b. As packer 565b is not as tall as packer 565a, the product carrying robot 566f stays a little lower in ergonomic rack 568b than product carrying robot 566a in ergonomic rack 568a.

The package carrying robots 567a contains the package 571 that the packer 565a has completed previously and just placed on the package carrying robots 567a to be transported to the shipment area.

The product carrying robot 566a positions itself at a convenient spot and at an ergonomic position next to the corresponding packer 565a tasked to pack the particular order containing the product that product carrying robot 566a is carrying so that the packer can reach for the specific product.

Once the packer 565a has collected the required amount of products carried by the product carrying robot 566a, the product carrying robot 566a leaves its spot and returns to the central storage area. As soon as it leaves its spot, the product carrying robot 566a is replaced by the product carrying robot 566b that is standing by next to product carrying robot 566a. Similarly product carrying robot 566c takes the spot vacated by the product carrying robot 566d and one more product carrying robot 566d coming from the warehouse access shaft 562a moves in to fill the spot vacated by product carrying robot 566c ensuring that there are always sufficient product carrying robots standing by on a queue to provide required products to fulfil orders without loss of time (see FIG. 90).

The package carrying robot 567a collects the package 571 and take it to the shipment area. As soon as the loaded package carrying robot 567a leaves its spot towards the shipment access shafts 563a, 563b, etc. it is replaced by another empty package carrying robot coming from the shipment access shafts 563a, 563b, etc. (see FIG. 90).

Operation—First Embodiment

The warehouse is first assembled to the required size, height and number of access shafts. For concision and to avoid cluttering in the drawings only 9 access shafts and 4 floors are illustrated. These numbers can however be greatly exceeded in a real case application.

FIG. 6 shows the first step of the warehouse being assembled 173. One array of bases 106a, 106b, 106c, etc. with the bases 106a, 106b, 106c placed at the adequate distance from each other in the X and Y direction, is constructed.

FIG. 7 shows the second step of the warehouse being assembled 173. At the correct places, the required number of base spacers 109a, 109b, etc. and base rack spacers 127a, 127b, 127c, 127d, etc. is placed on top of the corresponding bases 106a, 106b, 106c, etc. The base rack spacers 127a, 127b, 127c, 127d, are placed with the front faces facing each other creating the access shafts 174a, 174b, etc. that are regularly spaced.

Detail FIG. 7A shows one base rack spacer 127e in greater magnification to display the shelf insertion notch 110a that is used for the installation of shelves at a later stage. Also visible are the features of the shelf support 128 and the rack extension 129.

Detail FIG. 7B shows one base spacer 109c in greater magnification to display the shelf insertion notch 110b that is used for the installation of shelves at a later stage.

FIG. 8 shows the third step of the warehouse being assembled 173. One array of shelves 161a, 161b, 161c, etc. with each shelf placed at the right orientation is placed over the array of base spacers 109a, 109b, etc. and base rack spacers 127a, 127b, 127c, 127d, etc. that have been previously placed on top of the corresponding bases 106a, 106b, 106c, etc.

The orientation of one particular shelf 161a, 161b, 161c, etc. is defined by its relative position with respect to the access shaft 174a, 174b, etc. it is connected to. Each shelf 161a, 161b, etc. is placed with its shelf access channel 163a, 163b, etc. opening to the respective access shaft 174a, 174b, etc. it is connected to.

At the ground level, the layout of shelves is different than at the subsequent levels due to the necessity to provide access paths to the access shafts 174*a*, 174*b*, etc. to load and unload pallets. At the ground level, some shelves 161*x* (drawn in dash dot lines) are therefore not installed. More shelves may be removed or not installed at ground level to increase the number of access paths to the access shafts 174*a*, 174*b*, etc. eventually removing all shelves from the ground level to enable maximum access to all access shafts 174*a*, 174*b*, etc.

Where needed, plain blanks 111, shelf blanks 112, and quarter blanks 114 are installed to fill missing elements and ensure the stability of the structure (see detail FIG. 8A and detail FIG. 8B).

Detail FIG. 8A shows one base rack spacer 127*e* in greater magnification to display the shelf neck 165*a* and shelf fixation pin 166*a* from the corresponding shelf installed at this particular place and the plain blank 111, the shelf blank 112, and quarter blank 114*a* installed to complete the structure and fill the space left by missing elements that were not installed to provide access paths to the access shafts 174*a*, 174*b*, etc. The shelf stub 113 of the shelf blank 112 fills the space corresponding to one missing shelf neck from one missing shelf not installed at the access shaft that the base rack spacer 127*e* is connected. The quarter stub 115*a* of the quarter blank 114*a* fills the space of one missing shelf base from one missing shelf not installed at a neighboring access shaft.

Detail FIG. 8B shows one base spacer 109*c* in greater magnification to display the shelf base 162 and shelf fixation pin 166*b* from the corresponding shelf installed at this particular place and the quarter blanks 114*b*, 114*c*, etc. installed to complete the structure and fill the space left by missing elements that were not installed to provide access paths to the access shafts 174*a*, 174*b*, etc. and because the base spacer 109*c* is located on the edge of the structure.

The quarter stubs 115*b*, 115*c*, etc. of the quarter blanks 114*b*, 114*c*, etc. fill the space of missing shelf bases 162 left from missing shelves not installed.

FIG. 10 shows a top view of the warehouse being assembled 173 in an intermediate stage with pallets 102 placed on the ground level, each pallet 102 resting on its corresponding installed shelf 161. The access paths to all access shafts 174*a*, 174*b*, etc. produced by not installing shelves at convenient points of the structure are indicated using double arrowed lines.

FIG. 15 shows one embodiment of the advanced warehouse of the present invention showing one access shaft 174 with two levels and with moving parts in the first position.

One rack pole 130 equipped with one rack pole standard hinged rack A 139, one rack pole standard hinged rack B 145, and one rack pole top cover 149 properly installed is placed on top of each base rack spacer 127 and its corresponding base 106*a* at the proper orientation with the front faces of the base rack spacer 127 and the rack pole 130 facing towards the center of the access shaft 174.

Similarly, one plain pole 116 with one single rack piece 120*a* installed and fitted with one plain top spacer 119 at the top is placed on top of each base spacer 109 and its corresponding base 106*b* at the proper orientation with the single rack pieces 120*a*, 120*b*, etc. aligned with the corresponding shelf 161*d*, 161*e*, etc. above it.

One shelf has not been installed on the ground level to allow access to the access shaft 174, leaving the ground level with three shelves 161*a*, 161*b*, and 161*c*. The first level has all four shelves 161*d*, 161*e*, 161*f*, and 161*g* installed.

Only two pallets 102*a*, 102*b* of the total capacity of seven are shown as reference to avoid obstructing the view of other components of the structure.

In the first position shown in FIG. 15, the access shaft 174 is configured to allow vertical movement only and horizontal movement is not possible above the ground level. In the first position, the shelves 161*d*, 161*e*, 161*f*, and 161*g* in the first level are not accessible. The shelves 161*a*, 161*b*, and 161*c* that are at ground level are accessible and remain accessible at all times.

One rack pole neck cover 134 used when no fixed rack is attached to the rack pole 130 is also visible.

Detail FIG. 15A shows the rack pole 130 equipped with one rack pole standard hinged rack A 139, one rack pole standard hinged rack B 145, and one rack pole top cover 149 in greater magnification to display additional details including the shape of the structures containing frustum shaped teeth 122.

The rack pole standard hinged rack A 139 is held at a fixed position aligned to the left front face of the rack pole 130 using the lock bar 154*a* that is attached to the hinged rack external lock fixture 142*a* of the rack pole standard hinged rack A 139.

The rack pole standard hinged rack B 145 is held at a fixed position aligned to the right front face of the rack pole 130 using the lock bar 154*b* that is attached to the hinged rack external lock fixture 142*b* of the rack pole standard hinged rack B 145.

Detail FIG. 15A also shows the shelves 161*f*, and 161*g*, one plain blank 111, and one quarter blank 114 installed on the rack pole top cover 149 completing the structure and providing a proper place for the installation of one additional rack pole 130 to build another level of the structure.

FIG. 16 shows one embodiment of the advanced warehouse of the present invention showing one access shaft 174 with two levels and with moving parts in the second position.

One rack pole 130 equipped with one rack pole standard hinged rack A 139, one rack pole standard hinged rack B 145*a*, and one rack pole top cover 149 properly installed is placed on top of each base rack spacer 127 and its corresponding base 106*a* at the proper orientation with the front faces of the base rack spacer 127 and the rack pole 130 facing towards the center of the access shaft 174.

Similarly, one plain pole 116 with one single rack piece 120*a* installed and fitted with one plain top spacer 119 at the top is placed on top of each base spacer 109 and its corresponding base 106*b* at the proper orientation with the single rack pieces 120*a*, 120*b*, etc. aligned with the corresponding shelf 161*d*, 161*e*, etc. above it.

One shelf has not been installed on the ground level to allow access to the access shaft 174, leaving the ground level with three shelves 161*a*, 161*b*, and 161*c*. The first level has all four shelves 161*d*, 161*e*, 161*f*, and 161*g* installed.

Only two pallets 102*a*, 102*b* of the total capacity of seven are shown as reference to avoid obstructing the view of other components of the structure.

In the second position shown in FIG. 16, the access shaft 174 is configured to allow horizontal movement only and vertical movement is temporarily blocked. In the second position, the rack pole standard hinged rack A 139 and the rack pole standard hinged rack B 145*b* join at the edges to form a continuous seamless rack that bridges the gap in front of shelf 161*f* and continues in both directions all the way to the edges of the structure. Similarly, the gap in front of shelf 161*d* is also bridged. As a result, the shelves 161*e*, and 161*g* are accessible while the shelves 161*d*, and 161*f* are isolated from the access shaft 174. Components associated with the access to the shelves 161d, and 161f such as the single rack piece 120a remain disconnected from the rest of the rack structure.

One rack pole neck cover 134 used when no fixed rack is attached to the rack pole 130 is also visible.

Detail FIG. 16A shows the bridged region produced with the moving components in the second position in greater magnification to display additional details including the shape of the structures containing frustum shaped teeth 122.

The rack pole standard hinged rack A 139 and the rack pole standard hinged rack B 145b join at the edges to form a continuous seamless rack that bridges the gap in front of shelf 161f As the rack pole standard hinged rack A 139 moves to join with the rack pole standard hinged rack B 145b, the single rack piece 120c becomes disconnected from the rest of the rack structure.

The rack pole standard hinged rack A 139 is held at a fixed position aligned to the right front face of the rack pole 130 using the lock bar 154a that is attached to the hinged rack internal lock fixture 141a of the rack pole standard hinged rack A 139 leaving the hinged rack external lock fixture 142a unused.

FIG. 17 shows one embodiment of the advanced warehouse of the present invention showing one access shaft 174 with two levels and with moving parts in the third position.

One rack pole 130 equipped with one rack pole standard hinged rack A 139a, one rack pole standard hinged rack B 145a, and one rack pole top cover 149 properly installed is placed on top of each base rack spacer 127 and its corresponding base 106a at the proper orientation with the front faces of the base rack spacer 127 and the rack pole 130 facing towards the center of the access shaft 174.

Similarly, one plain pole 116 with one single rack piece 120a installed and fitted with one plain top spacer 119 at the top is placed on top of each base spacer 109 and its corresponding base 106b at the proper orientation with the single rack pieces 120a, 120b, etc. aligned with the corresponding shelf 161d, 161e, etc. above it.

One shelf has not been installed on the ground level to allow access to the access shaft 174, leaving the ground level with three shelves 161a, 161b, and 161c. The first level has all four shelves 161d, 161e, 161f, and 161g installed. For better visualization however, the shelf 161d is not shown and drawn in dash dotted lines for reference.

Only two pallets 102a, 102b of the total capacity of seven are shown as reference to avoid obstructing the view of other components of the structure.

In the third position shown in FIG. 17, the access shaft 174 is configured to allow horizontal movement only and vertical movement is temporarily blocked. In the third position, the rack pole standard hinged rack B 145a and the rack pole standard hinged rack A 139b join at the edges to form a continuous seamless rack that bridges the gap in front of shelf 161g. This continuous seamless rack extends in both directions until the edges of the structure, in one direction with the rack pole standard hinged rack B 145b and the single rack piece 120h and in the other direction with rack pole standard hinged rack A 139a and one additional single rack piece not visible as it is obstructed by the pallet 102b. The position of the single rack piece that is not visible can be determined though as it is the counterpart to the single rack piece 120d that is visible, the same way that the single rack piece 120h is the counterpart to the single rack piece 120a.

Similarly, the gap in front of shelf 161e is also bridged. As a result, the shelves 161d, and 161f are accessible while the shelves 161e, and 161g are isolated from the access shaft 174. Components associated with the access to the shelves 161e, and 161g such as the single rack piece 120b, 120g, etc. remain disconnected from the rest of the rack structure.

One rack pole neck cover 134 used when no fixed rack is attached to the rack pole 130 is also visible.

Detail FIG. 17A shows the bridged region produced with the moving components in the third position in greater magnification to display additional details including the shape of the structures containing frustum shaped teeth 122.

The rack pole standard hinged rack B 145a and the rack pole standard hinged rack A 139b join at the edges to form a continuous seamless rack that bridges the gap in front of shelf 161g.

The rack pole standard hinged rack B 145a is held at a fixed position aligned to the left front face of the rack pole 130 using the lock bar 154b that is attached to the hinged rack internal lock fixture 141b of the rack pole standard hinged rack B 145a leaving the hinged rack external lock fixture 142b unused.

FIG. 18 shows the complete two level nine cell warehouse 175 and the warehouse structure 176 that is equipped with shelves 161a at ground level and shelves 161b at the first level. The warehouse structure 176 of the two level nine cell warehouse 175 is shown in the first position, allowing vertical movement in the access shafts 174.

FIG. 19 shows a top view of the warehouse structure 176 without shelves to allow a better view of the structure. The warehouse structure 176 is shown in the first position, allowing vertical movement in the access shafts 174a, 174b, etc.

The warehouse structure 176 requires the usage of different components depending on the location they are installed. At places in the edge of the warehouse structure 176 that are adjacent to only one access shaft 174g, the single rack piece 120 is installed. At places of the warehouse structure 176 that are adjacent to two access shafts 174d, and 174g the double standard rack piece 125 is installed and at places at the center of the warehouse structure 176 that are adjacent to four access shafts 174d, 174e, 174g, and 174h the quadruple standard rack piece 126 is installed.

Detail FIG. 19A shows one rack pole standard hinged rack B 145 and one rack pole standard hinged rack A 139 in the first position. In the first position, the rack pole standard hinged rack B 145 is in alignment with one single rack piece 120 at the top left and both parts make a continuous seamless rack. Similarly, in the first position the rack pole standard hinged rack A 139 is in alignment with one arm of one double standard rack piece 125 at the bottom and both parts make a continuous seamless rack.

Detail FIG. 19B shows a part of the warehouse structure 176 that requires the installation of rack pole standard fixed racks 137a, 137b to complete the structure.

The rack pole standard hinged rack A 139a and the rack pole standard hinged rack B 145a at the left and the rack pole standard hinged rack A 139b and the rack pole standard hinged rack B 145b at the right are both shown in the first position.

The rack pole standard hinged rack B 145a at the bottom left is in alignment with the rack pole standard fixed rack 137b at the bottom right and both parts make a continuous seamless rack. Similarly, the rack pole standard hinged rack B 145b at the right is in alignment with the rack pole standard fixed rack 137a at the left and both parts make a continuous seamless rack. The rack pole standard hinged rack A 139 in alignment with one arm of the quadruple standard rack piece 126 at the top right and both parts make a continuous seamless rack.

FIG. 20 shows the four level nine cell warehouse 177 with the corresponding four level warehouse structure 176 fully loaded with pallets 102.

FIG. 21 shows a top view of the four level nine cell warehouse 177 fully loaded with pallets 102 to illustrate the accessibility of individual pallets 102. Each access shaft 174*a*, 174*b*, etc. provides access to four pallets 102 as indicated by the double arrowed lines. Any pallet 102 is accessible through only one specific access shaft.

FIG. 25 shows the horizontal pivoting support 232 that is driven at the horizontal pivoting support action bar 238 and rotates around the horizontal pivoting support main axis 235. As the horizontal pivoting support 232 rotates, the horizontal pivoting support gear support axis 237 and the horizontal pivoting support actuator reference hole 240 describe an arch carrying the components attached to them.

The horizontal gear support axis 244 is inserted into the horizontal pivoting support gear support axis 237 and allows the horizontal gear support 241 to vary its angle as it is driven by the horizontal pivoting support gear support axis 237.

This is accomplished using the horizontal gear support guide pin 249 that is inserted into the horizontal angle control guide track 223 in the horizontal angle control guide 222 and the horizontal gear support guide knob 250 that fits in the underside of the horizontal angle control guide 222 preventing the horizontal gear support guide pin 249 from escaping the horizontal angle control guide track 223.

As the horizontal pivoting support 232 rotates around the horizontal pivoting support main axis 235, the horizontal pivoting support gear support axis 237 carries the horizontal gear support 241 and the horizontal gear support guide pin 249 slides in the horizontal angle control guide track 223 forcing the horizontal gear support 241 to rotate more or less around the horizontal pivoting support gear support axis 237 providing angle adjustment for the horizontal gear support 241 (see FIG. 35).

FIG. 25 also shows the vertical pivoting support 252 that is driven at the vertical pivoting support action bar 257 and rotates around the vertical pivoting support main axis 255. As vertical pivoting support 252 rotates, the vertical pivoting support gear support axis 256 and the vertical pivoting support actuator reference hole 259 describe an arch carrying the components attached to them.

The vertical gear support axis 263 is inserted into the vertical pivoting support gear support axis 256 and allows the vertical gear support 260 to vary its angle as it is driven by the vertical pivoting support gear support axis 256.

This is accomplished using the vertical gear support guide pin 268 that is inserted into the vertical angle control guide track 226 in the vertical angle control guide 225 and the vertical gear support guide knob 269 that fits in the underside of the vertical angle control guide 225 preventing the vertical gear support guide pin 268 from escaping the vertical angle control guide track 226.

As the vertical pivoting support 252 rotates around the vertical pivoting support main axis 255, the vertical pivoting support gear support axis 256 carries the vertical gear support 260 and the vertical gear support guide pin 268 slides in the vertical angle control guide track 226 forcing the vertical gear support 260 to rotate more or less around the vertical pivoting support gear support axis 256 providing angle adjustment for the vertical gear support 260 (see FIG. 35).

FIG. 26 shows components used for manipulating moving parts in the advanced warehouse of the present invention.

The horizontal actuator angle control guide 271 and the vertical actuator angle control guide 274 are constructed as mirror images of each other.

The horizontal arm actuator sliding bar 282 is inserted into the horizontal actuator angle control track 272 of the horizontal actuator angle control guide 271 that is fixated above the horizontal arm actuator 277 and the horizontal arm actuator sliding knob 283 keeps the horizontal arm actuator sliding bar 282 from falling from the horizontal actuator angle control track 272. The horizontal arm actuator fixation pin 281 is fixated to the horizontal pivoting support actuator reference hole 240 of the horizontal pivoting support 232.

As the horizontal pivoting support 232 rotates around the horizontal pivoting support main axis 235, the horizontal pivoting support actuator reference hole 240 rotates and carries the horizontal arm actuator 277 forcing the horizontal arm actuator sliding bar 282 to slide inside the horizontal actuator angle control track 272 that in turn produces the desired orientation angle for the horizontal arm actuator 277 throughout the excursion of the horizontal pivoting support 232.

The vertical arm actuator sliding bar 289 is inserted into the vertical actuator angle control track 275 of the vertical actuator angle control guide 274 that is fixated above the vertical arm actuator 284 and the vertical arm actuator sliding knob 290 keeps the vertical arm actuator sliding bar 289 from falling from the vertical actuator angle control track 275. The vertical arm actuator fixation pin 288 is fixated to the vertical pivoting support actuator reference hole 259 of the vertical pivoting support 252.

As the vertical pivoting support 252 rotates around the vertical pivoting support main axis 255, the vertical pivoting support actuator reference hole 259 rotates and carries the vertical arm actuator 284 forcing the vertical arm actuator sliding bar 289 to slide inside the vertical actuator angle control track 275 that in turn produces the desired orientation angle for the vertical arm actuator 284 throughout the excursion of the vertical pivoting support 252.

The actuator arm 291 has the same diameter of the horizontal arm actuator center hole 278 and the vertical arm actuator center hole 285 and the actuator arm key 292 matches the horizontal arm actuator center hole key 279 and the vertical arm actuator center hole key 286 so that only one version of the actuator arm 291 is needed and can be installed at both the horizontal arm actuator 277 and the vertical arm actuator 284.

The horizontal arm actuator sliding bar 282 is longer than the vertical arm actuator sliding bar 289 to offset the position of the horizontal arm actuator 277 and the vertical arm actuator 284 to prevent the actuator arms 291 installed at the horizontal arm actuator center hole 278 and the vertical arm actuator center hole 285 from hitting each other allowing horizontal arm actuators 277 and vertical arm actuators 284 to be installed in proximity and move without interfering with each other.

The horizontal actuator hand 297 is equipped with the horizontal actuator hand finger 301 connected to the horizontal actuator hand top 300 that terminates in the horizontal actuator hand grabbing tip 302 that is a partially flexible metal fork that is able to snap into a metal rod of appropriate matching diameter and hold it with a relatively small force but sufficient to move the rod safely if there is no opposition to the movement and releases the rod when some opposition is present.

The vertical actuator hand 303 is equipped with the vertical actuator hand finger 307 connected to the vertical actuator hand top 306 that terminates in the vertical actuator hand grabbing tip 308 that is a partially flexible metal fork that is able to snap into a metal rod of appropriate matching diameter and hold it with a relatively small force but sufficient to move the rod safely if there is no opposition to the movement and releases the rod when some opposition is present.

The hinged rack arm 317 has the same diameter of the horizontal hinged rack actuator center hole 311 and the vertical hinged rack actuator center hole 315 and the hinged rack arm key 318 matches the horizontal hinged rack actuator center hole key 312 and the vertical hinged rack actuator center hole key 316 so that only one version of the hinged rack arm 317 is needed and can be installed at both the horizontal hinged rack actuator 309 and the vertical hinged rack actuator 313.

The hinged rack hand 323 with the pair of hinged rack hand fingers 327a, and 327b connected to the hinged rack hand base 326. Two hinged rack hand rollers 328 that can rotate freely around the hinged rack hand fingers 327a, 327b are installed on each hinged rack hand finger 327a, 327b.

FIG. 32 shows the autonomous mobile lift robot case 330 that has four sets of three different supports one set at each side of the autonomous mobile lift robot case 330 that are designed to support components of the wheel assembly 191. The directional motor support 335 is designed to support the wheel directional motor 200; the wheel motor support 336 is designed to support the wheel driving motor 202; and the wheel assembly support 337 with the wheel driving axis passage hole 338 is designed to support the wheel directional gear 197 and allow the wheel driving axle 203 to pass through.

The autonomous mobile lift robot case 330 has one opening A 331 and one opening B 332 at each corner making a total of 8 corner openings. One separation bar 333 is located at each corner to provide additional structural integrity and prevent the warping of the autonomous mobile lift robot case 330 around any opening A 331 or opening B 332.

The pivoting axis 334 is located at points in the diagonals of the autonomous mobile lift robot case 330 at a short distance from each corner. One pair of one horizontal pivoting support 232 and one vertical pivoting support 252 is installed with their respective horizontal pivoting support main axis 235 and vertical pivoting support main axis 255 around each pivoting axis 334.

On the bottom of the autonomous mobile lift robot case 330 the wheel openings 340 provide access for the wheels 192 to reach the floor and rotate freely and the bottom fixation holes 341 provide the place for the installation of four sets of one horizontal angle control guide 222 and one vertical angle control support 228.

On the top of the autonomous mobile lift robot case 330 the top fixation holes 342 provide the place for the installation of four sets of one horizontal actuator angle control guide 271 and one vertical actuator angle control guide 274.

The extension motor supports 339a is located in the front of the autonomous mobile lift robot case 330 at a slightly higher level and the extension motor support 339b is located at the back of the autonomous mobile lift robot case 330 at a slightly lower level.

The autonomous mobile lift robot case 330 has two pantographic fixed axis holes 343 for the installation of the bottom fixed axis 186 and two pantographic moving axis slots 344 for the installation of the bottom moving axis 187.

The pantographic lift platform 178 has one platform fixed axis hole 179 located near the top face, parallel to the top face that goes all the way through from one side to the other side of the pantographic lift platform 178. The pantographic lift platform 178 also has one platform moving axis slot 180 that is parallel to the top face and is located at the same distance of the top face of the pantographic lift platform 178 as the platform fixed axis hole 179 and goes all the way through from one side to the other side of the pantographic lift platform 178.

Two pantographic bars 181 are installed linked at the middle by the center axis 185 forming a "X" at each side of the pantographic lift platform 178. One top axis 184a is installed at the platform fixed axis hole 179 that remains fixed and another top axis 184b is installed at the platform moving axis slot 180 and is able to slide the length of the platform moving axis slot 180.

The pantographic motor 189 engages the bottom moving axis nut 188 and moves the bottom moving axis 187 closer or further away from the pantographic motor 189 causing the pantographic lift platform 178 to rise or drop accordingly.

FIG. 33 is an isometric view of one embodiment of the tapered teeth gear support and positioning mechanism for each first and second perpendicularly mounted tapered teeth gears installed in each corner of the autonomous mobile lift robot 349 of the present invention.

Four control disks 204a, 204b, 204c, and 204d arranged in two groups of two control disks 204a, and 204b and control disks 204c, and 204d mounted back to back are installed around the case central axis 346. The control disks 204a, and 204b are driven by the control disk actuator beveled gear 209a and the actuator beveled gear driving motor 210a and the control disks 204c, and 204d are driven by the control disk actuator beveled gear 209b and the actuator beveled gear driving motor 210b.

The gear position control bars 212b, and 212f are mounted at opposite control disk attachment pins 208a of the control disk 204b; and the gear position control bars 212c, and 212g are mounted at opposite control disk attachment pins 208 of the control disk 204a. Similarly, the gear position control bars 212a, and 212e are mounted at opposite control disk attachment pins 208 of the control disk 204d; and the gear position control bars 212d, and 212h are mounted at opposite control disk attachment pins 208 of the control disk 204c.

Because the control disks 204a, and 204b are mounted back to back, as the control disk actuator beveled gear 209a rotates clockwise, the control disk 204a is turned clockwise and the control disk 204b is turned counter clockwise and vice versa. The same applies to the control disks 204c, and 204d and the control disk actuator beveled gear 209b.

As a result, the gear position control bars 212b, and 212f and the gear position control bars 212d, and 212h extend or retract simultaneously, depending on the direction the control disk actuator beveled gear 209a rotates, extending if the control disk actuator beveled gear 209a rotates clockwise and retracting if the control disk actuator beveled gear 209a rotates counter clockwise. Similarly, the gear position control bars 212a, and 212e and the gear position control bars 212c, and 212g extend or retract simultaneously, depending on the direction the control disk actuator beveled gear 209b rotates, extending if the control disk actuator beveled gear 209b rotates clockwise and retracting if the control disk actuator beveled gear 209b rotates counter clockwise.

The gear position control bars 212b, and 212f transmit the movement to the horizontal pivoting supports 232a, and 232c respectively that result in movement of the tapered teeth gears 214b, and 214f that are in the same face of the autonomous mobile lift robot case 330. Similarly, the gear position control bars 212*d*, and 212*h* transmit the movement to the vertical pivoting supports 252*b*, and 252*d* respectively that in turn result in movement of the tapered teeth gears 214*d*, and 214*h* that are on the same face, opposite to the face where the tapered teeth gears 214*b*, and 214*f* are located.

Likewise, the gear position control bars 212*a*, and 212*e* transmit the movement to the vertical pivoting supports 252*a*, and 252*c* respectively that result in movement of the tapered teeth gears 214*a*, and 214*e* that are in the same face of the autonomous mobile lift robot case 330. Similarly, the gear position control bars 212*c*, and 212*g* transmit the movement to the horizontal pivoting supports 232*b*, and 232*d* respectively that result in movement of the tapered teeth gears 214*c*, and 214*g* that are on the same face, opposite to the face where the tapered teeth gears 214*a*, and 214*e* are located.

This mechanism allows for the positioning of all tapered teeth gears 214 in one pair of two opposite corners simultaneously with one actuator beveled gear driving motor 210*a*, and all tapered teeth gears 214 in the other pair of two opposite corners with the other actuator beveled gear driving motor 210*b*.

The exact positioning of a particular tapered teeth gear 214 is also affected by the angle control mechanism. The process is the same for all four pairs of the first and second perpendicularly mounted gears so it will be explained only once for concision, mostly for the pair of tapered teeth gears 214*c*, and 214*d*, exceptions made if other gear pairs offer a better angle for visualization. As the components are the same in all four sets of gears pairs, it is possible to identify the correspondent components in other gear pairs.

The gear position control bar 212*a* drives the vertical pivoting support 252*a* at the vertical pivoting support action bar 257*a* and the vertical pivoting support 252*a* carries the vertical gear support 260*a* that holds the tapered teeth gears 214*a*.

Likewise, the gear position control bar 212*b* drives the horizontal pivoting support 232*a* at the horizontal pivoting support action bar 238*a* and the horizontal pivoting support 232*a* carries the horizontal gear support 241*a* that holds the tapered teeth gears 214*b*.

As the control disk 204*a* moves the gear position control bar 212*c*, the movement is transferred to the vertical pivoting support 252*b* that rotates around the pivoting axis 334*b* and carries the vertical gear support 260*b*. As the vertical gear support 260*b* moves, the movement is transferred to the vertical gear support guide bar 267*b* and the vertical gear support guide pin 268*b* is forced to follow the geometry of the vertical angle control guide track 226*b* of the vertical angle control guide 225*b* installed on top of the vertical angle control support 228*b*. As the vertical gear support guide pin 268*b* slides in the vertical angle control guide track 226*b*, the vertical gear support 260*b* is forced to rotate accordingly to accommodate the geometry providing angle adjustment for the tapered teeth gear 214*c* to have the tapered teeth 215 adjust and align within the frustum shaped teeth 122 providing the traction necessary to move the autonomous mobile lift robot case 330 along the frustum shaped teeth 122 of the rack lattice structure in a vertical direction.

Likewise, as the control disk 204*c* moves the gear position control bar 212*d*, the movement is transferred to the horizontal pivoting support 232*b* that rotates around the pivoting axis 334*b* and carries the horizontal gear support 241*b*. As the horizontal gear support 241*b* moves, the movement is transferred to the horizontal gear support guide bar 248*b* and the horizontal gear support guide pin 249*b* is forced to follow the geometry of the horizontal angle control guide track 223*b* of the horizontal angle control guide 222*b*. As the horizontal gear support guide pin 249*b* slides in the horizontal angle control guide track 223*b*, the horizontal gear support 241*b* is forced to rotate accordingly to accommodate the geometry providing angle adjustment for the tapered teeth gear 214*d* to have the tapered teeth 215 adjust and align within the frustum shaped teeth 122 providing the traction necessary to move the autonomous mobile lift robot case 330 along the frustum shaped teeth 122 of the rack lattice structure in a horizontal direction.

The horizontal angle control guide 222*b* and the vertical angle control guide 225*b* are symmetrical to each other and installed at symmetrical positions. Because of the geometry, to respect the symmetry, the horizontal angle control guide 222*b* and the vertical angle control guide 225*b* need to be installed at different heights, the vertical angle control guide 225*b* on top of the vertical angle control support 228*b* while the horizontal angle control guide 222*b* is installed underneath the vertical angle control support 228*b*. The parts of the structure of the horizontal angle control guide 222*b* that are below the vertical angle control support 228*b* are drawn in dashed lines.

The vertical gear driving motor 220 and the vertical gear driving bevels 221*e*, and 221*f* that drive the tapered teeth gear 214*e* are seen on their installed positions.

The horizontal gear driving motor 217*c*, the horizontal gear driving pulleys 218*e*, and 218*f* and the horizontal gear driving belt 219*c* that drive the tapered teeth gears 214*f* are seen on their installed positions.

The horizontal pivoting support notch 236*c* provides additional space to accommodate the horizontal gear driving motor 217*c* that due to standardization of components may be longer than the available space in the horizontal pivoting support 232*c*.

The vertical hinged rack actuator 313*a* with the hinged rack arm 317*a* and the hinged rack hand 323*a* are seen on their installed position on the vertical gear support 260*a*. The horizontal hinged rack actuator 309*a* with the hinged rack arm 317*b* and the hinged rack hand 323*b* are seen on their installed position on the horizontal gear support 241*a*.

The horizontal pivoting support actuator reference hole 240*b* is indicated in the horizontal pivoting support 232*c* and the vertical pivoting support actuator reference hole 259*b* is indicated in the vertical pivoting support 252*a* as reference for FIG. 34 that describes the actuator positioning control mechanism.

FIG. 34 shows an isometric view of one embodiment of the actuator positioning control mechanism used in the autonomous mobile lift robot 349 of the present invention.

The mechanism controlling the positioning of the vertical pivoting supports 252*a*, 252*b*, 252*c*, and 252*d* and the horizontal pivoting supports 232*a*, 232*b*, 232*c*, and 232*d* is described in FIG. 33.

The control disks 204*a*, 204*b*, 204*c*, and 204*d*; the control disk attachment pin 208*a*; the control disk actuator beveled gears 209*a*, and 209*b*; the actuator beveled gear driving motor 210*a*, and 210*b*; the gear position control bar 212*a*, through 212*h*; the horizontal pivoting support action bar 238*a*; and the vertical pivoting support action bar 257*a* have been drawn and indicated as reference and to facilitate the correspondence with the explanation in FIG. 33.

FIG. 34 describes the components involved in the actuator positioning control mechanism used in the autonomous mobile lift robot 349 of the present invention. The positioning of a particular actuator is affected by the position of the pivoting support it is fixated to and the angle control guide it is linked to. The process is the same for all four pairs of pivoting supports so it will be explained only once for concision, mostly referring to the pair of pivoting supports 232b, and 252b and to the pair of pivoting supports 232d, and 252d exceptions made if other pivoting support pairs offer a better angle for visualization. As the components are the same in all four sets of pivoting support pairs, it is possible to identify the correspondent components in other pivoting support pairs.

The horizontal arm actuator 277b is installed in the horizontal pivoting support 232b fixating the horizontal arm actuator fixation pin 281b at the tip of the horizontal arm actuator fixation bar 280b in the horizontal pivoting support actuator reference hole 240b. The vertical arm actuator 284b is installed in the vertical pivoting support 252b fixating the vertical arm actuator fixation pin 288b at the tip of the vertical arm actuator fixation bar 287b in the vertical pivoting support actuator reference hole 259b (see FIG. 33).

The horizontal arm actuator sliding bar 282d is inserted into the horizontal actuator angle control track 272d of the horizontal actuator angle control guide 271d that is fixated above the horizontal arm actuator 277d and the horizontal arm actuator sliding knob 283d keeps the horizontal arm actuator sliding bar 282d from falling from the horizontal actuator angle control track 272d.

As the horizontal pivoting support 232d rotates around the pivoting axis 334d, the horizontal arm actuator sliding bar 282d slides inside the horizontal actuator angle control track 272d that in turn produces the desired orientation angle for the horizontal arm actuator 277d throughout the excursion of the horizontal pivoting support 232d.

The vertical arm actuator sliding bar 289d is inserted into the vertical actuator angle control track 275d of the vertical actuator angle control guide 274d that is fixated above the vertical arm actuator 284d and the vertical arm actuator sliding knob 290d keeps the vertical arm actuator sliding bar 289d from falling from the vertical actuator angle control track 275d.

As the vertical pivoting support 252d rotates around the pivoting axis 334d, the vertical arm actuator sliding bar 289d slides inside the vertical actuator angle control track 275d that in turn produces the desired orientation angle for the vertical arm actuator 284d throughout the excursion of the vertical pivoting support 252d.

The actuator arm 291g is installed in the vertical arm actuator 284d and the actuator arm 291h is installed in the horizontal arm actuator 277d.

The horizontal arm actuator sliding bar 282d is longer than the vertical arm actuator sliding bar 289d to offset the position of the horizontal arm actuator 277d and the vertical arm actuator 284d to prevent the actuator arms 291h, and 291g from hitting each other allowing the horizontal arm actuator 277d and the vertical arm actuator 284d to be installed in proximity and move without interfering with each other.

Due to the offset in the position of the vertical arm actuator 284d and the horizontal arm actuator 277d, the actuator hand 294g is higher than the actuator hand 294h. To compensate that, the vertical actuator hand finger 307d is longer than the horizontal actuator hand finger 301d to align the vertical actuator hand grabbing tip 308d with the horizontal actuator hand grabbing tip 302d in the same level.

FIG. 35 shows a top view of one embodiment of the autonomous mobile lift robot 349 of the present invention with the tapered teeth gears in the extended position showing the gear positioning mechanism and other internal components affected by the gear positioning mechanism and the clearances to other internal components.

The actuator beveled gear driving motors 210a, and 210b drive the control disks 204 that in turn drive the gear position control bars 212a, and 212b that extend the horizontal pivoting supports 232 and the vertical pivoting supports 252 that pivot around the pivoting axis 334 to the extended position.

The vertical pivoting supports 252 hold the vertical gear supports 260 that hold the tapered teeth gears 214a that are mounted vertically. The horizontal pivoting supports 232 hold the horizontal gear supports 241 that hold the tapered teeth gears 214b that are mounted horizontally.

The vertical gear driving motors 220 in conjunction with two vertical gear driving bevels 221 drive the tapered teeth gears 214a that are mounted vertically. The horizontal gear driving motor 217 in conjunction with the horizontal gear driving pulleys 218a, and 218b and the horizontal gear driving belt 219 drive the tapered teeth gears 214b that are mounted horizontally.

The horizontal angle control guide tracks 223 in the horizontal angle control guides 222 provide angle adjustment for the tapered teeth gears 214b that are mounted horizontally to have the tapered teeth 215 adjust and align within the frustum shaped teeth 122 providing the traction necessary to move the autonomous mobile lift robot case 330 along the frustum shaped teeth 122 of the rack lattice structure in a horizontal direction. The vertical angle control guide tracks 226 in the vertical angle control guides 225 mounted in the vertical angle control supports 228 provide angle adjustment for the tapered teeth gears 214a that are mounted vertically to have the tapered teeth 215 adjust and align within the frustum shaped teeth 122 providing the traction necessary to move the autonomous mobile lift robot case 330 along the frustum shaped teeth 122 of the rack lattice structure in a vertical direction.

In the extended position, the vertical arm actuator sliding knobs 290 move to the nearest end to the corners of the autonomous mobile lift robot case 330 of the vertical actuator angle control tracks 275 of the vertical actuator angle control guides 274 defining the alignment of the vertical arm actuators 284, the actuator arms 291a, and the vertical actuator hands 303.

Likewise, in the extended position, the horizontal arm actuator sliding knobs 283 move to the nearest end to the corners of the autonomous mobile lift robot case 330 of the horizontal actuator angle control tracks 272 of the horizontal actuator angle control guides 271 defining the alignment of the horizontal arm actuators 277, the actuator arms 291b, and the horizontal actuator hands 297.

The wheels 192, the wheel directional gear 197, and the wheel driving motor 202 are also visible in the center of each of the four faces of the autonomous mobile lift robot 349.

FIG. 36 shows a top view of one embodiment of the autonomous mobile lift robot 349 of the present invention with the tapered teeth gears in the retracted position overlayed with the views of the tapered teeth gears in the parallel and in the extended positions.

The actuator beveled gear driving motors 210 drive the control disks 204 that in turn drive the gear position control bars 212a, and 212b that retract the horizontal pivoting supports 232 and the vertical pivoting supports 252 that pivot around the pivoting axis 334 to the retracted position.

The positions of the vertically mounted tapered teeth gear 214a₁, 214a₂, and 214a₃ are shown in the retracted position, the parallel position, and the extended position respectively. The positions of horizontally mounted tapered teeth gear $214b_1$, $214b_2$, and $214b_3$ are in the retracted position, the parallel position, and the extended position respectively.

In the retracted position, the vertical arm actuator sliding knobs 290 move to the farthest end to the corners of the autonomous mobile lift robot case 330 of the vertical actuator angle control tracks 275 of the vertical actuator angle control guides 274 defining the alignment of the vertical arm actuators 284, the actuator arms 291a, and the vertical actuator hands 303.

Likewise, in the retracted position, the horizontal arm actuator sliding knobs 283 move to the farthest end to the corners of the autonomous mobile lift robot case 330 of the horizontal actuator angle control tracks 272 of the horizontal actuator angle control guides 271 defining the alignment of the horizontal arm actuators 277, the actuator arms 291b, and the horizontal actuator hands 297.

FIG. 37 shows an isometric view of one embodiment of the autonomous mobile lift robot 349 of the present invention with the tapered teeth gears in each corner in the retracted position and with the autonomous mobile lift robot case 330 drawn transparent in dash dotted lines to display details of the internal components and provide an overall picture of the components location inside the autonomous mobile lift robot 349.

The numbering pattern is the same used in FIG. 33 and FIG. 34 that are in the extended position, with same components located in the same place using the same differentiation letters to facilitate the identification of a particular component in all figures.

As FIG. 37 displays the autonomous mobile lift robot 349 in the retracted position, the gear position control bars 212c, etc. are mostly inside the control disks 204a, etc. that are located at the center of the autonomous mobile lift robot case 330. The actuator beveled gear driving motor 210b and the control disk actuator beveled gear 209a that drive the control disks 204a, and 204b on top are also visible, however, most of the positioning mechanism is partially obstructed from view by the other components and can be better seen in the extended position in FIG. 33 and FIG. 34.

FIG. 37 shows the horizontal pivoting support 232d and the vertical pivoting supports 252d installed around the pivoting axis 334d, with the horizontal gear support 241d indicated on its installed position in the horizontal pivoting support 232d. For better visualization angle, the vertical gear support 260b is indicated on its installed position in the vertical pivoting supports 252b.

The horizontal angle control guide 222a is installed at the bottom of the autonomous mobile lift robot case 330 and the vertical angle control guide 225a is installed on top of the vertical angle control support 228a that is installed at the bottom of the autonomous mobile lift robot case 330.

The vertical gear driving motor 220a and the vertical gear driving bevels 221a, and 221b that drive the vertical tapered teeth gear 214a are seen on their installed positions.

The horizontal gear driving motor 217a, the horizontal gear driving pulleys 218a, and 218b and the horizontal gear driving belt 219a that drive the horizontal tapered teeth gear 214b are seen on their installed positions.

FIG. 37 also shows the positioning arrangement of tapered teeth gears in each side of the autonomous mobile lift robot 349 allowing for a better understanding of the positioning mechanism.

The tapered teeth gears 214b and 214c are located in the side facing opposite to the side facing where the tapered teeth gears 214f and 214g are installed; and tapered teeth gears 214d and 214e are located in the side facing opposite to the side facing where the tapered teeth gears 214h and 214a are installed.

The positioning mechanism moves the horizontal pivoting supports 232a, and 232c together with the vertical pivoting support 252b, and 252d. This results in simultaneous movement of the tapered teeth gears 214b, and 214f together with the tapered teeth gears 214c, and 214g to configure the positioning of these gears on the two sides facing opposite to each other.

Similarly, the positioning mechanism moves the horizontal pivoting supports 232b, and 232d together with the vertical pivoting support 252a, and 252c. This results in simultaneous movement of the tapered teeth gears 214d, and 214h together with the tapered teeth gears 214a, and 214e to configure the positioning of these gears on the two other sides facing opposite to each other (see FIG. 33).

The horizontal arm actuator 277c is installed fixating the horizontal arm actuator fixation bar 280c in the horizontal pivoting support 232c. The horizontal arm actuator sliding knob 283c keeps the horizontal arm actuator sliding bar 282c from falling from the horizontal actuator angle control track 272c in the horizontal actuator angle control guide 271c that is installed at the top of the autonomous mobile lift robot case 330.

The vertical arm actuator 284c is installed fixating the vertical arm actuator fixation bar 287c in the vertical pivoting support 252c. The vertical arm actuator sliding knob 290c keeps the vertical arm actuator sliding bar 289c from falling from the vertical actuator angle control track 275c in the vertical actuator angle control guide 274c that is installed at the top of the autonomous mobile lift robot case 330.

The actuator arm 291f with the horizontal actuator hand 297c in the end is installed in the horizontal arm actuator 277c and the actuator arm 291e with the vertical actuator hand 303c in the end is installed in the vertical arm actuator 284c.

The wheels 192 are supported by the wheel support 195 that is attached to the wheel directional gear 197. The wheel directional motor 200 drives the wheel directional worm 199 that turns the wheel directional gear 197 adjusting the direction of movement.

The wheel driving axle 203 of the wheel driving motor 202 passes through the center of the wheel directional gear 197 and drives the wheel driving bevel 194b that transfers the movement to the wheel driving bevel 194a that drives the wheels 192.

FIG. 38 is a top view of the autonomous mobile lift robot 349 in the retracted position standing on the floor in middle of one access shaft 174 with two levels to show the clearances to the rack poles 130a, 130b, 130c, and 130d and the shelves 161d, 161e, 161f, and 161g.

FIG. 39 is a top view of the autonomous mobile lift robot 349 in the extended position in the middle of one access shaft 174 with two levels. In the extended position, the tapered teeth gears 214a, through 214h engage the rack poles 130a, 130b, 130c, and 130d allowing the autonomous mobile lift robot 349 to climb the rack poles.

As the autonomous mobile lift robot 349 climbs the rack poles the vertically mounted tapered teeth gears 214a, 214c, 214e, and 214g rotate and drive the autonomous mobile lift robot 349 up or down. The horizontally mounted tapered teeth gears 214b, 214d, 214f, and 214h remain stationary and slide providing a reference to keep the autonomous mobile lift robot 349 steady in the center of the access shaft 174. The clearances to shelves 161d, 161e, 161f, and 161g are visible in FIG. 39

FIG. 40 shows the autonomous mobile lift robot 349 that has climbed the rack poles 130 and reached the first level of the access shaft 174 in preparation to retrieve the pallet 102*b* stored in the first level exactly above the pallet 102*a* that is on the ground level.

Detail FIG. 40A shows a zoomed view of the tapered teeth gear 214 engaging the frustum shaped teeth 122 in the rack pole 130, in the rack pole standard hinged rack A 139, and in the rack pole top cover 149 and stopping at the center of the rack pole standard hinged rack A 139 in preparation to unlock and move the rack pole standard hinged rack A 139 to gain access to the pallet 102*b*.

FIG. 41 shows the autonomous mobile lift robot 349 in position for unlocking and moving the required components to gain access to the pallet 102*b* (see FIG. 40). To facilitate the view of more details, a reduced number of affected components and components needed to better illustrate the procedure are drawn: the rack poles 130*a*, through 130*d*; the rack pole standard hinged rack A 139*a*, through 139*d*; the rack pole standard hinged rack B 145*a*, trough 145*d*; and the rack pole top cover 149*a*, through 149*d*.

To access the pallet 102*b* the autonomous mobile lift robot 349 needs to move the rack pole standard hinged rack A 139*a*, and 139*c* and the rack pole standard hinged rack B 145*b*, and 145*d*. The process is the same for all parts so it is explained only once for the rack pole standard hinged rack A 139*a*.

Detail FIG. 41A shows a first position with the tapered teeth gear 214 engaging the frustum shaped teeth 122 in the rack pole standard hinged rack A 139. The lock bar 154 is firmly placed between the rack pole top lock fixture 150*a* of the rack pole top cover 149 and the hinged rack external lock fixture 142 of the rack pole standard hinged rack A 139. The hinged rack internal lock fixture 141 of the rack pole standard hinged rack A 139 is left unused.

The gear position control bar 212 attached to the vertical pivoting support action bar 257 keeps the vertical pivoting support 252 in the extended position. The vertical arm actuator fixation bar 287 fixated to the vertical pivoting support 252 puts the vertical arm actuator 284 in the extended position ensuring the proper alignment of the vertical arm actuator 284 (see FIG. 34).

In the extended position, the vertical gear support guide pin 268 is at the extremity of the vertical angle control guide track 226 adjusting the angle of the vertical gear support 260 so that the tapered teeth gear 214 is in full contact with the frustum shaped teeth 122 in the rack pole standard hinged rack A 139.

The vertical hinged rack actuator 313 is installed at the vertical gear support 260 and aligned perpendicularly to the rack pole standard hinged rack A 139. The hinged rack arm 317 is retracted and the hinged rack arm stopper 319 is further to the right. The hinged rack arm hand actuator 320, the hinged rack hand 323, and the hinged rack hand rollers 328 remain at a distance, not engaging the hinged rack hold bar 144 of the rack pole standard hinged rack A 139.

The hinged rack hand 323 is retracted and the hinged rack hand stopper 325 is further to the bottom to keep the hinged rack hand rollers 328 below the hinged rack hold bar 144.

The vertical arm actuator 284 and the actuator arm 291 are aligned with the position of lock bar grabbing neck 159 and the lock bar knob 160. The vertical actuator hand 303 is in a low position in the actuator hand 294 causing the vertical actuator hand grabbing tip 308 to be at exactly the same level of the lock bar grabbing neck 159. As the actuator arm

291 is retracted, the vertical actuator hand grabbing tip 308 stays at a distance and does not engage the lock bar grabbing neck 159.

Detail FIG. 41B shows a second position with the tapered teeth gear 214 engaging the frustum shaped teeth 122 in the rack pole standard hinged rack A 139. The lock bar 154 is firmly placed between the rack pole top lock fixture 150*a* of the rack pole top cover 149 and the hinged rack external lock fixture 142 of the rack pole standard hinged rack A 139. The hinged rack internal lock fixture 141 of the rack pole standard hinged rack A 139 is left unused.

The gear position control bar 212 attached to the vertical pivoting support action bar 257 keeps the vertical pivoting support 252 in the extended position. The vertical arm actuator fixation bar 287 fixated to the vertical pivoting support 252 puts the vertical arm actuator 284 in the extended position ensuring the proper alignment of the vertical arm actuator 284 (see FIG. 34).

In the extended position, the vertical gear support guide pin 268 is at the extremity of the vertical angle control guide track 226 adjusting the angle of the vertical gear support 260 so that the tapered teeth gear 214 is in full contact with the frustum shaped teeth 122 in the rack pole standard hinged rack A 139.

The vertical hinged rack actuator 313 is installed at the vertical gear support 260 and aligned perpendicularly to the rack pole standard hinged rack A 139. The hinged rack arm 317 is extended and the hinged rack arm stopper 319 is in contact with the vertical hinged rack actuator 313. The hinged rack arm hand actuator 320, the hinged rack hand 323, and the hinged rack hand rollers 328 are exactly below the hinged rack hold bar 144 of the rack pole standard hinged rack A 139.

As the hinged rack hand 323 is retracted and the hinged rack hand stopper 325 is further to the bottom the hinged rack hand rollers 328 are not in contact with the hinged rack hold bar 144 of the rack pole standard hinged rack A 139.

The vertical arm actuator 284 and the actuator arm 291 are aligned with the position of lock bar grabbing neck 159 and the lock bar knob 160. The actuator arm 291 is extended and the vertical actuator hand 303 is in a low position in the actuator hand 294 causing the vertical actuator hand grabbing tip 308 to engage the lock bar grabbing neck 159.

Detail FIG. 41C shows a third position with the tapered teeth gear 214 engaging the frustum shaped teeth 122 in the rack pole standard hinged rack A 139. The lock bar 154 is lifted and free to rotate around the rack pole top lock fixture 150*a* of the rack pole top cover 149. The hinged rack hand rollers 328 of the hinged rack hand 323 are in contact with both sides of the hinged rack hold bar 144 of the rack pole standard hinged rack A 139 and hold the rack pole standard hinged rack A 139 in place. The hinged rack internal lock fixture 141 and the hinged rack external lock fixture 142 of the rack pole standard hinged rack A 139 are not used.

The gear position control bar 212 attached to the vertical pivoting support action bar 257 keeps the vertical pivoting support 252 in the extended position. The vertical arm actuator fixation bar 287 fixated to the vertical pivoting support 252 puts the vertical arm actuator 284 to the extended position ensuring the proper alignment of the vertical arm actuator 284 (see FIG. 34).

In the extended position, the vertical gear support guide pin 268 is at the extremity of the vertical angle control guide track 226 adjusting the angle of the vertical gear support 260 so that the tapered teeth gear 214 is in full contact with the frustum shaped teeth 122 in the rack pole standard hinged rack A 139, with the tapered teeth 215 parallel to the rack pole standard hinged rack A 139.

The tapered teeth edge face 216 help the tapered teeth 215 to adjust to eventual minor variations in the frustum shaped teeth 122 individual positions when the tapered teeth gear 214 needs to slide horizontally against the rack pole standard hinged rack A 139 (see detail FIG. 41D).

The vertical hinged rack actuator 313 is installed at the vertical gear support 260 and aligned perpendicularly to the rack pole standard hinged rack A 139. The hinged rack arm 317 is extended and the hinged rack arm stopper 319 is in contact with the vertical hinged rack actuator 313.

The hinged rack arm hand actuator 320 is exactly below the hinged rack hold bar 144 and the hinged rack hand 323 is extended with the hinged rack hand stopper 325 in contact with the hinged rack arm hand actuator 320. The hinged rack hand rollers 328 in both sides of the hinged rack hand 323 are in contact with the hinged rack hold bar 144 holding the rack pole standard hinged rack A 139 in contact with the tapered teeth gear 214.

The vertical arm actuator 284 and the actuator arm 291 are aligned with the position of lock bar grabbing neck 159 and the lock bar knob 160. The actuator arm 291 is extended and the vertical actuator hand 303 is in a raised position in the actuator hand 294 causing the vertical actuator hand grabbing tip 308 engaged to the lock bar grabbing neck 159 to lift the lock bar knob 160 and the lock bar 154 until the tapered end 158 clears the hinged rack external lock fixture 142 of the rack pole standard hinged rack A 139.

To avoid losing the grip on the rack pole standard hinged rack A 139 the hinged rack hand 323 is extended before the vertical actuator hand 303 is raised.

The gear position control bar 212 attached to the vertical pivoting support action bar 257 then retracts and pulls the vertical pivoting support 252 to the parallel position. The vertical arm actuator fixation bar 287 fixated to the vertical pivoting support 252 pushes the vertical arm actuator 284 to the parallel position and the alignment of the vertical arm actuator 284 changes according to the profile of the vertical actuator angle control track 275 of the vertical actuator angle control guide 274 that is made to ensure that the movement of the vertical actuator hand grabbing tip 308 matches the lock bar grabbing neck 159 as the lock bar 154 rotates around the rack pole top lock fixture 150a of the rack pole top cover 149 (see FIG. 34).

At the same time, the vertical gear support guide pin 268 slides in the vertical angle control guide track 226 that has the profile needed to adjust the angle of the vertical gear support 260 so that the tapered teeth gear 214 remains in full contact with the frustum shaped teeth 122 in the rack pole standard hinged rack A 139, with the tapered teeth 215 parallel to the rack pole standard hinged rack A 139 at all times until the tapered teeth gear 214 reaches the parallel position.

Because the pivoting axis are different, the change in the positions of the rack pole standard hinged rack A 139 and the tapered teeth gear 214 requires a change in the relative position of the rack pole standard hinged rack A 139 and the tapered teeth gear 214. In case of a horizontally mounted tapered teeth gear 214 the tapered teeth gear 214 can just rotate. A vertically mounted tapered teeth gear 214 on the other hand has slide horizontally against the rack pole standard hinged rack A 139. The tapered teeth edge face 216 help the tapered teeth 215 to adjust to eventual minor variations in the frustum shaped teeth 122 individual positions throughout the length of the rack pole standard hinged rack A 139 where the slide takes place. As reference, the initial position of the tapered teeth gear 214 is a little to the right of the hinged rack internal lock fixture 141 (see detail FIG. 41D).

Detail FIG. 41D shows a fourth position with the rack pole standard hinged rack A 139 already moved to align with the rack pole standard hinged rack B 145. The lock bar 154 is lifted and free to rotate around the rack pole top lock fixture 150a of the rack pole top cover 149. The hinged rack hand rollers 328 of the hinged rack hand 323 are in contact with both sides of the hinged rack hold bar 144 of the rack pole standard hinged rack A 139 and hold the rack pole standard hinged rack A 139 in place. The hinged rack internal lock fixture 141 and the hinged rack external lock fixture 142 of the rack pole standard hinged rack A 139 are not used.

The vertical arm actuator fixation bar 287 fixated to the vertical pivoting support 252 puts the vertical arm actuator 284 in the parallel position and the alignment of the vertical arm actuator 284 is adjusted according to the profile of the vertical actuator angle control track 275 of the vertical actuator angle control guide 274 that ensures that at the parallel position, the position of the vertical actuator hand grabbing tip 308 matches the position of the hinged rack internal lock fixture 141 of the rack pole standard hinged rack A 139.

In the parallel position, the vertical gear support guide pin 268 sliding in the vertical angle control guide track 226 adjusts the angle of the vertical gear support 260 so that the tapered teeth gear 214 is in full contact with the frustum shaped teeth 122 in the rack pole standard hinged rack A 139.

The vertical hinged rack actuator 313 is installed at the vertical gear support 260 and aligned perpendicularly to the rack pole standard hinged rack A 139. The hinged rack arm 317 is extended and the hinged rack arm stopper 319 is in contact with the vertical hinged rack actuator 313.

The hinged rack arm hand actuator 320 is exactly below the hinged rack hold bar 144 and the hinged rack hand 323 is extended with the hinged rack hand stopper 325 in contact with hinged rack arm hand actuator 320. The hinged rack hand rollers 328 in both sides of the hinged rack hand 323 are in contact with the hinged rack hold bar 144 holding the rack pole standard hinged rack A 139 in contact with the tapered teeth gear 214.

The vertical arm actuator 284 and the actuator arm 291 are aligned with the position of lock bar grabbing neck 159 and the lock bar knob 160. The actuator arm 291 is extended and the vertical actuator hand 303 is in a high position in the actuator hand 294 causing the vertical actuator hand grabbing tip 308 engaged to the lock bar grabbing neck 159 to hold the lock bar 154 in a high position in such a way that the tapered end 158 aligns with and stay above the hinged rack internal lock fixture 141 of the rack pole standard hinged rack A 139.

As the tapered teeth gear 214 reaches the final position of the horizontal slide a little to the left of hinged rack external lock fixture 142 of the rack pole standard hinged rack A 139 the length of the horizontal slide during the pivoting of the rack pole standard hinged rack A 139 can be ascertained comparing the position of the tapered teeth gear 214 in Detail FIG. 41D with the position of the tapered teeth gear 214 in Detail FIG. 41C.

Detail FIG. 41E shows a fifth position with the rack pole standard hinged rack A 139 aligned with the rack pole standard hinged rack B 145. The lock bar 154 is firmly placed between the rack pole top lock fixture 150a of the rack pole top cover 149 and the hinged rack internal lock fixture 141 of the rack pole standard hinged rack A 139. The hinged rack external lock fixture 142 of the rack pole standard hinged rack A 139 is left unused.

The vertical arm actuator fixation bar 287 fixated to the vertical pivoting support 252 puts the vertical arm actuator 284 in the parallel position and the alignment of the vertical arm actuator 284 is adjusted according to the profile of the vertical actuator angle control track 275 of the vertical actuator angle control guide 274 that ensures that at the parallel position, the position of the vertical actuator hand grabbing tip 308 matches the position of the hinged rack internal lock fixture 141 of the rack pole standard hinged rack A 139.

In the parallel position, the vertical gear support guide pin 268 sliding in the vertical angle control guide track 226 adjusts the angle of the vertical gear support 260 so that the tapered teeth gear 214 is in full contact with the frustum shaped teeth 122 in the rack pole standard hinged rack A 139.

The vertical hinged rack actuator 313 is installed at the vertical gear support 260 and aligned perpendicularly to the rack pole standard hinged rack A 139. The hinged rack arm 317 is extended and the hinged rack arm hand actuator 320, the hinged rack hand 323, and the hinged rack hand rollers 328 are exactly below the hinged rack hold bar 144 of the rack pole standard hinged rack A 139.

As the hinged rack hand 323 has retracted, the hinged rack hand stopper 325 is located further to the bottom and the hinged rack hand rollers 328 are no longer in contact with the hinged rack hold bar 144 of the rack pole standard hinged rack A 139.

The vertical arm actuator 284 and the actuator arm 291 are aligned with the position of lock bar grabbing neck 159 and the lock bar knob 160. The actuator arm 291 is extended and the actuator hand 294 has lowered the position of the vertical actuator hand 303 causing the vertical actuator hand grabbing tip 308 engaged in the lock bar grabbing neck 159 to lower the lock bar knob 160 and the lock bar 154 so that the tapered end 158 fits into the hinged rack internal lock fixture 141 of the rack pole standard hinged rack A 139. The conical profile of the tapered end 158 helps to compensate for minor variations in the positioning and ensures a successful insertion of the lock bar 154 into the hinged rack internal lock fixture 141 of the rack pole standard hinged rack A 139.

To avoid losing the grip on the rack pole standard hinged rack A 139 the vertical actuator hand 303 is lowered before the hinged rack hand 323 is retracted.

Detail FIG. 41F shows a sixth position with the rack pole standard hinged rack A 139 aligned with the rack pole standard hinged rack B 145. The lock bar 154 is firmly placed between the rack pole top lock fixture 150a of the rack pole top cover 149 and the hinged rack internal lock fixture 141 of the rack pole standard hinged rack A 139. The hinged rack external lock fixture 142 of the rack pole standard hinged rack A 139 is left unused.

The vertical arm actuator fixation bar 287 fixated to the vertical pivoting support 252 puts the vertical arm actuator 284 in the parallel position and the alignment of the vertical arm actuator 284 is adjusted according to the profile of the vertical actuator angle control track 275 of the vertical actuator angle control guide 274 that ensures that at the parallel position, the position of the vertical actuator hand grabbing tip 308 matches the position of the hinged rack internal lock fixture 141 of the rack pole standard hinged rack A 139.

In the parallel position, the vertical gear support guide pin 268 sliding in the vertical angle control guide track 226 adjusts the angle of the vertical gear support 260 so that the tapered teeth gear 214a is in full contact with the frustum shaped teeth 122 in the rack pole standard hinged rack A 139.

The vertical hinged rack actuator 313 is installed at the vertical gear support 260 and aligned perpendicularly to the rack pole standard hinged rack A 139. The hinged rack arm 317 is retracted and hinged rack arm hand actuator 320, the hinged rack hand 323, and the hinged rack hand rollers 328 remain at a distance, not engaging the hinged rack hold bar 144 of the rack pole standard hinged rack A 139 and clear of other structures.

The hinged rack hand 323 is retracted and the hinged rack hand stopper 325 is further to the bottom keeping the hinged rack hand rollers 328 below the hinged rack hold bar 144.

The vertical arm actuator 284 and the actuator arm 291 are aligned with the position of lock bar grabbing neck 159 and the lock bar knob 160. As the actuator arm 291 retracts, the vertical actuator hand grabbing tip 308 disengages the lock bar grabbing neck 159 and moves back and stays clear of other structures. The vertical actuator hand 303 is in a low position in the actuator hand 294 and the vertical actuator hand grabbing tip 308 remains at the same level of the lock bar grabbing neck 159.

The tapered teeth gear 214b remains stationary at the same position throughout the process of pivoting the rack pole standard hinged rack A 139. Once the process of pivoting the rack pole standard hinged rack A 139 is complete, the tapered teeth gear 214b is able to rotate to propel the autonomous mobile lift robot case 330 horizontally. The tapered teeth gear 214a perpendicularly mounted to the tapered teeth gear 214b does not rotate but slides along the rack pole standard hinged rack A 139 and the rack pole standard hinged rack B 145. As the tapered teeth gear 214a slides, the engaged teeth function as guides to keep the autonomous mobile lift robot case 330 at the desired level.

FIG. 42 shows the autonomous mobile lift robot 349 at the first level of the access shaft 174 positioned to retrieve the pallet 102b stored in the first level exactly above the pallet 102a that is on the ground level.

The single rack piece 120, the rack pole standard hinged rack A 139a, and the rack pole standard hinged rack B 145a installed at the rack pole 130a and the rack pole standard hinged rack A 139b, and the rack pole standard hinged rack B 145b installed at the rack pole 130b are all aligned and form a single seamless rack. The same occurs at the other side of the access shaft 174 allowing the autonomous mobile lift robot 349 to leave the center of the access shaft 174 and move to the retrieving position below the pallet 102b.

Detail FIG. 42A shows the autonomous mobile lift robot 349 under the pallet 102b that is still resting on the shelf 161. The storage gap 350 between the pallet 102a and the pallet 102b provides sufficient space for the autonomous mobile lift robot 349 to fit in and the single rack piece 120, the and the single rack piece 120, the rack pole standard hinged rack B 145a and the rack pole standard hinged rack A 139a provide a continuous rack that supports the autonomous mobile lift robot 349.

FIG. 43 shows the autonomous mobile lift robot 349 with the pantographic lift platform 178 raised at the first level of the access shaft 174 retrieving the pallet 102b stored in the first level exactly above the pallet 102a that is on the ground level.

The single rack piece 120, the rack pole standard hinged rack A 139, and the rack pole standard hinged rack B 145 are all aligned and form a single seamless rack.

Detail FIG. 43A shows the autonomous mobile lift robot 349 with the pantographic lift platform 178 raised and supporting the pallet 102*b* that is no longer resting on the shelf 161. The storage gap 350 between the pallet 102*a* and the pallet 102*b* provides sufficient space for the autonomous mobile lift robot 349 to fit in and the single rack piece 120, the rack pole standard hinged rack B 145 and the rack pole standard hinged rack A 139 provide a continuous rack that supports the autonomous mobile lift robot 349.

FIG. 44 shows the autonomous mobile lift robot 349 with the pantographic lift platform 178 raised and carrying the pallet 102*b* that was retrieved from the shelf 161 on the first level. The shelf access channel 163 provides the path to allow the raised pantographic lift platform 178 to pass and remove the pallet 102*b* from the shelf 161.

The rack pole standard hinged rack A 139 and the rack pole standard hinged rack B 145 are aligned and form a single seamless rack that supports the autonomous mobile lift robot 349 as it moves back to the center of the access shaft 174.

Detail FIG. 44A shows the autonomous mobile lift robot 349 with the pantographic lift platform 178 raised and supporting the pallet 102*b* that is no longer above the pallet 102*a*. The rack pole standard hinged rack A 139 and the rack pole standard hinged rack B 145 are aligned and form a single seamless rack that supports the autonomous mobile lift robot 349 as it moves back to the center of the access shaft 174.

FIG. 45 shows one loaded autonomous mobile lift robot 351 configured with one half size pallet 352 loaded on top of the autonomous mobile lift robot 349 with the pantographic lift platform 178 raised and the tapered teeth gears 214*a*, and 214*b* in the front face and the corresponding tapered teeth gears 214*e*, and 214*f* on the opposite face on the back in the parallel position and the tapered teeth gears 214*g*, and 214*h* in the right face and the corresponding tapered teeth gears 214*c*, and 214*d* in the left face in the retracted position.

FIG. 46 is an embodiment of a fast loading truck 353 of the present invention used for hauling pallets. The fast loading truck 353 has the flatbed chassis 354 a standard cargo bay 355 with a right door 356 and left door 357 providing access to the cargo bay 355.

FIG. 47 shows the right door 356 and the left door 357 open showing a door rack 359 and a cargo bay side rack 361 installed at the right door 356. The standard cargo bay 355 has a cargo bay center division 358 with a cargo bay center rack 360 installed on both sides of the cargo bay center division 358. The cargo bay center division 358 has a middle division 362 split by a middle division rack 363 with lower shelves 364 and upper shelves 365.

FIG. 48 shows the fast loading truck 353 with the flatbed chassis 354 and the standard cargo bay 355 with the right door 356, the left door 357, and the middle division 362 open parked at one truck loading bay 367.

The right door lock bars 368*a* and 368*b* are installed between the right door 356 and the middle division 362 and the left door lock bars 369*a* and 369*b* are installed between the left door 357 and the middle division 362. The right door 356, the left door 357, and the middle division 362 are kept parallel to each other and at a fixed distance to each other.

With the middle division 362 open, the cargo bay center rack 360 installed on both sides of the cargo bay center division 358 and the middle division rack 363 installed on both sides of the middle division 362 form a continuous seamless rack.

Likewise, with the doors open, the cargo bay side rack 361 installed at the right side of the cargo bay 355 is aligned with the door rack 359 installed at the right door 356 and the mirror version of the cargo bay side rack 361 installed at the left side of the cargo bay 355 is aligned with the mirror version of the door rack 359 installed at the left door 357.

The portions of the lower shelves 364*a*, and 364*b* and the upper shelves 365*a*, 365*b* that are installed on both sides of the cargo bay center division 358 that are inside the cargo bay 355 have been drawn in dashed lines to enable the visualization of the access path 366*a*, 366*b*, 366*c*, and 366*d* in the middle of the lower shelves 364*a*, and 364*b* and the upper shelves 365*a*, 365*b* that runs all the way from the door to the front of the cargo bay 355 that allow loaded autonomous mobile lift robots 351 with their respective pantographic lift platforms 178 to pass through the lower shelves 364 and the upper shelves 365.

The truck loading bay 367 is at the same level of the truck floor 370 that runs all the way from the doors until the front of the cargo bay 355.

FIG. 49 shows the fast loading truck 353 being loaded with several loaded autonomous mobile lift robots 351*a*, through 351*x* that climb the rack structure on the right door 356, the left door 357, and the middle division 362 and continue into the rack structure in the cargo bay 355. The right door lock bars 368*a* and 368*b* and the left door lock bars 369*a* and 369*b* hold the right door 356, the left door 357, and the middle division 362 at the proper distance and keep the rack structure accessible to the loaded autonomous mobile lift robots.

The loaded autonomous mobile lift robots 351*a*, through 351*x* coming from the truck loading bay 367 climb the rack structure and move inside the cargo bay 355 in pairs one after the other at both sides of the middle division 362 and move forward towards the front of the cargo bay 355 to make space for the subsequent pair of loaded autonomous mobile lift robots. This strategy allows for the loading of the entire first level of the fast loading truck 353 in one step.

FIG. 49 shows the last loaded autonomous mobile lift robots 351*w*, and 351*x* about to start climbing the rack structure on the right door 356, the left door 357, and the middle division 362 while the other loaded autonomous mobile lift robots 351*a*, through 351*v* that are already inside the cargo bay 355 are moving towards the front of the cargo bay 355.

Once all the loaded autonomous mobile lift robots 351*a*, through 351*x* are inside the cargo bay 355, the loaded autonomous mobile lift robots 351*a*, through 351*x* lower their pantographic lift platforms 178 deposit their half size pallets 352 in the corresponding upper shelves 365*a* and the loaded autonomous mobile lift robots 351*a*, through 351*x* leave, with the last pair of loaded autonomous mobile lift robots 351*w*, and 351*x* that went in being the first pair to leave until all loaded autonomous mobile lift robots 351*a*, through 351*x* have left.

FIG. 50 shows the fast loading truck 353 with the loaded upper level 372 being loaded at the ground level with several loaded autonomous mobile lift robots 351*a*, through 351*d* that run from the truck loading bay 367 directly into the cargo bay 355 using the truck floor 370.

To avoid unnecessary clutter, only four loaded autonomous mobile lift robots 351*a*, through 351*d* have been drawn, but as seen in FIG. 49, the exact number of loaded autonomous mobile lift robots necessary to load the entire ground level of the fast loading truck 353 is used, entering the cargo bay 355 in pairs until they reach the front of the cargo bay 355, then lower their pantographic lift platforms 178 to deposit their half size pallets 352 in the corresponding lower shelves 364a and leave, with the last pair of loaded autonomous mobile lift robots that went in being the first pair to leave until all loaded autonomous mobile lift robots have left.

Alternatively, all or some of the loaded autonomous mobile lift robots 351 may remain on the fast loading truck 353 for deployment and delivery of each of the half size pallets 352. Through mapping and scheduling, the loaded autonomous mobile lift robots 351 may load the fast loading truck 353 in the proper order with each of the half size pallets 352 having the proper goods for delivery to each mapped location along the designated route of the fast loading truck 353. Depending on the height of the fast loading truck 353 and the height of the pallets, additional levels may be needed, and the rack structure is made accordingly.

Operation—Second Embodiment

FIG. 53 shows the first step of the assembly of the improved warehouse being assembled 403. One array of bases 106a, 106b, 106c, etc. with the bases 106a, 106b, 106c placed at the adequate distance from each other in the X and Y direction, is constructed.

On top of each base 106 either one base short pole 373 or one base short traction pole 376a is installed according to the pattern shown in FIG. 53. At regular intervals, four base short traction pole 376a, 376b, 376c, and 376d, etc. are placed with the face containing the straight flat teeth 377 facing each other towards the center, defining one cross-track access shaft 404a, 404b, etc. (see FIG. 54).

FIG. 54 the second step of the improved warehouse being assembled 403. One array of ground level wider shelves 386a and ground level longer shelves 395a each one at the adequate place is installed on top of the array of bases 106, base short poles 373, and base short traction poles 376 previously laid out (see FIG. 53).

All ground level wider shelves 386a are installed with their respective wider shelf access openings 388 oriented towards their respective cross-track access shaft 404a. Likewise, all ground level longer shelves 395a are installed with their respective longer shelf access opening 396 oriented towards their respective cross-track access shaft 404a.

At convenient places, some ground level wider shelves 386x and ground level longer shelves 395x (drawn in dash dotted lines) are not installed to create access paths to the cross-track access shafts 404a, 404b, etc. The number of ground level wider shelves 386x and ground level longer shelves 395x not installed at construction time may be increased or some installed may be removed later on to increase the number of access paths to the cross-track access shafts 404a, 404b, etc. up to the limit of removing all ground level wider shelves 386x and ground level longer shelves 395x from the structure for maximum access to the cross-track access shafts 404a, 404b, etc.

For clarity, the expression ground level is used to refer to shelves installed at a short distance to the ground floor, where the bases are placed. It counts as the first level in the structure and the terms ground level, and first level are used with the same meaning and are interchangeable henceforth.

Detail FIG. 54A shows the ground level wider shelf 386b installed at one of the shelf supports 374a of the base short traction pole 376. The ground level wider shelf 386b is locked in place by means of inserting the shelf insertion hole 387a of the ground level wider shelf 386b into the shelf support fixation bolt 375a of the base short traction pole 376.

A simple bolt nut (not drawn) may be used to fasten the ground level wider shelf 386b in place and provide additional stability to the structure.

Detail FIG. 54B shows the ground level longer shelf 395b installed at one of the shelf supports 374b of the base short poles 373. The ground level longer shelf 395b is locked in place by means of inserting the shelf insertion hole 387b of the ground level longer shelf 395b into the shelf support fixation bolt 375b of the base short traction pole 376. A simple bolt nut (not drawn) may be used to fasten the ground level longer shelf 395b in place and provide additional stability to the structure.

FIG. 55 shows a top view of the improved warehouse being assembled 403 to better display the access paths to the cross-track access shafts 404a, 404b, etc. One ground level wider shelf 386 and one ground level longer shelf 395 are indicated to illustrate their difference in shape and how they fit in the structure, with one side of one shelf matching the base of the other shelf and vice versa.

FIG. 56 shows the improved warehouse being assembled 403 fully loaded with all shelves installed at ground level occupied by full size containers 405.

FIG. 57 shows an isometric view of the improved two level nine cell warehouse 406. The improved warehouse structure 407 of the improved two level nine cell warehouse 406 is constructed containing one array of ground level wider shelves 386 and ground level longer shelves 395 that are installed only at ground level and one array of upper levels wider shelves 389 and upper levels longer shelves 397 that are installed at all other levels above ground level.

Differently from the ground level where some ground level wider shelves 386 and ground level longer shelves 395 are not installed, at subsequent levels all upper levels wider shelves 389 and all upper levels longer shelves 397 are installed to maximize available storage space.

The improved warehouse structure 407 also contains bases 106, base short poles 373, and base short traction poles 376 at the adequate locations between the ground floor and the ground level or first level.

To ensure that any item can be taken into and removed from the improved warehouse through the access paths (see FIG. 55), full size poles 384 and full size traction poles 385 are used at the adequate locations between the ground level or first level and the second level. Subsequent levels of the warehouse may be constructed using rack pieces of shorter sizes but the distance between the first level and the second level must be equal or greater than the longest distance between any subsequent levels in the rest of the improved warehouse.

FIG. 58 shows an isometric view of the improved six level nine cell warehouse 408. The improved warehouse structure 407 of the improved six level nine cell warehouse 408 is constructed containing one array of ground level wider shelves 386 and ground level longer shelves 395 that are installed only at ground level and one array of upper levels wider shelves 389 and upper levels longer shelves 397 that are installed at all other levels above the ground level.

FIG. 59 shows an isometric view of the improved six level nine cell warehouse 408 fully loaded with various items that can be stored in the improved warehouse structure 407 at their intended levels.

In the example of FIG. 59 the full size containers 405 occupy the first and the second levels. The half size pallets 409 occupy the third level, the third size boxes 410 occupy the fourth level, the quarter size boxes 411 occupy the fifth level and the full size pallets 412 occupy the sixth and last level.

FIG. 60 shows a front view of the improved six level nine cell warehouse 408 with one or two of the various items that can be stored in the improved warehouse structure 407 at their intended levels for a better view of the relative sizes and storage possibilities that the design of the improved warehouse of the present invention offers.

The full size containers 405*a* and 405*b* occupy the first and the second levels that are constructed using full size poles 384 and full size traction poles 385. Because the full size container 405 is the tallest item, any other item could be stored in the first and second levels in a position replacing one full size container 405 such as the full size pallet 412*a* albeit wasting some storage space. As a general rule, any item can be stored in a level not originally intended to store such item provided that the item height is less than the available heigh at the level it is intended to be stored.

The half size pallet 409 occupies the third level that is constructed using half size poles 382 and half size traction poles 383. The third size box 410 occupies the fourth level that is constructed using one third size poles 380 and one third size traction poles 381. The quarter size box 411 occupies the fifth level that is constructed using one quarter size poles 378 the one quarter size traction poles 379, and the full size pallet 412*b* occupies the sixth and last level.

FIG. 61 shows a top view of the improved six level nine cell warehouse 408 fully loaded, with full size pallets 412 at the top to display the accessibility of all the stored items through the various cross-track access shafts 404*a*, 404*b*, etc. Any item is accessible by one and only one cross-track access shaft 404 and each cross-track access shaft 404 enables access to four stored items on a particular level.

FIG. 62 shows an isometric exploded view of components used to construct the pantographic lift assembly 413 (see FIG. 71).

The taller pantographic lift platform 414 has the shape of a parallelogram that is hollow and does not have the face at the bottom. The taller pantographic lift platform 414 has one platform fixed axis holes 179 located near the top face, parallel to the top face that goes all the way through from one side to the other side of the taller pantographic lift platform 414. The taller pantographic lift platform 414 also has one platform moving axis slot 180 that is parallel to the top face and is located at the same distance of the top face of the taller pantographic lift platform 414 as the platform fixed axis hole 179 and goes all the way through from one side to the other side of the taller pantographic lift platform 414.

The pantographic bar 181*a* is composed of a straight bar with one pair of outer axis holes 182*a*, 182*b* one at each end of the bar and one center axis hole 183 located at the center of the bar. Four pantographic bars 181*a*, 181*b*, etc. are required to build the pantographic lift. Two groups of two pantographic bars 181*a*, and 181*b* are installed linked at the middle forming a "X", one group at each side of the taller pantographic lift platform 414 (see FIG. 71).

The top axis 184*a* is a simple rod with the same width as the outer wall of the pantographic lift platform 178. Two top axis 184*a*, and 184*b* are required to build the pantographic lift, one installed at platform fixed axis hole 179 that remains fixed and another installed at the platform moving axis slot 180 that is able to slide the length of the platform moving axis slot 180.

The outer axis holes 182*a* of the pantographic bars 181 are inserted into the two top axis 184*a*, and 184*b* before the top axis 184*a*, and 184*b* are fully inserted into their corresponding places of installation. Matching sides of the top arms of the two "X" shapes constructed with the four pantographic bars 181*a*, and 181*b*, etc. are inserted at each top axis 184 so that each top axis 184 is inserted into two pantographic bars 181, one from each "X" shape that are at the same side of the "X" shapes (see FIG. 71).

The center axis 185 is a simple rod with the width as the inner wall of the taller pantographic lift platform 414. The center axis 185 is installed connecting the center axis holes 183 of all the four pantographic bars 181 used to construct the pantographic lift and that are arranged in two "X" shapes, one "X" shape at each side of the taller pantographic lift platform 414 (see FIG. 71).

The bottom fixed axis 186 is a simple rod of suitable length that is installed at an anchoring point (see FIG. 71).

The bottom moving axis 187 is a simple rod with the same length of the bottom fixed axis 186 that has one bottom moving axis nut 188 at the center.

The pantographic motor 189 with one pantographic motor axis 190 of suitable length that has a thread with the same gage as the bottom moving axis nut 188 is used to engage the bottom moving axis nut 188 and move the bottom moving axis 187 closer or further away from the pantographic motor 189. Embodiments of the present invention comprise suitable electronics are provided within the scope of the present invention to establish connection to one or more digital devices such as computers, laptops, cellphones, tablets or other, may be connected wirelessly, using Wi-Fi, Bluetooth, cellular, radio-frequency, and other bandwidths for communication to have the one or more digital devices control the pantographic motor 189 to direct operation and movement or for scheduling of operations using one or more software applications.

FIG. 63 shows an exploded view of the short wheel assembly 415. The short wheel assembly 415 is composed of one pair of wheels 192 that are connected by the wheel axis 193 that is supported by the wheel support 195 that has one pair of wheel support axis holes 196 that matches the wheel axis 193.

One pair of wheel driving bevels 194*a*, and 194*b* with the first wheel driving bevel 194*a* placed at the wheel axis 193 to drive the wheel axis 193 and the second wheel driving bevel 194*b* placed at a 90 degrees angle to the first wheel driving bevel 194*a* is used to drive the wheels 192.

The wheel support 195 is attached to the wheel directional gear 197 that has one wheel directional gear center passage 198. The wheel directional gear 197 is able to rotate altering the orientation of the wheel support 195 and as a consequence of the wheels 192 by means of the wheel directional worm 199 that is fixed to the wheel directional motor shaft 201 of the wheel directional motor 200.

The wheel driving motor 202 is fitted with the short wheel driving axle 416 of suitable length that passes through the wheel directional gear center passage 198 and reaches the wheel driving bevel 194*b*. The wheel driving bevel 194*a* is fixated to the short wheel driving axle 416 so when the wheel driving motor 202 drives the short wheel driving axle 416 the movement is transferred to the wheels 192.

FIG. 64 shows the parts used to assemble the vertical sliding gear assembly 417. The vertical sliding gear support control rod 431 of the vertical sliding gear support 424 is inserted into the vertical sliding gear support actuator central hole 434 of the vertical sliding gear support actuator 433 and the vertical sliding gear support control rod stopper 432 is attached to the extremity of the vertical sliding gear support control rod 431 to lock it inside the vertical sliding gear support actuator 433.

The vertical sliding gear support front pin 427*a* and the vertical sliding gear support rear pin 428*a* of the vertical sliding gear support 424 are inserted into the vertical sliding gear support rail guide slot 422, the vertical sliding gear support actuator front pins 435a, 435b are inserted into the respective vertical sliding gear support rail front insertion holes 420a, 420b and the vertical sliding gear support actuator rear pin 436a is inserted into the vertical sliding gear support rail rear insertion hole 421 of the vertical sliding gear support rail 418a that is placed below.

Likewise the vertical sliding gear support front pin 427b and the vertical sliding gear support rear pin 428b of the vertical sliding gear support 424 are inserted into the vertical sliding gear support rail guide slot 422, the vertical sliding gear support actuator front pins 435c, 435d are inserted into the respective vertical sliding gear support rail front insertion holes 420a, 420b and the vertical sliding gear support actuator rear pin 436b is inserted into the vertical sliding gear support rail rear insertion hole 421 of a second vertical sliding gear support rail 418b that is placed above.

FIG. 64 also shows the hollow gear drive motor 437 that has the shape of a short cylinder with hollow gear drive motor fixation holes 438 at one side and one hollow gear drive motor main axis 439 at the other side.

The hollow flat gear 440 has the short hollow flat gear outer shaft 441 extending from the center of the solid side of the hollow flat gear 440 and the hollow flat gear inner shaft 442 at the opposite side, where the hollow flat gear 440 has the hollow flat gear cavity 443 of the appropriate size to contain the hollow gear drive motor 437. The hollow flat gear inner shaft 442 has the length shorter than the thickness of the hollow flat gear 440 so that as the hollow flat gear inner shaft 442 is inserted into the hollow gear drive motor main axis 439, the hollow gear drive motor 437 fits inside the hollow tapered gear cavity 466. The hollow flat gear 440 has standard hollow flat gear straight teeth 444.

The hollow gear drive motor 437 is installed into the vertical sliding gear support 424 using bolts of appropriate size in the vertical sliding gear support gear motor fixation holes 429 and the hollow gear drive motor fixation holes 438. The hollow flat gear outer shaft 441 of the hollow flat gear 440 is inserted into the vertical sliding gear support gear axle insertion hole 430 of the vertical sliding gear support 424.

FIG. 65 shows the parts used to assemble the horizontal sliding gear assembly 445. The horizontal sliding gear support control rod 457 of the horizontal sliding gear support 451 is inserted into the horizontal sliding gear support actuator hollow shaft 460 of the horizontal sliding gear support actuator 459 and the horizontal sliding gear support control rod stopper 458 is attached to the extremity of the horizontal sliding gear support control rod 457 to lock it inside the horizontal sliding gear support actuator 459.

The horizontal sliding gear support front pin 453a and the horizontal sliding gear support rear pin 454a of the horizontal sliding gear support 451 are inserted into the horizontal sliding gear support rail guide slot 449, the horizontal sliding gear support actuator front pins 461a, 461b are inserted into the respective horizontal sliding gear support rail front insertion holes 447a, and 447b and the horizontal sliding gear support actuator rear pin 462a is inserted into the horizontal sliding gear support rail rear insertion hole 448 of the horizontal sliding gear support rail 446 that is placed below.

Likewise the horizontal sliding gear support front pin 453b and the horizontal sliding gear support rear pin 454b of the horizontal sliding gear support 451 are inserted into the horizontal sliding gear support rail guide slot 449, the horizontal sliding gear support actuator front pins 461c, 461d are inserted into the respective horizontal sliding gear support rail front insertion holes 447a, and 447b and the horizontal sliding gear support actuator rear pin 462b is inserted into the horizontal sliding gear support rail rear insertion hole 448 of a second horizontal sliding gear support rail 446 that is placed above.

FIG. 65 also shows the hollow gear drive motor 437 that has the shape of a short cylinder with hollow gear drive motor fixation holes 438 at one side and one hollow gear drive motor main axis 439 at the other side.

The hollow tapered gear 463 is a straight teeth gear that has the short hollow tapered gear outer shaft 464 extending from the center of the solid side of the hollow tapered gear 463 and the hollow tapered gear inner shaft 465 at the opposite side, where the hollow tapered gear 463 has the hollow tapered gear cavity 466 of the appropriate size to contain the hollow gear drive motor 437. The length of the hollow tapered gear inner shaft 465 has a length shorter than the thickness of the hollow tapered gear 463 so that the hollow tapered gear inner shaft 465 is inserted into the hollow gear drive motor main axis 439, the hollow gear drive motor 437 fits inside the hollow tapered gear cavity 466.

The hollow tapered gear 463 is made with tapered teeth 215 to facilitate the sliding of the hollow tapered gear 463 in a linear direction parallel to its axis with the tapered teeth 215 engaged in an appropriate frustum shaped teeth rack.

The hollow gear drive motor 437 is installed into the horizontal sliding gear support 451 using bolts of appropriate size in the horizontal sliding gear support motor fixation holes 455 and the hollow gear drive motor fixation holes 438. The hollow tapered gear outer shaft 464 of the hollow tapered gear 463 is inserted into the horizontal sliding gear support gear axle insertion hole 456 of the horizontal sliding gear support 451.

Detail FIG. 65A shows the tapered teeth 215 of the hollow tapered gear 463 in greater magnification to display the tapered teeth edge face 216 of the tapered teeth 215.

FIG. 66 shows the parts used to assemble the vertical pivoting gear assembly 467. The pivoting support plate 468 has the pivoting support plate center hole 469 that goes through the entire width of the pivoting support plate 468. The pivoting support plate center hole 469 is surrounded by the pivoting support plate center hole holder 470 that has a bigger diameter than the pivoting support plate center hole 469 that goes through only the top half of the width of the pivoting support plate 468.

The pivoting support plate angle guide slot 471 spans a 45 degree arch that goes through the entire width of the pivoting support plate 468. The pivoting support plate angle guide slot 471 is surrounded by the pivoting support plate angle guide slot holder 472 that is a circular slot with bigger diameter and spanning the same 45 degree arch as the pivoting support plate angle guide slot 471 but that goes through only the top half of the width of the pivoting support plate 468.

The pivoting support plate 468 also has the pivoting support plate bevel gear 473 at one side spanning one arch of 55 degrees, with 5 degrees extra span for each side beyond the 45 degrees of the pivoting support plate angle guide slot 471 and the pivoting support plate angle guide slot holder 472.

The other features of the pivoting support plate 468 are the pivoting support plate front insertion holes 474a, 474b, the pivoting support plate rear insertion hole 475 and the pivoting support plate guide slot 476 that have the same shape and dimensions as the vertical sliding gear support rail front insertion holes 420a, 420b, the vertical sliding gear support rail rear insertion hole 421, and the vertical sliding gear support rail guide slot 422 respectively.

The angle control bevel 477 engages the pivoting support plate bevel gear 473 to turn the pivoting support plate 468 around the pivoting support plate center hole 469 clockwise or counterclockwise until the total travel of 45 degrees allowed by the pivoting support plate angle guide slot 471 is reached.

The angle control bevel 477 has the angle control bevel center hole 478 that fits into the angle control motor shaft 480 driven by the angle control motor 479.

The vertical sliding gear support 424 is composed by the vertical sliding gear support holder 425 and two vertical sliding gear support cross bars 426a, 426b. Each vertical sliding gear support cross bar 426a, 426b has one vertical sliding gear support front pin 427a, and 427b respectively and one vertical sliding gear support rear pin 428a, and 428b respectively. The vertical sliding gear support holder 425 has one set of vertical sliding gear support gear motor fixation holes 429 at one arm and one vertical sliding gear support gear axle insertion hole 430 at the other arm. The vertical sliding gear support control rod 431 is attached to the back of the vertical sliding gear support 424 at the opposite side of the vertical sliding gear support holder 425 slightly offset towards the top of the vertical sliding gear support 424.

The vertical sliding gear support control rod 431 terminates in the vertical sliding gear support control rod stopper 432 that is bolted to the vertical sliding gear support control rod 431.

The vertical sliding gear support actuator 433 is composed of a body in the shape of a cylinder with one vertical sliding gear support actuator central hole 434, one pair of vertical sliding gear support actuator front pins 435a, 435b, 435c, and 435d and one vertical sliding gear support actuator rear pin 436a, 436b that extend for both sides of the vertical sliding gear support actuator 433.

To match the offset towards the top that the vertical sliding gear support control rod 431 of the vertical sliding gear support 424 has, the portion of the vertical sliding gear support actuator front pins 435a, 435b below the body of the vertical sliding gear support actuator 433 is slightly longer than the portion of the vertical sliding gear support actuator front pins 435c, 435d above the body of the vertical sliding gear support actuator 433. Likewise, the portion of the vertical sliding gear support actuator rear pin 436a below the body of the vertical sliding gear support actuator 433 is slightly longer than the portion of the vertical sliding gear support actuator rear pin 436b above the body of the vertical sliding gear support actuator 433.

The vertical sliding gear support control rod 431 is inserted into the vertical sliding gear support actuator central hole 434 of the vertical sliding gear support actuator 433 and the vertical sliding gear support control rod stopper 432 is attached to the extremity of the vertical sliding gear support control rod 431 to lock it inside the vertical sliding gear support actuator 433.

The vertical sliding gear support front pin 427a and the vertical sliding gear support rear pin 428a are inserted into the pivoting support plate guide slot 476, the vertical sliding gear support actuator front pins 435a, 435b are inserted into the respective pivoting support plate front insertion holes 474a, 474b, and the vertical sliding gear support actuator rear pin 436a is inserted into the pivoting support plate rear insertion hole 475 of the pivoting support plate 468 that is placed below.

Likewise the vertical sliding gear support front pin 427b and the vertical sliding gear support rear pin 428b are inserted into the pivoting support plate guide slot 476, the vertical sliding gear support actuator front pins 435c, 435d are inserted into the respective pivoting support plate front insertion holes 474a, 474b, and the vertical sliding gear support actuator rear pin 436b is inserted into the pivoting support plate rear insertion hole 475 of the mirrored vertical sliding gear pivoting support rail 481 that is placed above. The mirrored vertical sliding gear pivoting support rail 481 is a mirror image of the pivoting support plate 468 and has the same features only inverted to be able to fit the assembly.

The positions of the pivoting support plate 468 and the mirrored vertical sliding gear pivoting support rail 481 are swapped to produce a mirrored version of the same assembly described above. The angle control bevel 477 is however only used to drive the pivoting rail at the bottom and where the positions are swapped, the angle control bevel 477. Drives the pivoting support plate bevel gear 473 of the mirrored vertical sliding gear pivoting support rail 481 (see FIG. 77 and FIG. 78).

FIG. 66 also shows the hollow gear drive motor 437 that has the shape of a short cylinder with one set of hollow gear drive motor fixation holes 438 at one side and one hollow gear drive motor main axis 439 at the other side.

The hollow tapered gear 463 is a straight teeth gear that has one short hollow tapered gear outer shaft 464 extending from the center of the solid side of the hollow tapered gear 463 and one hollow tapered gear inner shaft 465 at the opposite side, where the hollow tapered gear 463 has one hollow tapered gear cavity 466 of an appropriate size to contain the hollow gear drive motor 437. The hollow tapered gear inner shaft 465 has a length shorter than the thickness of the hollow tapered gear 463 so that the hollow tapered gear inner shaft 465 is inserted into the hollow gear drive motor main axis 439, the hollow gear drive motor 437 fits inside the hollow tapered gear cavity 466.

The hollow tapered gear 463 is made with tapered teeth 215 to facilitate the sliding of the hollow tapered gear 463 in a linear direction parallel to its axis with the tapered teeth 215 engaged in an appropriate frustum shaped teeth rack.

The hollow gear drive motor 437 is installed into the vertical sliding gear support 424 using bolts of appropriate size in the vertical sliding gear support gear motor fixation holes 429 and the hollow gear drive motor fixation holes 438. The hollow tapered gear outer shaft 464 of the hollow tapered gear 463 is inserted into the vertical sliding gear support gear axle insertion hole 430 of the vertical sliding gear support 424.

FIG. 67 shows the parts used to assemble the fixed gear assembly 482. The fixed hollow gear drive motor support 483 is a simple L shaped folded metal sheet with the fixed hollow gear drive motor support fixation holes 484 in one side and the fixed hollow gear drive motor support motor fixation holes 485 at the other side.

The fixed hollow gear support 486 is a simple L shaped folded metal sheet with the fixed hollow gear support fixation holes 487 in one side and the fixed hollow gear support gear shaft insertion hole 488 at the other side.

The hollow gear drive motor 437 is installed into the fixed hollow gear drive motor support 483 using bolts of appropriate size in the fixed hollow gear drive motor support motor fixation holes 485 and the hollow gear drive motor fixation holes 438. The hollow tapered gear outer shaft 464 of the hollow tapered gear 463 is inserted into the fixed hollow gear support gear shaft insertion hole 488 of the fixed hollow gear support 486.

FIG. 68 shows the components used to build the roller positioning assembly 489. The roller positioning assembly 489 is composed of the roller positioning motor 490 that has one roller positioning motor center hole 491. The roller positioning screw 492 with the roller positioning screw shaft 493 is installed into the roller positioning motor center hole 491 of the roller positioning motor 490.

The roller positioning device 494 is composed of the central body with the roller positioning device arms 495a, 495b, one at each side. Each roller positioning device arm 495a, 495b, has one roller positioning device arm slot 496a, 496b. The roller positioning device nut 497 matching the roller positioning screw 492 is located at the middle of the central body of the roller positioning device 494.

The roller positioning motor support 498 is composed of the roller positioning motor support base 499 with the roller positioning motor support hole 500 and the roller positioning motor support base guide pin 501a, 501b extending from both sides of the roller positioning motor support base 499. The roller positioning motor support arms 502a, 502b extend from the roller positioning motor support 498 and terminate in the roller positioning motor support arm guide pins 503a, 503b one at each side and with a void in the middle to accommodate the roller positioning device 494.

The roller positioning motor support motor fixation holes 504 provide the fixation points for the roller positioning driving motor 505 with the short roller positioning driving motor shaft 506. The roller 507 with the roller center hole 508 is installed in the roller positioning driving motor shaft 506 and s directly driven by the roller positioning driving motor 505.

The roller positioning motor support arm guide pins 503a, 503b of the roller positioning motor support 498 are inserted into the corresponding roller positioning device arm slots 496a, 496b of the roller positioning device 494. As the roller positioning motor 490 turns the roller positioning screw 492, the roller positioning device nut 497 transforms the rotational movement of the roller positioning screw 492 into linear movement of the roller positioning device 494. The roller positioning device 494 transmits the linear movement to the roller positioning motor support 498 with the added degree of freedom of the vertical slide motion of the roller positioning motor support arm guide pins 503a, 503b in the corresponding roller positioning device arm slots 496a, 496b allowing the roller positioning motor support 498 to move in a direction at an angle with respect to the direction of movement of the roller positioning device 494.

FIG. 71 shows the standard robot 528 composed of the standard robot case 515 and the robot lid 509 and all its internal components installed: the pantographic lift assembly 413 shown in the extended position and four short wheel assemblies 415. In the pantographic lift assembly 413 raised position, the top axis 184 moves to the centermost extreme of the platform moving axis slot 180 in the taller pantographic lift platform 414 causing the pantographic bars 181 to raise the taller pantographic lift platform 414.

Using suitable electronics to establish connection of the standard robot 528 to one or more digital devices such as computers, laptops, cellphones, tablets or other digital devices, through a wireless connection, using Wi-Fi, Bluetooth, cellular, radio-frequency, and other bandwidths for communication to the standard robot 528 may be established to have the one or more digital devices direct operation and movement and/or scheduling of operations of the standard robot 528 using one or more software applications. With communication established control of the wheel assemblies 415 may move the standard robot 528 in any direction.

Communication may also be established to control the pantographic motor 189 to raise and lower the pantographic lift assembly 413 to load and unload full size pallets 412 or full size containers 405a.

FIG. 73 shows the rack climbing robot 533 composed of the rack climbing robot case 529 and the robot lid 509 and all its internal components installed: the pantographic lift assembly 413 shown in the retracted position and four short wheel assemblies 415.

Additionally to the components in common with the standard robot 528, the rack climbing robot 533 has six fixed gear assemblies 482. Two hollow tapered gears 463a are mounted horizontally and four hollow tapered gears 463b are mounted vertically. Each hollow tapered gear 463 has one associated hollow gear drive motor 437 to drive it. The hollow tapered gears 463 are held in place by one fixed hollow gear support 486 and the hollow gear drive motor 437 are held in place by one fixed hollow gear drive motor support 483.

The rack climbing robot 533 can operate in racks constructed using frustum shaped teeth 122 used in the fast loading truck 353 and move in and out, up and down in rail rack shafts in buildings.

The hollow tapered gears 463a mounted in the horizontal position serve as a reference rail to keep the rack climbing robot 533 on a steady track as the hollow tapered gears 463b mounted vertically turn causing the rack climbing robot 533 to move up or down.

Similarly, the hollow tapered gears 463b mounted in the vertical position serve as a reference rail to keep the rack climbing robot 533 on a steady track as the hollow tapered gears 463a mounted horizontally turn causing the rack climbing robot 533 to move in one or another direction on a horizontal level.

Using suitable electronics to establish connection of the rack climbing robot 533 to one or more digital devices such as computers, laptops, cellphones, tablets or other digital devices, through a wireless connection, using Wi-Fi, Bluetooth, cellular, radio-frequency, and other bandwidths for communication to the rack climbing robot 533 may be established to have the one or more digital devices direct operation and movement and/or scheduling of operations of the rack climbing robot 533 using one or more software applications. With communication established control of the wheel assemblies 415 may move the rack climbing robot 533 in any direction. Communication may also be established to control the pantographic motor 189 to raise and lower the pantographic lift assembly 413 to load and unload full size pallets 412 or full size containers 405a. Control of the hollow gear drive motors 437 may also be established to drive the six hollow tapered gears 463a, 463b, etc. and propel the rack climbing robot 533 in a vertical direction to climb or move horizontally within a rack lattice structure.

FIG. 75 shows the warehouse climbing robot 545 composed of the warehouse climbing robot case 534 and the robot lid 509 and all its internal components installed: the pantographic lift assembly 413 shown in the retracted position and four short wheel assemblies 415.

Additionally to the components in common with the standard robot 528, the warehouse climbing robot 545 has four roller positioning assemblies 489, one assembly at each side of the warehouse climbing robot case 534 and four vertical sliding gear assemblies 417 each containing two vertical sliding gear support rails 418a, 418b, one vertical sliding gear support 424, one vertical sliding gear support actuator 433, one hollow flat gear 440, and one hollow gear drive motor 437, one assembly at each corner of the warehouse climbing robot case 534.

The roller positioning assembly 489 is shown in the retracted position with the roller positioning device 494 close to the roller positioning motor 490. The vertical sliding gear support 424 is shown in the extended position, with the vertical sliding gear support front pin 427 at the outer end of the vertical sliding gear support rail guide slot 422, the vertical sliding gear support control rod stopper 432 in contact with the vertical sliding gear support actuator 433 and the hollow flat gear 440 extending out of the corner of the warehouse climbing robot case 534.

The vertical sliding gear support actuator 433 moves the vertical sliding gear support 424 extending or retracting the hollow gear drive motor 437 and the hollow flat gear 440.

The roller positioning motor 490 turns the roller positioning screw 492 that moves the roller positioning device 494 causing the roller positioning assembly 489 to extend if the roller positioning device 494 moves away from the roller positioning motor 490 or retract if the roller positioning device 494 moves towards the roller positioning motor 490.

Using suitable electronics to establish connection of the warehouse climbing robot 545 to one or more digital devices such as computers, laptops, cellphones, tablets or other digital devices, through a wireless connection, using Wi-Fi, Bluetooth, cellular, radio-frequency, and other bandwidths for communication to the warehouse climbing robot 545. With communication established control of the wheel assemblies 415 may move the warehouse climbing robot 545 in any direction. Communication may also be established to control the pantographic motor 189 to raise and lower the pantographic lift assembly 413 and to the roller positioning assembly 489 to load and unload full size pallets 412 or full size containers 405a using the upper levels wider shelf slide 402 to slide the full size pallet 412 or full size container 405a out of the upper levels longer shelf rim 400 and on to the pantographic lift assembly 413. Control of the hollow gear drive motors 437 may also be established to drive the six hollow tapered gears 463a, 463b, etc. and propel the rack climbing robot 533 in a vertical direction to climb or move horizontally within a rack lattice structure.

Communication may also be established to have one or more digital devices direct operation and movement and/or scheduling of operations of the rack climbing robot 533 using one or more software applications.

FIG. 77 shows the dual climbing robot 558 in the warehouse climbing position. In the warehouse climbing position, the dual climbing robot 558 can operate in warehouses containing cross-track access shafts 404 constructed using straight flat teeth 377.

The dual climbing robot 558 is composed of the dual climbing robot case 546 and the robot lid 509 and all its internal components installed: the pantographic lift assembly 413 shown in the retracted position and four short wheel assemblies 415.

Additionally to the components in common with the standard robot 528, the dual climbing robot 558 has four roller positioning assemblies 489, one assembly at each side of the dual climbing robot case 546, four vertical pivoting gear assemblies 467; and four horizontal sliding gear assemblies 445.

Each vertical pivoting gear assembly 467 has one pivoting support plate 468 and one mirrored vertical sliding gear pivoting support rail 481, one angle control bevel 477, one angle control motor 479, one vertical sliding gear support 424, one vertical sliding gear support actuator 433, one hollow tapered gear 463b, and one hollow gear drive motor

437, one assembly at each corner of the dual climbing robot case 546. The pivoting support plate 468 and the mirrored vertical sliding gear pivoting support rail 481 alternate positions at the bottom or at the top of the dual climbing robot case 546 depending on the corner that the assembly is installed.

Each horizontal sliding gear assembly 445 has two horizontal sliding gear support rails 446, one horizontal sliding gear support 451, one horizontal sliding gear support actuator 459, one hollow tapered gear 463a, and one hollow gear drive motor 437, one assembly at the front and one at the back of the dual climbing robot case 546.

The roller positioning assembly 489 is shown in the retracted position.

The vertical pivoting gear assembly 467 is in the corner extended position, with the angle control bevel 477 at one end of the pivoting support plate bevel gear 473 rotating the pivoting support plate 468 and the mirrored vertical sliding gear pivoting support rail 481 to align the hollow tapered gear 463b to the robot case corner opening 535 at the corner of the dual climbing robot case 546. The vertical sliding gear support front pin 427 is at one end of the pivoting support plate angle guide slot 471, the vertical sliding gear support control rod stopper 432 is in contact with the vertical sliding gear support actuator 433 and the hollow tapered gear 463 is extending out of the robot case corner opening 535 at the corner of the dual climbing robot case 546.

The horizontal sliding gear assembly 445 is in the retracted position with the horizontal sliding gear support rear pin 454 at the end of the horizontal sliding gear support rail guide slot 449, the horizontal sliding gear support control rod 457 fully retracted and the horizontal sliding gear support control rod stopper 458 at the farthest from the horizontal sliding gear support actuator 459.

FIG. 78 shows the dual climbing robot 558 in the rack climbing position. In the rack climbing position, the dual climbing robot 558 can operate in racks constructed using frustum shaped teeth 122 used in the fast loading truck 353 and rail rack shafts in buildings.

The dual climbing robot 558 is composed of the dual climbing robot case 546 and the robot lid 509 and all its internal components installed: the pantographic lift assembly 413 shown in the retracted position and four short wheel assemblies 415.

Additionally to the components in common with the standard robot 528, the dual climbing robot 558 has four roller positioning assemblies 489, one assembly at each side of the dual climbing robot case 546, four vertical pivoting gear assemblies 467; and four horizontal sliding gear assemblies 445.

Each vertical pivoting gear assembly 467 has one pivoting support plate 468 and one mirrored vertical sliding gear pivoting support rail 481, one angle control bevel 477, one angle control motor 479, one vertical sliding gear support 424, one vertical sliding gear support actuator 433, one hollow tapered gear 463b, and one hollow gear drive motor 437, one assembly at each corner of the dual climbing robot case 546. The pivoting support plate 468 and the mirrored vertical sliding gear pivoting support rail 481 alternate positions at the bottom or at the top of the dual climbing robot case 546 depending on the corner that the assembly is installed.

Each horizontal sliding gear assembly 445 has two horizontal sliding gear support rails 446, one horizontal sliding gear support 451, one horizontal sliding gear support actuator 459, one hollow tapered gear 463a, and one hollow gear drive motor 437, one assembly at the front and one at the back of the dual climbing robot case 546.

The roller positioning assembly 489 is shown in the retracted position.

The vertical pivoting gear assembly 467 is in the center extended position, with the angle control bevel 477 at the end of the pivoting support plate bevel gear 473 rotating the pivoting support plate 468 and the mirrored vertical sliding gear pivoting support rail 481 to align the hollow tapered gear 463*b* to the vertical gear opening 530 at the side of the dual climbing robot case 546. The vertical sliding gear support front pin 427 is near one end of the pivoting support plate angle guide slot 471, the vertical sliding gear support control rod stopper 432 is close but not in contact with the vertical sliding gear support actuator 433 and the hollow tapered gear 463 is extending out of the vertical gear openings 530 at the corner of the dual climbing robot case 546.

The horizontal sliding gear assembly 445 is in the extended position with the horizontal sliding gear support front pin 453 at one end of the horizontal sliding gear support rail guide slot 449, the horizontal sliding gear support control rod 457 fully extended and the horizontal sliding gear support control rod stopper 458 in contact with the horizontal sliding gear support actuator 459.

In the center extended position, the hollow tapered gear 463*a* in the horizontal sliding gear support 451 and the hollow tapered gear 463*a* in the vertical sliding gear support 424 are aligned to work together in a frustum shaped teeth rack.

To move the dual climbing robot 558 from the warehouse climbing position into the rack climbing position, the vertical sliding gear support actuator 433 moves the vertical sliding gear support 424 inwards, retracting the hollow tapered gear 463. Then the angle control motor 479 turns the angle control bevel 477 engaged with the pivoting support plate bevel gear 473 causing the pivoting support plate 468 and the mirrored vertical sliding gear pivoting support rail 481 to turn from the corner position to the parallel position. The vertical sliding gear support actuator 433 then moves the vertical sliding gear support 424 outwards, extending the hollow tapered gear 463*b* mounted vertically and the horizontal sliding gear support actuator 459 moves the horizontal sliding gear support 451 outwards extending the hollow tapered gear 463*a* mounted horizontally.

To move the dual climbing robot 558 from the rack climbing position into the warehouse climbing position, the process described in the above paragraph is reversed.

FIG. 79 shows the improved two level single cell warehouse 559 with one warehouse climbing robot 545 entering the cross-track access shaft 404.

The improved two level single cell warehouse 559 is assembled using twelve bases 106*a*, 106*b*, eight base short poles 373, four base short traction poles 376, eight full size poles 384, and four full size traction pole 385.

The structure of the improved two level single cell warehouse 559 also has at the ground level or first level one ground level wider shelf 386 and two ground level longer shelves 395. One ground level wider shelf 386 was not installed to allow an access route to the warehouse climbing robot 545. The improved two level single cell warehouse 559 can also be assembled using two ground level wider shelves 386 and one ground level longer shelf 395 creating an alternative access route to the warehouse climbing robot 545.

Completing the structure of the improved two level single cell warehouse 559 at the second level two upper levels wider shelves 389 and two upper levels longer shelves 397 are installed.

FIG. 80 shows a top view of the improved two level single cell warehouse 559 with the warehouse climbing robot 545 in the retracted position at the center of the cross-track access shaft 404.

The upper levels wider shelves 389 and the upper levels longer shelves 397 are also indicated for reference.

FIG. 81 shows a top view of the improved two level single cell warehouse 559 with the warehouse climbing robot 545 in the extended position with the hollow flat gears 440 engaging the straight flat teeth 377 allowing the warehouse climbing robot 545 to climb the cross-track access shaft 404.

As the hollow flat gears 440 extend and engage the straight flat teeth 377, minor variations in the position of the warehouse climbing robot 545 are eliminated, providing a useful self-centering mechanism to keep the warehouse climbing robot 545 always at the right position in the center of the cross-track access shaft 404 and the hollow flat gears 440 engaged.

The upper levels wider shelves 389 and the upper levels longer shelves 397 are also indicated for reference.

FIG. 82 shows the warehouse climbing robot 545 in the extended position with the hollow flat gears 440 engaging the straight flat teeth 377 at the center of the cross-track access shaft 404 of the loaded improved two level single cell warehouse 559.

The improved two level single cell warehouse 559 is assembled using twelve bases 106*a*, 106*b*, eight base short poles 373, four base short traction poles 376, eight full size poles 384, and four full size traction pole 385.

The structure of the improved two level single cell warehouse 559 also has at the ground level or first level one ground level wider shelf 386 and two ground level longer shelves 395. One ground level wider shelf 386 was not installed to allow an access route to the warehouse climbing robot 545. The improved two level single cell warehouse 559 can also be assembled using two ground level wider shelves 386 and one ground level longer shelf 395 creating an alternative access route to the warehouse climbing robot 545.

Completing the structure of the improved two level single cell warehouse 559 at the second level two upper levels wider shelves 389 and two upper levels longer shelves 397 are installed. The improved two level single cell warehouse 559 is loaded with one full size pallet 412 and two full size containers 405*a* and 405*b* to illustrate the item retrieval process.

FIG. 83 shows the warehouse climbing robot 545 at the center of the cross-track access shaft 404 positioned right below the upper levels wider shelves 389 and upper levels longer shelves 397 at the second level of the loaded improved two level single cell warehouse 559 ready to retrieve the full size container 405*b*.

The full size pallet 412 and two full size containers 405*a* and 405*b* are indicated as reference to facilitate the understanding of the retrieval process as different view angles are used in subsequent figures.

FIG. 84 shows the warehouse climbing robot 545 at the center of the cross-track access shaft 404 positioned right below the upper levels wider shelves 389 and upper levels longer shelves 397 at the second level of the loaded improved two level single cell warehouse 559 initiating the process to retrieve the full size container 405*b*.

To initiate the retrieval process, the warehouse climbing robot 545 extends the appropriate roller positioning assembly 489 below upper levels longer shelf 397 where the full size container 405*b* that will be retrieved is placed to engage and move the upper levels longer shelf 397 (see detail FIG. 84A).

Detail FIG. 84A shows the warehouse climbing robot 545 with the roller positioning assembly 489 extended. The roller positioning motor support 498 reaches its full extension out of the warehouse climbing robot case 534 and positions the roller positioning driving motor 505 so that the roller 507 engages the upper levels longer shelf sliding base 398 of the upper levels longer shelf 397 where the full size container 405*b* that will be retrieved is placed.

To move the upper levels longer shelf sliding base 398 the roller positioning driving motor 505 rotates the roller 507 that in turn moves the upper levels longer shelf sliding base 398 in the direction given by the direction of the rotation of the roller 507.

Also visible in detail FIG. 84A are the hollow flat gear 440 engaging the straight flat teeth 377 of the full size traction pole 385.

FIG. 85 shows the warehouse climbing robot 545 at the center of the cross-track access shaft 404 of the improved two level single cell warehouse 559 with the moved upper levels longer shelf sliding base 398 containing the full size container 405*b* positioned above the warehouse climbing robot 545.

The upper levels wider shelf slide 402 slides out of the upper levels longer shelf rim 400 providing support for the upper levels longer shelf sliding base 398.

FIG. 86 shows the warehouse climbing robot 545 at the center of the cross-track access shaft 404 of the improved two level single cell warehouse 559 with the moved upper levels longer shelf sliding base 398 positioned above the warehouse climbing robot 545.

The pantographic lift assembly 413 is extended and the full size container 405*b* is no longer resting on top of the upper levels longer shelf sliding base 398 but on the taller pantographic lift platform 414 enabling the upper levels longer shelf sliding base 398 to be moved back to its resting place. The longer shelf access opening 396*b* that allows the upper levels longer shelf sliding base 398 to move past the extended taller pantographic lift platform 414 is also visible.

The upper levels wider shelf slide 402 is still extended out of the upper levels longer shelf rim 400 providing support for the upper levels longer shelf sliding base 398.

FIG. 87 shows the warehouse climbing robot 545 at the center of the cross-track access shaft 404 of the improved two level single cell warehouse 559 carrying the full size container 405*b* on top of the taller pantographic lift platform 414 with the upper levels longer shelf sliding base 398 moved back to its resting position next to the upper levels longer shelf rim 400.

The longer shelf access opening 396*b* that allows the upper levels longer shelf sliding base 398 to move past the extended taller pantographic lift platform 414 is also indicated for reference.

FIG. 88 shows the warehouse climbing robot 545 at the center of the cross-track access shaft 404 of the improved two level single cell warehouse 559 after retracting the taller pantographic lift platform 414 carrying the full size container 405*b* at the top of the warehouse climbing robot case 534.

FIG. 89 shows the warehouse climbing robot 545 exiting the improved two level single cell warehouse 559 after descending from the cross-track access shaft 404 carrying the full size container 405*b* at the top of the warehouse climbing robot case 534.

FIG. 90 shows a top view of one embodiment of the packer station 560.

The packer workstations 564*a*, 564*b*, 564*c*, etc. provide the work space, materials and access to instructions to the packers 565*a*, 565*b*, 565*c*, etc. that are tasked to fulfil incoming customer orders.

The robot lanes 561*a*, 561*b*, 561*c*, 561*d*, 561*e*, and 561*f* allow the product carrying robots 566*a*, through 566*e* the package carrying robots 567*a*, 567*b*, etc. to move and wait at adequate positions to assist the packers 565*a*, 565*b*, etc. The product carrying robots 566*a*, through 566*e* carry boxes or other containers from the central storage, the boxes or containers containing products that need to be packed to fulfil an specific order.

The package carrying robots 567*a*, 567*b*, etc. are constructed using the rack climbing robot 533 design. The product carrying robots 566*a*, through 566*e* are constructed using the rack climbing robot 533 or the dual climbing robot 558 design. The rack climbing robot 533 and the dual climbing robot 558 design are able to move in and out, up and down in the warehouse access shafts 562*a*, 562*b*, etc. and the shipment access shafts 563*a*, 563*b*, etc. constructed using frustum shaped teeth 122.

The robot lanes 561*a*, 561*b*, 561*c*, 561*d*, 561*e*, and 561*f* are organized so that robot lanes 561*a*, 561*b*, 561*e*, and 561*f* provide space for robots standing by at specific places close to the packers they are tasked to assist. The robot lanes 561*c*, and 561*d* allow for robots to move in and out. In the particular example of FIG. 90, the robot lanes 561*c* is used by robots moving from right to left and robot lanes 561*d* is used by robots moving from left to right.

The number and purpose of the robot lanes can be altered. Additional robot lanes can be allocated to increase mobility and/or increase the number of standby robots and robot lanes can be eliminated to save floor space provided that at least two robot lanes 561*a*, and 561*f* are available for stand by robots and at least two robot lanes 561*c*, and 561*d* are available for the movement of robots.

The product carrying robots 566*a*, through 566*e* come from and return to the central storage area through the warehouse access shafts 562*a*, 562*b*, etc. The warehouse access shafts 562*a*, 562*b*, etc. are organized in pairs with one warehouse access shaft 562*a* for robots going up and one warehouse access shaft 562*b* for robots going down.

Similarly the package carrying robots 567*a*, 567*b*, etc. come from and return to the shipment area through the shipment access shafts 563*a*, 563*b*, etc. The shipment access shafts 563*a*, 563*b*, etc. are organized in pairs with one shipment access shaft 563*a* for robots going up and one shipment access shafts 563*b* for robots going down.

The product carrying robot 566*a* positions itself at a convenient spot and at an ergonomic position next to the corresponding packer 565*a* tasked to pack the particular order containing the product that product carrying robot 566*a* is carrying so that the packer can reach for the specific product.

Once the packer 565*a* has collected the required amount of products carried by the product carrying robot 566*a*, the product carrying robot 566*a* leaves its spot and returns to the central storage area using one warehouse access shaft 562*b*. As soon as it leaves its spot, the product carrying robot 566*a* is replaced by the product carrying robot 566*b* that is standing by next to product carrying robot 566*a*. Similarly product carrying robot 566*c* takes the spot vacated by the product carrying robot 566*d* and one more product carrying robot 566*d* coming from the warehouse access shaft 562*a* moves in to fill the spot vacated by product carrying robot 566*c* ensuring that there are always sufficient product carrying robots standing by on a queue to provide required products to fulfil orders without loss of time.

The package carrying robot 567*a* collects the fulfilled order and take it to the shipment area. As soon as the loaded package carrying robot 567*a* leaves its spot towards the shipment access shafts 563*a*, 563*b*, etc. it is replaced by another empty package carrying robot coming from the shipment access shafts 563*a*, 563*b*, etc. (see FIG. 91 and FIG. 92).

The packer station 560 may span multiple floors that are connected by the warehouse access shafts 562 and the shipment access shafts 563 constructed using frustum shaped teeth 122. The product carrying robots 566 and the package carrying robots 567 are able to move in and out, up and down the warehouse access shafts 562 and the shipment access shafts 563 respectively and reach any packer workstation 564 at the required floor.

The size of one floor of the packer station 560 can be increased by means of increasing the number of packer workstations 564*a*, 564*b*, 564*c* etc. between the warehouse access shafts 562*a*, 562*b*, etc. and the shipment access shafts 563*a*, 563*b*, etc. according to the availability of space, resulting in an increase of the size of the unit cell.

The size of one floor of the packer station 560 can also be increased by means of having multiple copies of the unit cell placed side by side in both directions perpendicular to the robot lanes. In FIG. 90 the dash dotted line separates two subsequent unit cells.

The number of warehouse access shafts 562*a*, 562*b*, etc. and the number of shipment access shafts 563*a*, 563*b*, etc. are calculated to allow sufficient space for the movement of the required number of robots that enable the efficient operation of the packer station 560 considering the existing number of packers spread over multiple floors and allow for future expansions.

FIG. 91 shows an isometric view of one embodiment of one portion of the packer station 560.

The packer workstations 564*a*, 564*b*, etc. provide the work space for the packers 565*a*, 565*b*, etc. that are tasked to fulfil incoming customer orders.

The product carrying robots 566*a*, 566*b*, and 566*c* bring specific boxes containing product to the packer 565*a*. The product carrying robot 566*a* positions itself in the center of the ergonomic rack 568*a* in preparation to climb it enabling the packer 565*a* to reach for the product in the best possible ergonomic position.

The packer display 569 located at the packer workstation 564*a* allows the packer 565*a* to receive information regarding the type and amount of product that must be retrieved from the product carrying robot 566*a*. While the packer 565*a* reaches for the appropriate size of package from the assortment of packing materials 570 as instructed in the packer display 569, the product carrying robot 566*a* climbs the ergonomic rack 568*a* that then tilts for optimum access of the product (see FIG. 92).

The product carrying robot 566*f* serving the packer 565*b* is shown already at the appropriate height in the ergonomic rack 568*b* that tilted to provide optimum ergonomic reach for the packer 565*b* as determined by the height of packer 565*b*.

The package carrying robots 567*a* contains the package 571 that the packer 565*a* has completed previously and just placed on the package carrying robots 567*a* to be transported to the shipment area.

Once the packer 565*a* has collected the required amount of products carried by the product carrying robot 566*a*, the product carrying robot 566*a* leaves its spot and returns to the central storage area. As soon as it leaves its spot, the product carrying robot 566*a* is replaced by the product carrying robot 566*b* that is standing by next to product carrying robot 566*a*. Similarly product carrying robot 566*c* takes the spot vacated by the product carrying robot 566*d* and one more product carrying robot 566*d* coming from the warehouse access shaft 562*a* moves in to fill the spot vacated by product carrying robot 566*c* ensuring that there are always sufficient product carrying robots standing by on a queue to provide required products to fulfil orders without loss of time (see FIG. 90).

The package carrying robot 567*a* collects the package 571 and take it to the shipment area. As soon as the loaded package carrying robot 567*a* leaves its spot towards the shipment access shafts 563*a*, 563*b*, etc. it is replaced by another empty package carrying robot coming from the shipment access shafts 563*a*, 563*b*, etc. (see FIG. 90).

FIG. 92 shows an isometric view of one embodiment of one portion of the packer station 560.

The packer workstations 564*a*, 564*b*, etc. provide the work space for the packers 565*a*, 565*b*, etc. that are tasked to fulfil incoming customer orders.

The product carrying robots 566*a*, 566*b*, and 566*c* bring specific boxes containing product to the packer 565*a*. The product carrying robot 566*a* has climbed the ergonomic rack 568*a* that has tilted towards the packer 565*a*, enabling the packer 565*a* to reach for the product in the best possible ergonomic position as determined by the height of packer 565*a*.

The packer display 569 located at the packer workstation 564*a* allows the packer 565*a* to receive information regarding the type and amount of product that must be retrieved from the product carrying robot 566*a*. The packer 565*a* reaches for the appropriate size of package from the assortment of packing materials 570 as instructed in the packer display 569 and reaches for the product inside the box carried by the product carrying robot 566*a* to fulfil the customer order.

The product carrying robot 566*f* serving the packer 565*b* is shown at the appropriate height in the ergonomic rack 568*b* that tilted to provide optimum ergonomic reach for the packer 565*b* as determined by the height of packer 565*b*. As packer 565*b* is not as tall as packer 565*a*, the product carrying robot 566*f* stays a little lower in ergonomic rack 568*b* than product carrying robot 566*a* in ergonomic rack 568*a*.

The package carrying robots 567*a* contains the package 571 that the packer 565*a* has completed previously and just placed on the package carrying robots 567*a* to be transported to the shipment area.

Once the packer 565*a* has collected the required amount of products carried by the product carrying robot 566*a*, the product carrying robot 566*a* leaves its spot and returns to the central storage area. As soon as it leaves its spot, the product carrying robot 566*a* is replaced by the product carrying robot 566*b* that is standing by next to product carrying robot 566*a*. Similarly product carrying robot 566*c* takes the spot vacated by the product carrying robot 566*d* and one more product carrying robot 566*d* coming from the warehouse access shaft 562*a* moves in to fill the spot vacated by product carrying robot 566*c* ensuring that there are always sufficient product carrying robots standing by on a queue to provide required products to fulfil orders without loss of time (see FIG. 90).

The package carrying robot 567*a* collects the package 571 and take it to the shipment area. As soon as the loaded package carrying robot 567*a* leaves its spot towards the shipment access shafts 563*a*, 563*b*, etc. it is replaced by another empty package carrying robot coming from the shipment access shafts 563*a*, 563*b*, etc. (see FIG. 90).

CONCLUSION

A new design for the storage of goods in a warehouse is described that enables goods to be stored more efficiently, with better usage of space, smaller number of parts and smaller number of different machines needed to manipulate the goods.

Furthermore, as the goods are stored in a more compact way and are more accessible, meaning that multiple machines can access different locations simultaneously than is possible in traditional designs, this translates in an increase in speed for manipulation of the goods.

The increase in storage efficiency, increase in manipulation speed, reduction of components and machines and reduction in maintenance costs translates into better returns for the companies operating and a competitive edge in an ever more competitive market.

| DRAWINGS - REFERENCE NUMERALS | | |
|---|---|---|
| N | Item Name | Shown in Figures |
| 100 | traditional warehouse | 1 2 |
| 101 | shelf structure | 1 2 |
| 102 | pallet | 1 2 9 10 15 16 17 20 21 40 42 42A 43 43A 44 44A |
| 103 | single row | 1 2 |
| 104 | back-to-back row | 1 2 |
| 105 | access row | 1 2 |
| 106 | base | 3 6 7 8 15 16 17 51 53 57 79 82 |
| 107 | guide pin | 3 4 4A 51 |
| 108 | guide pin notch | 3 4 51 |
| 109 | base spacer | 3 7 7B 8 8B 15 16 17 |
| 110 | shelf insertion notch | 3 4 7A 7B |
| 111 | plain blank | 3 8A 15A |
| 112 | shelf blank | 3 8A |
| 113 | shelf stub | 3 8A |
| 114 | quarter blank | 3 8A 8B 15A |
| 115 | quarter stub | 3 8A 8B |
| 116 | plain pole | 3 15 16 17 |
| 117 | plain pole neck | 3 |
| 118 | pole horizontal rack plane | 3 4 4A |
| 119 | plain top spacer | 3 15 16 17 |
| 120 | single rack piece | 3 15 16 16A 17 19 19A 42 42A 43 43A |
| 121 | standard rack track | 3 |
| 122 | frustum shaped teeth | 3 3A 4 4A 15A 16A 17A 40A 41A 41B 41C 41D 41E 41F 48A |
| 123 | square base | 3 |
| 124 | square base insertion hole | 3 |
| 125 | double standard rack piece | 3 19 19A |
| 126 | quadruple standard rack piece | 3 19 19B |
| 127 | base rack spacer | 4 7 7A 8 8A 15 16 17 |
| 128 | shelf support | 4 7A |
| 129 | rack extension | 4 7A |
| 130 | rack pole | 4 4A 11 12 13 14 15 15A 16 16A 17 17A 38 39 40 40A 41 42 |
| 131 | hinge pin | 4 4A |
| 132 | rack pole neck | 4 4A |
| 133 | dovetail notch | 4 4A |
| 134 | rack pole neck cover | 4 12 15 16 17 |
| 135 | dovetail pin | 4 |
| 136 | rack pole short fixed rack | 4 |
| 137 | rack pole standard fixed rack | 4 13 14 19B |
| 138 | rack pole long fixed rack | 4 |
| 139 | rack pole standard hinged rack A | 4 11 12 13 14 15 15A 16 16A 17 17A 19A 19B 40A 41 41A 41B 41C 41D 41E 41F 42 42A 43 43A 44 44A |
| 140 | hinge A | 4 11 |
| 141 | hinged rack internal lock fixture | 4 11 12 13 14 16A 17A 41A 41B 41C 41D 41E 41F |
| 142 | hinged rack external lock fixture | 4 11 12 13 14 15A 16A 17A 41A 41B 41C 41D 41E 41F |
| 143 | hinged rack lock hole | 4 |
| 144 | hinged rack hold bar | 4 41A 41B 41C 41D 41E 41F |
| 145 | rack pole standard hinged rack B | 4 11 12 13 14 15 15A 16 16A 17 17A 19A 19B 41 41D 41E 41F 42 42A 43 43A 44 44A |
| 146 | hinge B | 4 11 |
| 147 | rack pole short hinged rack A | 4 |
| 148 | rack pole short hinged rack B | 4 |

| DRAWINGS - REFERENCE NUMERALS | | |
|---|---|---|
| N | Item Name | Shown in Figures |
| 149 | rack pole top cover | 4 4A 11 12 13 14 15 15A 16 16A 17 17A 40A 41 41A 41B 41C 41D 41E 41F |
| 150 | rack pole top lock fixture | 4 4A 11 12 13 14 41A 41B 41C 41D 41E 41F |
| 151 | rack pole top lock hole | 4 4A |
| 152 | rack pole base | 4A |
| 153 | hinge pin hole | 4A |
| 154 | lock bar | 4 4A 11 12 13 14 15A 16A 17A 41A 41B 41C 41D 41E 41F |
| 155 | horizontal bar | 4A |
| 156 | centered vertical bar | 4A |
| 157 | pivoting vertical bar | 4A |
| 158 | tapered end | 4A 41C 41D 41E 41F |
| 159 | lock bar grabbing neck | 4A 41A 41B 41C 41F |
| 160 | lock bar knob | 4A 41A 41B 41C 41D 41E 41F |
| 161 | shelf | 5 8 9 10 15 15A 16 16A 17 17A 18 38 39 42A 43A 44 |
| 162 | shelf base | 5 8B |
| 163 | shelf access channel | 5 8 43A 44 |
| 164 | rim reinforcement | 5 |
| 165 | shelf neck | 5 8A |
| 166 | shelf fixation pin | 5 8A 8B |
| 167 | longer shelf | 5 |
| 168 | longer shelf base | 5 |
| 169 | longer shelf access channel | 5 |
| 170 | wider shelf | 5 |
| 171 | wider shelf base | 5 |
| 172 | wider shelf access channel | 5 |
| 173 | warehouse being assembled | 6 7 8 9 10 |
| 174 | access shaft | 7 8 10 15 16 17 18 19 21 38 39 40 42 43 44 44A |
| 175 | two level nine cell warehouse | 18 |
| 176 | warehouse structure | 18 19 20 |
| 177 | four level nine cell warehouse | 20 21 |
| 178 | pantographic lift platform | 22 31 32 43 43A 44 44A 45 |
| 179 | platform fixed axis hole | 22 32 62 |
| 180 | platform moving axis slot | 22 31 32 62 71 |
| 181 | pantographic bar | 22 31 32 62 71 |
| 182 | outer axis hole | 22 62 |
| 183 | center axis hole | 22 62 |
| 184 | top axis | 22 31 32 62 71 |
| 185 | center axis | 22 31 32 62 |
| 186 | bottom fixed axis | 22 32 62 |
| 187 | bottom moving axis | 22 32 62 |
| 188 | bottom moving axis nut | 22 32 62 |
| 189 | pantographic motor | 22 32 62 |
| 190 | pantographic motor axis | 22 62 |
| 191 | wheel assembly | 23 |
| 192 | wheel | 23 31 35 37 45 63 |
| 193 | wheel axis | 23 63 |
| 194 | wheel driving bevel | 23 37 63 |
| 195 | wheel support | 23 37 63 |
| 196 | wheel support axis hole | 23 63 |
| 197 | wheel directional gear | 23 35 37 63 |
| 198 | wheel directional gear center passage | 23 63 |
| 199 | wheel directional worm | 23 37 63 |
| 200 | wheel directional motor | 23 37 63 |
| 201 | wheel directional motor shaft | 23 63 |
| 202 | wheel driving motor | 23 35 37 63 |
| 203 | wheel driving axle | 23 37 |
| 204 | control disk | 24 33 34 35 36 37 |
| 205 | control disk central axis | 24 |
| 206 | weight reduction cut | 24 |
| 207 | control disk beveled teeth | 24 |
| 208 | control disk attachment pin | 24 33 34 |
| 209 | control disk actuator beveled gear | 24 33 34 37 |
| 210 | actuator beveled gear driving motor | 24 33 34 35 36 37 |
| 211 | actuator beveled gear driving motor shaft | 24 |
| 212 | gear position control bar | 24 33 34 35 36 37 41A 41B 41C |
| 213 | gear position control bar attachment hole | 24 |
| 214 | tapered teeth gear | 24 31 33 35 36 37 39 40A 41 41A 41B 41C 41D 41E 41F 45 |
| 215 | tapered teeth | 24A 41C 65 65A 67 |
| 216 | tapered teeth edge face | 24A 41C 65A |

-continued

DRAWINGS - REFERENCE NUMERALS

| N | Item Name | Shown in Figures |
|---|---|---|
| 217 | horizontal gear driving motor | 24 33 35 37 |
| 218 | horizontal gear driving pulley | 24 33 35 37 |
| 219 | horizontal gear driving belt | 24 33 35 37 |
| 220 | vertical gear driving motor | 24 33 35 37 |
| 221 | vertical gear driving bevel | 24 33 35 37 |
| 222 | horizontal angle control guide | 25 33 35 37 |
| 223 | horizontal angle control guide track | 25 33 35 |
| 224 | horizontal angle control guide fixation hole | 25 |
| 225 | vertical angle control guide | 25 33 35 37 |
| 226 | vertical angle control guide track | 25 33 35 41A 41B 41C |
| 227 | vertical angle control guide fixation hole | 25 |
| 228 | vertical angle control support | 25 33 35 37 |
| 229 | vertical angle control support raised platform | 25 |
| 230 | vertical angle control support angle control guide fixation hole | 25 |
| 231 | vertical angle control support fixation hole | 25 |
| 232 | horizontal pivoting support | 25 31 33 34 35 36 37 |
| 233 | horizontal pivoting support top bar | 25 |
| 234 | horizontal pivoting support bottom bar | 25 |
| 235 | horizontal pivoting support main axis | 25 |
| 236 | horizontal pivoting support notch | 25 33 |
| 237 | horizontal pivoting support gear support axis | 25 34 |
| 238 | horizontal pivoting support action bar | 25 33 34 |
| 239 | horizontal pivoting support top bar extension | 25 |
| 240 | horizontal pivoting support actuator reference hole | 25 33 |
| 241 | horizontal gear support | 25 33 35 37 |
| 242 | horizontal gear support top plate | 25 |
| 243 | horizontal gear support bottom plate | 25 |
| 244 | horizontal gear support axis | 25 |
| 245 | horizontal gear support motor support | 25 |
| 246 | horizontal gear support gear shaft hole | 25 |
| 247 | horizontal gear support actuator insertion hole | 25 |
| 248 | horizontal gear support guide bar | 25 33 |
| 249 | horizontal gear support guide pin | 25 33 |
| 250 | horizontal gear support guide knob | 25 |
| 251 | horizontal gear shaft | 25 |
| 252 | vertical pivoting support | 25 31 33 34 35 36 37 41A 41B 41C 41D 41E 41F |
| 253 | vertical pivoting support top bar | 25 |
| 254 | vertical pivoting support bottom bar | 25 |
| 255 | vertical pivoting support main axis | 25 |
| 256 | vertical pivoting support gear support axis | 25 34 |
| 257 | vertical pivoting support action bar | 25 33 34 41A 41B 41C |
| 258 | vertical pivoting support top bar extension | 25 |
| 259 | vertical pivoting support actuator reference hole | 25 33 |
| 260 | vertical gear support | 25 33 35 37 41A 41B 41C |
| 261 | vertical gear support left plate | 25 |
| 262 | vertical gear support right plate | 25 |
| 263 | vertical gear support axis | 25 |
| 264 | vertical gear support motor support | 25 |
| 265 | vertical gear support gear shaft hole | 25 |
| 266 | vertical gear support actuator insertion hole | 25 |
| 267 | vertical gear support guide bar | 25 33 |
| 268 | vertical gear support guide pin | 25 33 41A 41B 41C |
| 269 | vertical gear support guide knob | 25 |
| 270 | vertical gear shaft | 25 |
| 271 | horizontal actuator angle control guide | 26 34 35 36 37 |
| 272 | horizontal actuator angle control track | 26 34 35 36 37 |
| 273 | horizontal actuator angle control guide fixation hole | 26 |
| 274 | vertical actuator angle control guide | 26 34 35 36 37 |
| 275 | vertical actuator angle control track | 26 34 35 36 37 |
| 276 | vertical actuator angle control guide fixation hole | 26 |
| 277 | horizontal arm actuator | 26 34 35 36 37 |
| 278 | horizontal arm actuator center hole | 26 |
| 279 | horizontal arm actuator center hole key | 26 |
| 280 | horizontal arm actuator fixation bar | 26 34 37 |
| 281 | horizontal arm actuator fixation pin | 26 |
| 282 | horizontal arm actuator sliding bar | 26 34 |
| 283 | horizontal arm actuator sliding knob | 26 34 35 36 37 |
| 284 | vertical arm actuator | 26 34 35 36 37 41A 41B 41C 41D 41E 41F |
| 285 | vertical arm actuator center hole | 26 |
| 286 | vertical arm actuator center hole key | 26 |
| 287 | vertical arm actuator fixation bar | 26 34 37 41A 41B 41C 41D 41E 41F |
| 288 | vertical arm actuator fixation pin | 26 |

-continued

| DRAWINGS - REFERENCE NUMERALS | | |
| --- | --- | --- |
| N | Item Name | Shown in Figures |
| 289 | vertical arm actuator sliding bar | 26 34 |
| 290 | vertical arm actuator sliding knob | 26 34 35 36 37 |
| 291 | actuator arm | 26 34 35 36 37 41A 41B 41C 41D 41E 41F |
| 292 | actuator arm key | 26 26A |
| 293 | actuator arm stopper | 26 |
| 294 | actuator hand | 26 26A 34 41A 41B 41C 41D 41E 41F |
| 295 | actuator hand center hole | 26A |
| 296 | actuator hand center hole key | 26A |
| 297 | horizontal actuator hand | 26 35 36 37 |
| 298 | horizontal actuator hand key | 26 |
| 299 | horizontal actuator stopper | 26 |
| 300 | horizontal actuator hand top | 26 |
| 301 | horizontal actuator hand finger | 26 34 |
| 302 | horizontal actuator hand grabbing tip | 26 34 |
| 303 | vertical actuator hand | 26 35 36 37 41A 41B 41C 41D 41E 41F |
| 304 | vertical actuator hand key | 26 |
| 305 | vertical actuator stopper | 26 |
| 306 | vertical actuator hand top | 26 |
| 307 | vertical actuator hand finger | 26 34 |
| 308 | vertical actuator hand grabbing tip | 26 34 41A 41B 41C 41D 41E 41F |
| 309 | horizontal hinged rack actuator | 26 33 |
| 310 | horizontal hinged rack actuator attachment bar | 26 |
| 311 | horizontal hinged rack actuator center hole | 26 |
| 312 | horizontal hinged rack actuator center hole key | 26 |
| 313 | vertical hinged rack actuator | 26 33 41A 41B 41C 41D 41E 41F |
| 314 | vertical hinged rack actuator attachment bar | 26 |
| 315 | vertical hinged rack actuator center hole | 26 |
| 316 | vertical hinged rack actuator center hole key | 26 |
| 317 | hinged rack arm | 26 33 41A 41B 41C 41D 41E 41F |
| 318 | hinged rack arm key | 26 |
| 319 | hinged rack arm stopper | 26 41A 41B 41C |
| 320 | hinged rack arm hand actuator | 26 41A 41B 41C 41D 41E 41F |
| 321 | hinged rack arm hand actuator center hole | 26 |
| 322 | hinged rack arm hand actuator center hole key | 26 |
| 323 | hinged rack hand | 26 33 41A 41B 41C 41D 41E 41F |
| 324 | hinged rack hand key | 26 |
| 325 | hinged rack hand stopper | 26 41A 41B 41C 41D 41E 41F |
| 326 | hinged rack hand base | 26 |
| 327 | hinged rack hand finger | 26 |
| 328 | hinged rack hand roller | 26 41A 41B 41C 41D 41E |
| 329 | hinged rack hand roller center hole | 26 |
| 330 | autonomous mobile lift robot case | 27 28 29 31 32 35 36 37 |
| 331 | opening A | 27 28 31 32 |
| 332 | opening B | 27 28 31 32 |
| 333 | separation bar | 27 28 31 32 |
| 334 | pivoting axis | 27 28 29 31 32 33 34 35 36 37 |
| 335 | directional motor support | 27 28 29 32 |
| 336 | wheel motor support | 27 28 29 32 |
| 337 | wheel assembly support | 27 28 29 32 |
| 338 | wheel driving axis passage hole | 27 29 34 |
| 339 | extension motor support | 27 28 29 32 |
| 340 | wheel opening | 27 29 32 |
| 341 | bottom fixation holes | 27 29 32 |
| 342 | top fixation holes | 27 29 32 |
| 343 | pantographic fixed axis hole | 27 32 |
| 344 | pantographic moving axis slot | 27 32 |
| 345 | pantographic motor niche | 27 29 |
| 346 | case central axis | 27 28 29 |
| 347 | bottom lid | 30 |
| 348 | bottom lid wheel opening | 30 |
| 349 | autonomous mobile lift robot | 31 35 36 37 38 39 40 41 42 42A 43 43A 44 44A 45 |
| 350 | storage gap | 42A 43A |
| 351 | loaded autonomous mobile lift robot | 45 49 50 |
| 352 | half size pallet | 45 |
| 353 | fast loading truck | 46 47 48 49 50 |
| 354 | flatbed chassis | 46 47 48 |
| 355 | cargo bay | 46 47 48 |
| 356 | right door | 46 47 48 49 |
| 357 | left door | 46 47 48 49 |
| 358 | cargo bay center division | 47 48 |
| 359 | door rack | 47 48 |
| 360 | cargo bay center rack | 47 48 48A |
| 361 | cargo bay side rack | 47 48 48A |

-continued

| DRAWINGS - REFERENCE NUMERALS | | |
| --- | --- | --- |
| N | Item Name | Shown in Figures |
| 362 | middle division | 47 48 48A 49 |
| 363 | middle division rack | 47 48 48A |
| 364 | lower shelves | 47 48 49 50 |
| 365 | upper shelves | 47 48 48A 49 |
| 366 | access path | 48 50 |
| 367 | truck loading bay | 48 49 50 |
| 368 | right door lock bar | 48 49 |
| 369 | left door lock bar | 48 48A 49 |
| 370 | truck floor | 48 50 |
| 371 | rack interface | 49 |
| 372 | loaded upper level | 50 |
| 373 | base short pole | 51 53 54B 57 79 82 |
| 374 | shelf support | 51 54A 54B |
| 375 | shelf support fixation bolt | 51 54A 54B |
| 376 | base short traction pole | 51 53 54A 57 79 82 |
| 377 | straight flat teeth | 51 81 82 84A |
| 378 | one quarter size pole | 51 60 |
| 379 | one quarter size traction pole | 51 |
| 380 | one third size pole | 51 60 |
| 381 | one third size traction pole | 51 |
| 382 | half size pole | 51 60 |
| 383 | half size traction pole | 51 |
| 384 | full size pole | 51 57 60 79 82 |
| 385 | full size traction pole | 51 57 79 82 84A |
| 386 | ground level wider shelf | 52 54 54A 55 57 58 79 82 |
| 387 | shelf insertion hole | 52 52A 52B 54A 54B |
| 388 | wider shelf access opening | 52 54 |
| 389 | upper levels wider shelf | 52 57 58 79 80 81 82 83 84 |
| 390 | upper levels wider shelf sliding base | 52 52A |
| 391 | upper levels wider shelf sliding base rail | 52A |
| 392 | upper levels wider shelf rim | 52 52A |
| 393 | upper levels wider shelf rim rail | 52 52A |
| 394 | upper levels wider shelf slide | 52 52A |
| 395 | ground level longer shelf | 52 54 54B 55 57 58 79 82 |
| 396 | longer shelf access opening | 52 54 86 87 |
| 397 | upper levels longer shelf | 52 57 58 79 80 81 82 83 84 |
| 398 | upper levels longer shelf sliding base | 52 52B 84A 85 86 87 |
| 399 | upper levels longer shelf sliding base rail | 52B |
| 400 | upper levels longer shelf rim | 52 52B 85 86 87 |
| 401 | upper levels longer shelf rim rail | 52 52B |
| 402 | upper levels longer shelf slide | 52 52B 85 86 |
| 403 | improved warehouse being assembled | 53 54 55 56 |
| 404 | cross-track access shaft | 53 54 55 61 79 80 81 82 85 86 87 88 89 |
| 405 | full size container | 55 56 59 60 82 83 84 85 86 87 88 89 |
| 406 | improved two level nine cell warehouse | 57 |
| 407 | improved warehouse structure | 57 58 59 60 |
| 408 | improved six level nine cell warehouse | 58 59 60 61 |
| 409 | half size pallet | 59 60 |
| 410 | third size box | 59 60 |
| 411 | quarter size box | 59 60 |
| 412 | full size pallet | 59 60 61 82 83 84 85 86 87 88 89 |
| 413 | pantographic lift assembly | 62 71 73 75 77 78 |
| 414 | taller pantographic lift platform | 62 71 86 87 |
| 415 | short wheel assembly | 63 71 73 75 77 78 |
| 416 | short wheel driving axle | 63 |
| 417 | vertical sliding gear assembly | 64 75 |
| 418 | vertical sliding gear support rail | 64 75 |
| 419 | vertical sliding gear support rail cut edge | 64 |
| 420 | vertical sliding gear support rail front insertion hole | 64 |
| 421 | vertical sliding gear support rail rear insertion hole | 64 |
| 422 | vertical sliding gear support rail guide slot | 64 75 |
| 423 | vertical sliding gear support rail fixation hole | 64 |
| 424 | vertical sliding gear support | 64 67 75 77 78 |
| 425 | vertical sliding gear support holder | 64 67 |
| 426 | vertical sliding gear support cross bar | 64 67 |
| 427 | vertical sliding gear support front pin | 64 67 75 77 78 |
| 428 | vertical sliding gear support rear pin | 64 67 |
| 429 | vertical sliding gear support gear motor fixation holes | 64 67 |
| 430 | vertical sliding gear support gear axle insertion hole | 64 67 |
| 431 | vertical sliding gear support control rod | 64 67 77 78 |
| 432 | vertical sliding gear support control rod stopper | 64 67 75 77 78 |
| 433 | vertical sliding gear support actuator | 64 67 75 77 78 |
| 434 | vertical sliding gear support actuator central hole | 64 67 |
| 435 | vertical sliding gear support actuator front pin | 64 67 |

-continued

DRAWINGS - REFERENCE NUMERALS

| N | Item Name | Shown in Figures |
|---|---|---|
| 436 | vertical sliding gear support actuator rear pin | 64 67 |
| 437 | hollow gear drive motor | 64 65 67 73 75 77 78 |
| 438 | hollow gear drive motor fixation holes | 64 65 67 |
| 439 | hollow gear drive motor main axis | 64 65 67 |
| 440 | hollow flat gear | 64 75 81 82 84A |
| 441 | hollow flat gear outer shaft | 64 |
| 442 | hollow flat gear inner shaft | 64 |
| 443 | hollow flat gear cavity | 64 |
| 444 | hollow flat gear straight teeth | 64 |
| 445 | horizontal sliding gear assembly | 65 |
| 446 | horizontal sliding gear support rail | 65 77 78 |
| 447 | horizontal sliding gear support rail front insertion hole | 65 |
| 448 | horizontal sliding gear support rail rear insertion hole | 65 |
| 449 | horizontal sliding gear support rail guide slot | 65 77 78 |
| 450 | horizontal sliding gear support rail fixation hole | 65 |
| 451 | horizontal sliding gear support | 65 |
| 452 | horizontal sliding gear support holder | 65 |
| 453 | horizontal sliding gear support front pin | 65 78 |
| 454 | horizontal sliding gear support rear pin | 65 77 |
| 455 | horizontal sliding gear support motor fixation holes | 65 |
| 456 | horizontal sliding gear support gear axle insertion hole | 65 |
| 457 | horizontal sliding gear support control rod | 65 77 78 |
| 458 | horizontal sliding gear support control rod stopper | 65 77 78 |
| 459 | horizontal sliding gear support actuator | 65 77 78 |
| 460 | horizontal sliding gear support actuator hollow shaft | 65 |
| 461 | horizontal sliding gear support actuator front pin | 65 |
| 462 | horizontal sliding gear support actuator rear pin | 65 |
| 463 | hollow tapered gear | 65 65A 67 73 77 78 |
| 464 | hollow tapered gear outer shaft | 65 67 |
| 465 | hollow tapered gear inner shaft | 65 67 |
| 466 | hollow tapered gear cavity | 65 67 |
| 467 | vertical pivoting gear assembly | 66 77 78 |
| 468 | pivoting support plate | 66 77 78 |
| 469 | pivoting support plate center hole | 66 |
| 470 | pivoting support plate center hole holder | 66 |
| 471 | pivoting support plate angle guide slot | 66 77 78 |
| 472 | pivoting support plate angle guide slot holder | 66 |
| 473 | pivoting support plate bevel gear | 66 77 78 |
| 474 | pivoting support plate front insertion hole | 66 |
| 475 | pivoting support plate rear insertion hole | 66 |
| 476 | pivoting support plate guide slot | 66 |
| 477 | angle control bevel | 66 77 78 |
| 478 | angle control bevel center hole | 66 |
| 479 | angle control motor | 66 77 78 |
| 480 | angle control motor shaft | 66 |
| 481 | mirrored vertical sliding gear pivoting support rail | 66 77 78 |
| 482 | fixed gear assembly | 67 |
| 483 | fixed hollow gear drive motor support | 67 73 |
| 484 | fixed hollow gear drive motor support fixation holes | 67 |
| 485 | fixed hollow gear drive motor support motor fixation holes | 67 |
| 486 | fixed hollow gear support | 67 73 |
| 487 | fixed hollow gear support fixation holes | 67 |
| 488 | fixed hollow gear support gear shaft insertion hole | 67 |
| 489 | roller positioning assembly | 68 75 77 78 |
| 490 | roller positioning motor | 68 75 |
| 491 | roller positioning motor center hole | 68 |
| 492 | roller positioning screw | 68 75 |
| 493 | roller positioning screw shaft | 68 |
| 494 | roller positioning device | 68 75 |
| 495 | roller positioning device arm | 68 |
| 496 | roller positioning device arm slot | 68 |
| 497 | roller positioning device nut | 68 |
| 498 | roller positioning motor support | 68 84A |
| 499 | roller positioning motor support base | 68 |
| 500 | roller positioning motor support hole | 68 |
| 501 | roller positioning motor support base guide pin | 68 |
| 502 | roller positioning motor support arm | 68 |
| 503 | roller positioning motor support arm guide pin | 68 |
| 504 | roller positioning motor support motor fixation hole | 68 |
| 505 | roller positioning driving motor | 68 84A |
| 506 | roller positioning driving motor shaft | 68 |

-continued

| DRAWINGS - REFERENCE NUMERALS | | |
| --- | --- | --- |
| N | Item Name | Shown in Figures |
| 507 | roller | 68 84A |
| 508 | roller center hole | 68 |
| 509 | robot lid | 69 71 73 75 77 78 |
| 510 | lid top | 69 |
| 511 | lid corner cut | 69 |
| 512 | lid central opening | 69 |
| 513 | lid long wall | 69 |
| 514 | lid short wall | 69 |
| 515 | standard robot case | 70 71 |
| 516 | robot case top | 70 72 74 76 |
| 517 | robot case lid opening | 70 72 74 76 |
| 518 | pantographic lift base long support | 70 72 74 76 |
| 519 | pantographic lift base long support slot | 70 72 74 76 |
| 520 | pantographic lift base short support | 70 72 74 76 |
| 521 | pantographic lift base short support hole | 70 72 74 76 |
| 522 | pantographic lift base motor fixation hole | 70 72 74 76 |
| 523 | robot case base wheel opening | 70 72 74 76 |
| 524 | wheel directional gear support | 70 72 74 76 |
| 525 | wheel directional gear support center hole | 70 72 74 76 |
| 526 | wheel driving motor support | 70 72 74 76 |
| 527 | wheel directional motor support | 70 72 74 76 |
| 528 | standard robot | 71 |
| 529 | rack climbing robot case | 72 73 |
| 530 | vertical gear opening | 72 76 78 |
| 531 | horizontal gear opening | 72 76 |
| 532 | fixed support fixation holes | 72 |
| 533 | rack climbing robot | 73 |
| 534 | warehouse climbing robot case | 74 |
| 535 | robot case corner opening | 74 76 77 |
| 536 | robot case vertical sliding gear support rail bottom fixation holes | 74 76 |
| 537 | robot case vertical sliding gear support rail top fixation holes | 74 76 |
| 538 | roller assembly opening | 74 76 |
| 539 | roller assembly support A | 74 76 |
| 540 | roller assembly support A slot | 74 76 |
| 541 | roller assembly support A cut | 74 76 |
| 542 | roller assembly support B | 74 76 |
| 543 | roller assembly support B slot | 74 76 |
| 544 | roller assembly support B motor support | 74 76 |
| 545 | warehouse climbing robot | 75 79 80 81 82 83 84 84A 85 86 87 88 89 |
| 546 | dual climbing robot case | 76 77 78 |
| 547 | bottom central pivot | 76 |
| 548 | bottom central knob | 76 |
| 549 | bottom angle control pin | 76 |
| 550 | bottom angle control knob | 76 |
| 551 | top central pivot | 76 |
| 552 | top central knob | 76 |
| 553 | top angle control pin | 76 |
| 554 | top angle control knob | 76 |
| 555 | angle control motor fixation holes | 76 |
| 556 | robot case horizontal sliding gear support rail bottom fixation holes | 76 |
| 557 | robot case horizontal sliding gear support rail top fixation holes | 76 |
| 558 | dual climbing robot | 77 78 |
| 559 | improved two level single cell warehouse | 79 80 81 82 83 84 85 86 87 88 89 |
| 560 | packer station | 90 91 92 |
| 561 | robot lanes | 90 |
| 562 | warehouse access shaft | 90 |
| 563 | shipment access shaft | 90 |
| 564 | packer workstation | 90 91 92 |
| 565 | packer | 90 91 92 |
| 566 | product carrying robot | 90 91 92 |
| 567 | package carrying robot | 90 91 92 |
| 568 | ergonomic rack | 91 92 |
| 569 | packer display | 91 92 |
| 570 | packing materials | 91 92 |
| 571 | package | 91 92 |

What is claimed is:

1. An autonomous mobile lift robot, comprising a plurality of tapered gears, the tapered gears configured to move the autonomous mobile lift robot through a rack lattice;

an actuator assembly configured to extend each of the plurality of tapered gears to engage with teeth of a track and configured to retract to disengage with teeth of a track;

wherein the actuator assembly comprising:

an actuator comprising a hollow shaft and support pins;

at least one support rail having a guide slot;

a gear support configured to support one of each of the plurality of tapered gears, the gear support having guide pins, the guide pins configured to slide along the guide slot;

a control rod affixed to the gear support, the control rod configured to slide through the hollow shaft of the actuator; and wherein the control rod configured to move through the actuator shaft aligning the guide pins within the guide slot thereby controlling the movement of one of each of the plurality of tapered gears to an extended or retracted position.

2. The autonomous mobile lift robot of claim 1, wherein one of each of the plurality of tapered gears are positioned at a corner of the autonomous mobile lift robot.

3. The autonomous mobile lift robot of claim 1, wherein each of the plurality of tapered gears configured to engage flat teeth tracks of an access shaft of a rack lattice to move the autonomous mobile lift robot up and down through the access shaft.

4. The autonomous mobile lift robot of claim 1 comprising:

at least one first gear having tapered teeth, the first gear configured to move the autonomous mobile lift robot in a vertical direction along a rack lattice;

at least one second gear having tapered teeth mounted perpendicularly to the first gear, the second gear configured to move the autonomous mobile lift robot in a horizontal direction along a rack lattice.

5. The autonomous mobile lift robot of claim 1 comprising a pantographic lift, the pantographic lift configured to raise a pallet, package, or other container for transport using the autonomous mobile lift robot and lower a pallet, package, or other container.

6. The autonomous mobile lift robot of claim 1 comprising a roller, the roller configured to move a shelf having shelf slides.

7. The autonomous mobile lift robot of claim 1 comprising a pantographic lift, the pantographic lift configured to raise a pallet for transport using the autonomous mobile lift robot;

a roller configured to move a shelf having shelf slides; and wherein the pantographic lift configured to raise a pallet, package, or other container, the roller configured to slide a shelf supporting the pallet, package, or other container out from under the pallet, package, or other container providing for the removal of the pallet, package, or other container from the shelf for transport of the pallet package, or other container using the autonomous mobile lift robot.

8. The autonomous mobile lift robot of claim 1 comprising wheels configured to move and maneuver the autonomous mobile lift robot in any direction outside of a rack lattice system.

9. The autonomous mobile lift robot of claim 1 comprising electronics to establish connection to one or more digital devices for communication to have the one or more digital devices schedule the operations of the autonomous mobile lift robot using one or more software applications.

10. The autonomous mobile lift robot of claim 1 comprising electronics to establish connection to one or more digital devices for communication to have one or more software applications map the locations for delivery and scheduling the loading of containers, pallets, packages, or other objects on the autonomous mobile lift robot.

11. An autonomous mobile lift robot, comprising:

a pivoting gear assembly configured to rotate one of each of the plurality of tapered gears;

wherein the pivoting gear assembly comprising:

at least one pivoting support plate having a curved bevel support rail;

a bevel gear having an angle control bevel, the angle control bevel configured to engage the curved bevel support rail and rotate the pivoting support plate.

12. The autonomous mobile lift robot of claim 11 wherein the pivoting gear assembly comprising:

the at least one pivoting support plate having a guide slot spanning a 45 degree arch;

a gear support configured to support one of each of the plurality of tapered gears, the gear support having guide pins, the guide pins configured to slide through the guide slot spanning a 45 degree arch; and wherein the rotation of the bevel gear aligns the guide pins in the guide slot spanning a 45 degree arch thereby controlling the rotational movement of one of each of the plurality of tapered gears.

13. An advanced warehouse and logistic system, comprising:

a rack lattice including an access shaft, the access shaft configured to engage a plurality of tapered gears of an autonomous mobile lift robot to provide for the autonomous mobile lift robot to move vertically up and down through the access shaft of the rack lattice; and wherein the rack lattice comprising shelves having slides, the shelf slides configured to be engaged with a roller of an autonomous mobile lift robot to have the autonomous mobile lift robot slide the shelf.

14. The advanced warehouse and logistic system of claim 13 wherein the access shaft comprising tracks positioned across from one another, the tracks configured to support the autonomous mobile lift robot when moving through the access shaft of the rack lattice.

15. The advanced warehouse and logistic system of claim 13 wherein the rack lattice comprising a plurality of hinged racks, the hinged racks configured to support horizontal and/or vertical movement of an autonomous mobile lift robot having a plurality of first gears positioned perpendicularly to a plurality of second gears, the plurality of first gears configured to move the autonomous mobile lift robot through the rack lattice in a vertical direction and the plurality of second gears configured to move the autonomous mobile lift robot through the rack lattice in a horizontal direction.

16. The advanced warehouse and logistic system of claim 15 wherein the rack lattice comprising an internal lock fixture configured to lock the hinged rack in a first position to set the geometry of the rack lattice for movement of the autonomous mobile lift robot in a first direction;

an external lock fixture configured to lock the hinged rack in a second position to set the geometry of the rack lattice for movement of the autonomous mobile lift robot in a second direction; and a lock bar configured to set the hinged rack in either the first position or the second position.

* * * * *